(12) United States Patent
Morell et al.

(10) Patent No.: US 10,698,950 B2
(45) Date of Patent: Jun. 30, 2020

(54) SYSTEMS AND METHODS FOR CREATING CUSTOMIZED VOCAL ENSEMBLE ARRANGEMENTS

(71) Applicant: NiceChart, Inc., San Diego, CA (US)

(72) Inventors: Steve Morell, San Diego, CA (US); Tammy Morell, San Diego, CA (US)

(73) Assignee: NiceChart, Inc., San Diego, CA (US)

( * ) Notice: Subject to any disclaimer, the term of this patent is extended or adjusted under 35 U.S.C. 154(b) by 334 days.

(21) Appl. No.: 15/910,787

(22) Filed: Mar. 2, 2018

(65) Prior Publication Data

US 2018/0253489 A1   Sep. 6, 2018

Related U.S. Application Data

(60) Provisional application No. 62/465,938, filed on Mar. 2, 2017.

(51) Int. Cl.
| | |
|---|---|
| *G06F 16/683* | (2019.01) |
| *G10G 1/04* | (2006.01) |
| *G06F 16/61* | (2019.01) |
| *G06F 16/635* | (2019.01) |
| *G06F 16/638* | (2019.01) |

(52) U.S. Cl.
CPC .......... *G06F 16/683* (2019.01); *G06F 16/61* (2019.01); *G06F 16/635* (2019.01); *G10G 1/04* (2013.01); *G06F 16/638* (2019.01); *G10H 2210/066* (2013.01); *G10H 2210/081* (2013.01); *G10H 2210/105* (2013.01)

(58) Field of Classification Search
CPC ...... G06F 16/683; G06F 16/61; G06F 16/635; G10G 1/04
USPC .......................................................... 707/734
See application file for complete search history.

(56) References Cited

U.S. PATENT DOCUMENTS

| | | | |
|---|---|---|---|
| 4,876,937 | A | 10/1989 | Suzuki |
| 5,533,903 | A | 7/1996 | Kennedy |
| 5,590,282 | A | 12/1996 | Clynes |
| 5,663,517 | A | 9/1997 | Oppenheim |
| 5,746,605 | A | 5/1998 | Kennedy |
| 6,175,070 | B1 | 1/2001 | Naples et al. |
| 6,211,451 | B1 | 4/2001 | Tohgi et al. |
| 6,287,124 | B1 | 9/2001 | Yamaura et al. |
| 6,348,648 | B1 | 2/2002 | Connick, Jr. |
| 6,635,815 | B2 | 10/2003 | Kosakaya et al. |
| 6,897,367 | B2 | 5/2005 | Leach |
| 7,199,298 | B2 | 4/2007 | Funaki |
| 7,365,262 | B2 | 4/2008 | Hayakawa |
| 7,435,891 | B2 | 10/2008 | Perla |
| 7,977,560 | B2 | 7/2011 | Marcus |
| 7,985,912 | B2 | 7/2011 | Copperwhite et al. |
| 7,989,689 | B2 | 8/2011 | Sitrick et al. |
| 8,058,544 | B2 | 11/2011 | Hoeberechts et al. |

(Continued)

*Primary Examiner* — Dung K Chau
(74) *Attorney, Agent, or Firm* — The Salerno Law Firm, P.C.

(57) ABSTRACT

Systems and methods for creating customized vocal ensemble arrangements are provided herein. A user can specify a musical selection and provide information about an ensemble, such as the number of vocalists, vocal range, gender, and display preferences into the system. The system generates a conductor's score and individual vocalist scores that have been customized for each member of the ensemble to match their individual vocal range and tailored to balance the entire ensemble.

20 Claims, 162 Drawing Sheets

(56) References Cited

U.S. PATENT DOCUMENTS

| | | |
|---|---|---|
| 8,106,281 B2 | 1/2012 | Minamitaka |
| 8,273,976 B1 | 9/2012 | Dalby |
| 8,552,281 B1 | 10/2013 | Cotrone |
| 8,859,875 B2 | 10/2014 | Daniels |
| 8,955,021 B1* | 2/2015 | Treder ............ H04N 21/47217 725/93 |
| 9,113,128 B1* | 8/2015 | Aliverti .................... H04N 9/79 |
| 9,165,543 B1 | 10/2015 | Vorobyev |
| 9,202,448 B2 | 12/2015 | Morell et al. |
| 9,489,932 B2 | 11/2016 | Morell et al. |
| 9,767,705 B1 | 9/2017 | Klapuri et al. |
| 2002/0165921 A1 | 11/2002 | Sapieyevski |
| 2003/0036046 A1 | 2/2003 | Smolover |
| 2003/0094093 A1 | 5/2003 | Smith et al. |
| 2003/0110926 A1* | 6/2003 | Sitrick ................ G09B 15/023 84/477 R |
| 2005/0016368 A1 | 1/2005 | Perla |
| 2006/0150804 A1 | 7/2006 | Hiratsuka |
| 2007/0137463 A1 | 6/2007 | Lumsden |
| 2009/0258700 A1* | 10/2009 | Bright .................... A63F 13/10 463/31 |
| 2009/0300480 A1* | 12/2009 | Cohen ................. G11B 27/034 715/234 |
| 2010/0211200 A1* | 8/2010 | Kobayashi ............ G06T 13/205 700/94 |
| 2010/0303261 A1* | 12/2010 | Stieler von Heydekampf ............ H04H 60/04 381/119 |
| 2011/0041059 A1* | 2/2011 | Amarasingham .... G11B 27/034 715/716 |
| 2012/0014673 A1* | 1/2012 | O'Dwyer .............. G06F 3/0346 386/282 |
| 2014/0254831 A1* | 9/2014 | Patton ..................... H03G 3/20 381/107 |
| 2014/0280589 A1* | 9/2014 | Atkinson ............. H04L 65/403 709/204 |
| 2015/0070516 A1* | 3/2015 | Shoemake ....... H04N 21/42203 348/207.11 |
| 2016/0012853 A1* | 1/2016 | Cabanilla ................ H04W 4/21 386/241 |
| 2016/0253915 A1 | 9/2016 | Lee et al. |
| 2018/0144729 A1 | 5/2018 | Morell et al. |

* cited by examiner

SYSTEMS AND METHODS FOR CREATING CUSTOMIZED VOCAL ENSEMBLE ARRANGEMENTS

CROSS-REFERENCE TO RELATED APPLICATION

This application claims the benefit of and priority to U.S. Provisional Application Ser. No. 62/465,938 entitled "SYSTEMS AND METHODS FOR CREATING CUSTOMIZED VOCAL ENSEMBLE ARRANGEMENTS" and filed Mar. 2, 2017, the entirety of which is hereby incorporated by reference herein for all purposes.

BACKGROUND

1. Field of the Invention

The present disclosure relates to the arrangement of vocal compositions, and more particularly the automated creation of customized vocal arrangements based upon ensemble size, level, gender makeup, and individual vocalist ranges.

2. Background of Related Art

Vocal ensemble arrangements are fixed documents written for specific age groups, and assumed vocal ranges. For instance, arrangements may be written for SATB (soprano, alto, tenor, bass), SSA (soprano 1, soprano 2, and alto) or SAB (soprano, alto, baritone). Arrangements are prepared based upon the assumption that the ensemble has specific types of vocalists (such as soprano or tenor), has enough vocalists to cover all parts, that the vocalists expected to perform the piece will not have any out-of-range notes presented to them, and that the group is balanced across the different functions (such as soprano or tenor). Generally, the arrangement is selected and/or purchased by a musical arrangement user, such as a vocal music director, conductor, or producer.

In practice, most ensembles do not meet the exact requirements of the arrangement. For example, the ensemble may have vocalists with varying vocal ranges that do not meet the assumed standard vocal ranges. Some vocalists may have vocal ranges that are mid-way between two standard vocal ranges assumed in the arrangement. For example, a mezzo-soprano range will not cover 100% of the assumed range of a soprano or an alto because the mezzo-soprano range is between the soprano and alto ranges. This is also the case with baritones who find themselves between the tenor and bass range. In cases where the ensemble lineup differs from that which is called for by the musical arrangement, the outcome will not be optimal. For instance, if there are thirty sopranos, two altos, fifteen tenors and fifteen basses, the alto part may be too weak to be considered covered. The arrangement will break down and vocalists may be asked to sing out of their vocal range as a solution, which can strain their voices and provide less than desirable results.

Consequently, vocal ensemble arrangement users are typically required to manually revise scores to accommodate the vocalists available and the individual ranges of each vocalist within each overall category they fall into. Users may be required to move vocalists to parts that do not suit their voice or create supplemental parts for vocalists whose range does not fall into any standard vocal range. Parts for unavailable vocal categories may be given to less optimal substitute vocalists, and may require rewriting to accommodate the characteristics (such as vocal function, range, and gender) of the substitute vocalist. This process requires a high degree of skill, can be time consuming, and may frustrate the user who, after making an investment in purchasing an arrangement, finds that additional resources are needed to make it suitable for use. In some cases, ensemble users may simply lack the skills to rewrite the fixed musical arrangement, therefore they are limited in their options and often end up with less than optimal results.

SUMMARY

Systems and methods are provided for creating customized vocal ensemble arrangements by receiving ensemble information, assessing the ensemble information based on a plurality of factors, and selecting customized arrangements for each member of the ensemble based on the ensemble information. The ensemble information may include a number of vocalists in the ensemble, the range of each vocalist in the ensemble, and the level of the ensemble performing the piece. The user may select a musical selection, enter the ensemble information into the system or load a previously used ensemble, and then receive a customized arrangement of the selection for each ensemble member without requiring any additional arrangement or processing by the user.

Accordingly, several advantages are provided, including the ability for users to specify the number of vocalists in the ensemble, each vocalist's range, the gender and age level of each vocalist, and the derived function of the vocalists available based on the vocalist's range. The system will determine parts (solo, soprano, alto, tenor, baritone, or bass) and rearrange the parts accordingly based upon on the user's ensemble specifications. The preloaded files may include different subparts (such as tenor 1/tenor 2). The alternate versions may be used when balance issues exist, for example, when an ensemble has 4 sopranos and 2 altos. In this example, an SSA arrangement with soprano 1, soprano 2, and alto parts would be an ideal way to evenly spread out vocalists. These parts are an example of the ideal range and shape of the part, but can be manipulated later to allow for key changes and changes required due to the part's range. Individual parts, preloaded into the system and selected through the processes, may be used to create the score that each vocalist will sing. In embodiments, systems in accordance with the present disclosure can account for small ensembles and large ensembles with or without solo parts.

Each arrangement may include several main categories of arrangements of which several sub-arrangements may exist. For example SATB, can have a subset available of SAATB (e.g., soprano, alto 1, alto 2, tenor, and baritone).

In one aspect, embodiments of the present disclosure are directed to a method of generating a musical score for an ensemble of vocalists, each having a range of at least one octave. The method includes storing, in a database, alternative arrangements of a musical score that are each suited for an ensemble having a predetermined characteristic; retrieving, from the database, one of the alternative arrangements based upon the predetermined characteristic of the ensemble of instruments; and assigning members of the ensemble to a part of the retrieved arrangement in accordance with the vocalists' range, gender, and estimated age.

In embodiments, the predetermined characteristic includes an aggregate proficiency which may be characterized as elementary school level (EL), Middle School (MS), or high school level (HS). In embodiments, the predetermined characteristic includes an arrangement type such as soprano, alto, tenor, bass (SATB), soprano 1, soprano 2, alto (SSA), or soprano, alto, baritone (SAB).

In embodiments, the disclosed method includes retrieving, from the database, a different one of the alternative arrangements in response to a determination of the number of available parts. In embodiments, the method includes characterizing the number of parts to be retrieved for the arrangement for a solo, soprano, alto, tenor, baritone or bass part. This includes the ability to add an indefinite number of soloists, and whether any soprano, alto, tenor, baritone or bass part has one or two parts within it.

In embodiments, the method includes delivering the generated musical score to a user device. In embodiments, the delivered score may be in Portable Document Format (Adobe® PDF format) or Music XML.

In another aspect, embodiments of the present disclosure perform range correction on a music notation. The selected range of the vocalist and/or range of the part may influence range correction. Examples of range correction processes which may be employed in connection with the present invention are disclosed in U.S. Pat. No. 9,202,448 entitled "SYSTEMS AND METHODS FOR CREATING CUSTOMIZED MUSIC ARRANGEMENTS" and U.S. Pat. No. 9,489,932 entitled "SYSTEMS AND METHODS FOR CREATING CUSTOMIZED MUSIC ARRANGEMENTS," each of which is owned by the assignee of the present application and incorporated by reference herein for all purposes.

In embodiments, the memory further stores executable instructions which, when executed by the processor, cause the processor to retrieve, from the database, a different one of the alternative arrangements in response to a determination that the number of available parts in the first retrieved arrangement exceeds the number of vocalists in the ensemble having a proficiency exceeding a predetermined proficiency threshold.

In yet another aspect, the present disclosure is directed to a method of customizing a vocal ensemble arrangement. The method includes providing a database storing alternative arrangements of a musical selection, each alternative arrangement having a different set of vocal parts, determining a target arrangement type having the ideal number of vocal parts for the musical selection based on the individual vocal ranges of a selected ensemble of vocalists, querying the database to determine whether a stored alternative arrangement matches the target arrangement type, changing the target arrangement type to a stored arrangement type in accordance with a predetermined substitution rule if no stored alternative arrangement matches the target arrangement type, assigning each vocalist of the ensemble to a vocal part based on the vocal range of the vocalist and the range of the part being assigned, and generating individual scores for each vocal part.

In some embodiments, the assigning further includes determining whether the vocal part being assigned includes at least one variation part, wherein the assigning is further based upon the vocal range of the vocalist and the range of the variation part. In some embodiments, the method includes range-correcting the assigned part in response to a determination that determining whether one or more notes of an assigned part are outside the range of the assigned vocalist, creating a new part from the range-corrected part, and re-assigning the vocalist to the newly created range-corrected part.

In some embodiments, the method includes generating an accompaniment score comprising at least one accompanying instrument part and at least one vocal part, wherein the accompaniment instrument part is selected from the group consisting of a standard notation version, a slash version, and a lead sheet version.

In some embodiments, the method includes determining the ratio of the number of vocalists assigned to a first part to the sum of the number of vocalists assigned to the first part and the number of vocalists assigned to second part that is contiguous to the first part, and if the ratio is less than a predetermined percentage, re-assigning the vocalists from the first part to the second part; and eliminating the first part. The predetermined percentage may be about 25%. Where first part is lower than the second part, the method may include re-assigning a vocalist from first part to the second part if a highest note of the first part corresponds to a highest note of the vocalist's range. Where the first part is higher than the second part, the method may include re-assigning a vocalist from first part to the second part if a lowest note of the first part corresponds to a lowest note of the vocalist's range.

In some embodiments, the method includes determining which key encompasses the greatest number of individual vocalists' ranges, and transposing the arrangement to the determined key. In some embodiments, the individual scores for each vocal part includes the primary vocal part and at least one other representative vocal part of another section of the ensemble.

In still another aspect, the present disclosure is directed to a system for customizing a vocal ensemble arrangement. The system includes a database storing alternative arrangements of a musical selection, each alternative arrangement having a different set of vocal parts, a processor in communication with the database, a memory operatively coupled to the processor and storing executable instructions, which, when executed by the processor, cause the processor to determine a target arrangement type having the ideal number of vocal parts for the musical selection based on the individual vocal ranges of a selected ensemble of vocalists, query the database to determine whether a stored alternative arrangement matches the target arrangement type, change the target arrangement type to a stored arrangement type in accordance with a predetermined substitution rule if no stored alternative arrangement matches the target arrangement type, assign each vocalist of the ensemble to a vocal part based on the vocal range of the vocalist and the range of the part being assigned, generate individual scores for each vocal part.

In some embodiments, the memory further includes instructions which, when executed by the processor, cause the processor to determine whether the vocal part being assigned includes at least one variation part, wherein the assigning is further based upon the vocal range of the vocalist and the range of the variation part.

In some embodiments, the memory further includes instructions which, when executed by the processor, cause the processor to range-correct the assigned part in response to a determination that determining whether one or more notes of an assigned part are outside the range of the assigned vocalist, create a new part from the range-corrected part, and re-assign the vocalist to the newly created range-corrected part.

In some embodiments, the memory further includes instructions which, when executed by the processor, cause the processor to generate an accompaniment score comprising at least one accompanying instrument part and at least one vocal part, wherein the accompaniment instrument part is selected from the group consisting of a standard notation version, a slash version, and a lead sheet version.

In some embodiments, the memory further includes instructions which, when executed by the processor, cause the processor to determine the ratio of the number of vocalists assigned to a first part to the sum of the number of vocalists assigned to the first part and the number of vocalists assigned to second part that is contiguous to the first part, and if the ratio is less than a predetermined percentage, re-assign the vocalists from the first part to the second part, and eliminate the first part. The predetermined percentage may be about 25%.

In some embodiments, the memory further includes instructions which, when executed by the processor, cause the processor to re-assign a vocalist from first part to the second part if a highest note of the first part corresponds to a highest note of the vocalist's range and the first part is lower than the second part. In some embodiments, the memory further includes instructions which, when executed by the processor, cause the processor to re-assign a vocalist from first part to the second part if a lowest note of the first part corresponds to a lowest note of the vocalist's range and the first part is higher than the second part.

In some embodiments, the memory further includes instructions which, when executed by the processor, cause the processor to determine which key encompasses the greatest number of individual vocalists' ranges and transpose the arrangement to the determined key.

In some embodiments, the memory further includes instructions which, when executed by the processor, cause the processor to include a primary vocal part and at least one other representative vocal part of another section of the ensemble in the generated score.

Other features and advantages will become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments.

Figure 1:
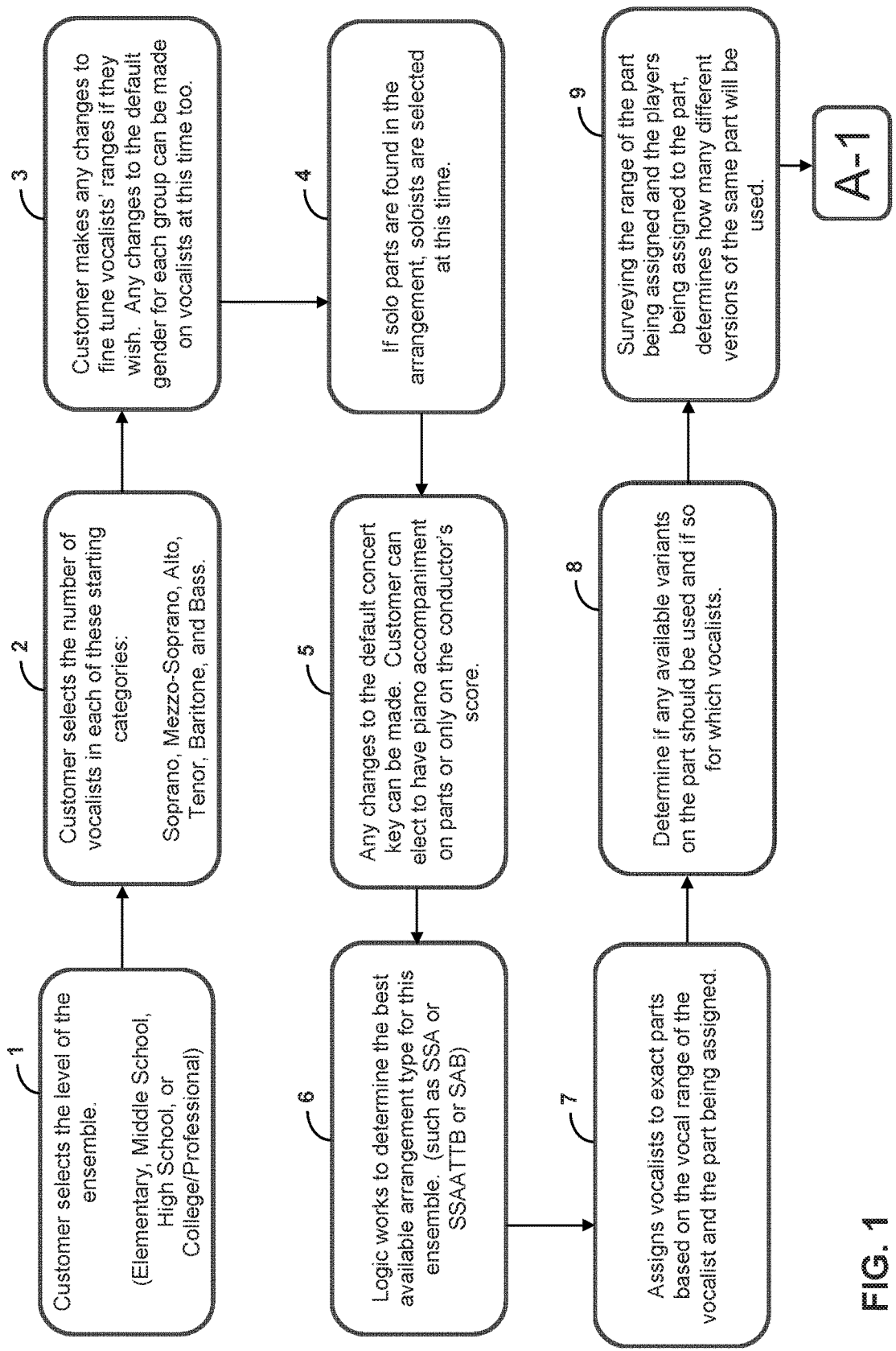
FIGS. 1-2 present an overview of the disclosed vocal customization process.

The various embodiments mentioned above are described in further detail with reference to the aforementioned figures and the following detailed description of exemplary embodiments.

DETAILED DESCRIPTION

Disclosed herein are systems and methods for customizing vocal ensemble arrangements. Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

The present disclosure may be described herein in terms of functional block components, code listings, optional selections, page displays, and various processing steps. It should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting language such as C, C++, C#, Java, Javascript, assembler, PERL, Python, PHP, or the like, with the various algorithms being implemented with any combination of data structures, objects, processes, routines or other programming elements. The object code created may be executed by a device having a processor, and, optionally, a data connection capable of connecting to the Internet, on a variety of operating systems including without limitation Apple OSX®, Apple iOS®, Google Android®, linux, UNIX®, Microsoft Windows®, and so forth.

It should be appreciated that the particular implementations described herein are illustrative of the disclosure and its best mode and are not intended to otherwise limit the scope of the present disclosure in any way. Examples are presented herein which may include sample data items which are intended as examples and are not to be construed as limiting. Indeed, for the sake of brevity, conventional data networking, application development and other functional aspects of the systems (and components of the individual operating components of the systems) may not be described in detail herein. It should be noted that many alternative or additional functional relationships or physical or virtual connections may be present in a practical electronic system or apparatus. In the discussion contained herein, terms referencing user interface elements and/or buttons are understood to be non-limiting, and include other user interface elements such as, without limitation, a hyperlink, clickable image, and the like.

As will be appreciated by one of ordinary skill in the art, the present disclosure may be embodied as a method, a data processing system, a device for data processing, and/or a computer program product. Accordingly, the present disclosure may take the form of an entirely software embodiment, an entirely hardware embodiment, or an embodiment combining aspects of both software and hardware. Furthermore, the present disclosure may take the form of a computer program product on a computer-readable storage medium having computer-readable program code means embodied in the storage medium, a web app, and/or software-as-a-service (SAS). Any suitable computer-readable storage medium may be utilized, including hard disks, CD-ROM, DVD-ROM, optical storage devices, magnetic storage devices, semiconductor storage devices (e.g., flash memory, USB thumb drives) and/or the like.

Computer program instructions embodying the present disclosure may also be stored in a computer-readable memory that can direct a computer or other programmable data processing apparatus to function in a particular manner, such that the instructions stored in the computer-readable memory produce an article of manufacture, including instruction means, that implement the function specified in the description or flowchart block(s). The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the present disclosure.

One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like The steps recited herein may be executed in any order and are not limited to the order presented. Moreover, two or more steps or actions recited herein may be conducted concurrently.

Objectives of the disclosed system are to provide a balanced arrangement as well as give every ensemble member an appropriate part that is well-suited for his or her individual vocal range. Overview operation of the disclosed vocal customization system is illustrated with reference to FIGS. 1 and 2 and with further reference to the corresponding example embodiments depicted in the subsequent figures, as discussed below.

FIG. 1, blocks 1-5 describe the initial user interaction with the system to describe the ensemble characteristics and desired arrangement to the system. At block 1, a user first inputs the title to be performed and level of the ensemble for which the arrangement is intended (elementary, middle school, high school, or college/professional). In block 2, the user inputs the number of performers falling into each of the common vocal ranges (e.g., soprano, mezzo-soprano, alto, tenor, baritone, or bass). The system will then display all vocalists at a preset vocal range based on the level and selected vocal range. In some embodiments, gender defaults are assigned based on typical vocal range. For example, in some embodiments gender will default to female for soprano, mezzo-soprano, and alto parts; and to male for tenor, baritone, and bass parts. At block 3, the user is presented with options to edit the vocal range for each vocalist, name the vocalist, and change the vocalist's gender if necessary.

Figure 99:
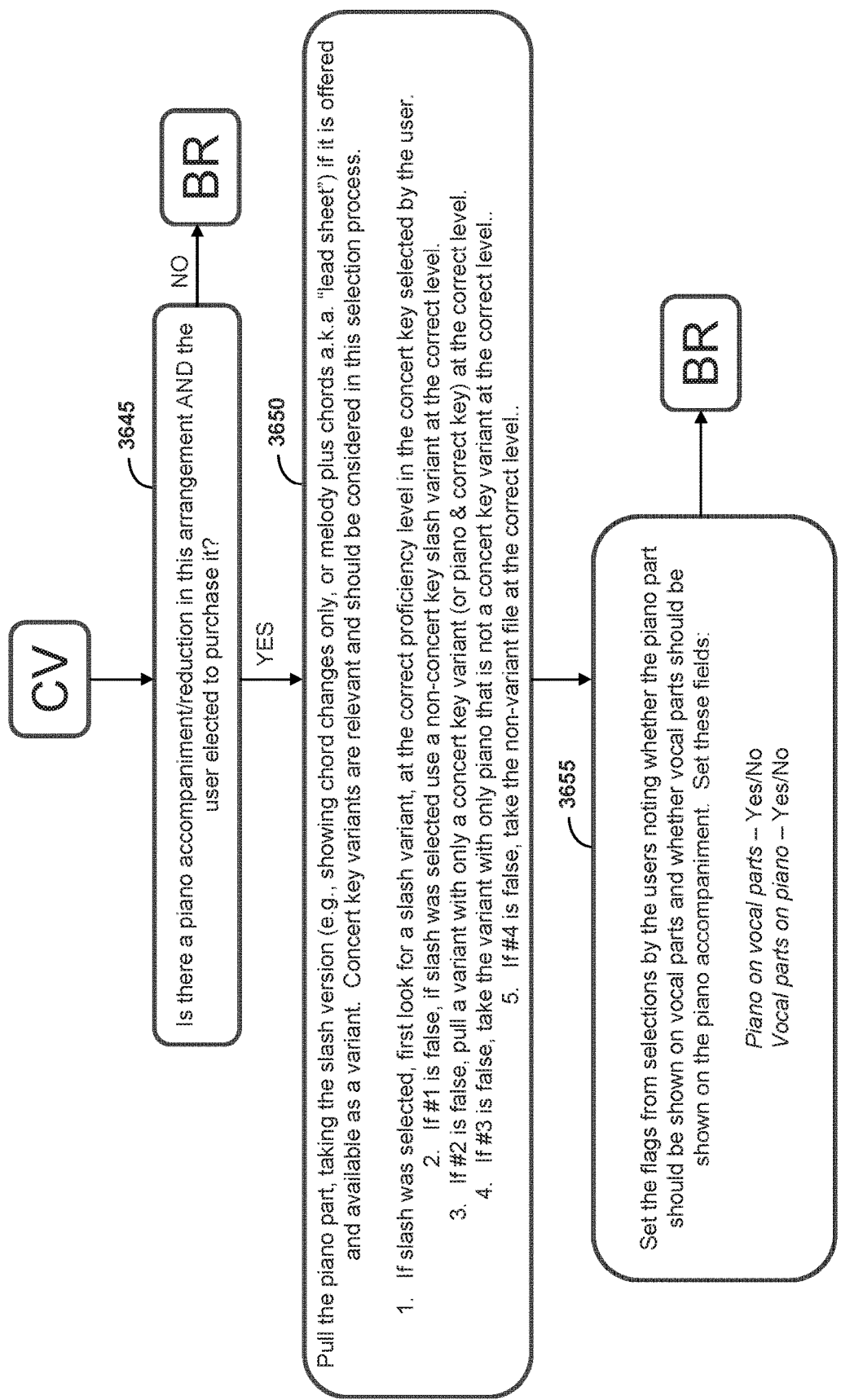
FIG. 99 illustrates further aspects of the disclosure directed to determining part variant assignments.
Figure 100:
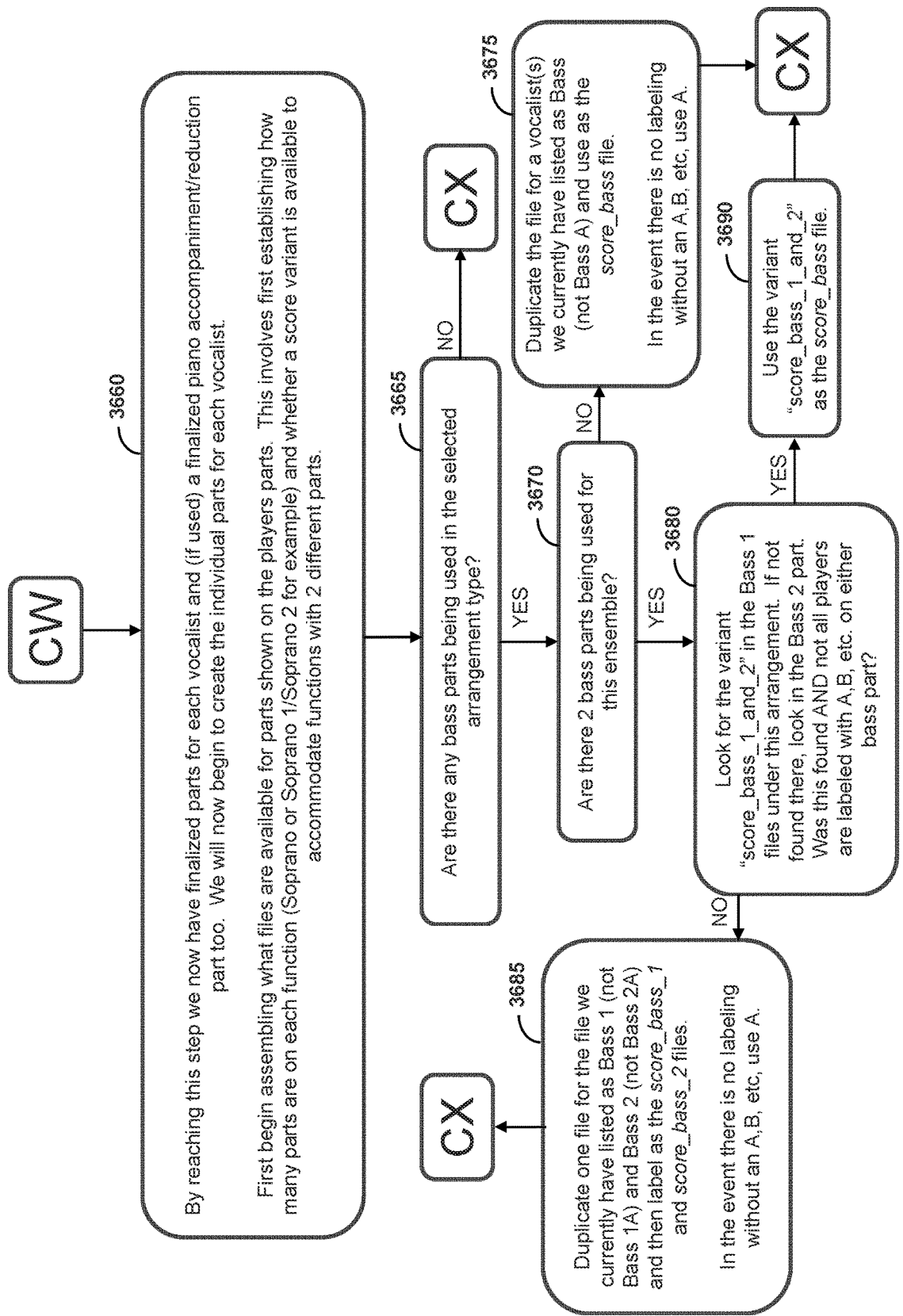
FIGS. 100-108 illustrate aspects of the disclosure directed to the creation of customized musical score that combines individual parts with those of other sections of the ensemble and/or accompanying instruments.
Figure 101:
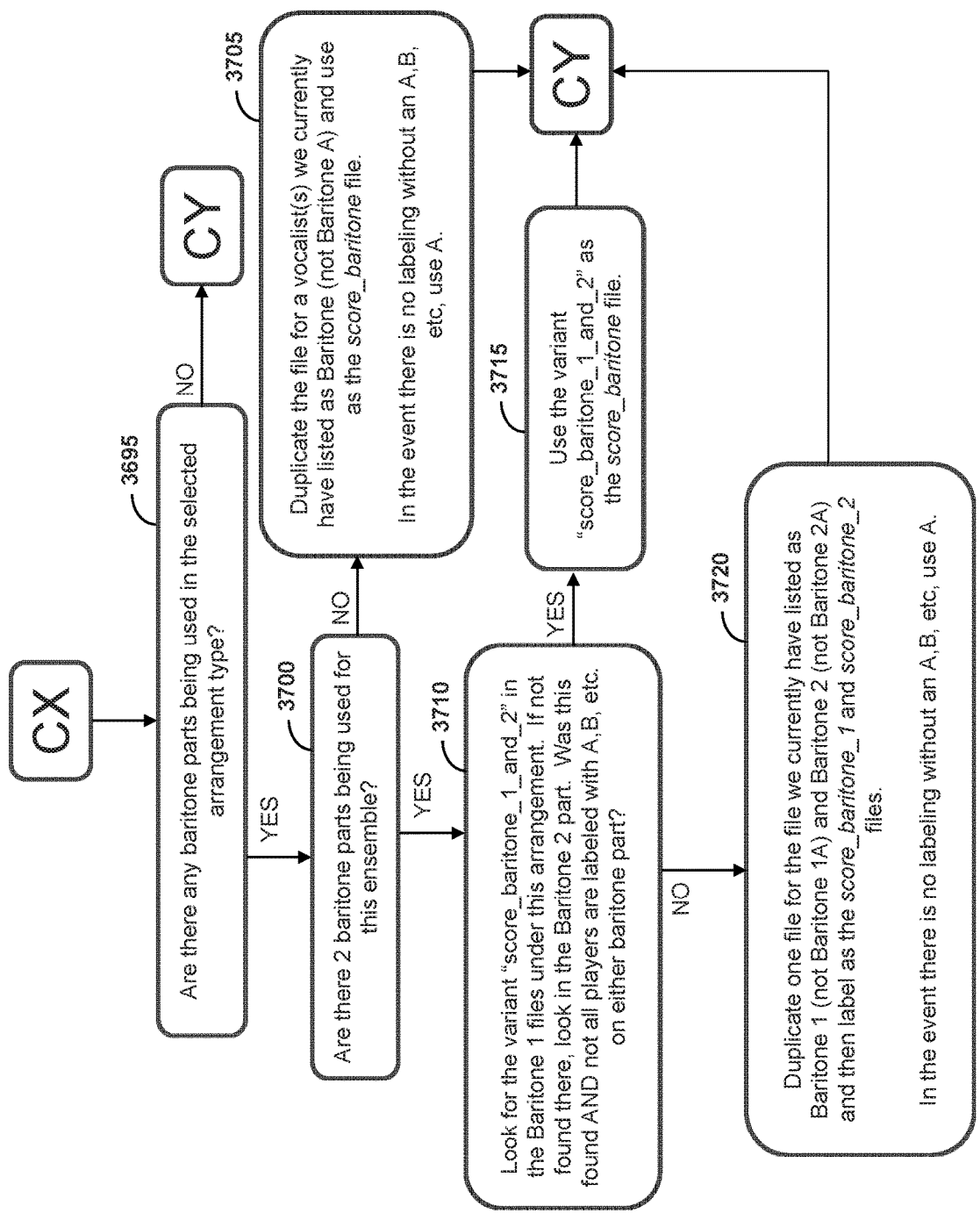
Figure 102:
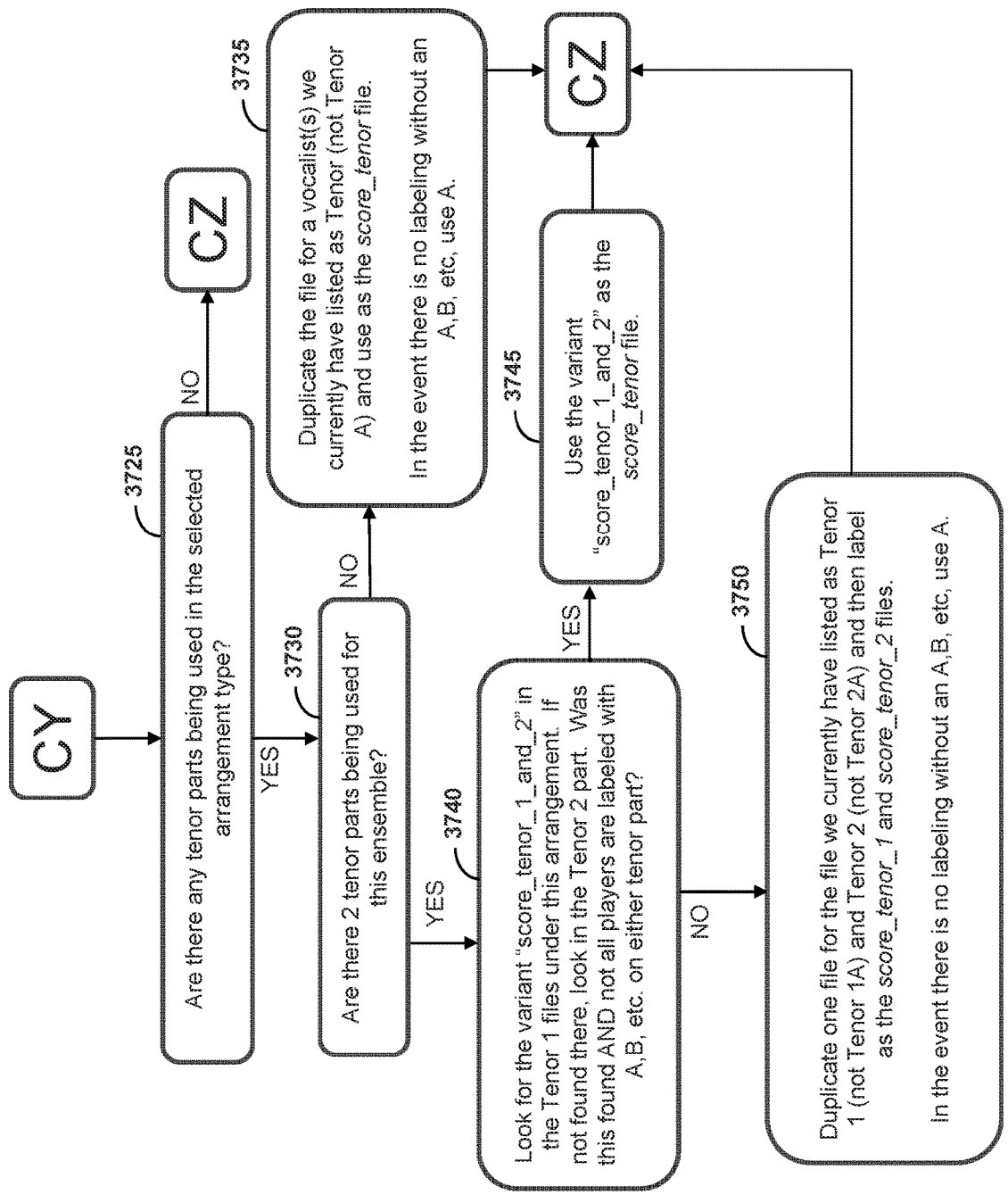
Figure 103:
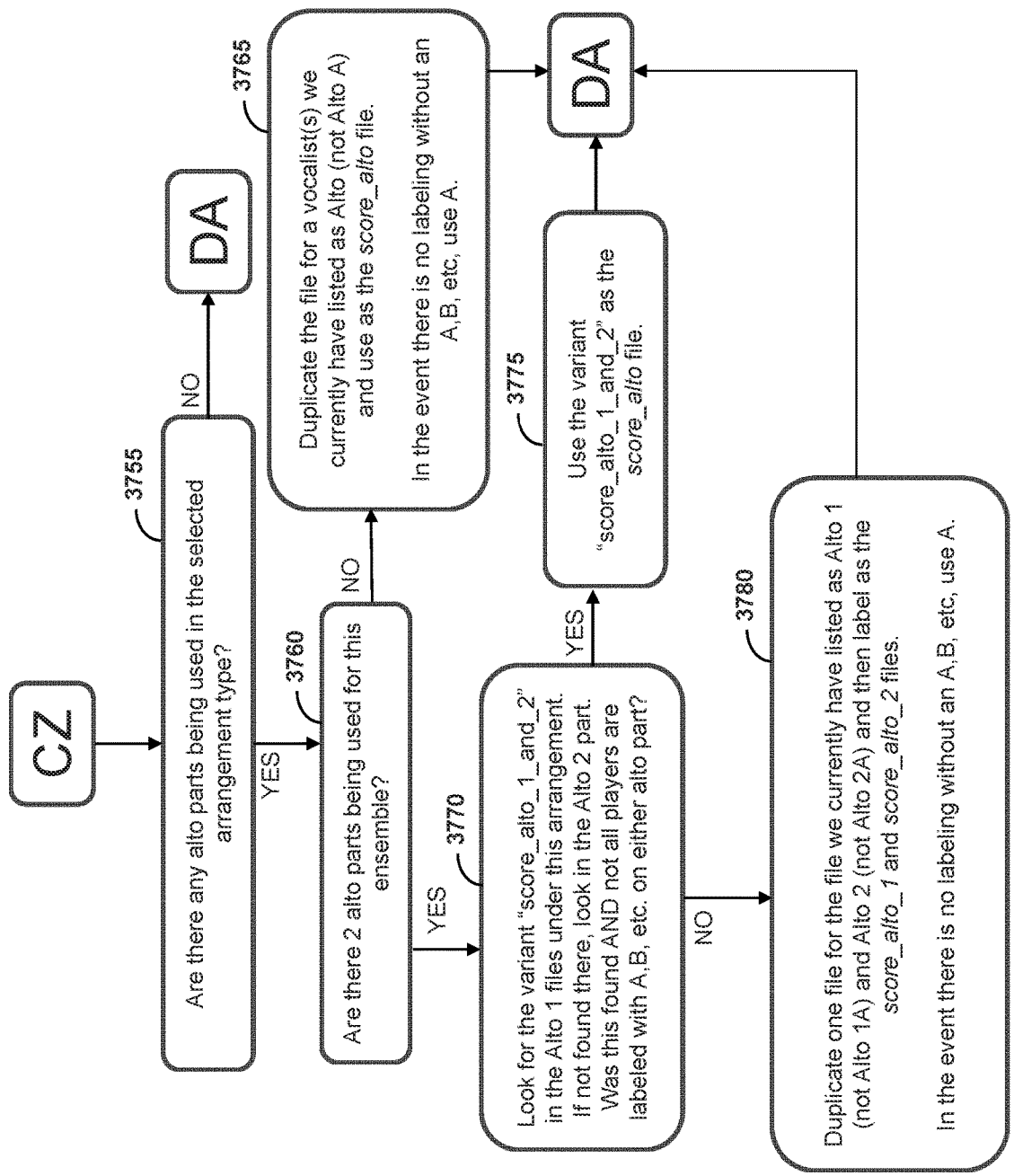
Figure 104:
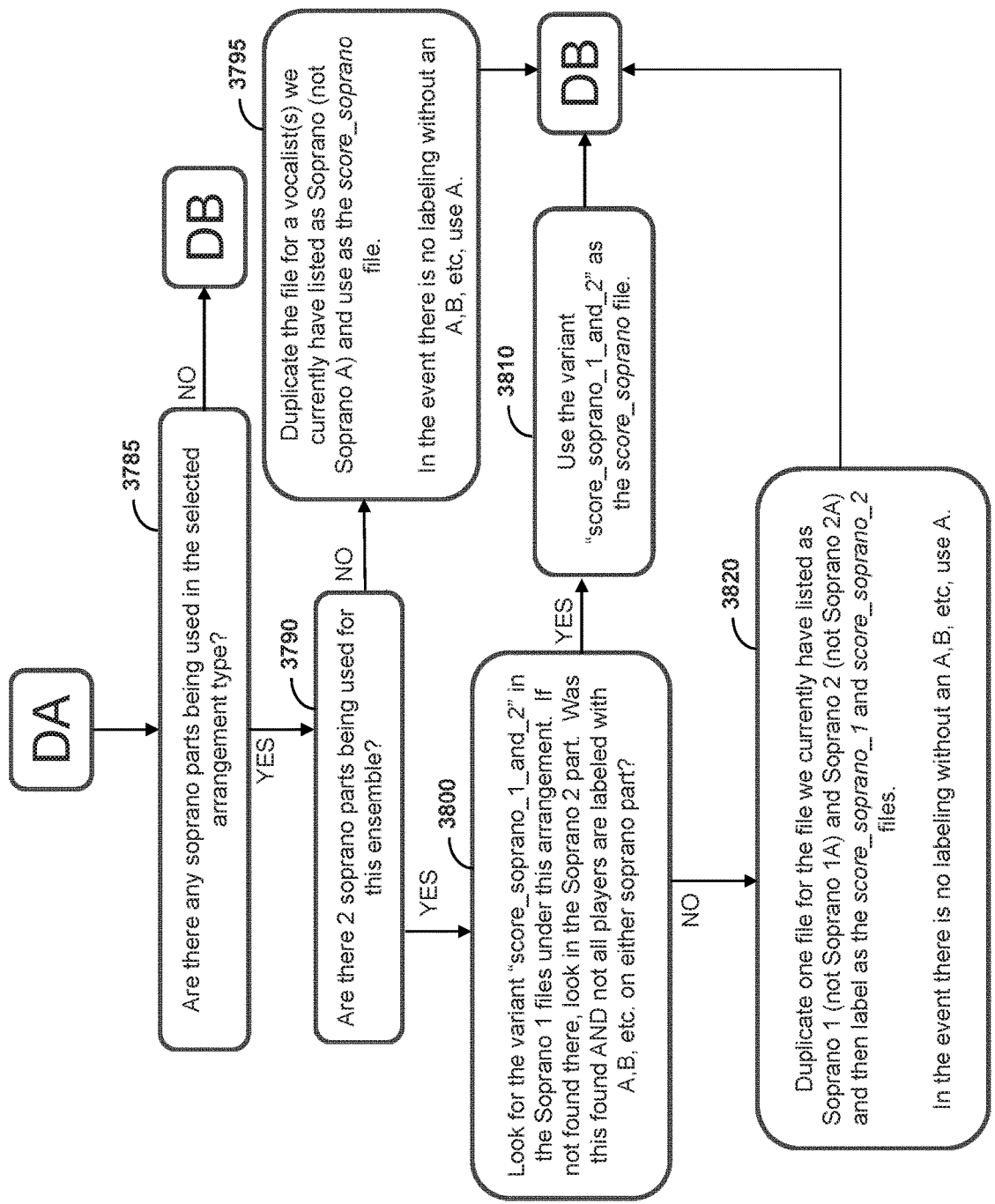
Figure 105:
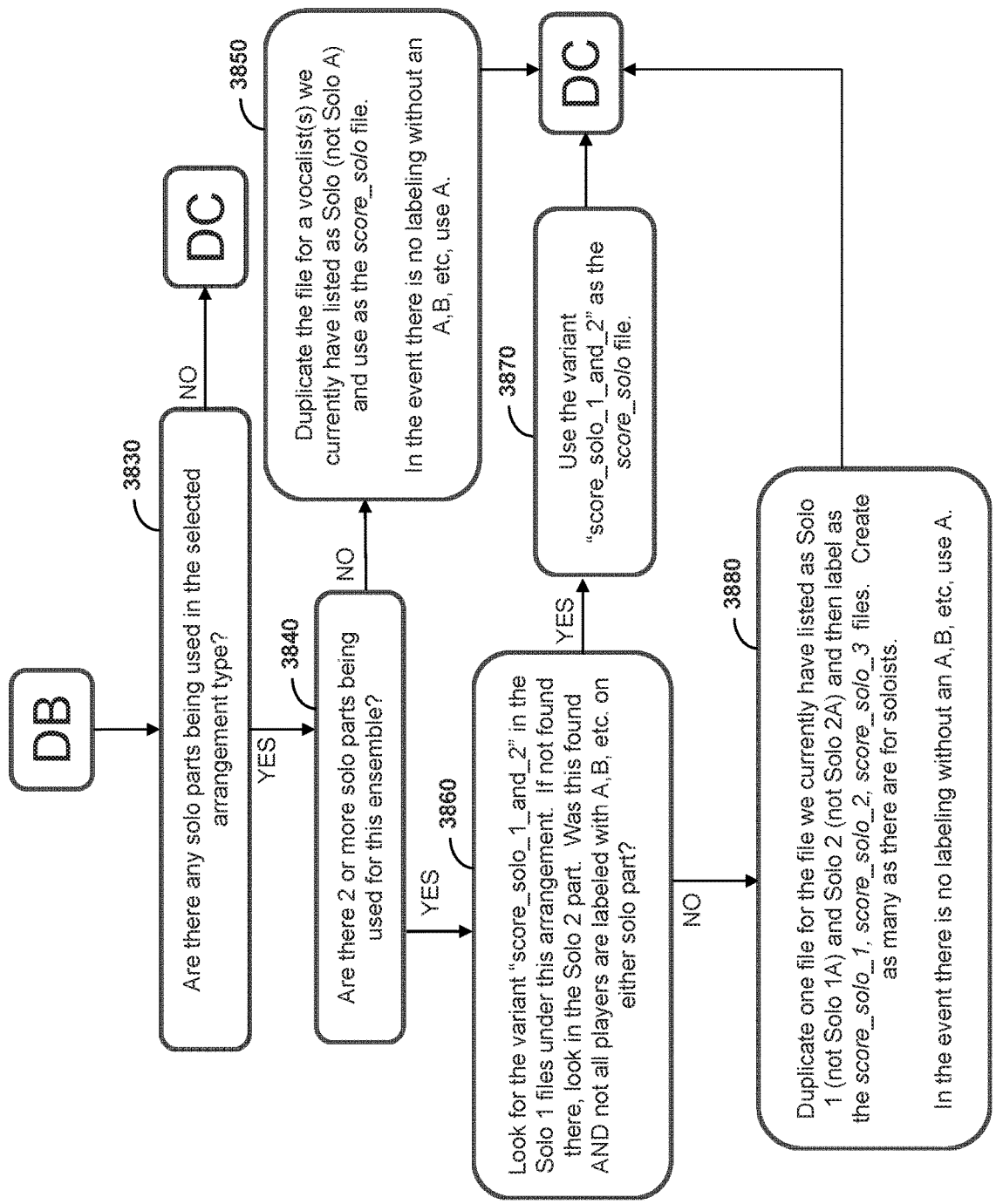
Figure 106:
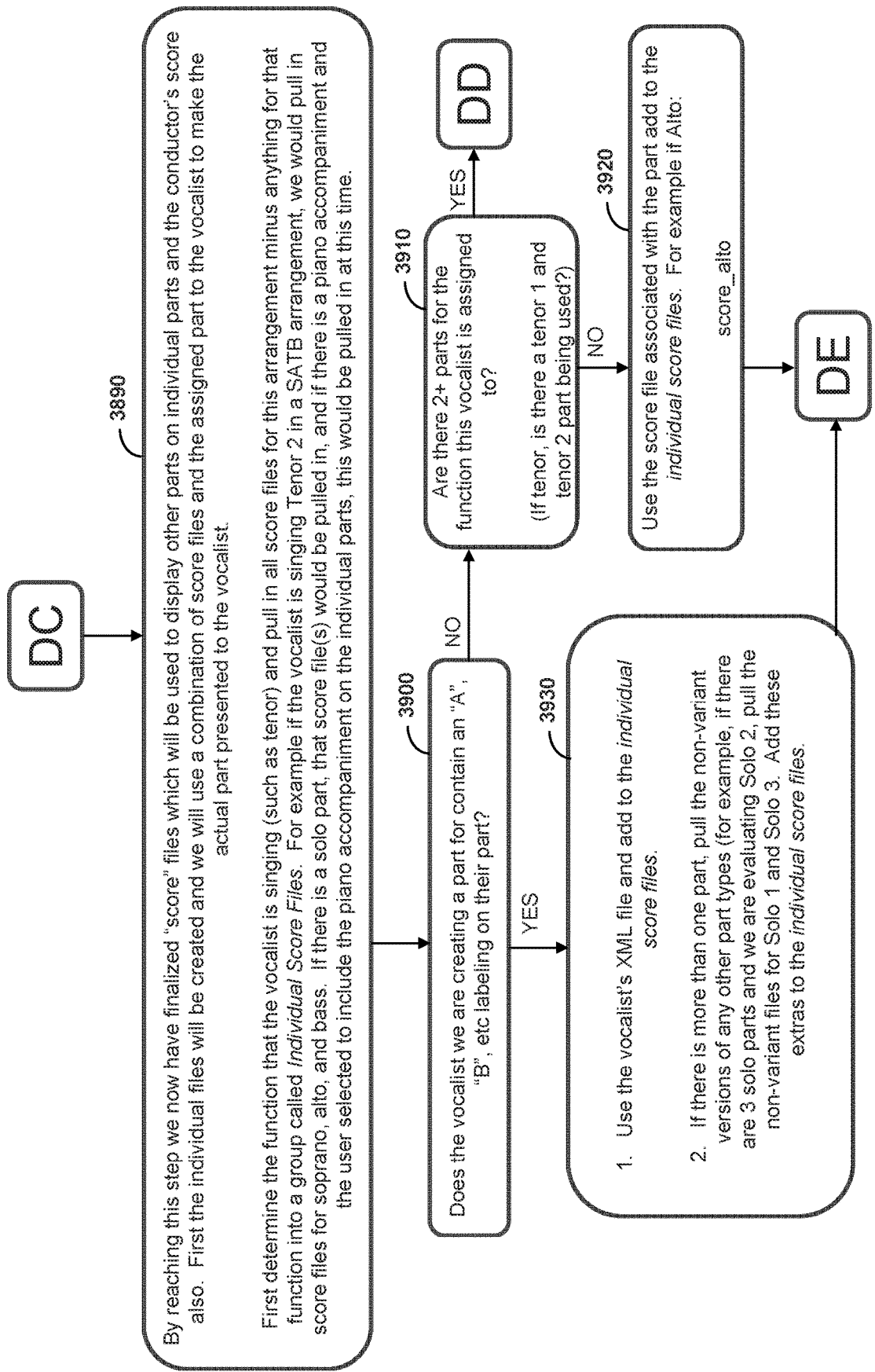
Figure 107:
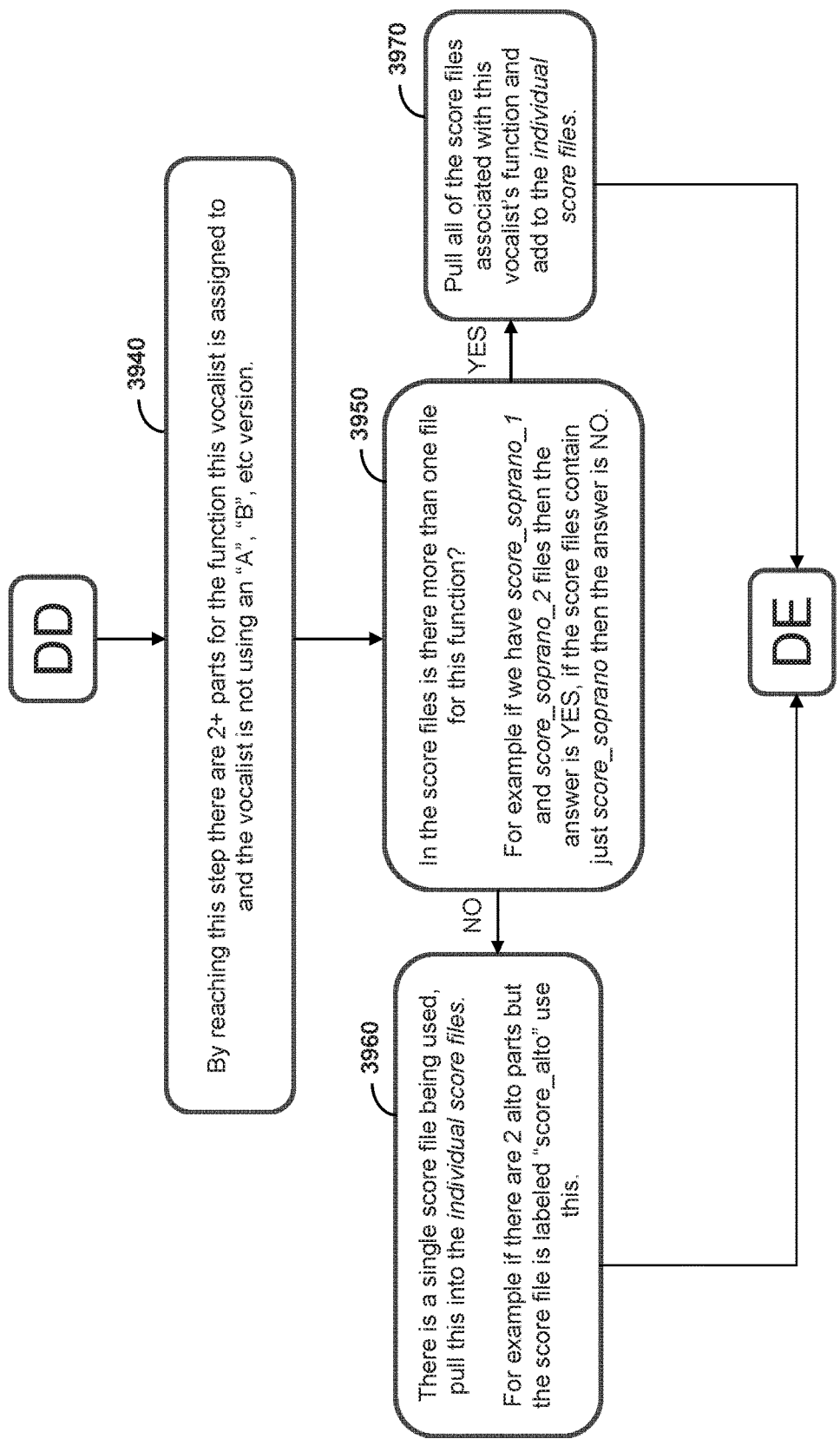
Figure 108:
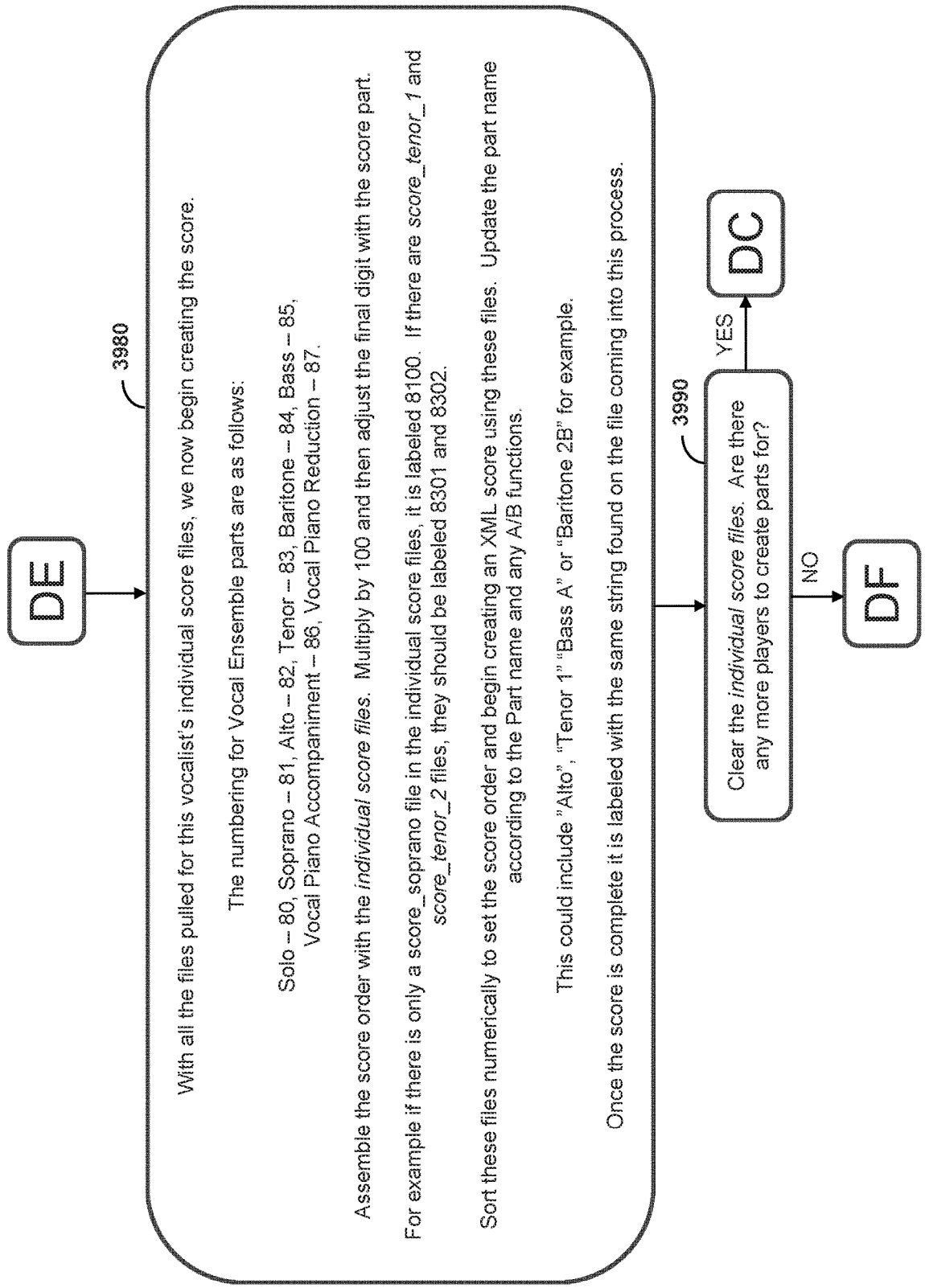
Figure 109:
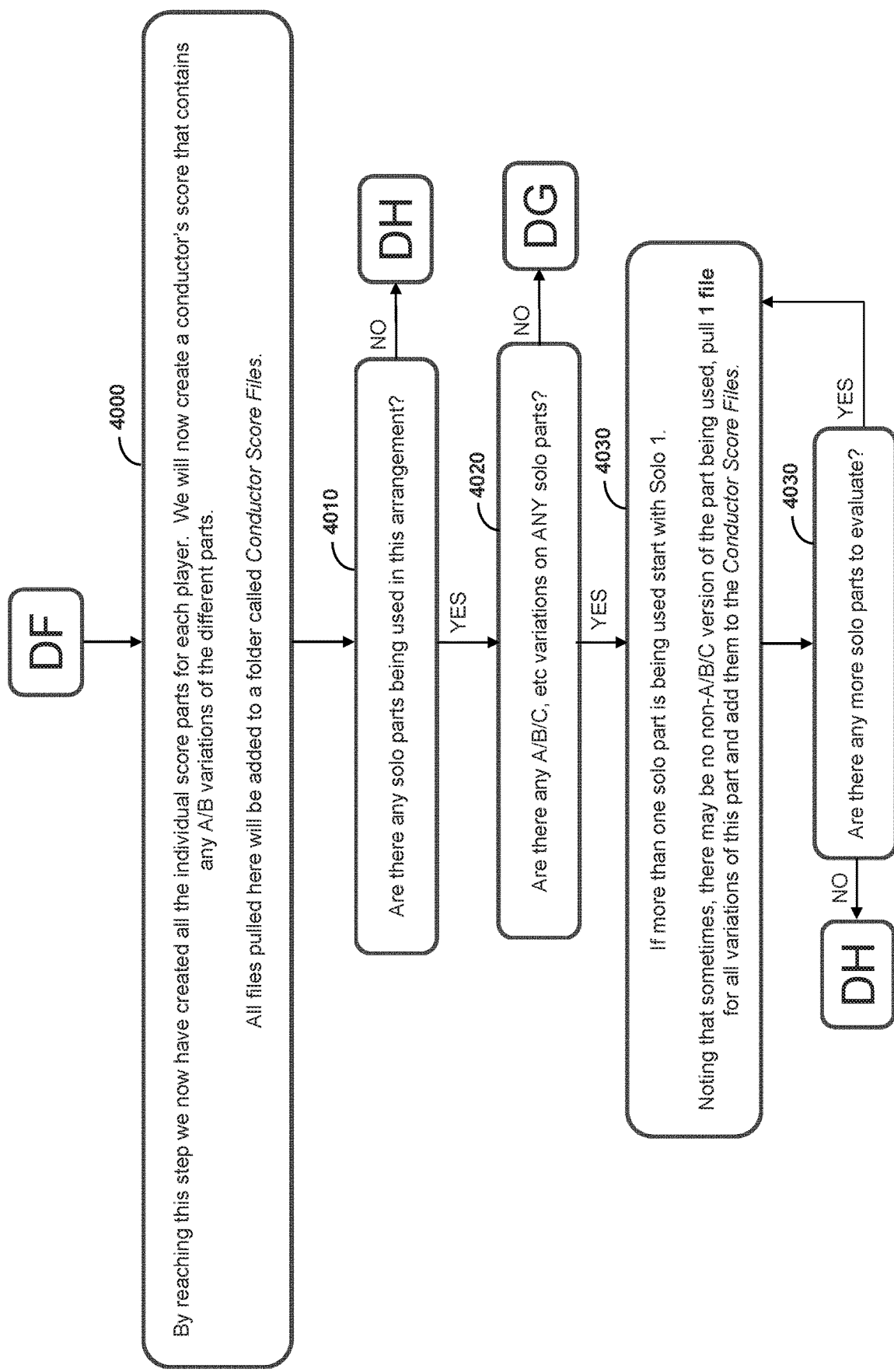
FIGS. 109-121 illustrate aspects of the present disclosure directed to the creation of a conductor's score that includes all variations of all parts and any piano or instrumental accompaniment.
Figure 110:
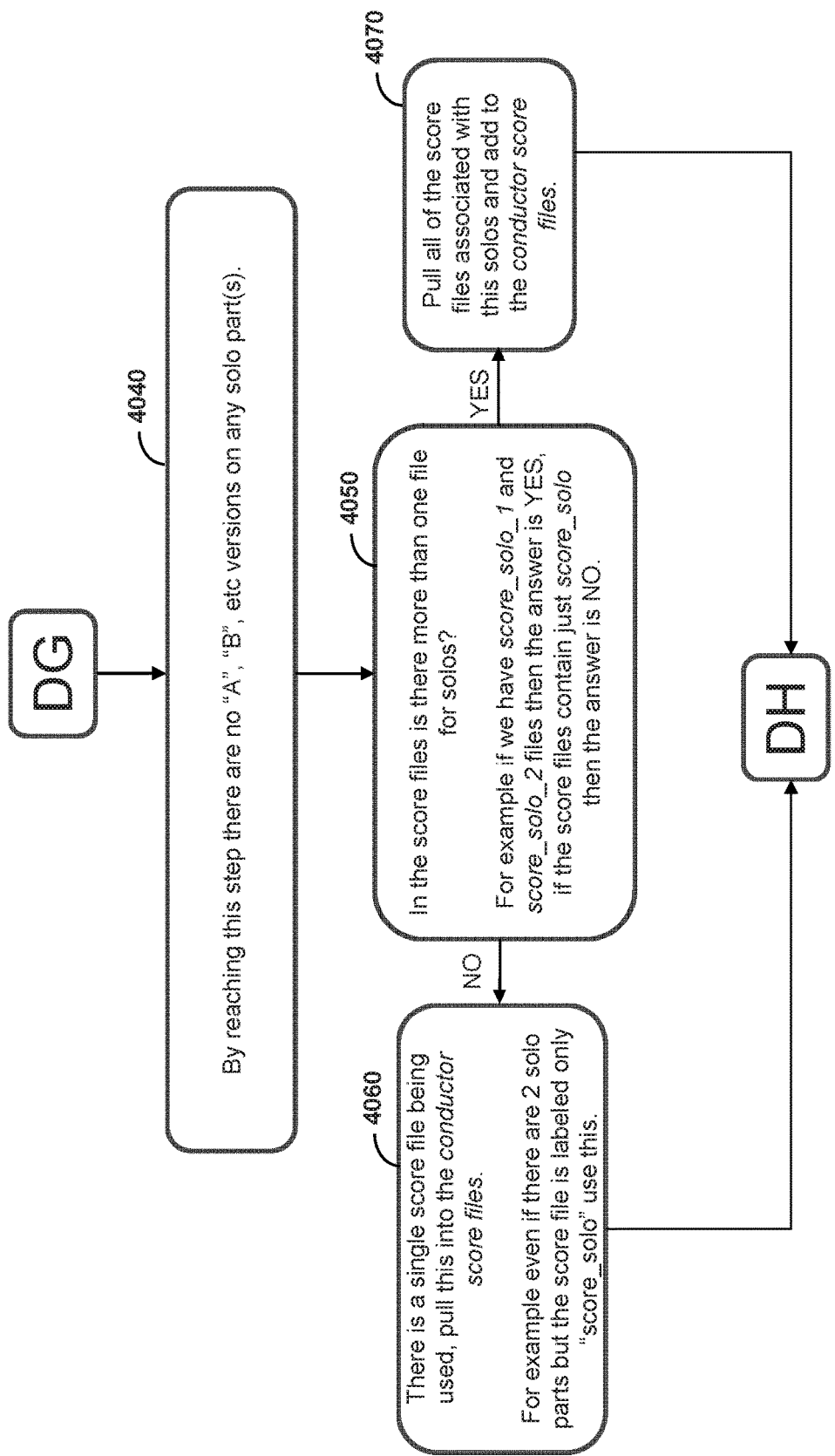
Figure 111:
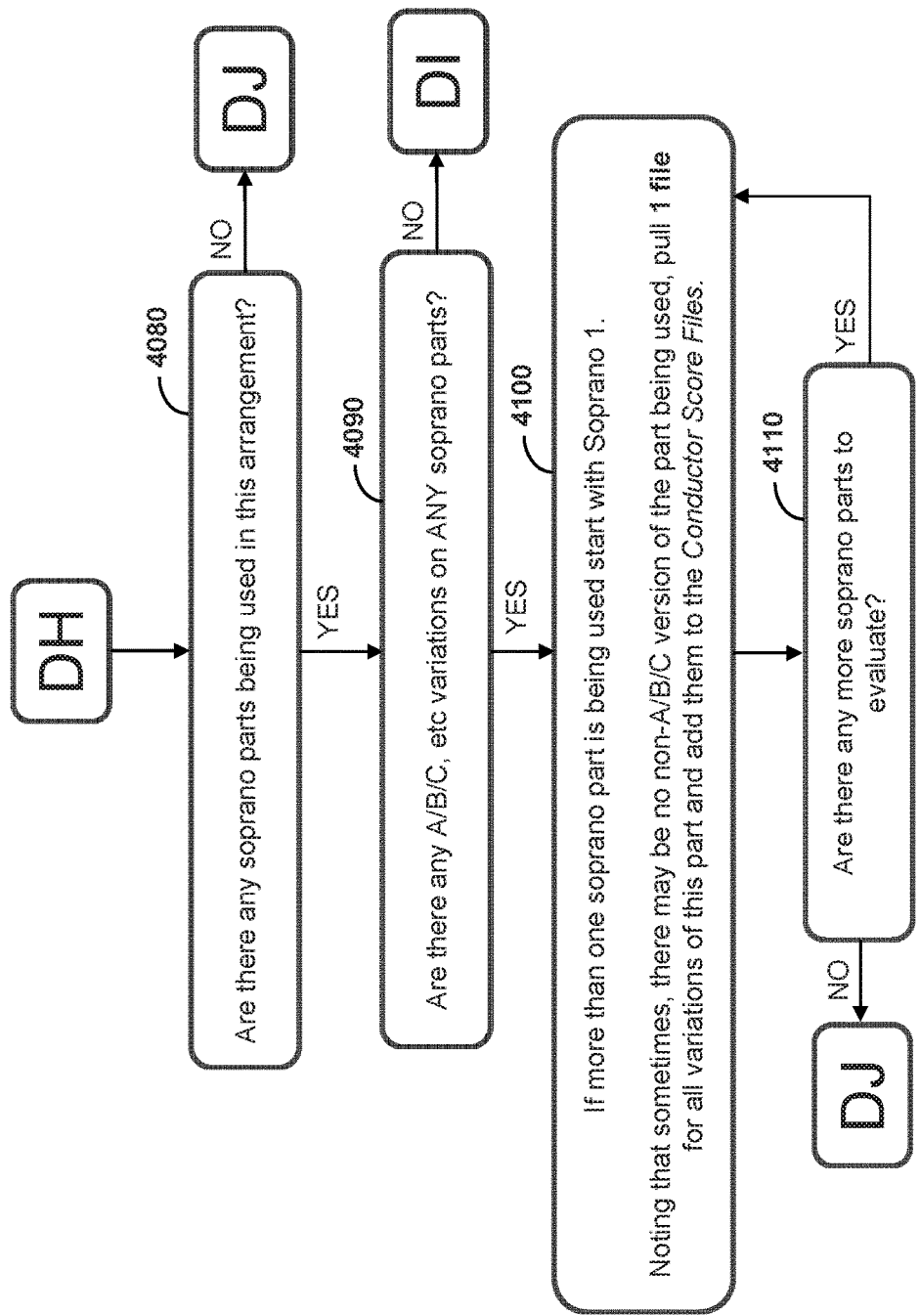
Figure 112:
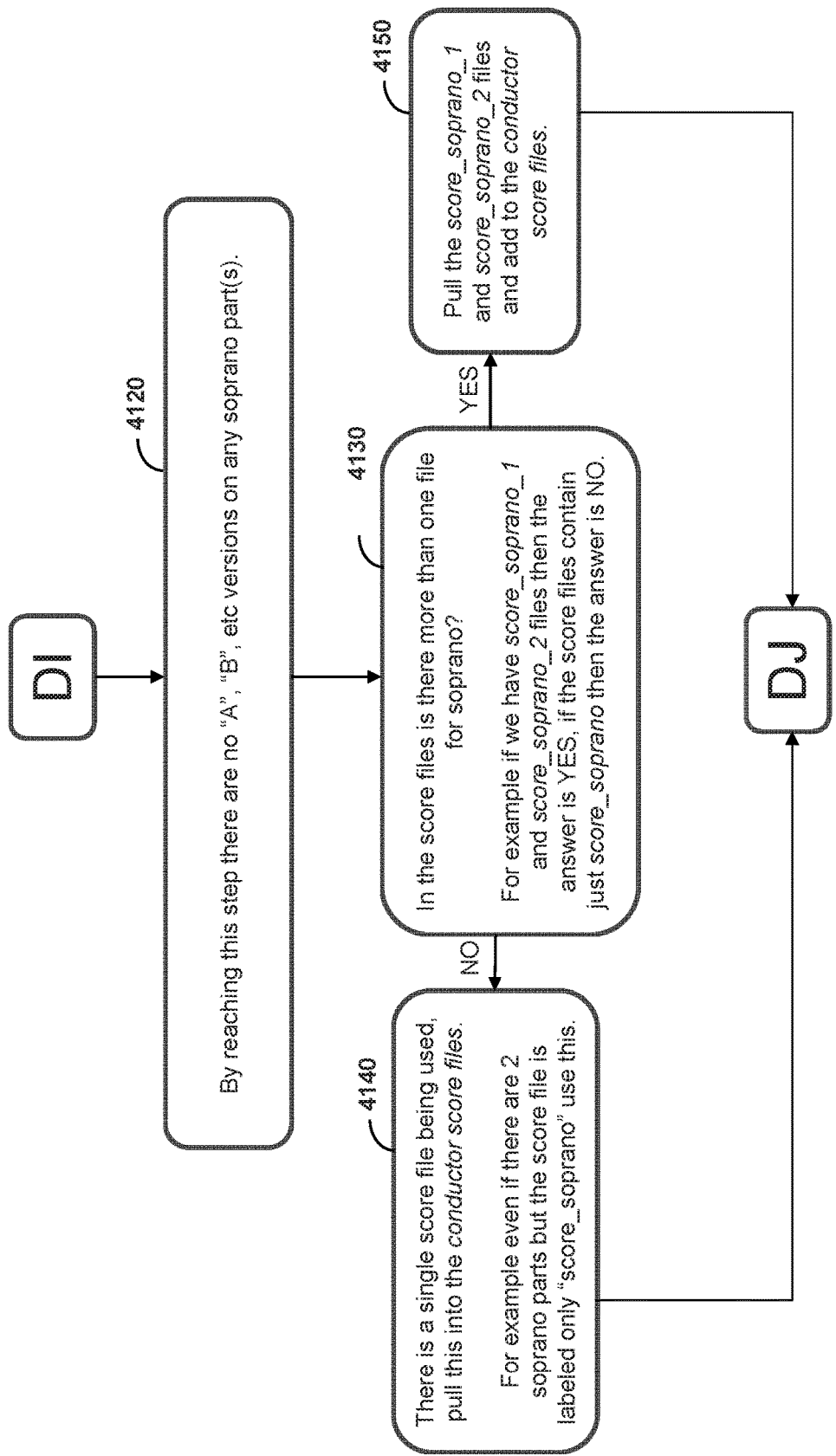
Figure 113:
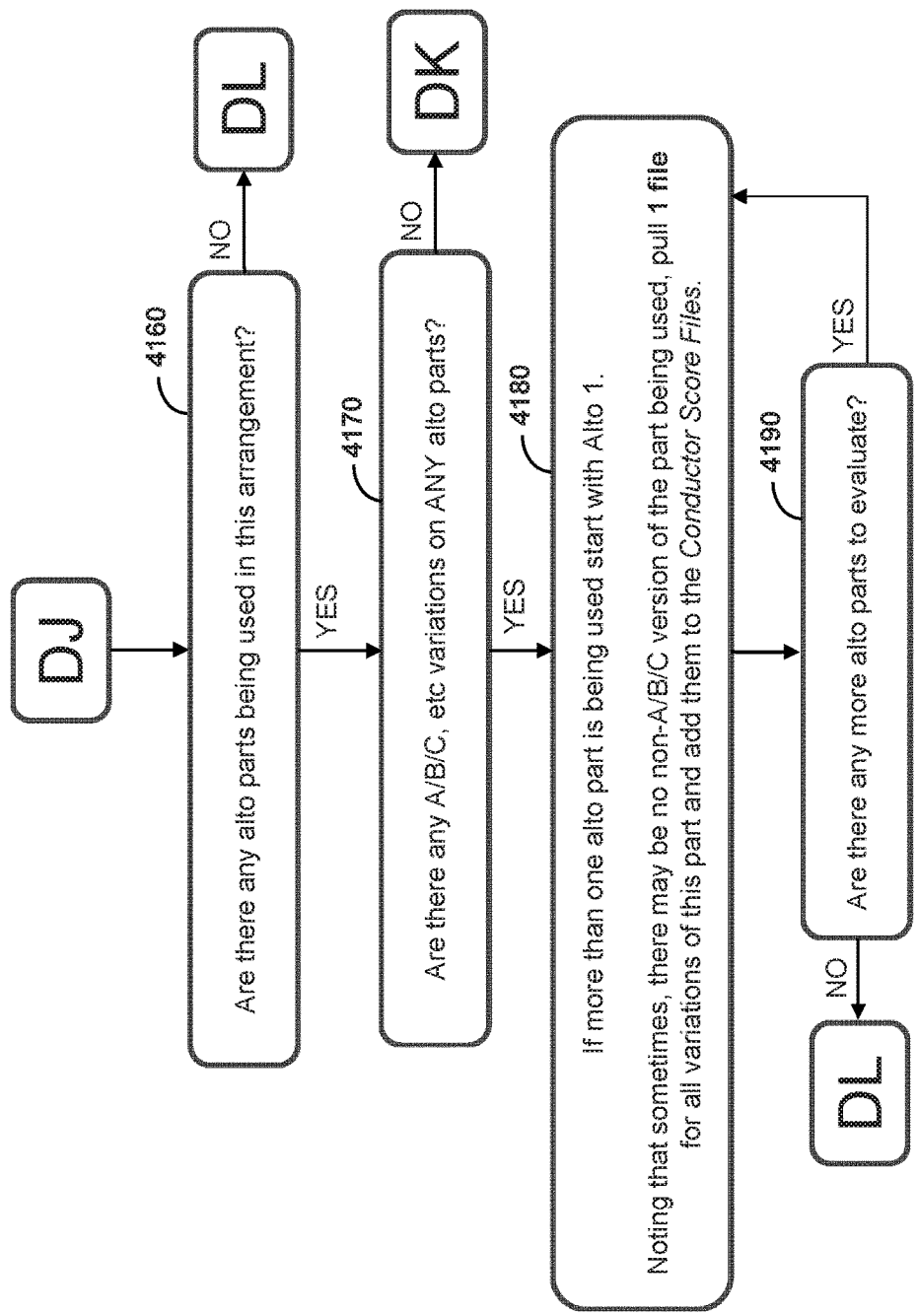
Figure 114:
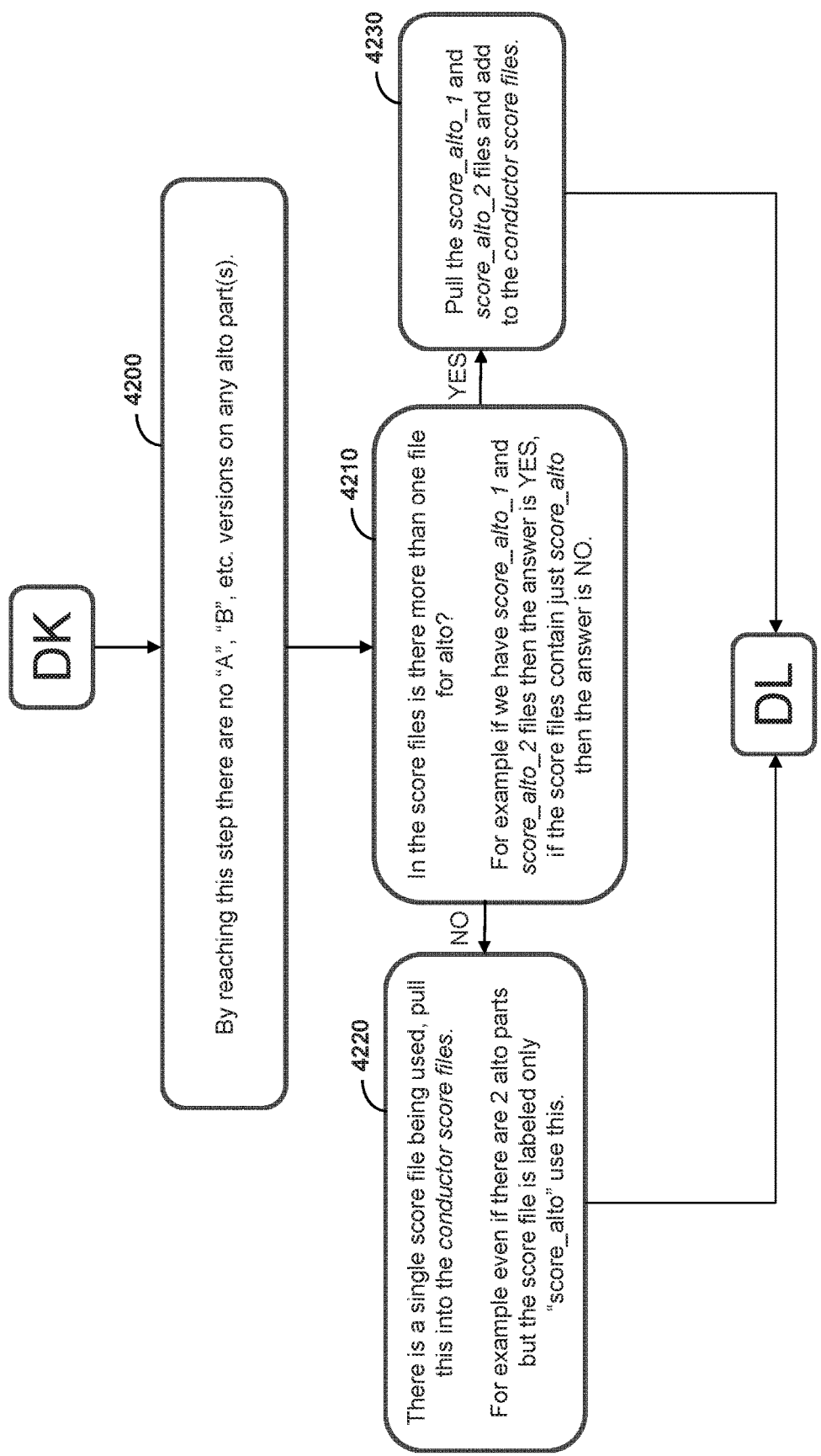
Figure 115:
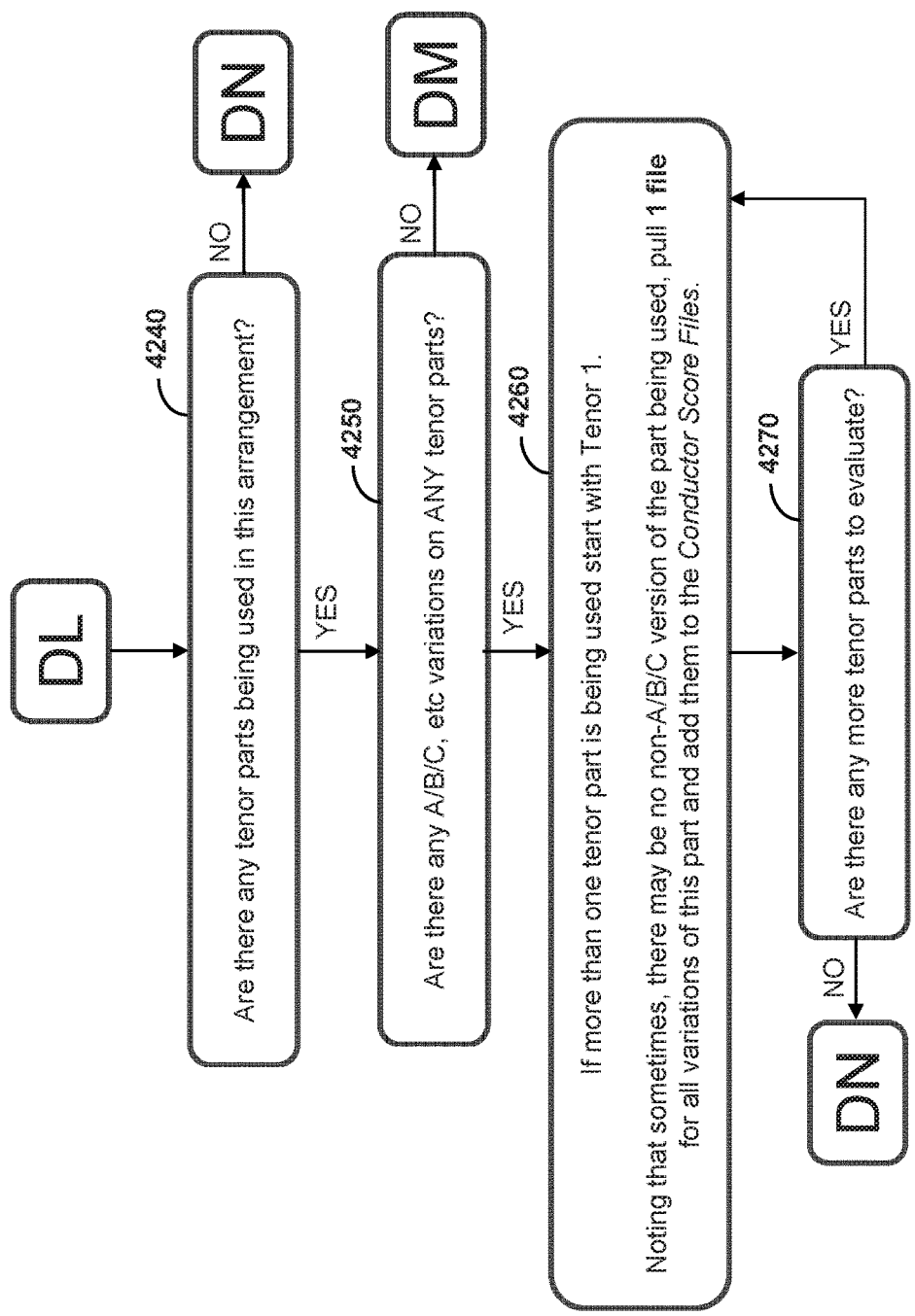
Figure 116:
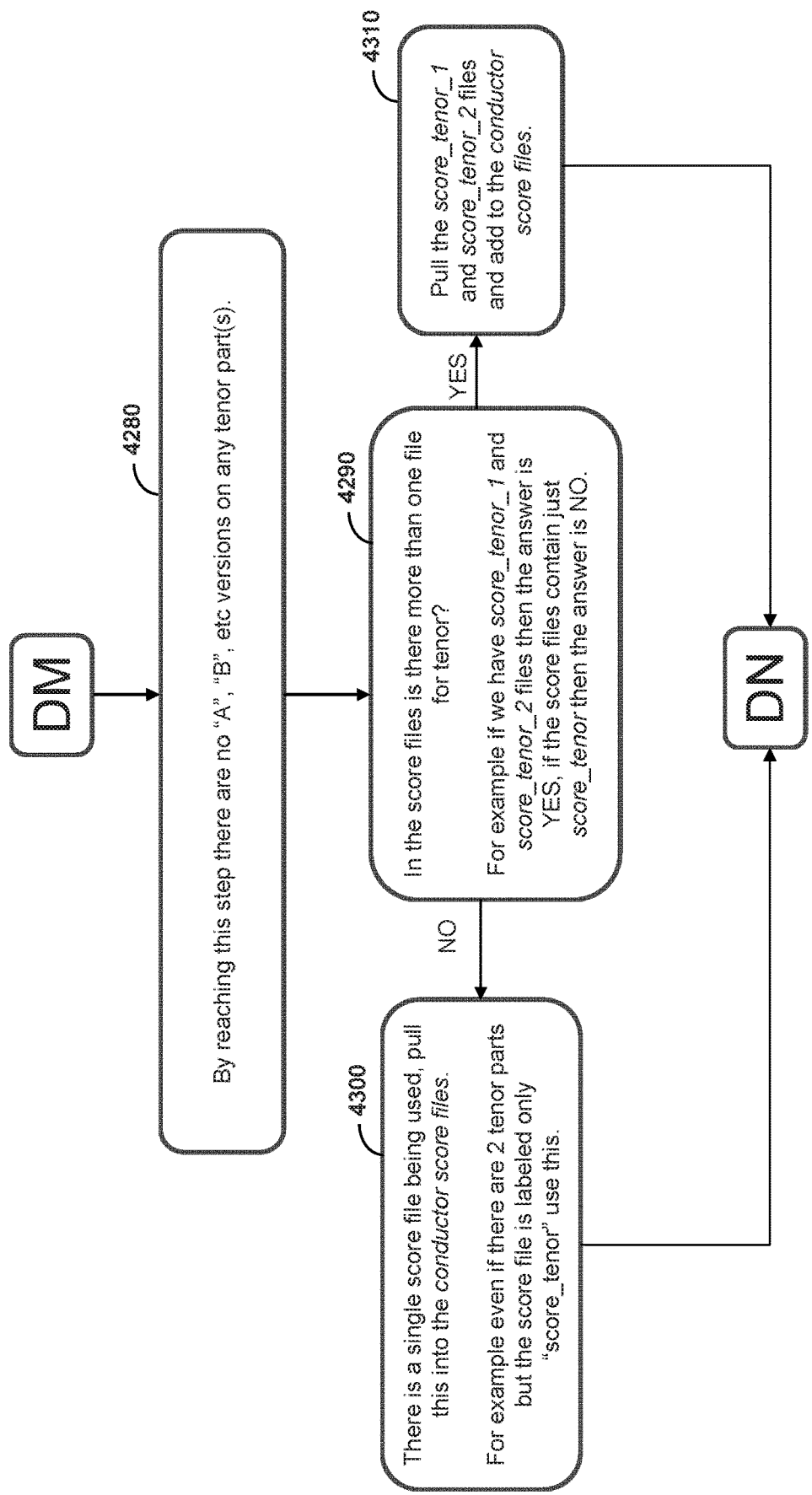
Figure 117:
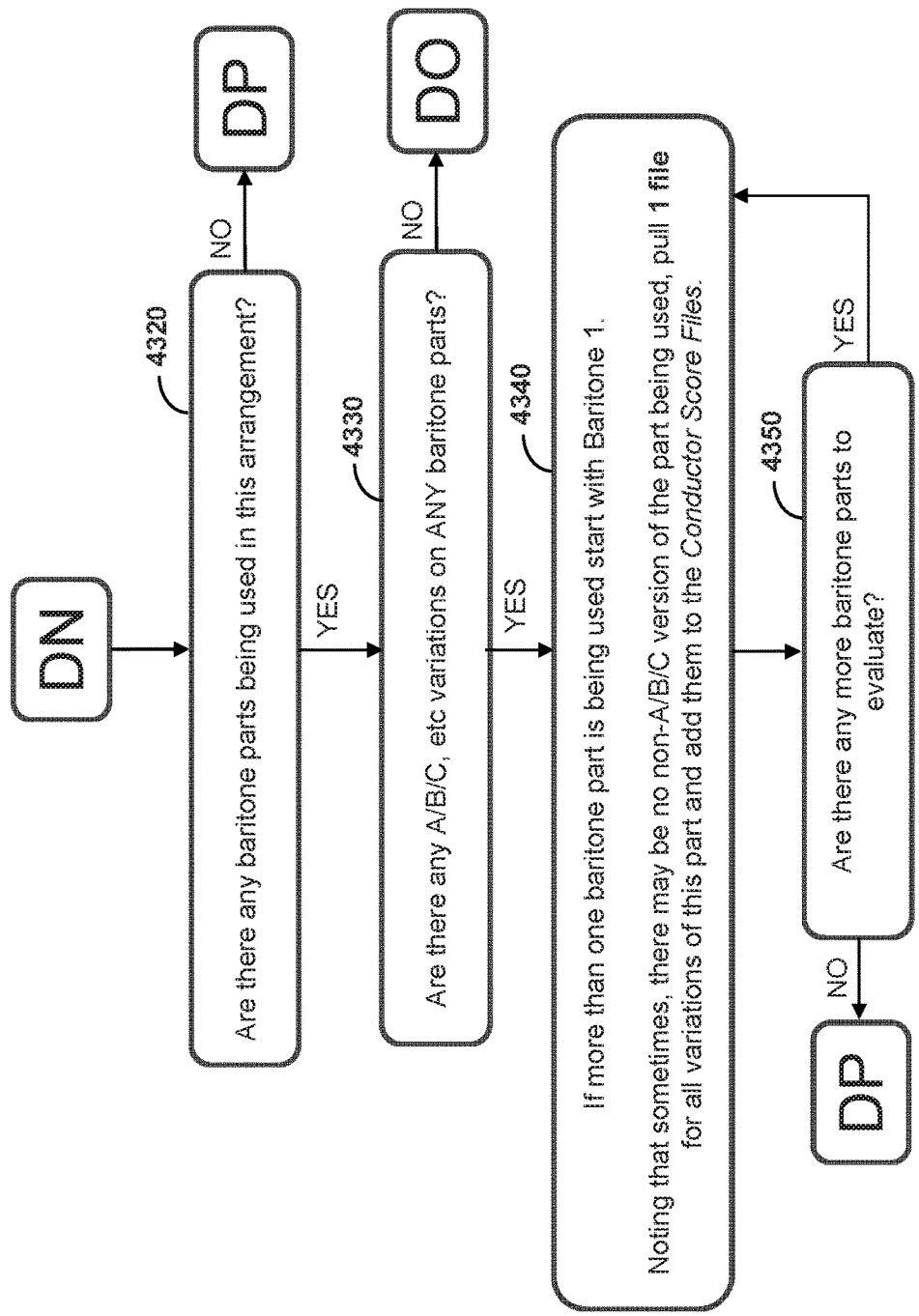
Figure 118:
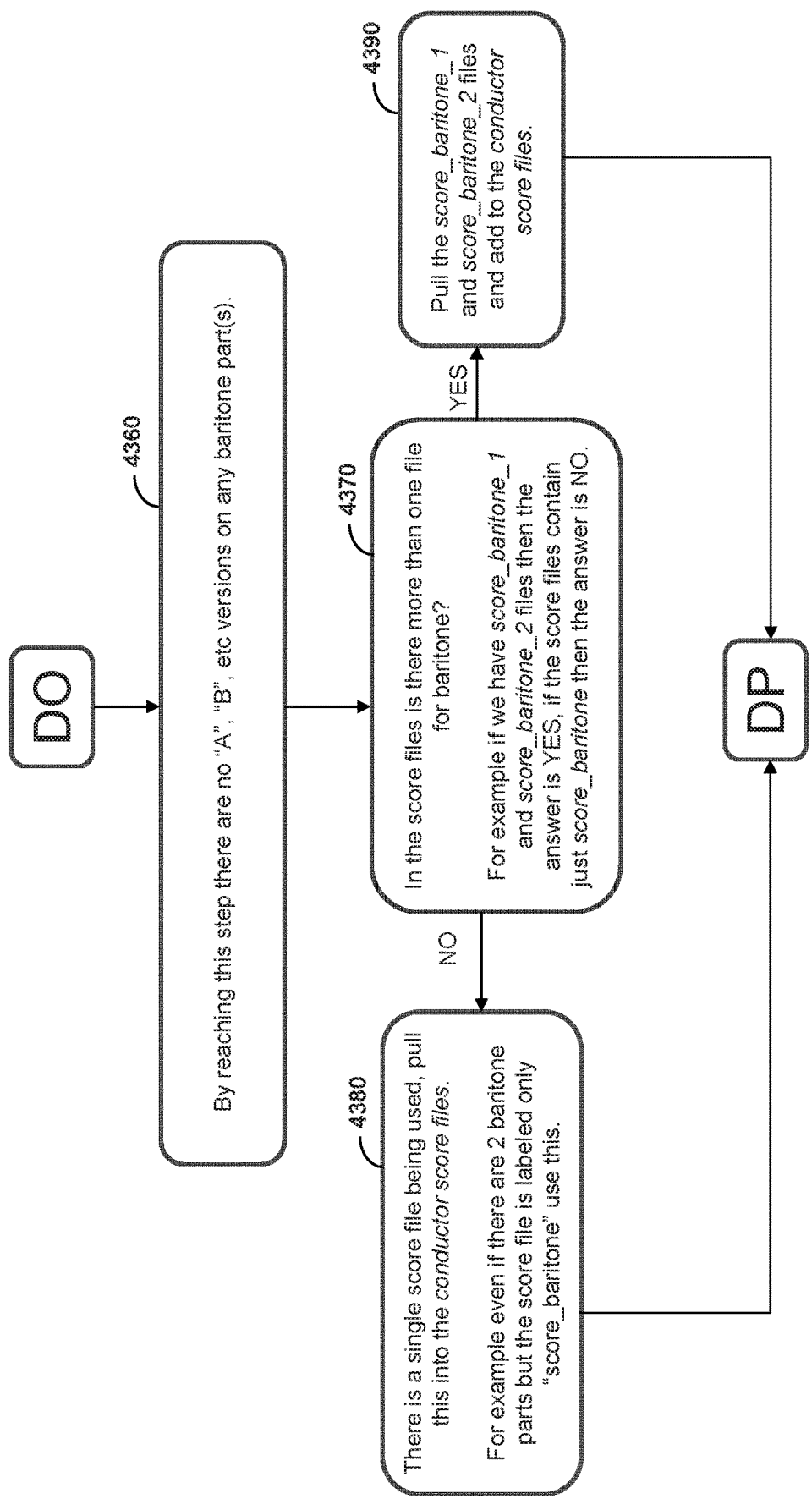
Figure 119:
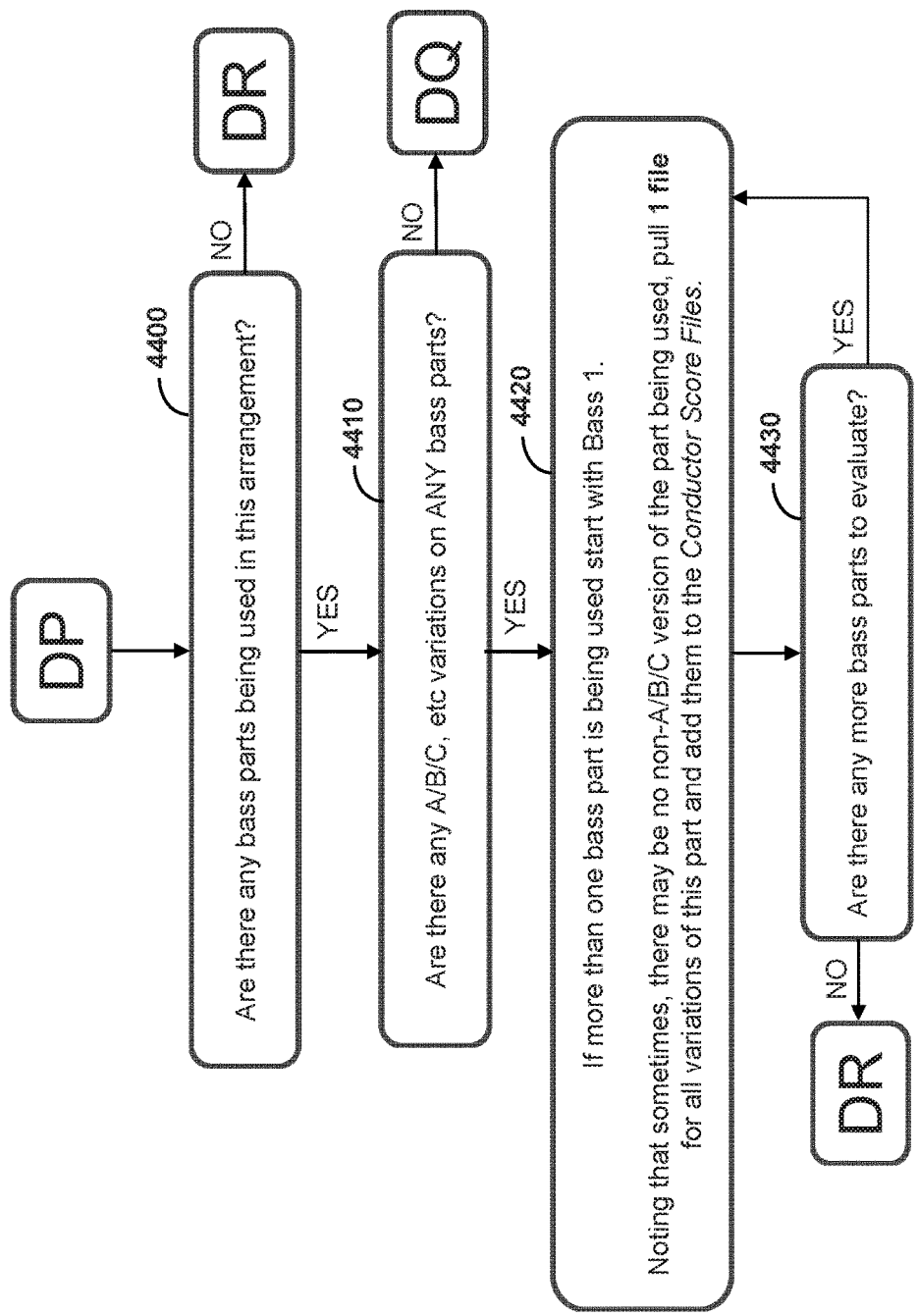
Figure 120:
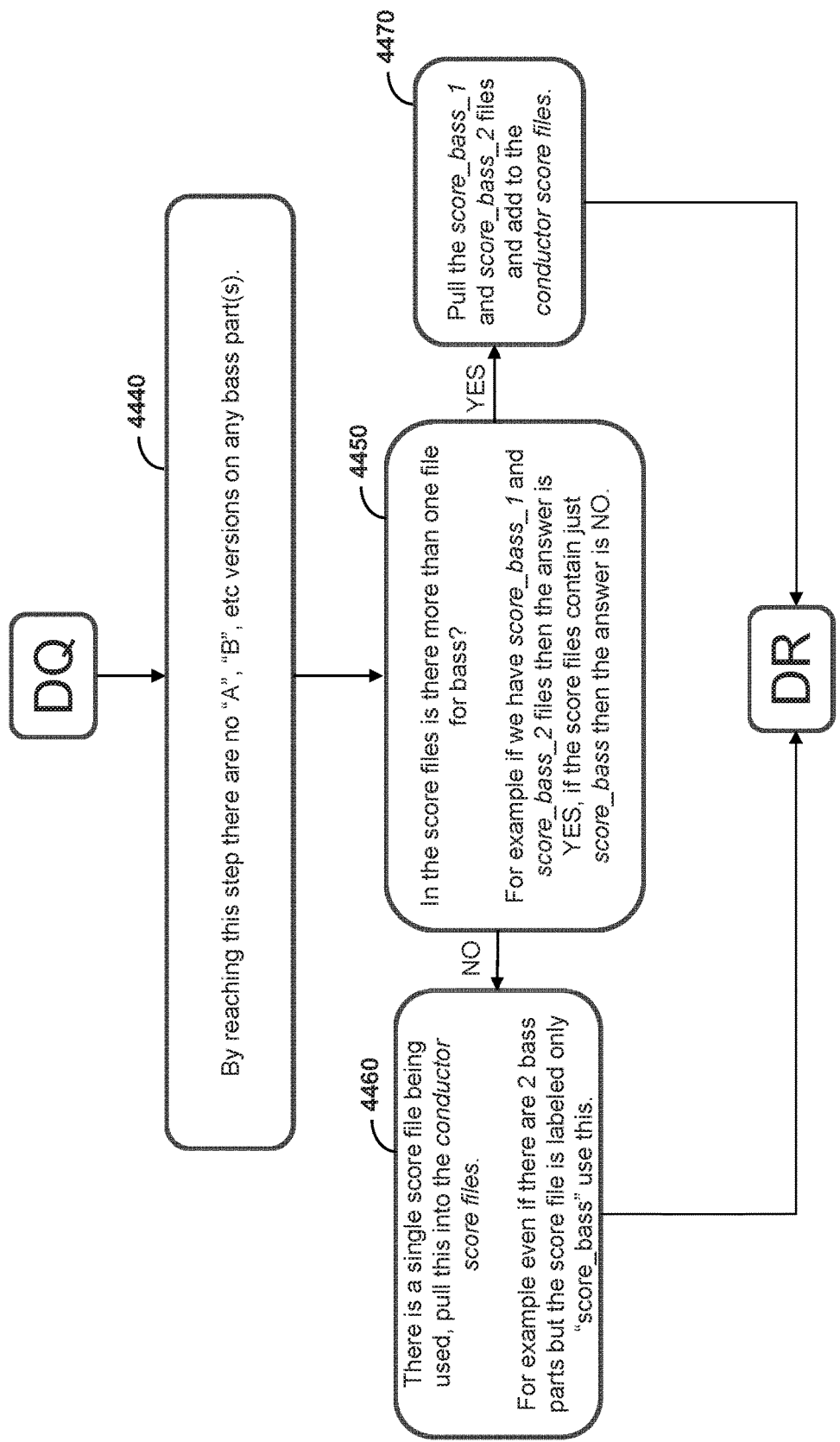
Figure 121:
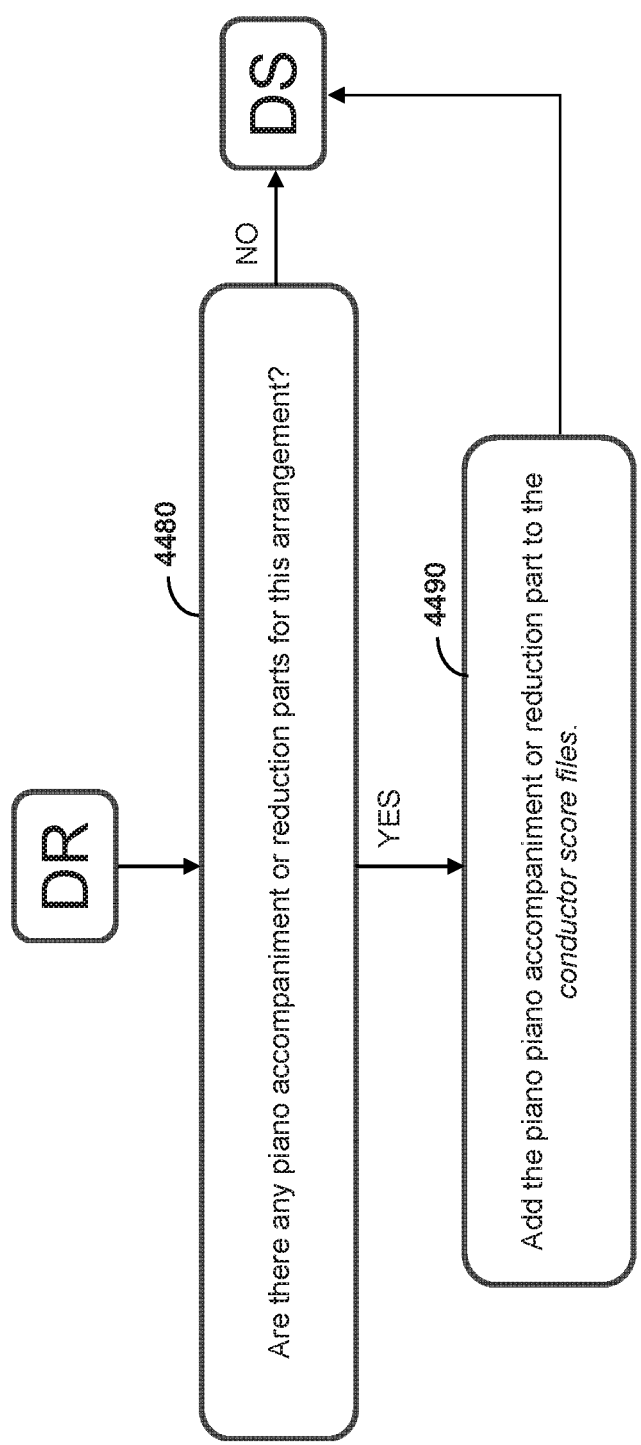

After selecting the vocalists, and fine tuning the individual vocalists' range if necessary to define vocalist's ability, in block 4 the user may select soloists. In an embodiment, the system will advise the user with regard to which range encompasses the native (e.g., unadjusted) solo part (such as alto if the original arrangement had an alto as a soloist). After selecting the soloist(s), at block 5 the user may change the default concert key of the arrangement, and change the proficiency and/or display options for the plano accompaniment. This enables the user to specify which parts are printed on which sheets of music. For example, for a conductor score, all parts of the score may be printed on each page. For a plano accompaniment score, the plano part and a representative vocal part from one or more sections (S, A, T, B) may be printed. A section-specific score, for example, the alto score, would contain all parts for that section (alto 1, alto 2, alto Solo 1, alto Solo 2, etc.) and one representative part for each of the other sections. The user may specify the proficiency level for the plano accompaniment and, additional or alternatively, specify that a slash sheet (e.g., showing chord changes only) or a lead sheet be used for the plano accompaniment. In this manner, the disclosed system provides clear and uncluttered customized scores for each participant role in the ensemble. Plano accompaniment options are further illustrated in FIG. 99, blocks 3645-3655.

In block 6 the best available arrangement type for the ensemble is determined, such as, for example, SSA or SSAATTB or SAB and is further illustrated by the illustrative embodiment shown in FIGS. 3-27 and 123-160 (blocks 17-1140 and blocks 4520-4540). Balancing starts with the low end of the ensemble, e.g., tenors, baritones and bass singers. At FIGS. 4-10 tenors, baritones, and bass parts are balanced (blocks 17-325). If the smaller of the total vocalists assigned to tenor or total assigned to bass is less than 25% of the larger of total assigned to tenor or total assigned to bass, input from the user is solicited to determine whether to eliminate the tenor section entirely (block 275). In a similar way, if the smaller of the total vocalists assigned to tenor plus the total assigned to bass is less than 25% of the ensemble size, input from the user is solicited to determine whether to eliminate the tenor section entirely (block 325). At FIGS. 11-21, the upper sections of the ensemble are balanced, e.g., sopranos, mezzo-sopranos, and altos (blocks 330-840). Here, again, user input is solicited if the number of any one section contains too few members, and whether to consolidate the smaller section into another section (blocks 680-690). FIGS. 22-27 illustrate processing of arrangements where one or more sections include a secondary part, e.g., soprano 1, soprano 2, etc. (blocks 850-1140).

While there are several different logic paths for how the system determines the final ensemble type, once determined, all ensemble types flow through the same process for concert key transposition, range correction, final vocalist assignment, variant determination, individual part creation, conductor's score creation and rendering for preview, as described hereinbelow.

FIGS. 123-160 continue the balancing process. At FIGS. 123-125, blocks 4520-4570, for ensembles composed of all higher voices, e.g., elementary school level ensembles and soprano, mezzo-soprano and alto ensembles, the ensemble type is changed to soprano-alto (SA) and if an equal number of soprano and alto vocalists exist, all soprano and alto vocalists are assigned. Otherwise, starting at FIG. 125, vocalists are assigned to parts in a balanced manner. For example, if the ensemble is short of sopranos, 25% of vocalists assigned to alto are reassigned to soprano, reassigning firstly the players whose highest notes are the highest notes in their vocal range. Conversely, if the ensemble is short on altos, 25% of vocalists assigned to soprano are moved to alto, moving firstly the players with the lowest notes as the lowest notes in their vocal range.

Figure 127:
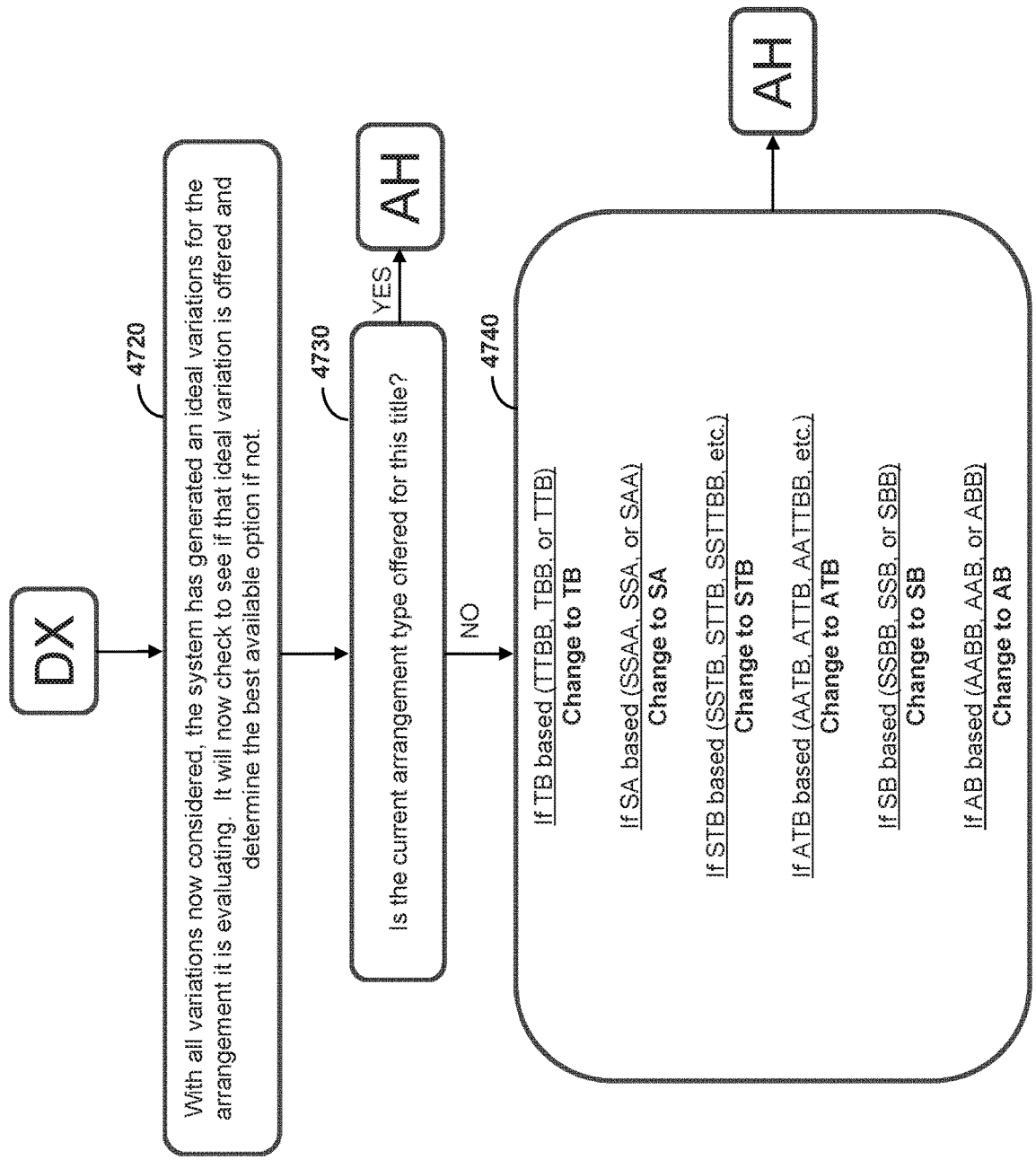
Figure 128:
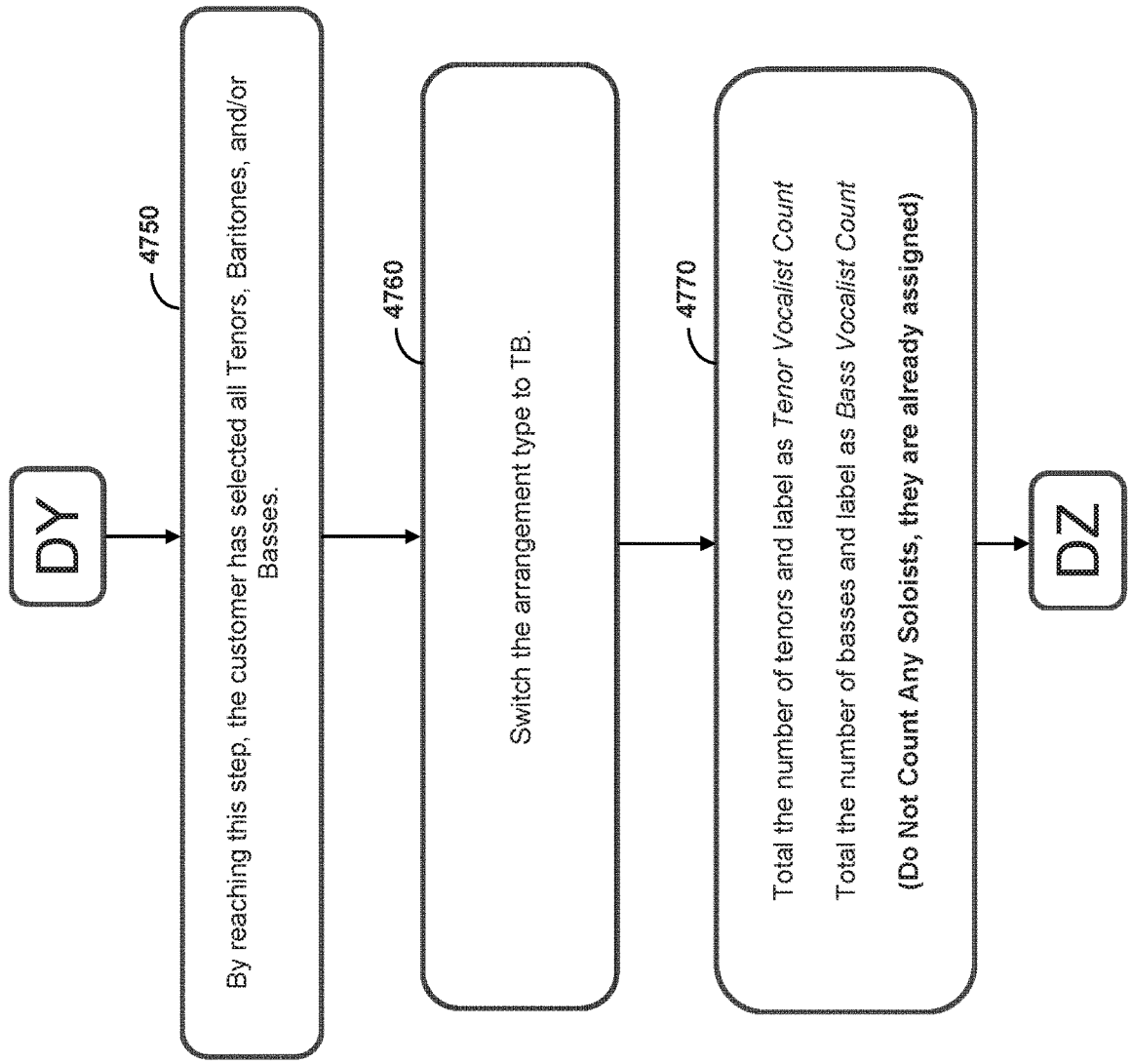
Figure 129:
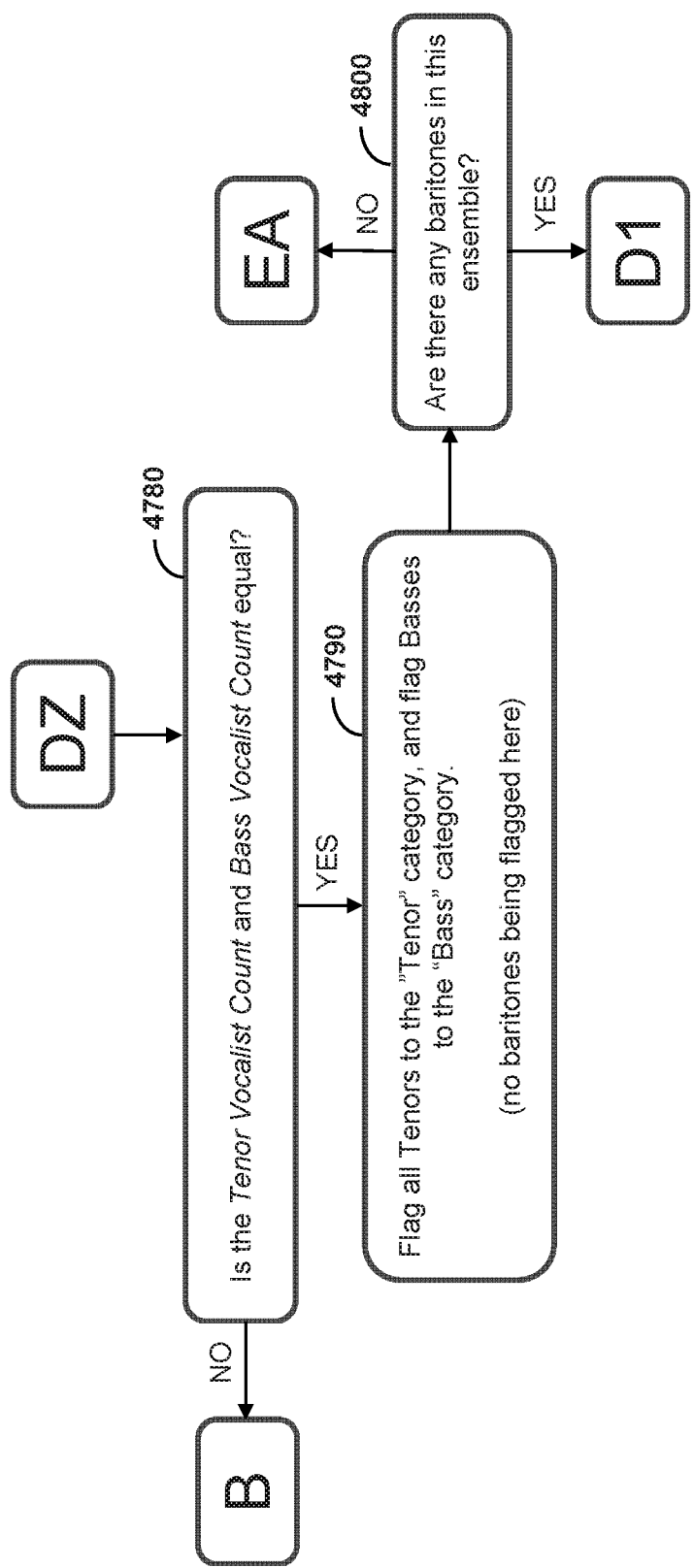
Figure 130:
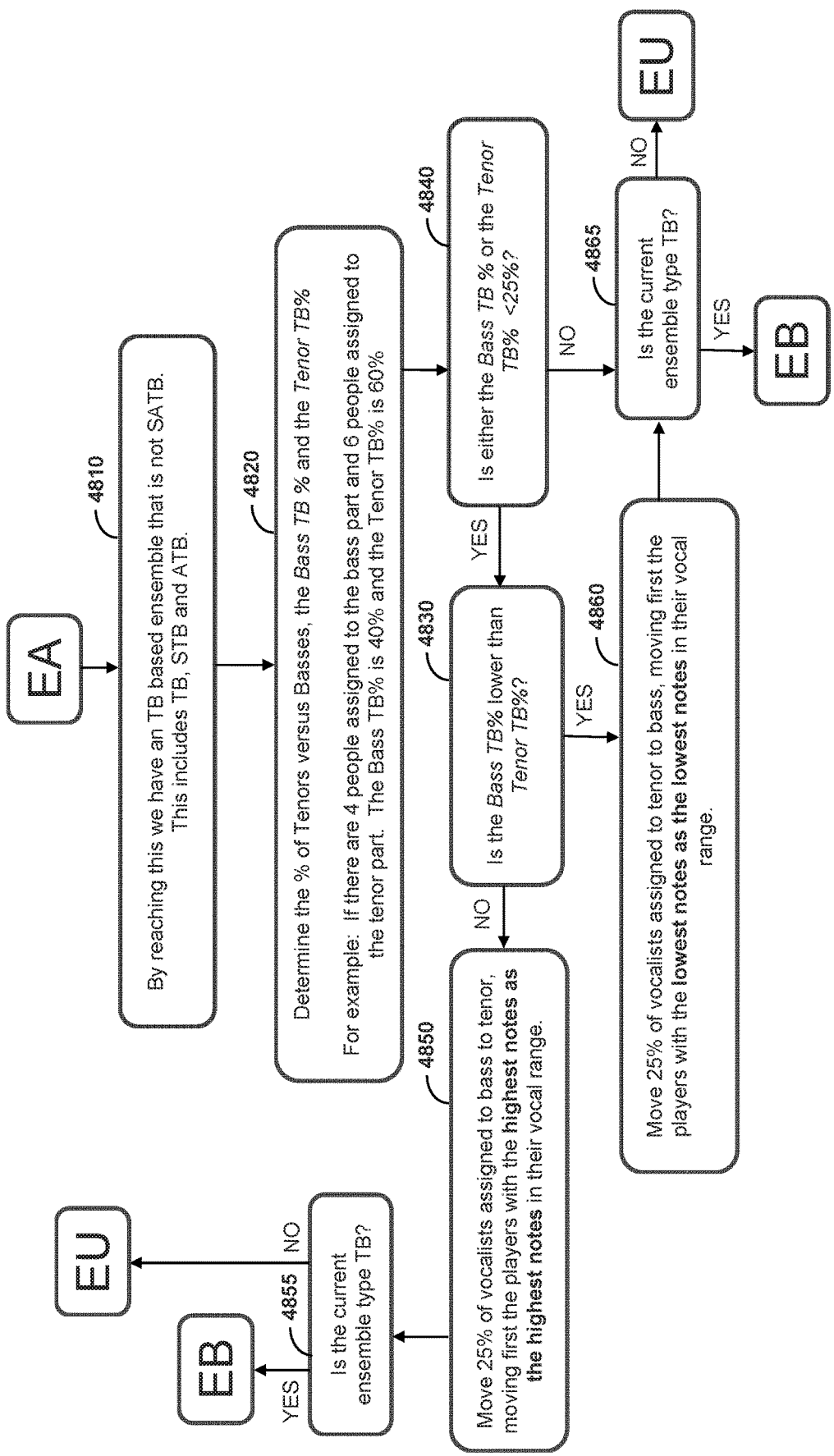
Figure 131:
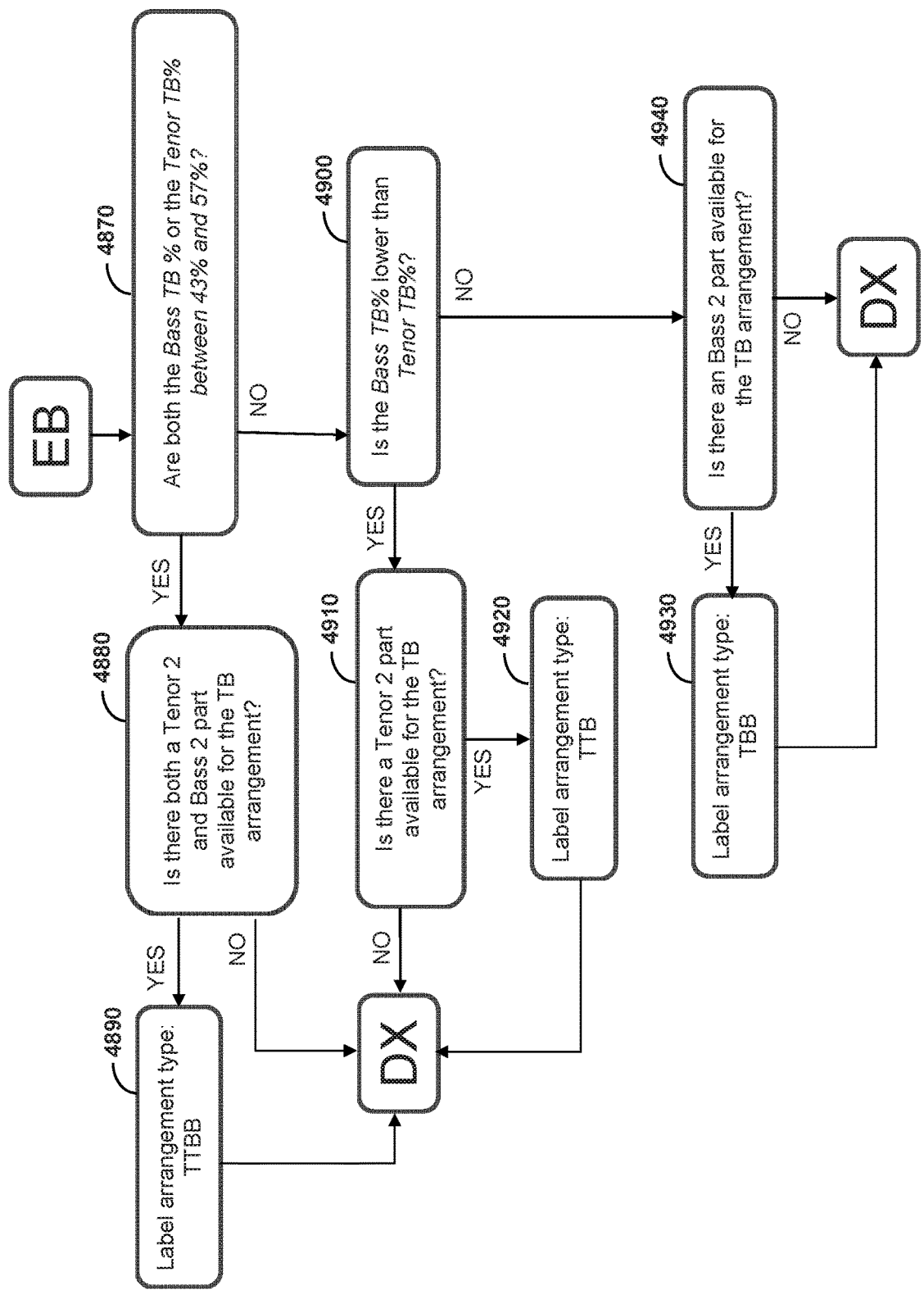
Figure 132:
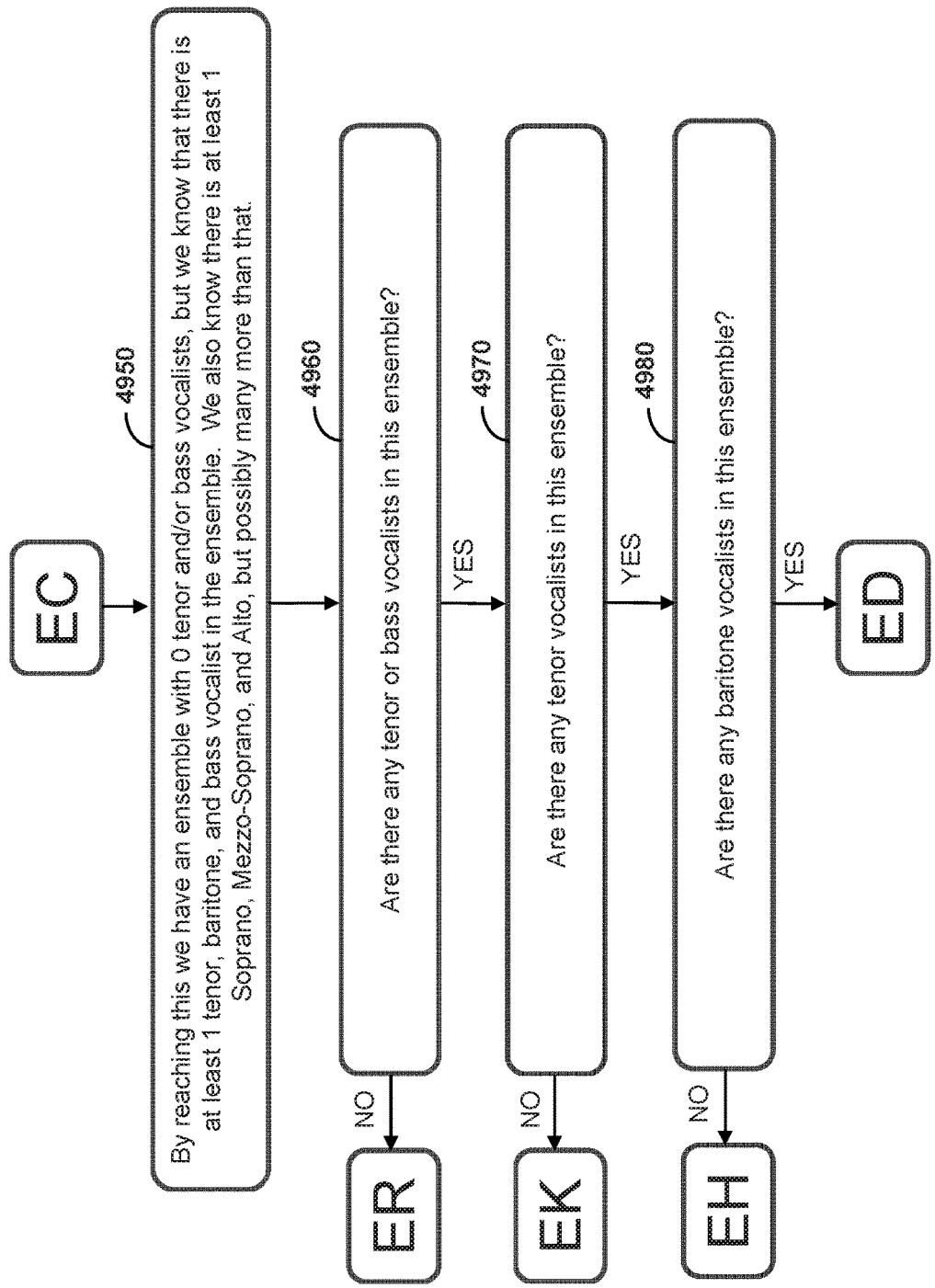
Figure 133:
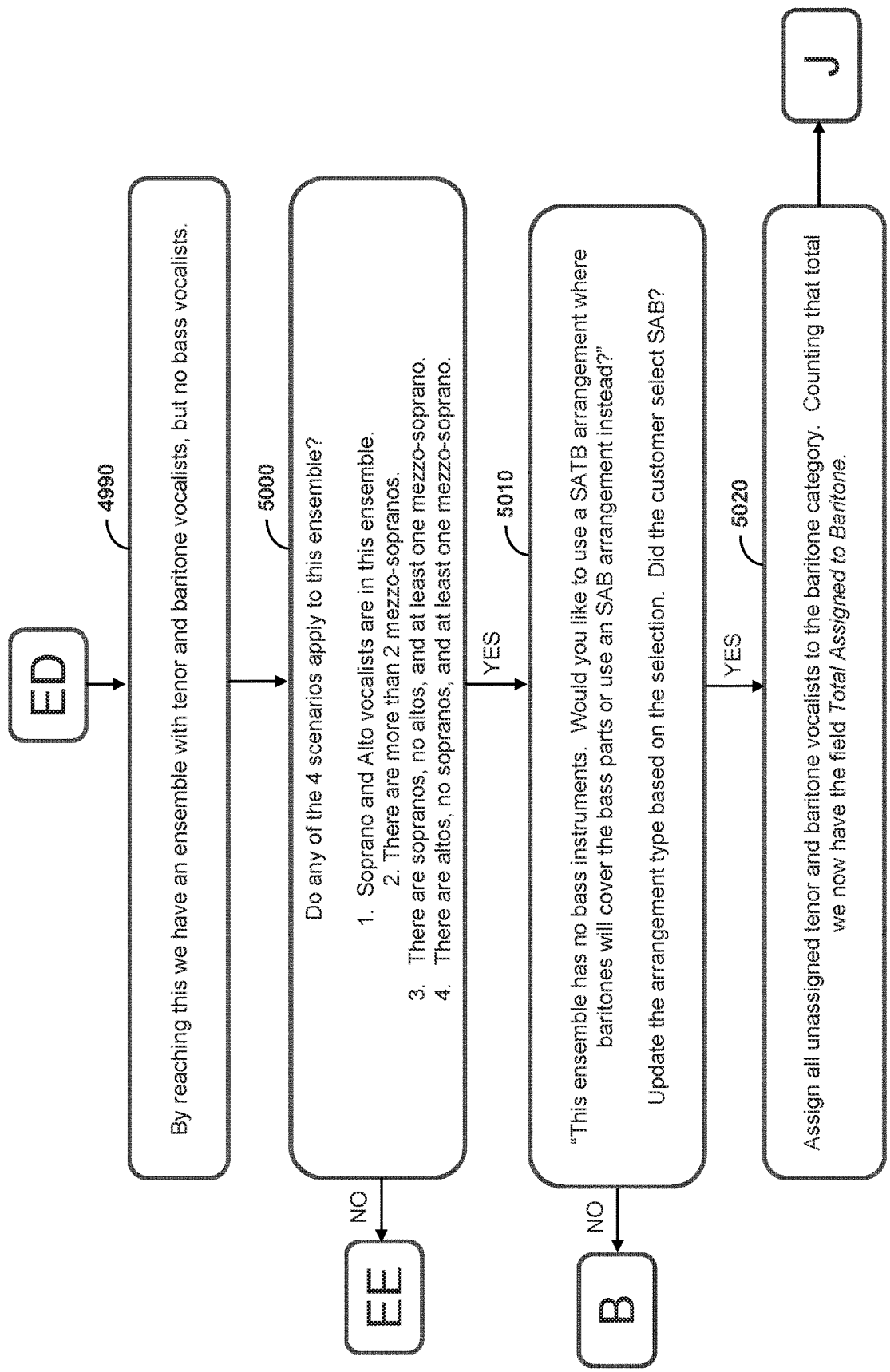
Figure 134:
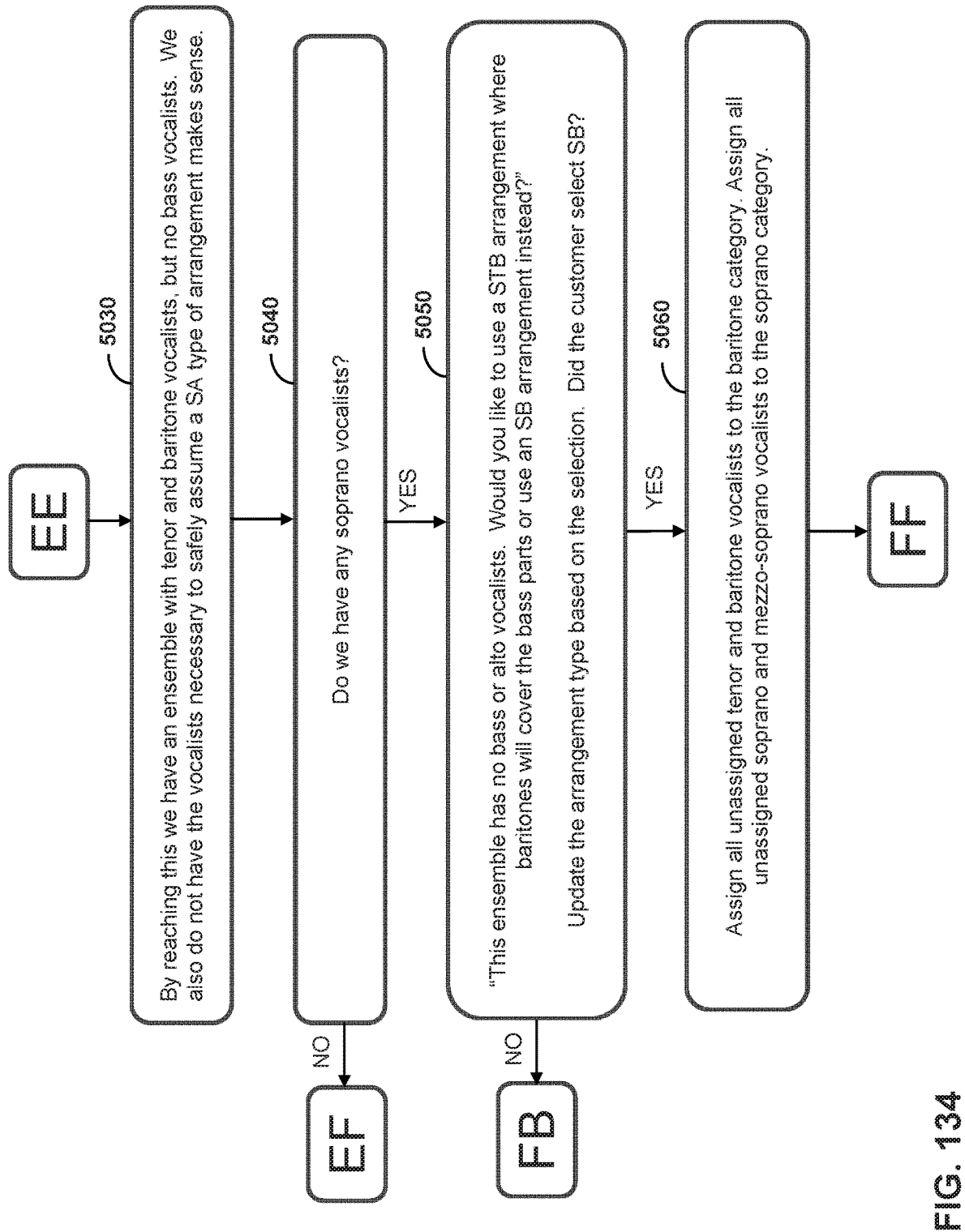
Figure 135:
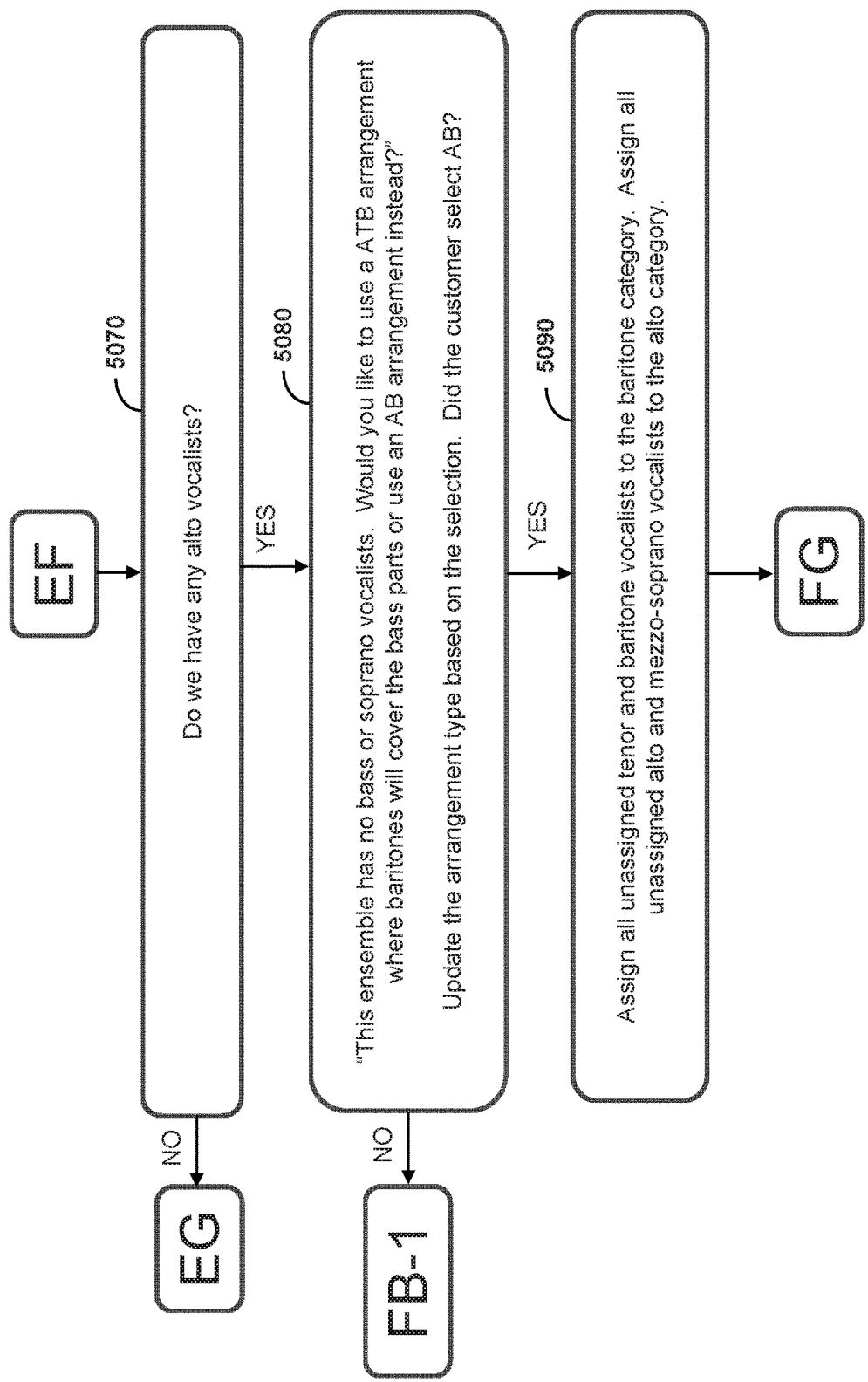
Figure 136:
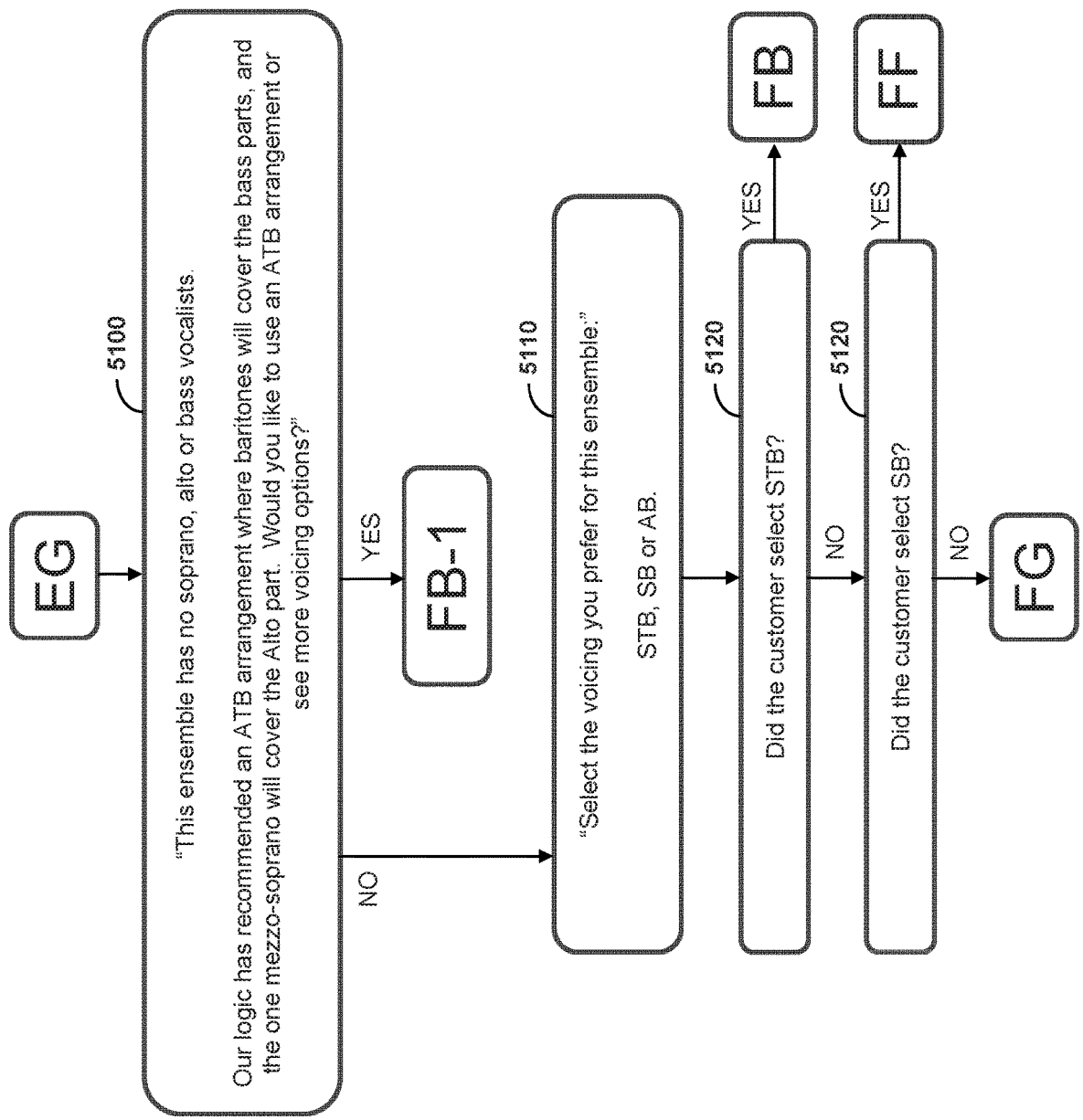
Figure 137:
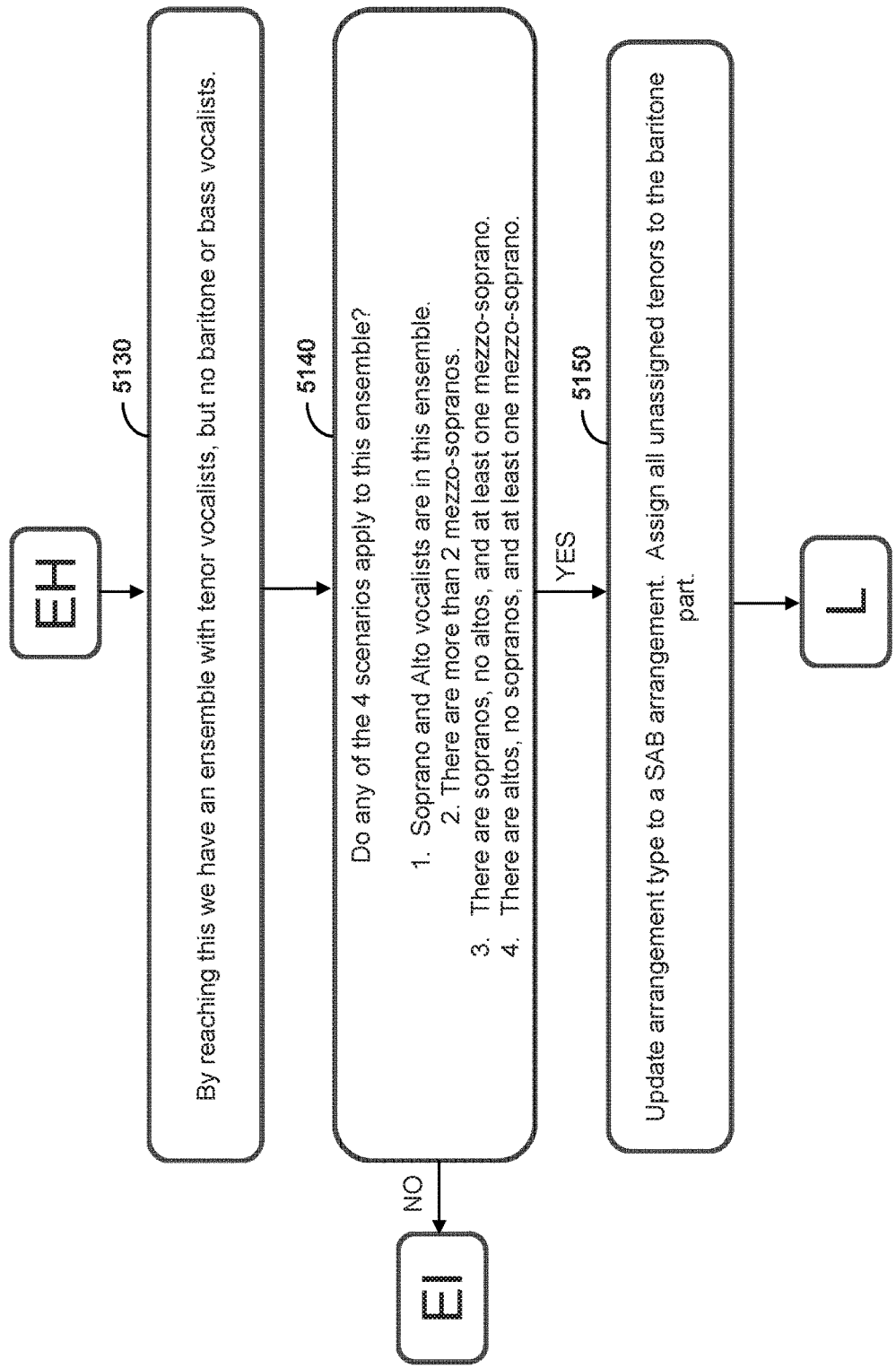
Figure 138:
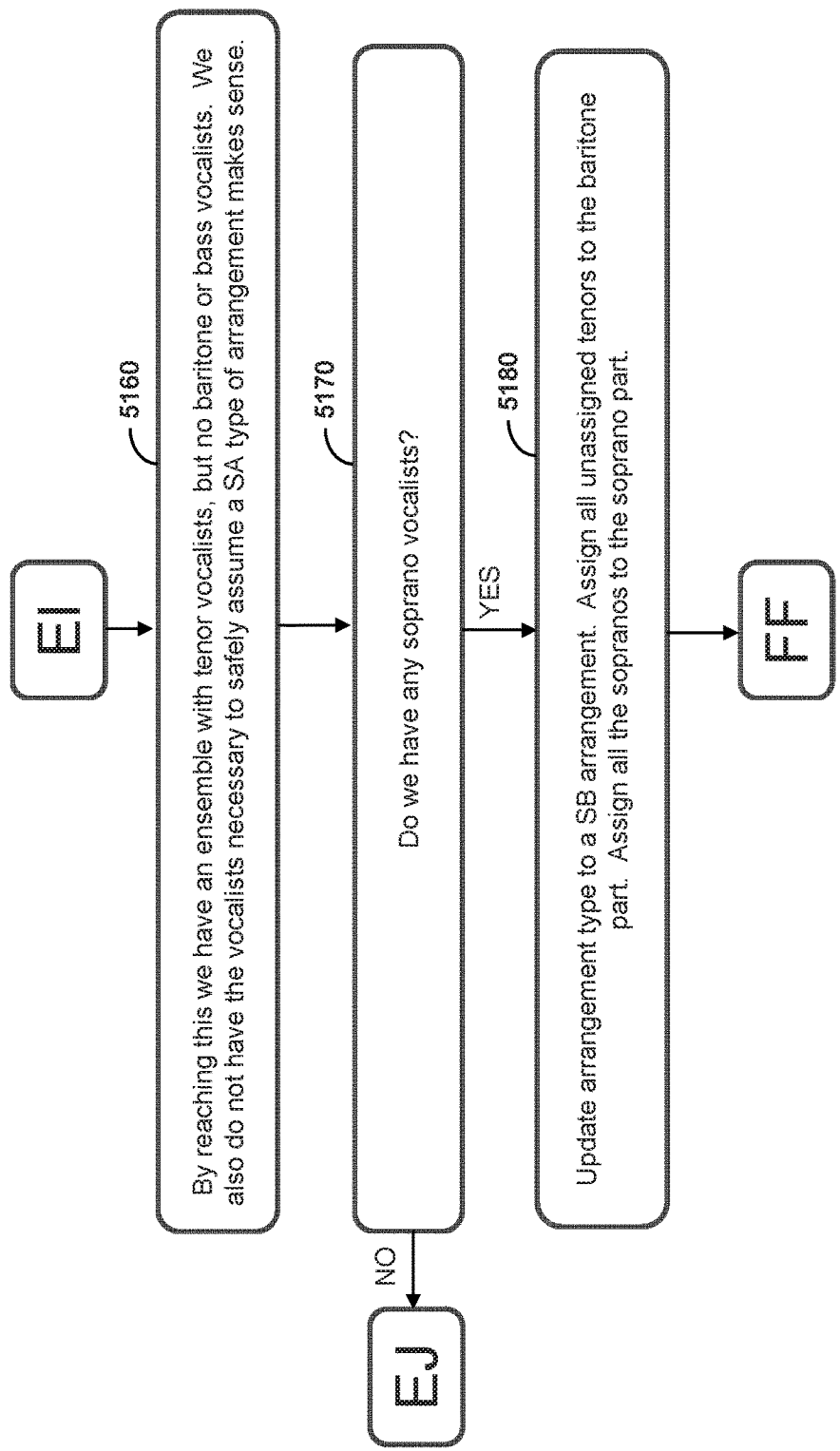
Figure 139:
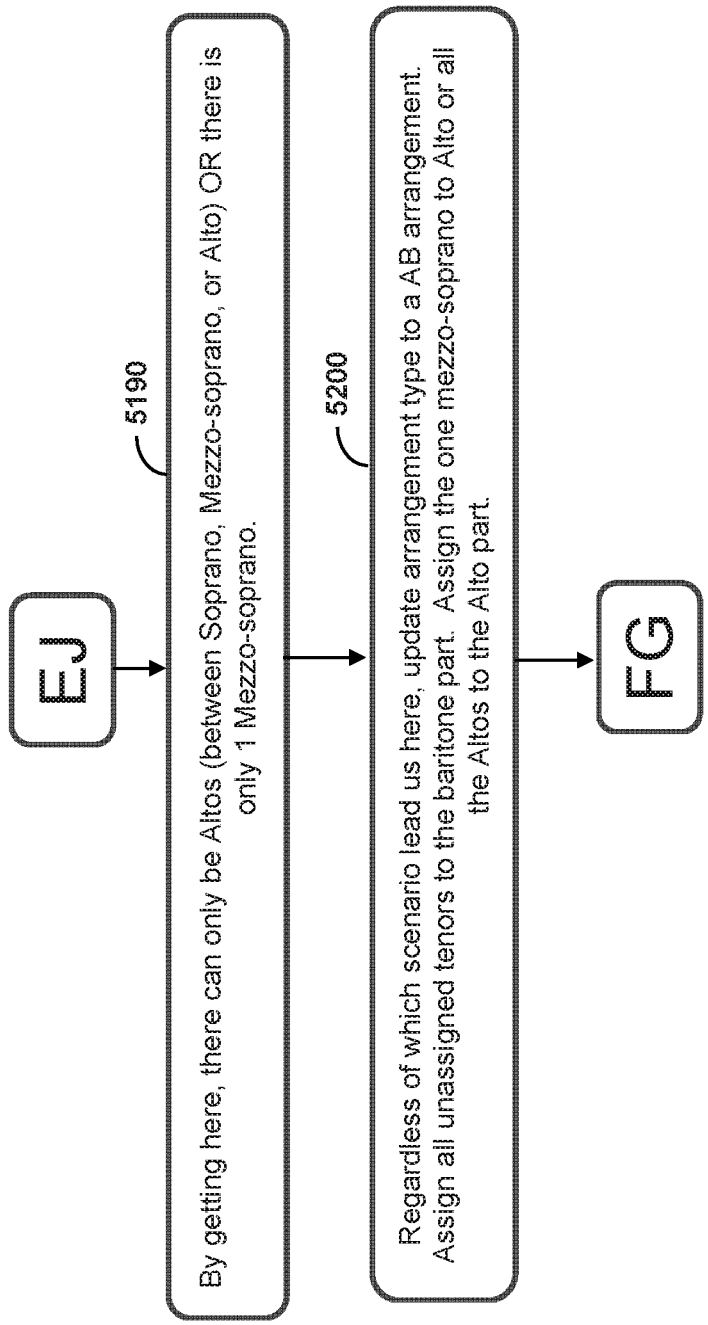
Figure 140:
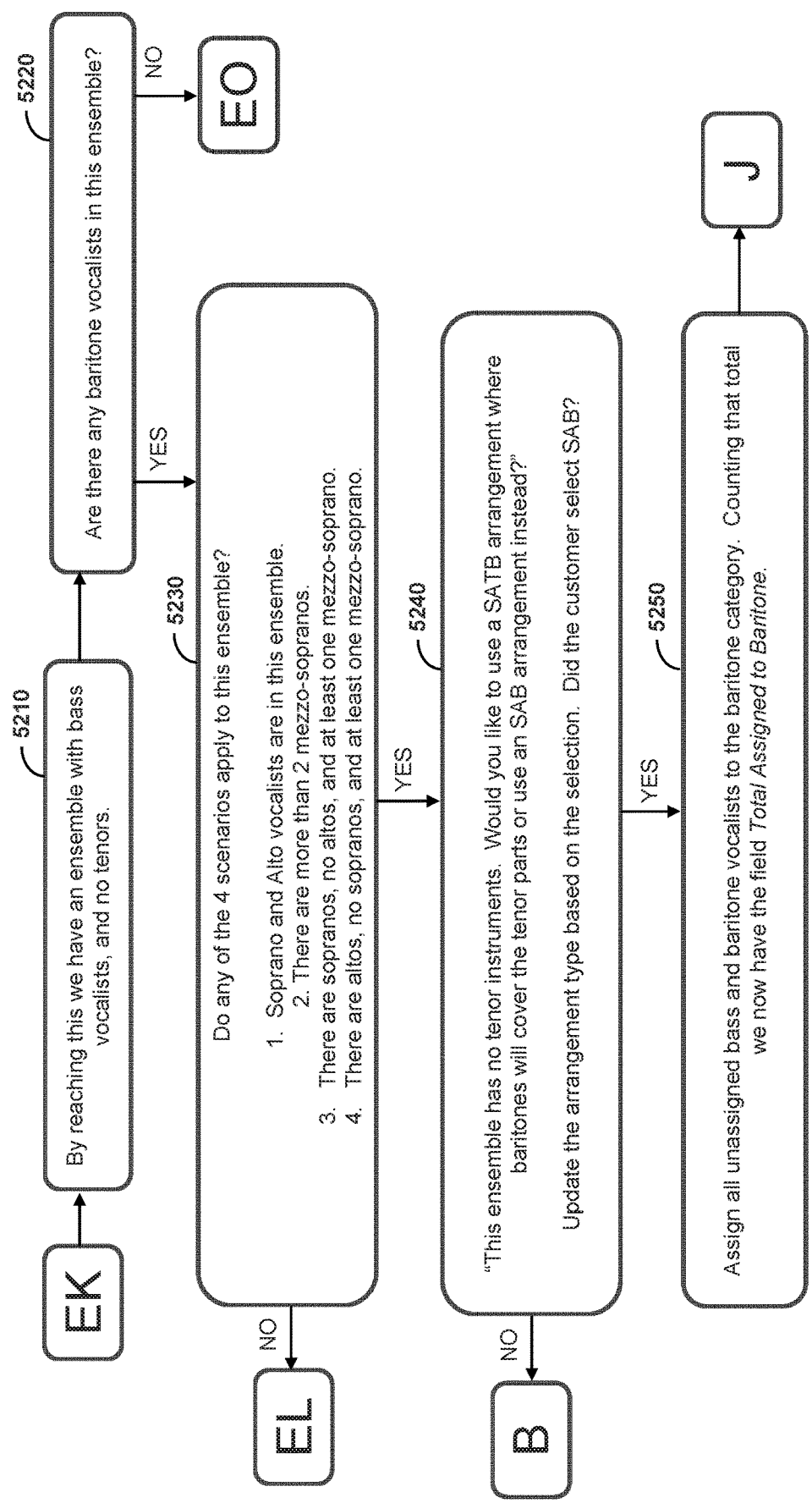
Figure 141:
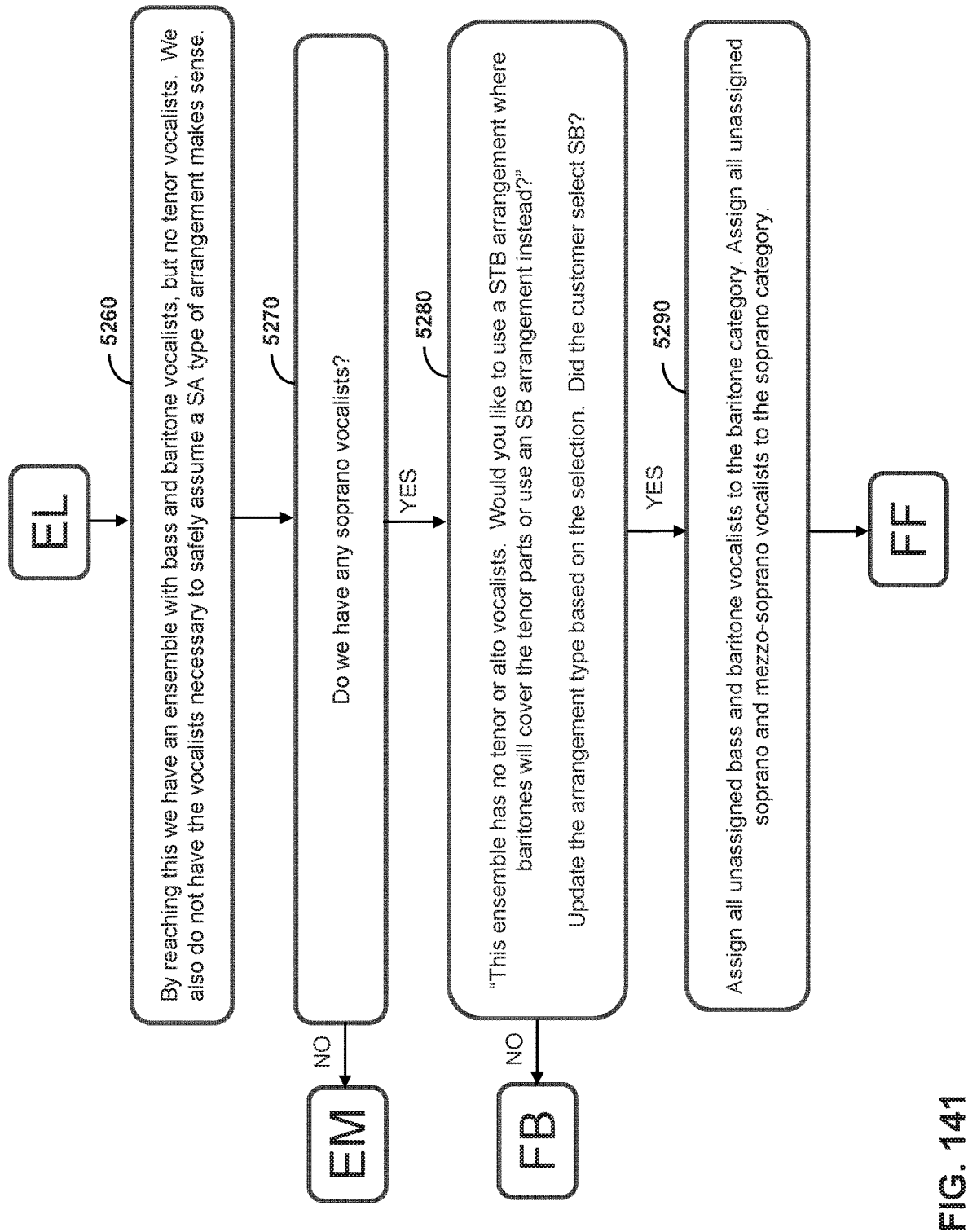
Figure 142:
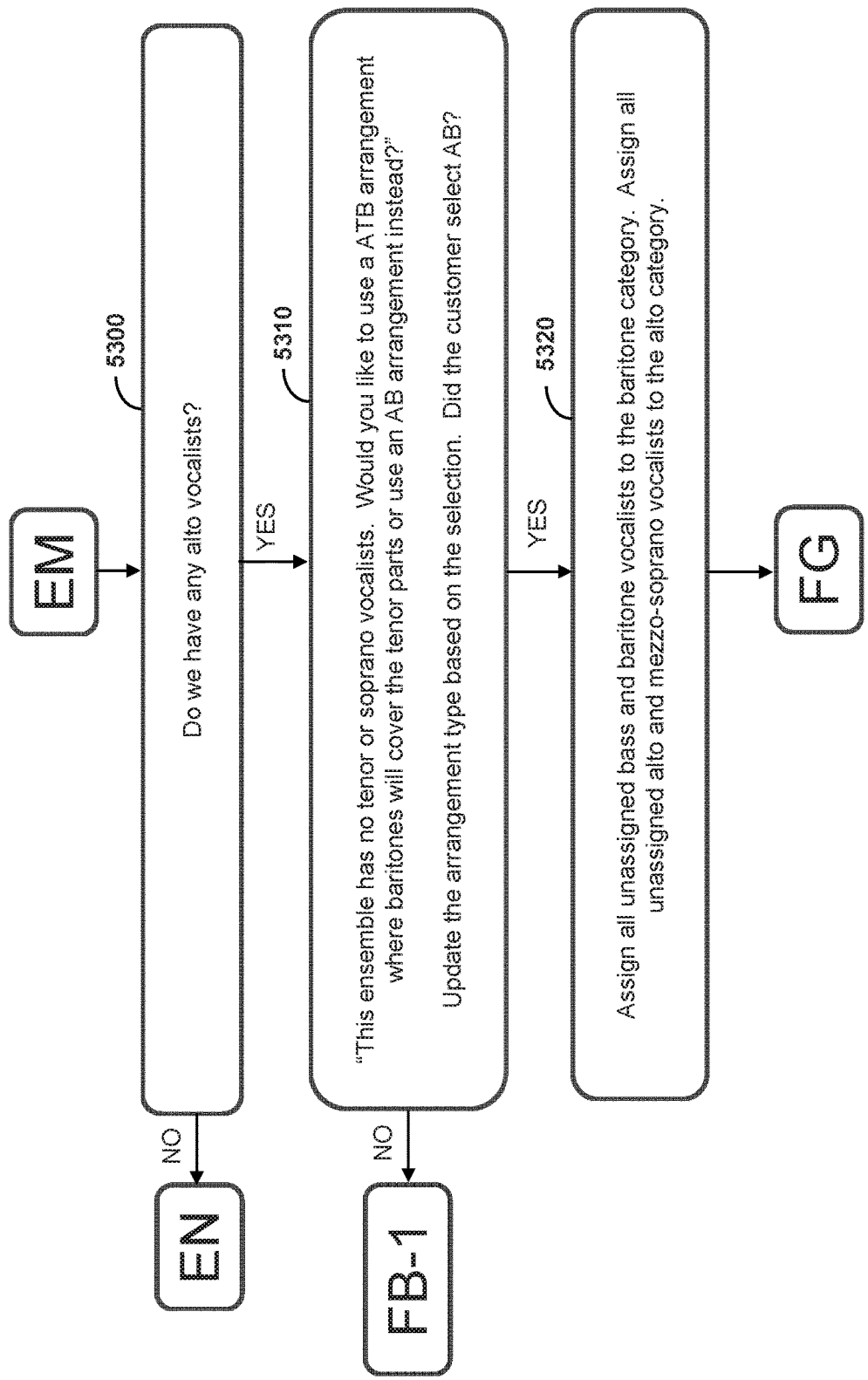
Figure 143:
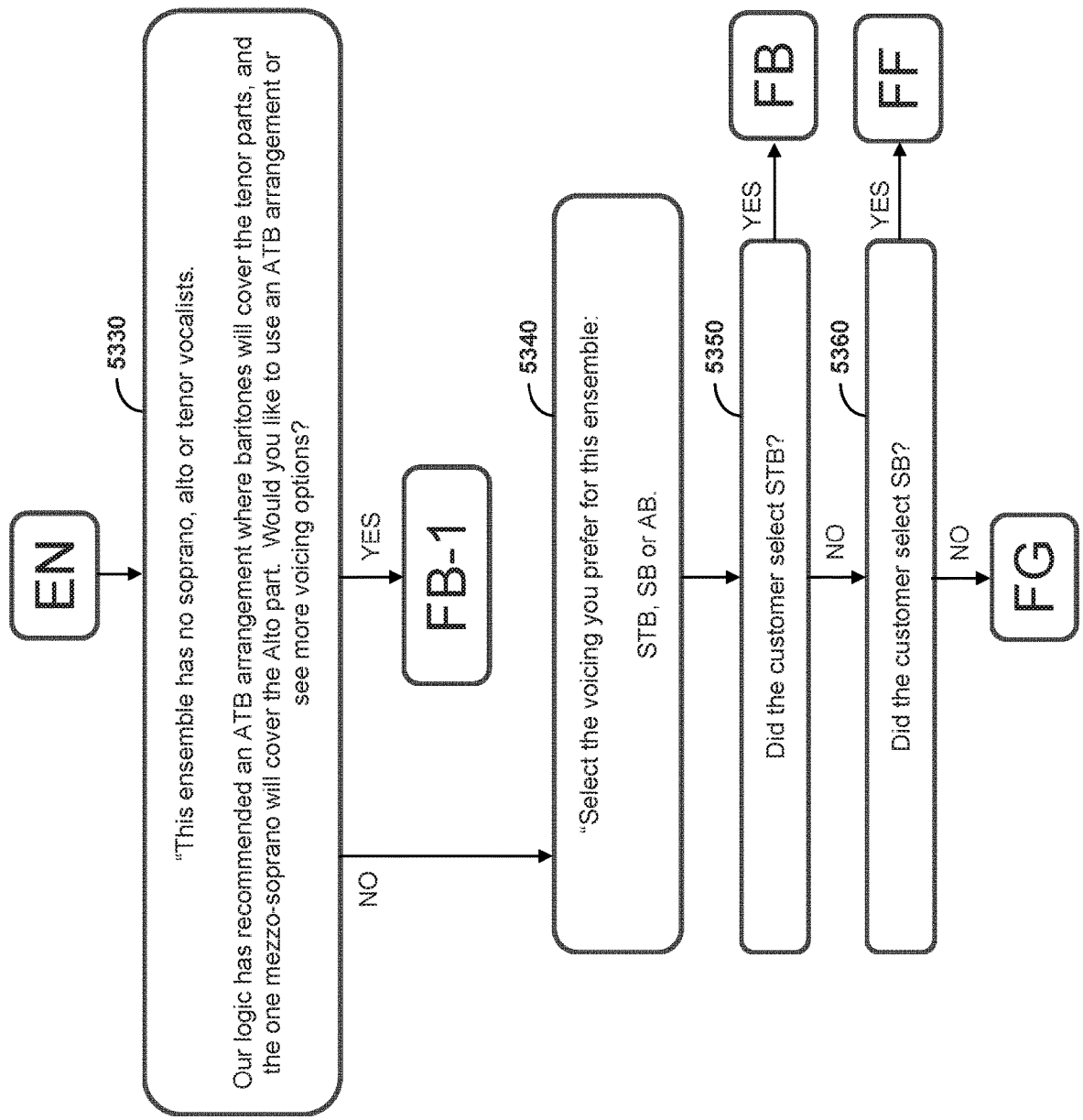
Figure 144:
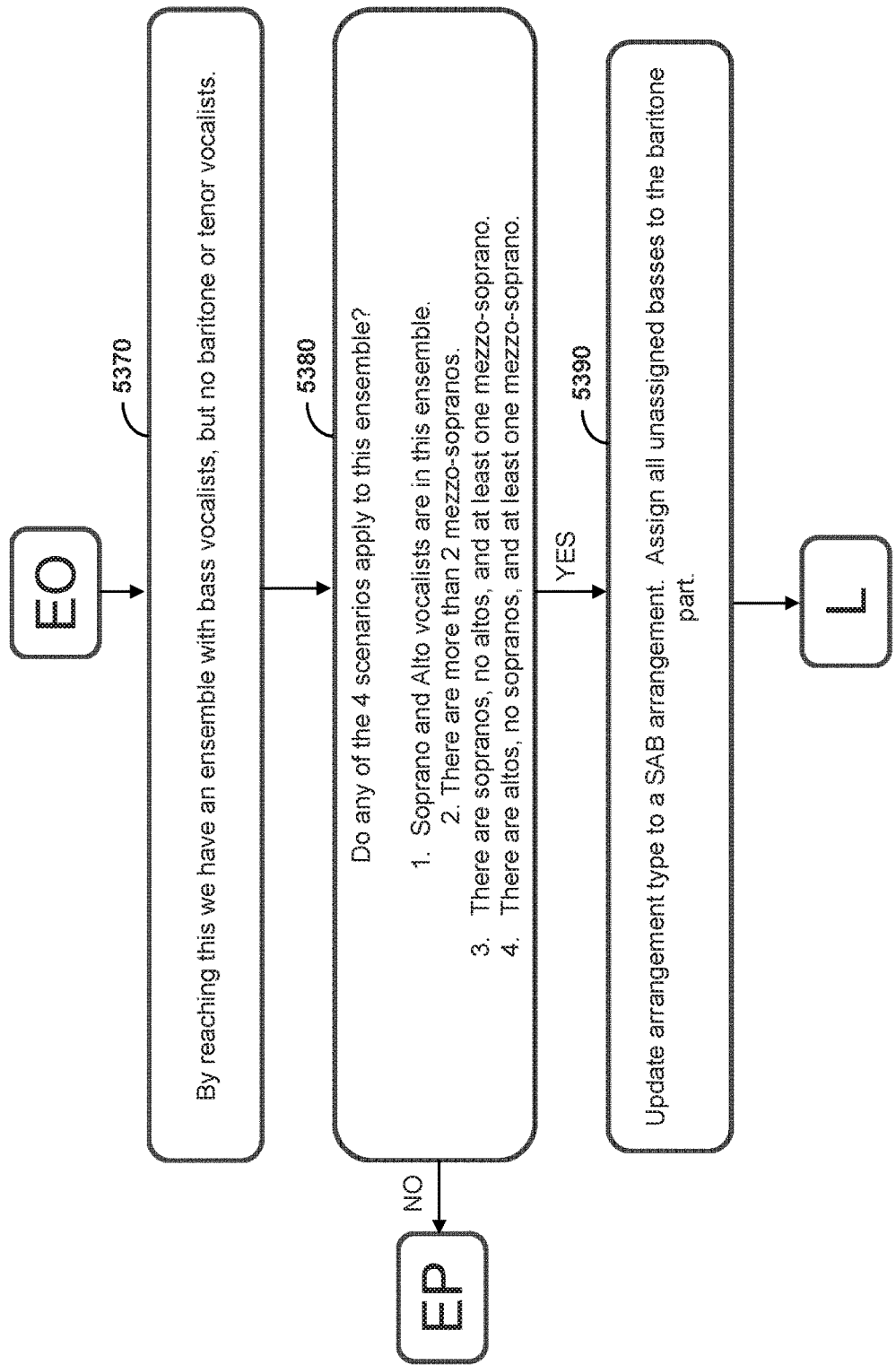
Figure 145:
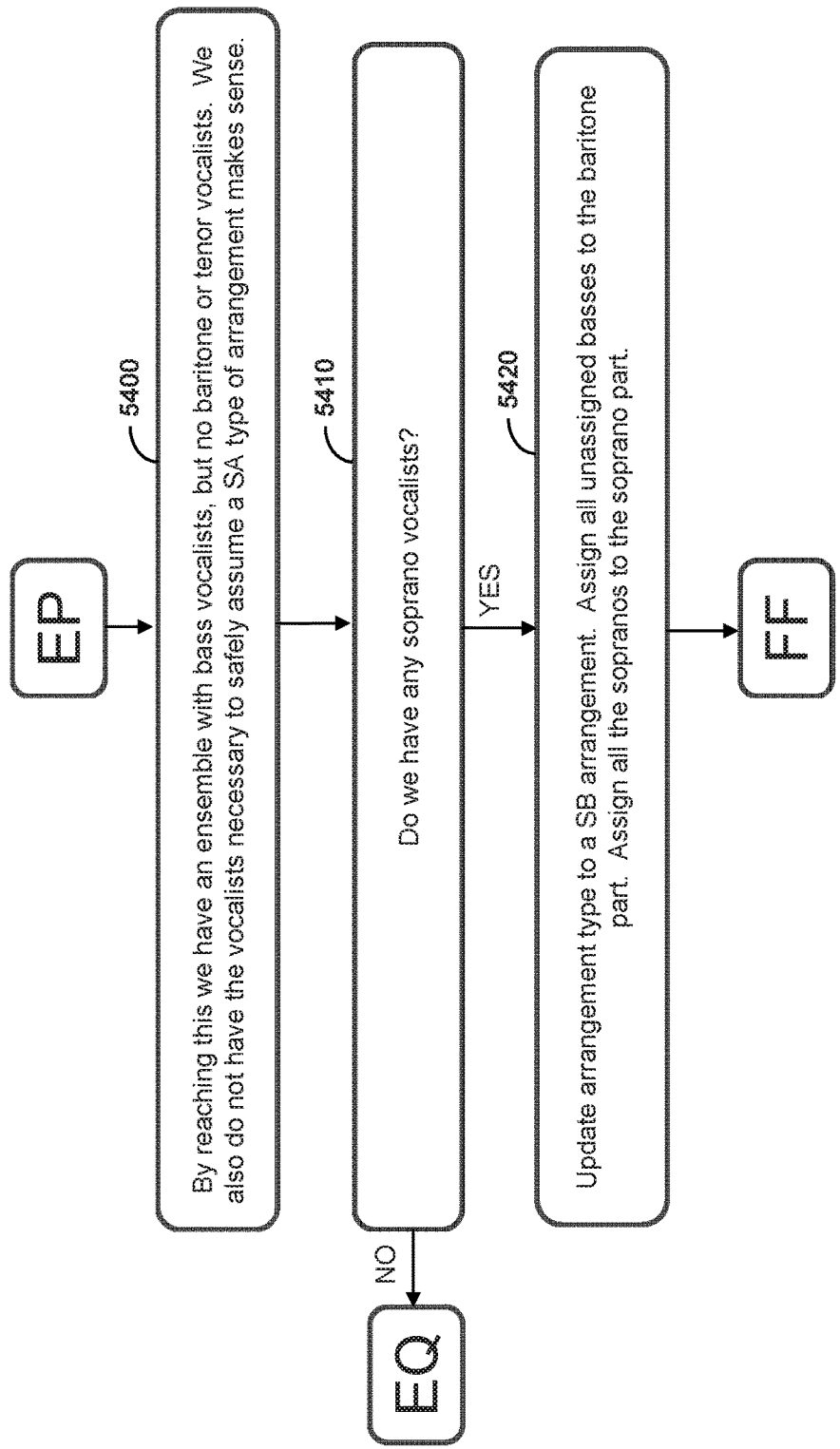
Figure 146:
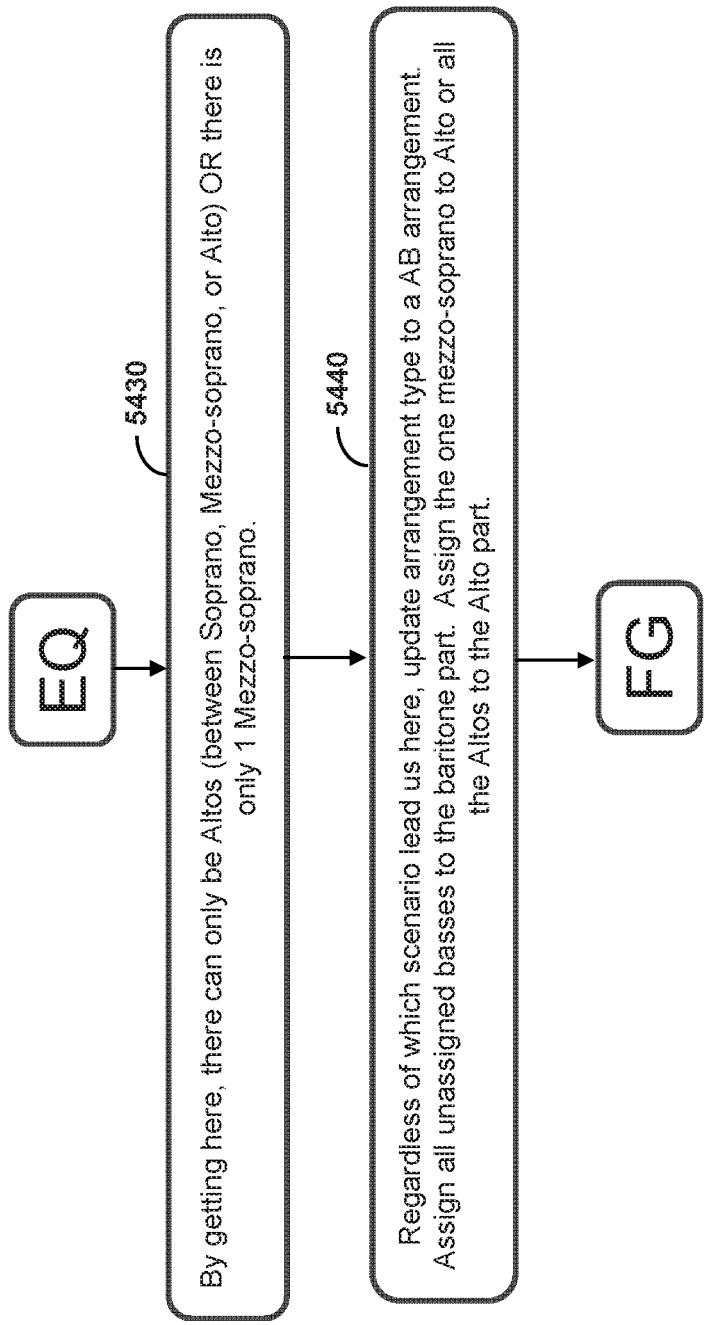
Figure 147:
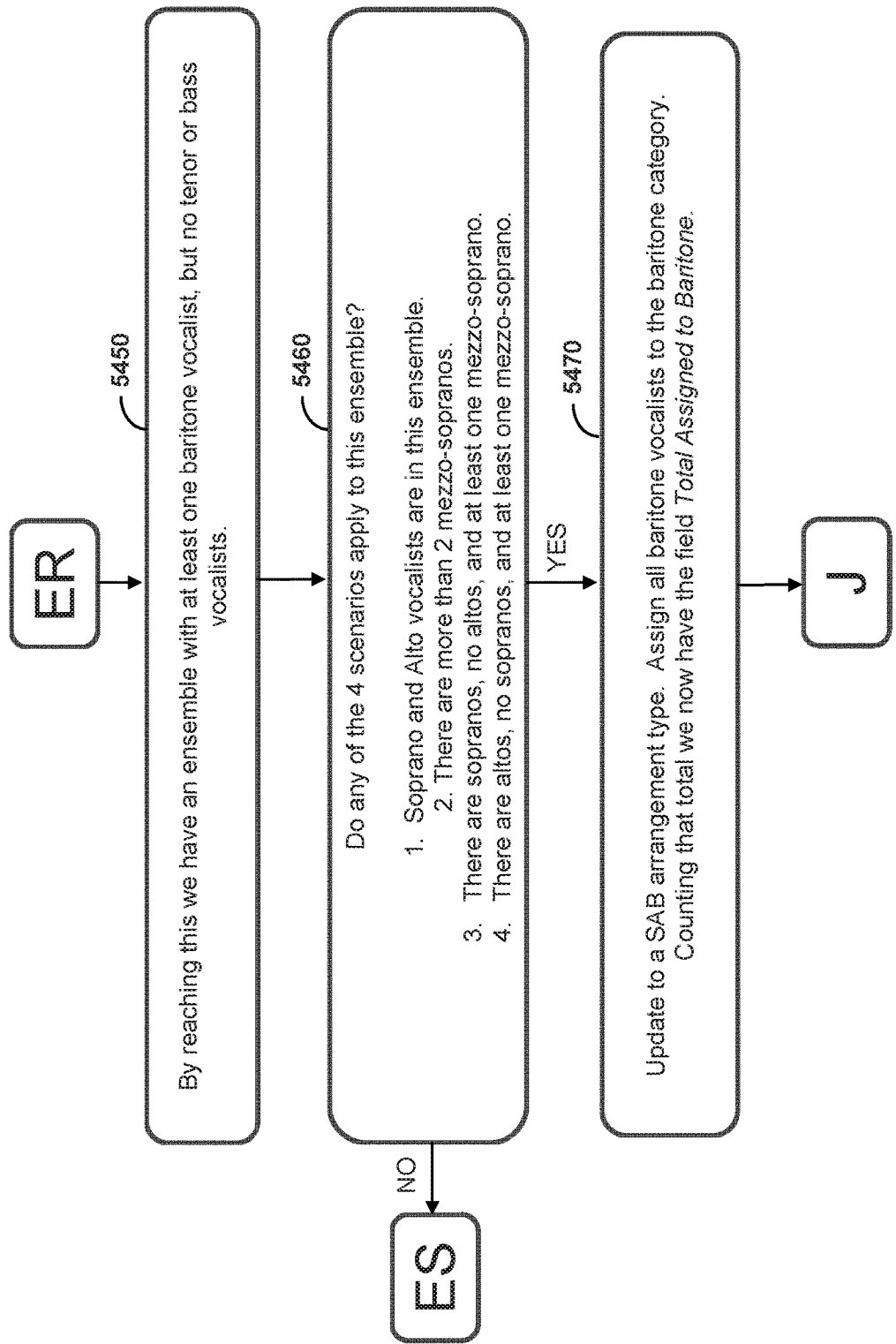
Figure 148:
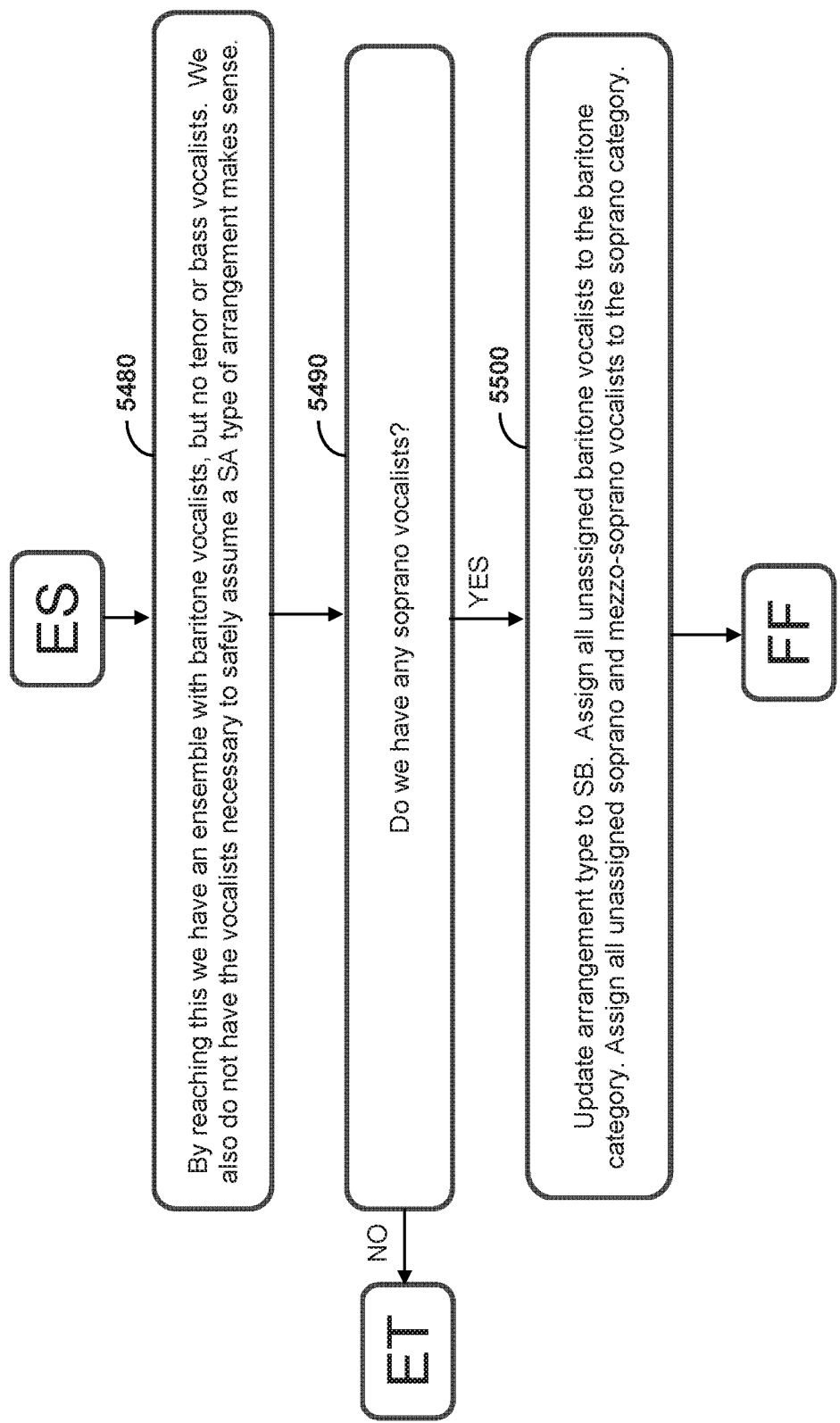
Figure 149:
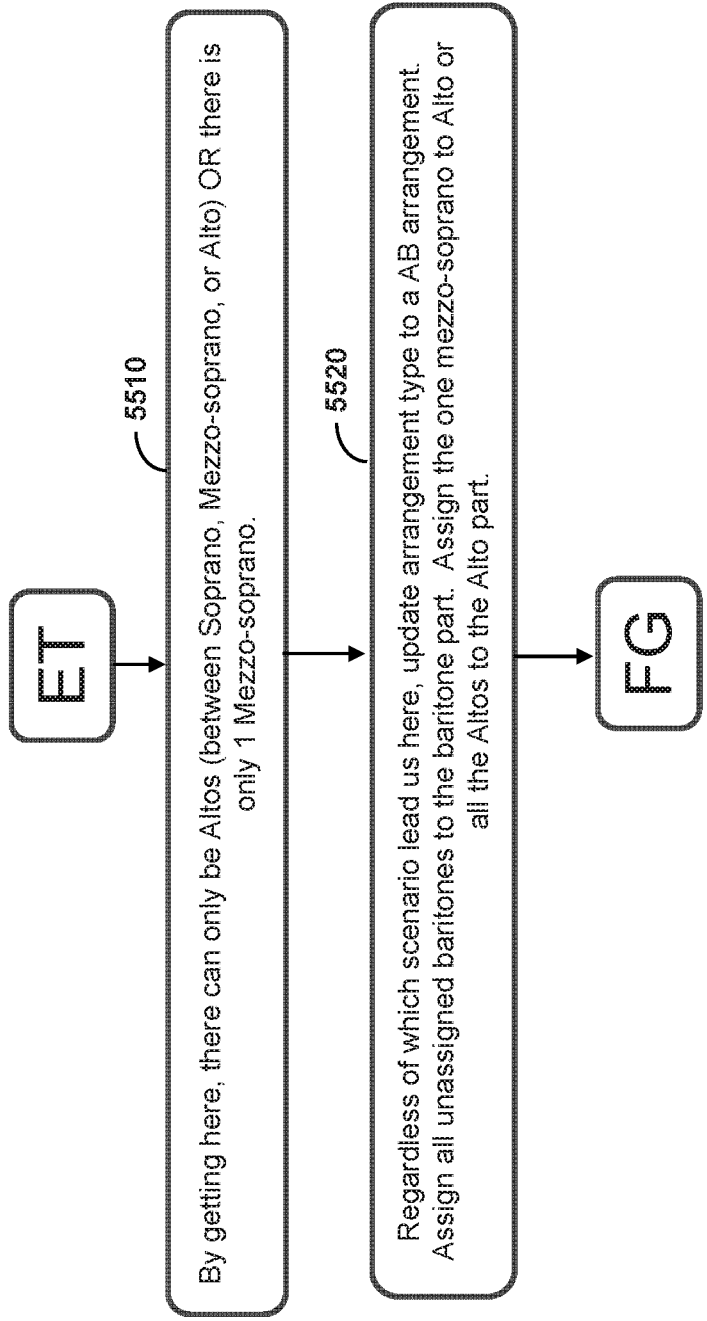
Figure 150:
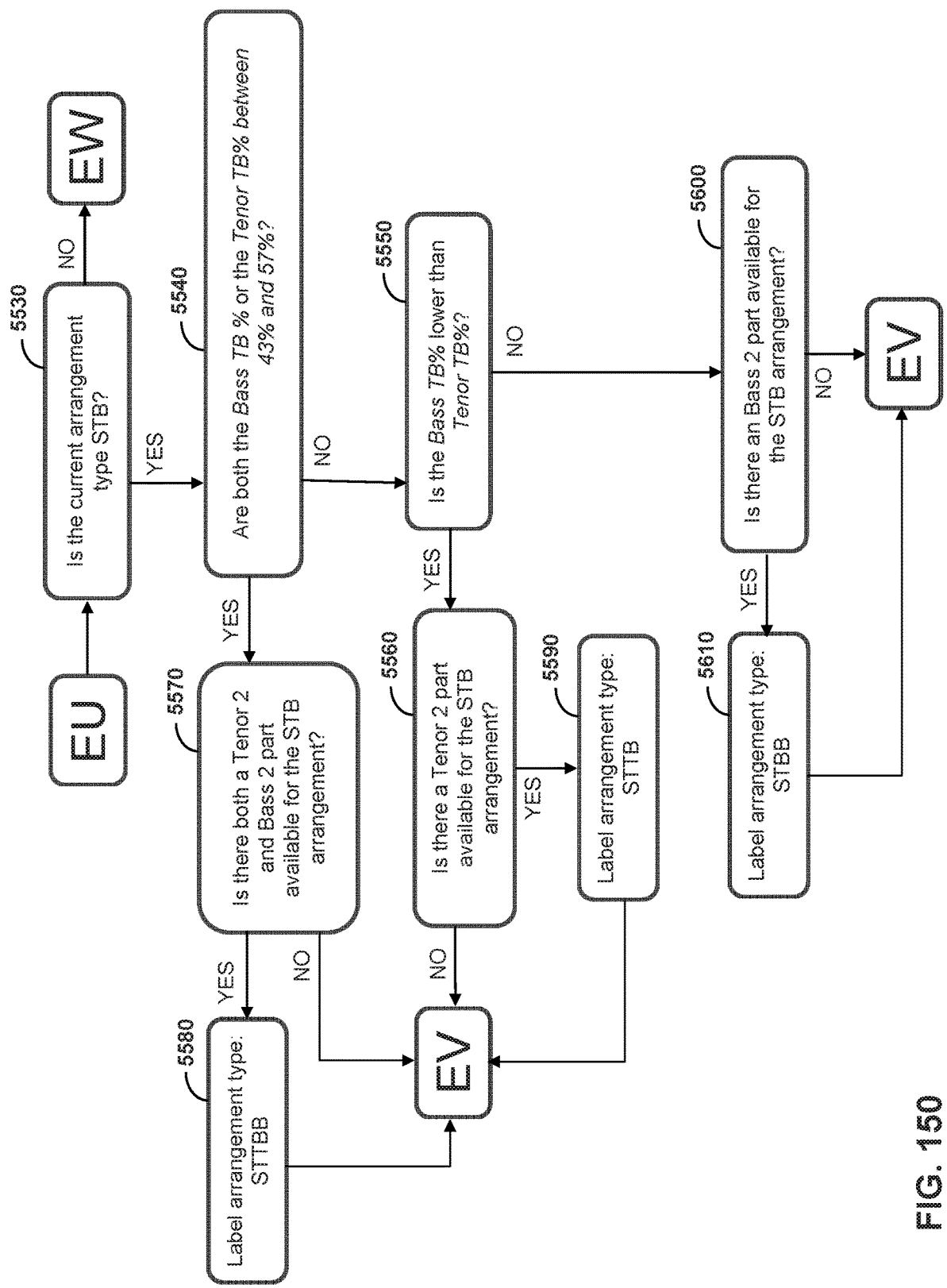
Figure 151:
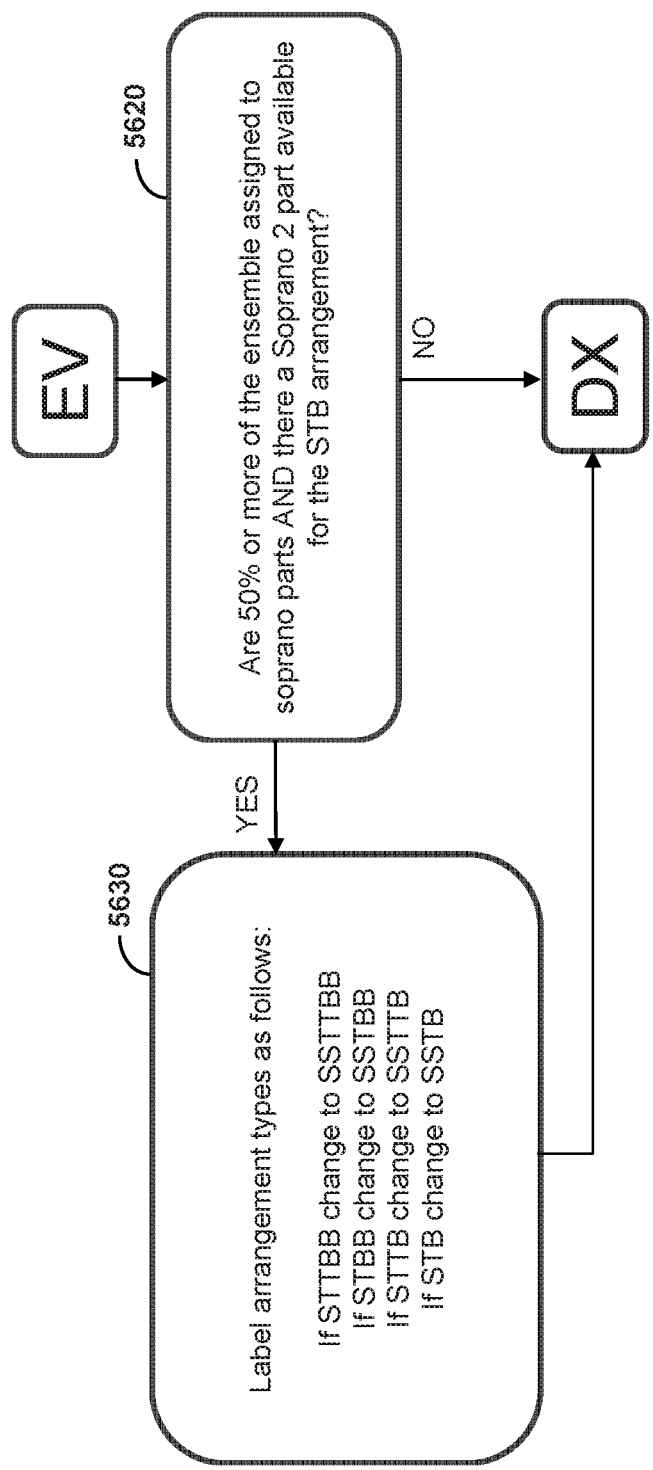
Figure 152:
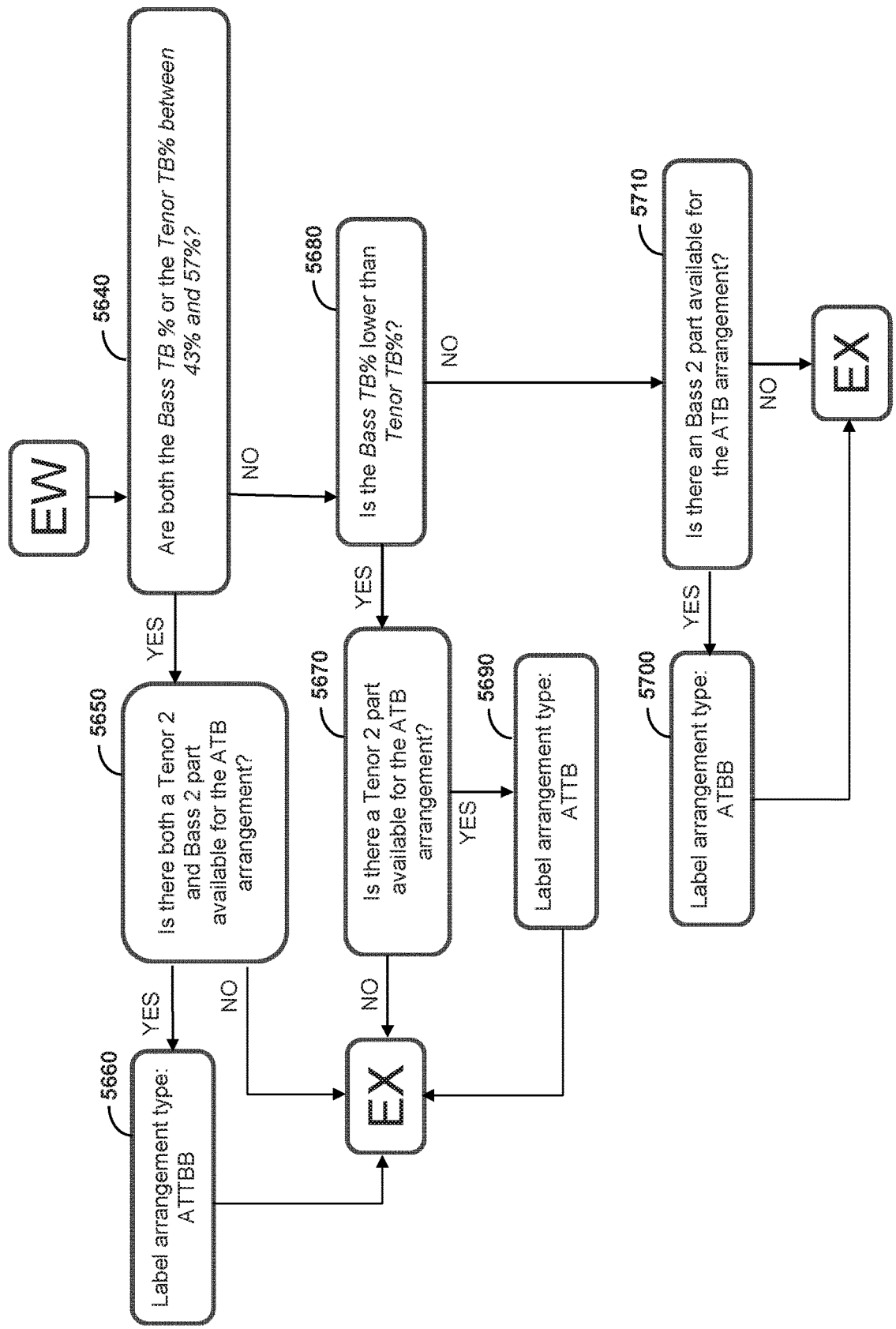
Figure 153:
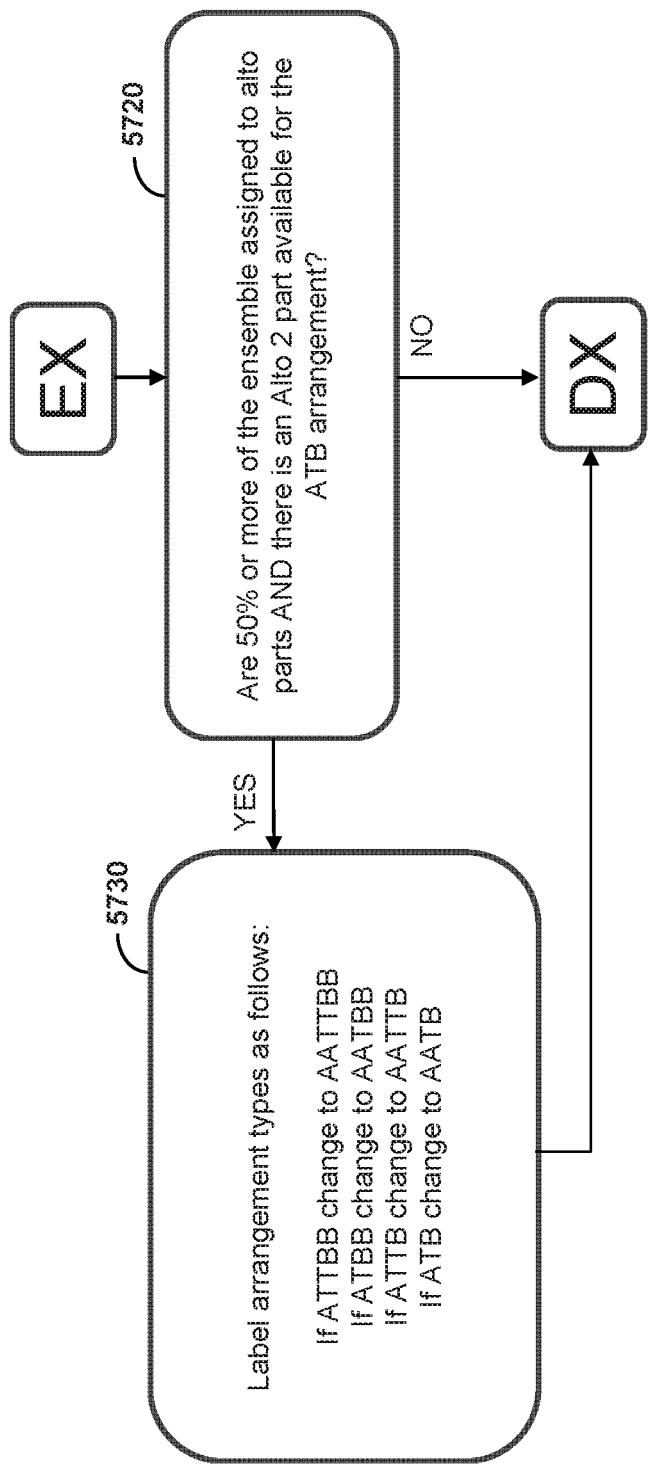
Figure 154:
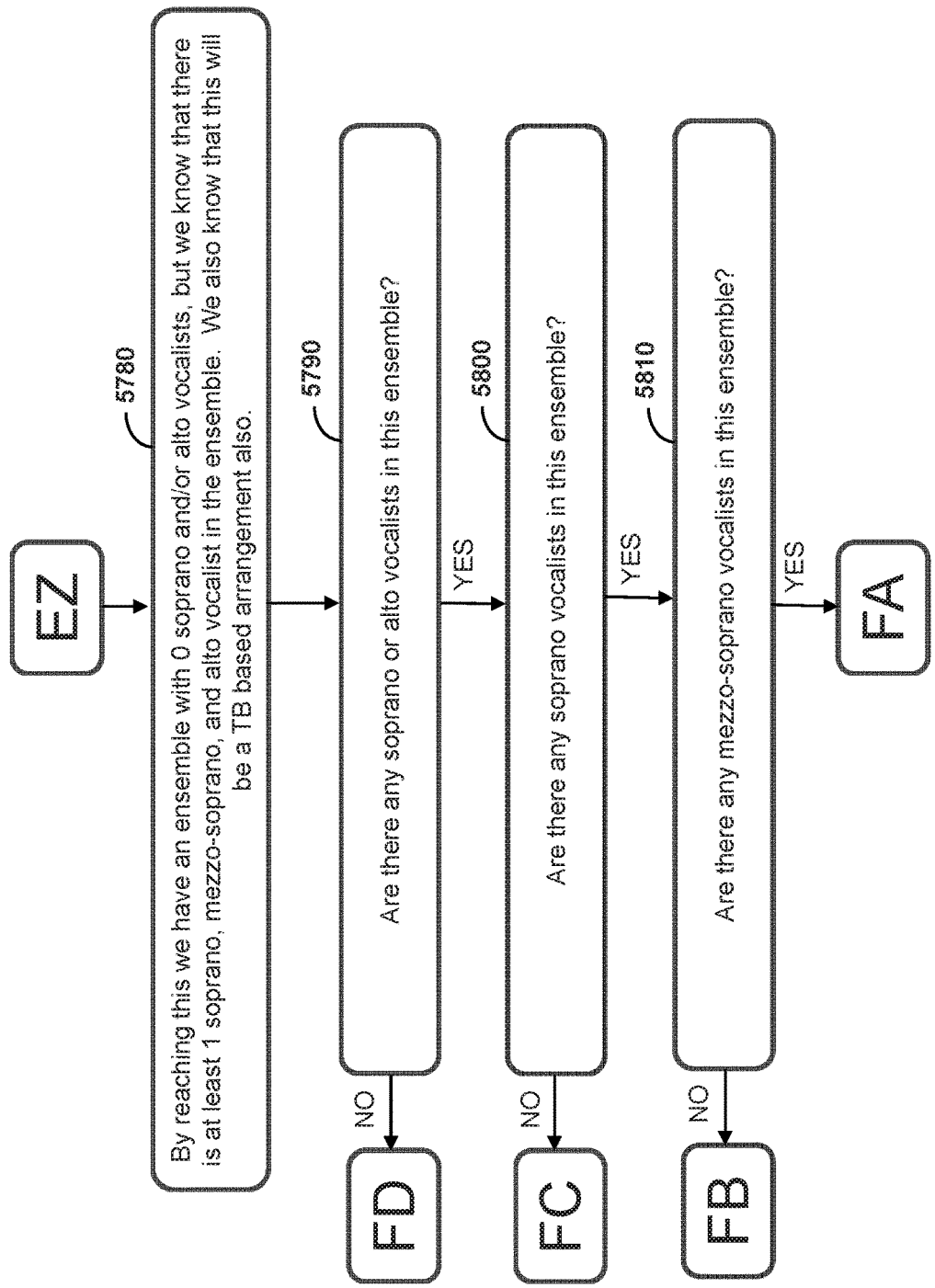
Figure 155:
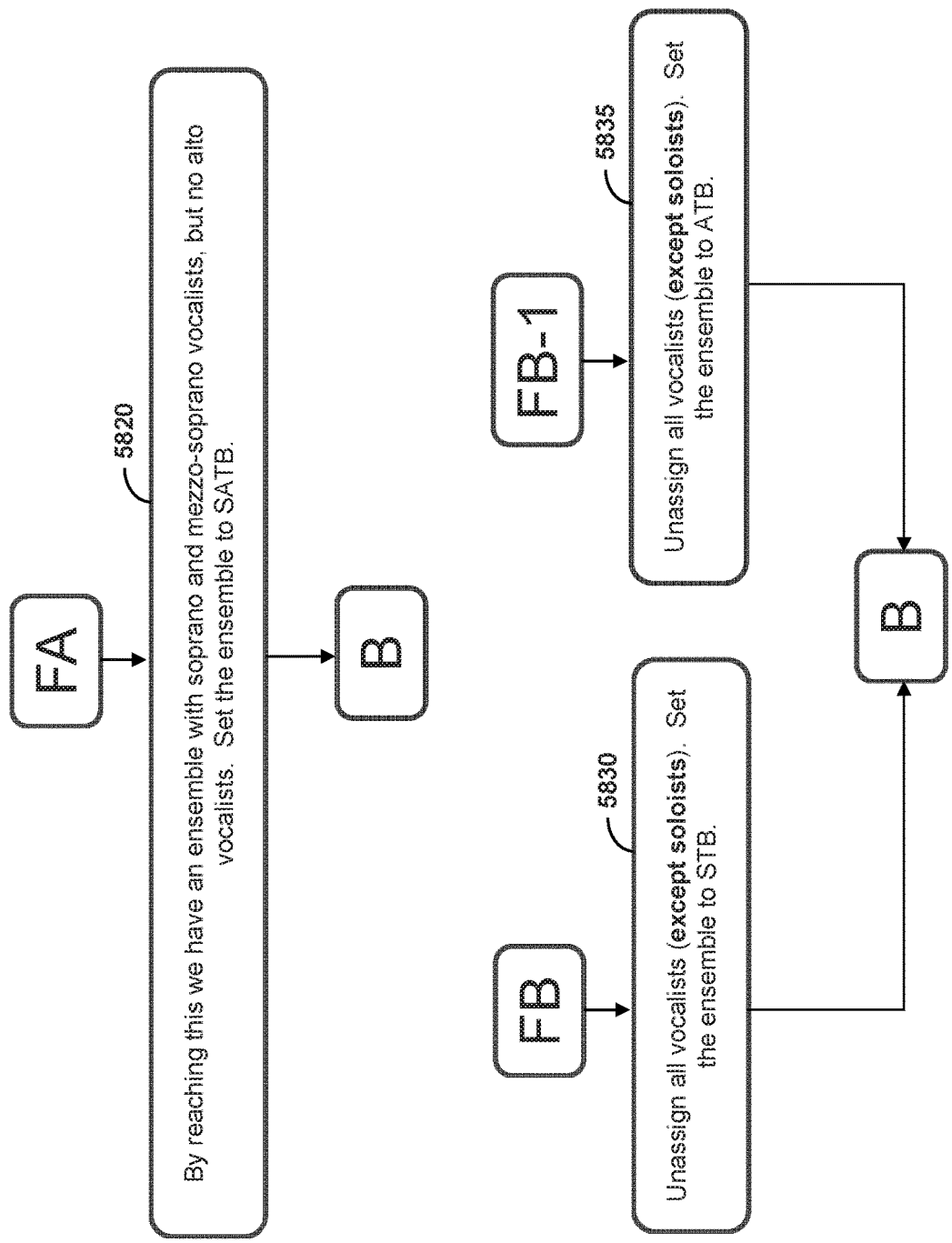
Figure 156:
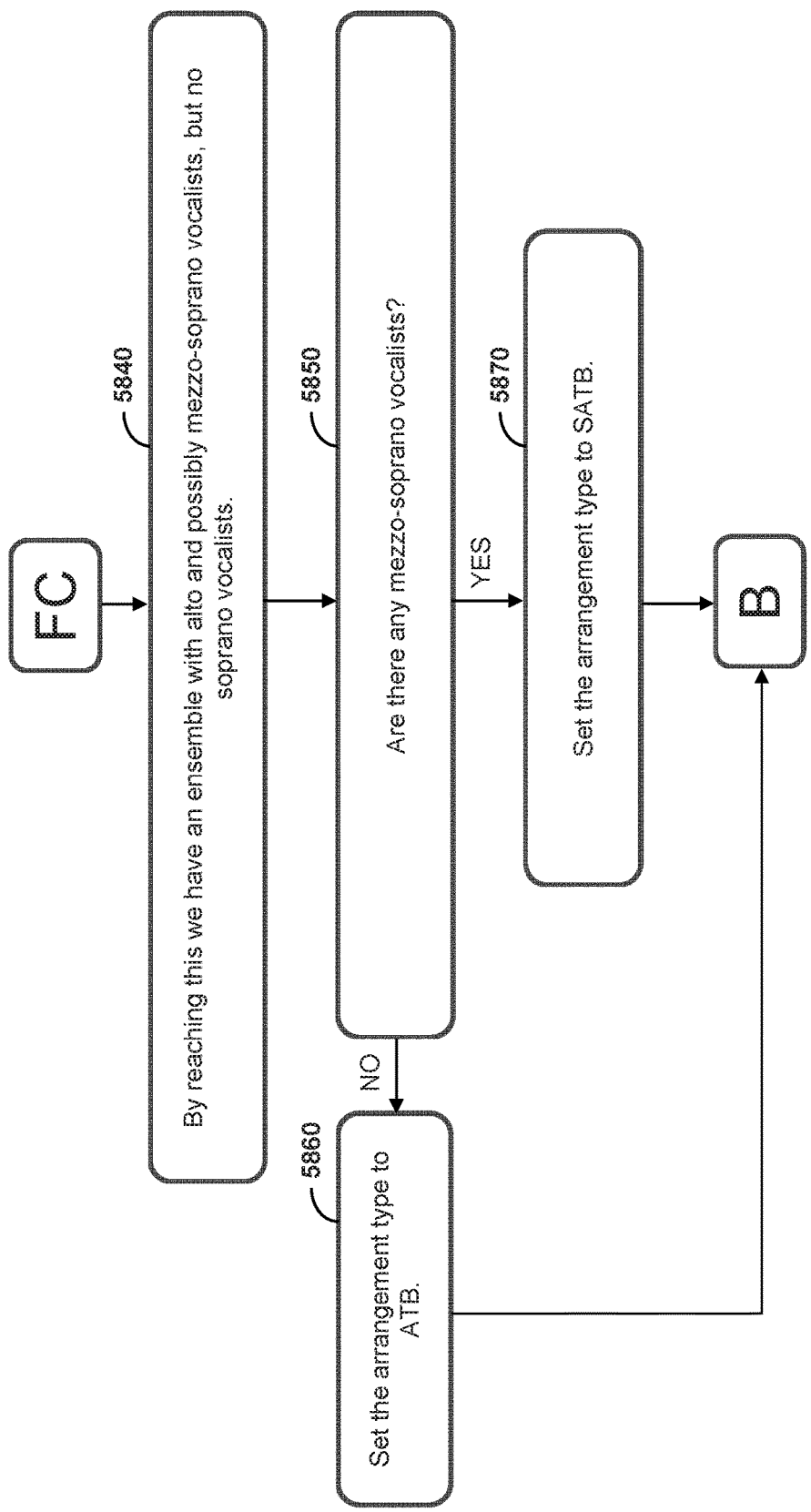
Figure 157:
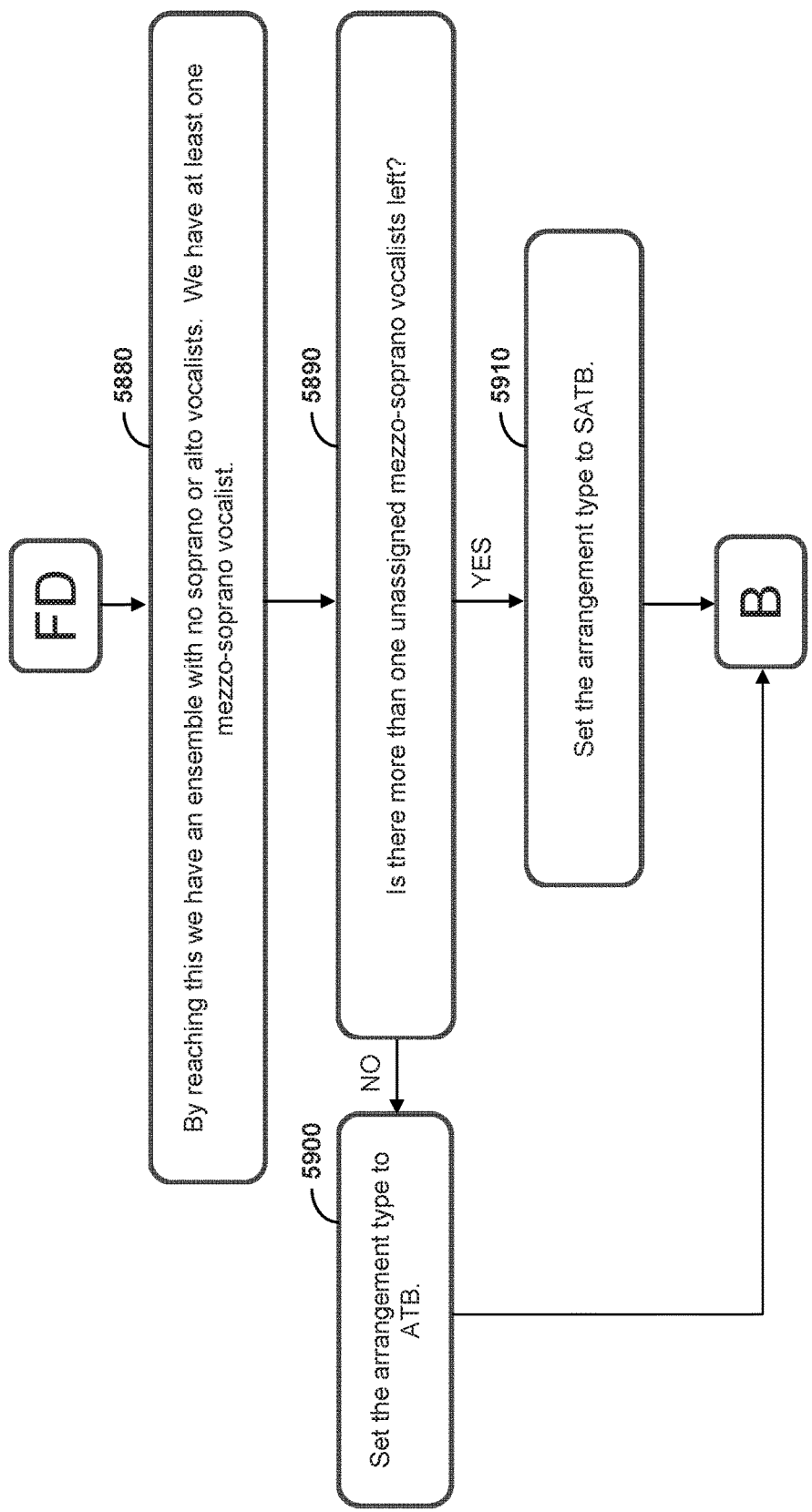
Figure 158:
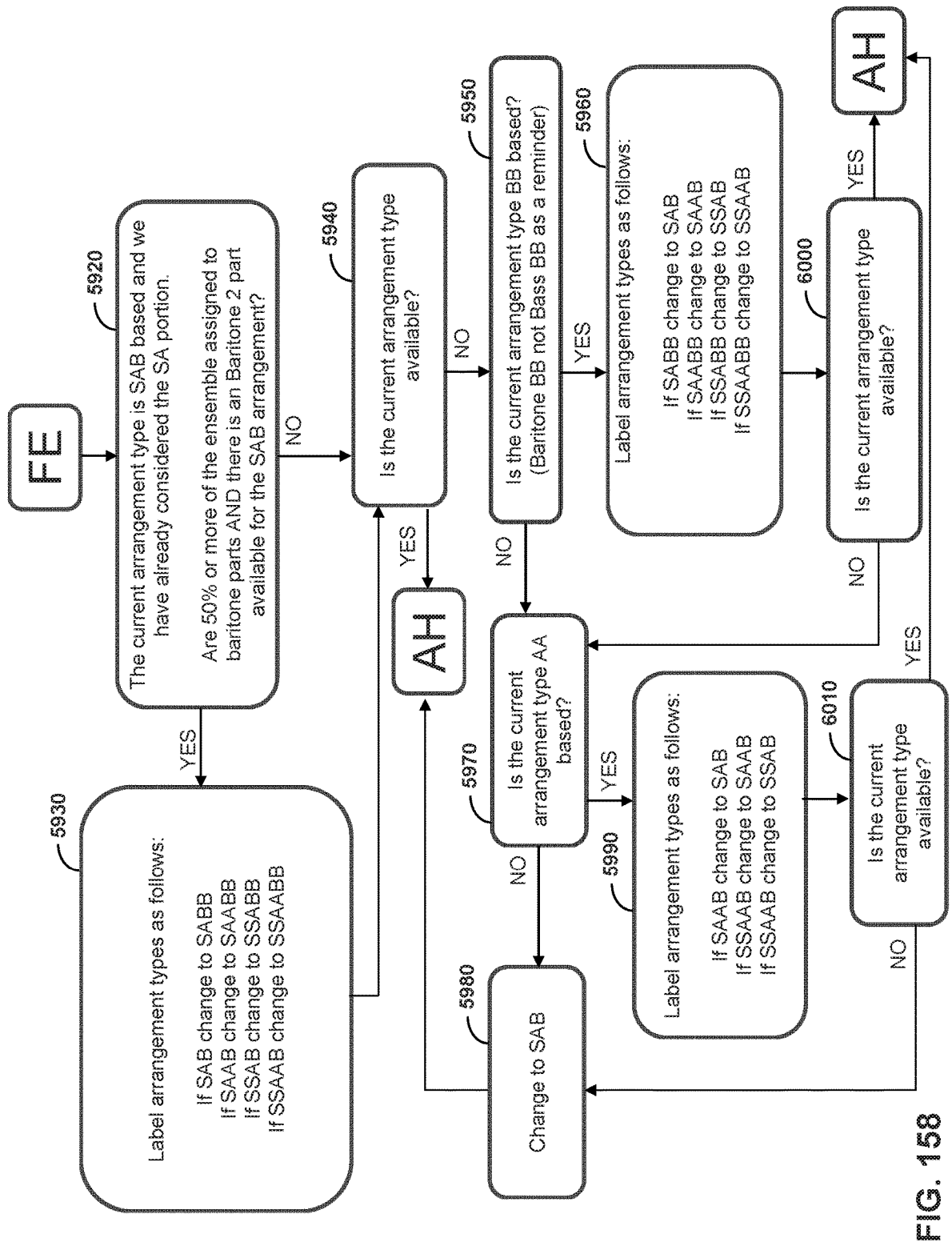
Figure 159:
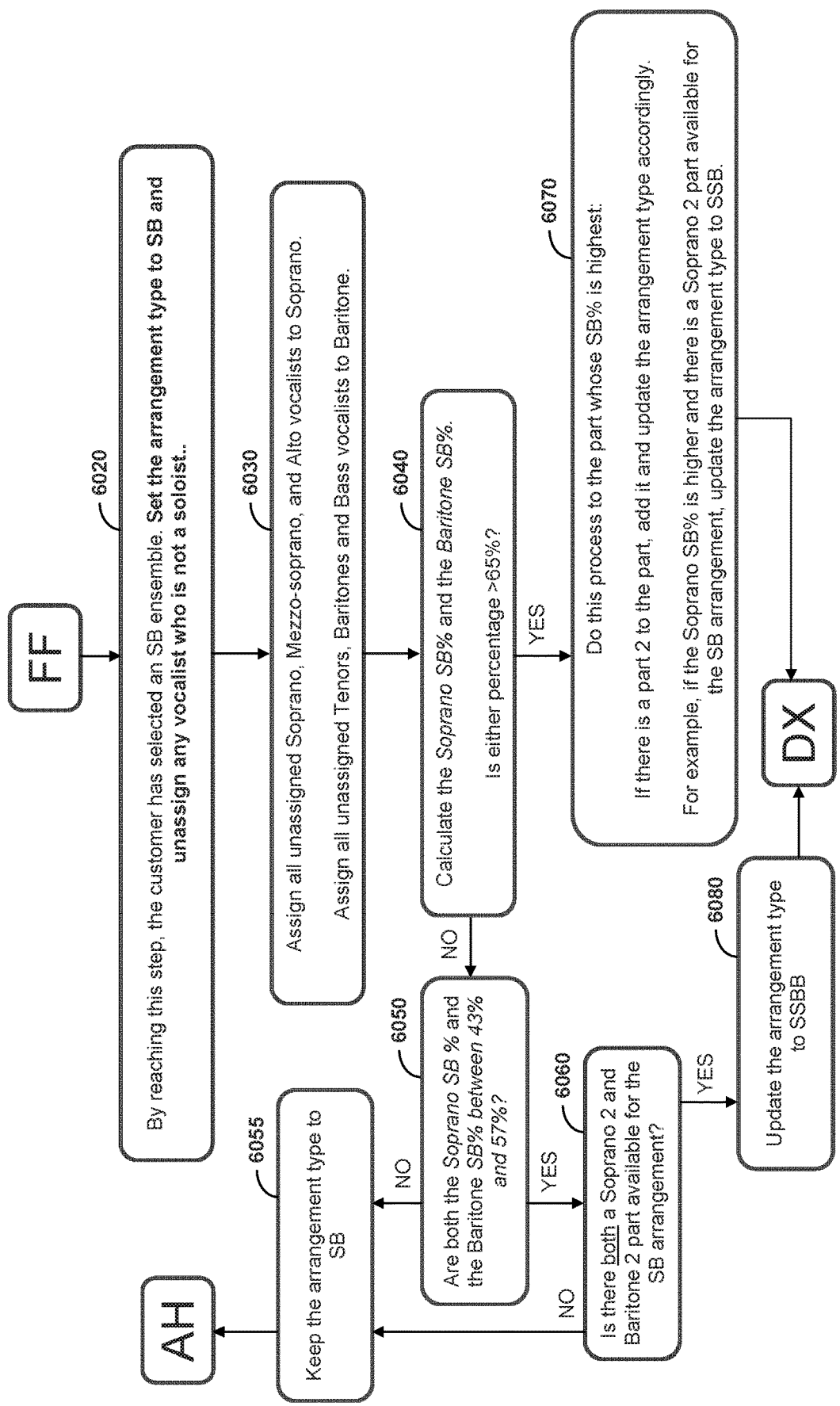
Figure 160:
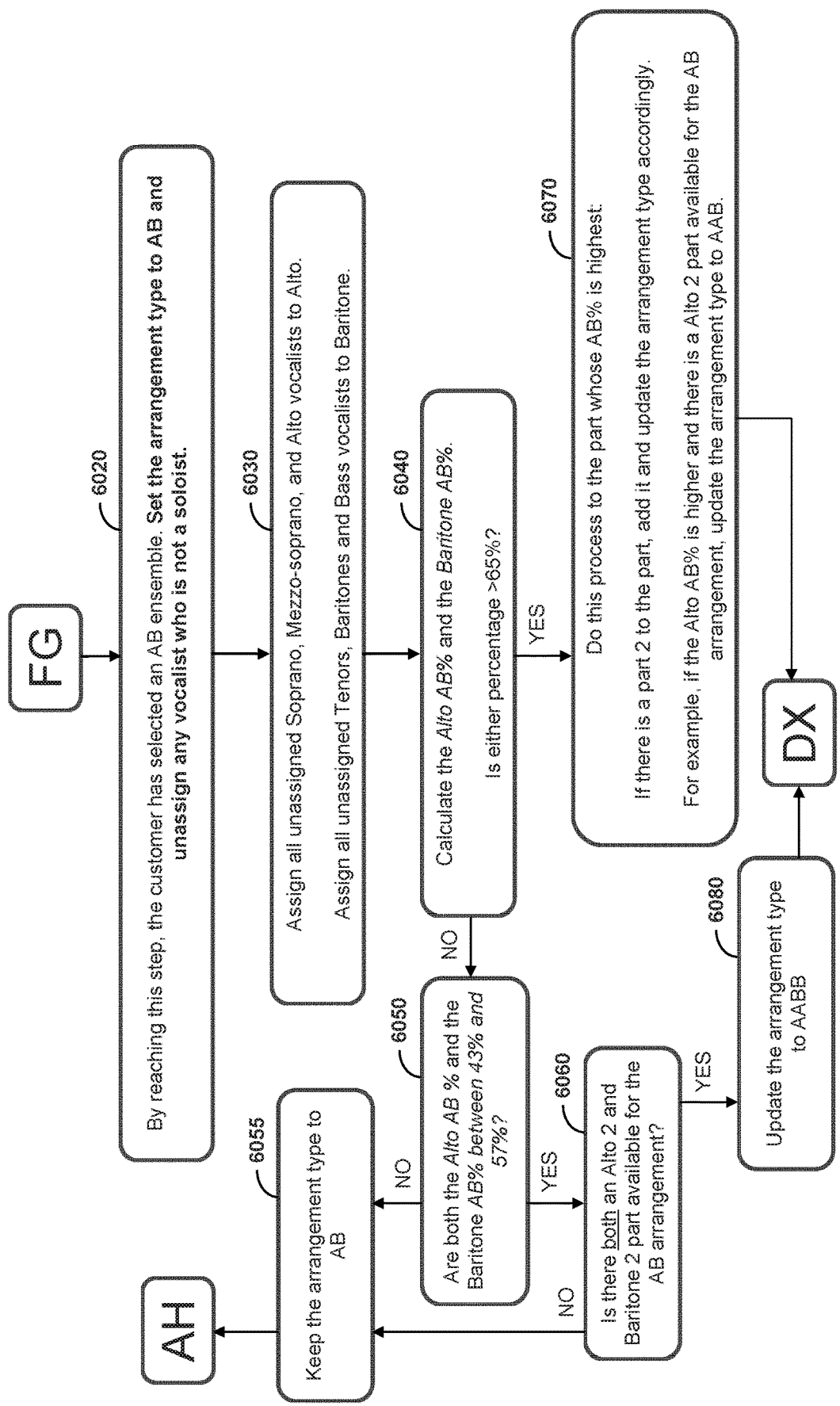

The mandatory arrangement database is queried at FIG. 127, blocks 4720-4730 to determine whether the arrived-at arrangement is available for the selected title. If the needed arrangement is not available, the ensemble is changed to an appropriate type (block 4740). At FIGS. 128-133 (blocks 4750-5020), lower-voiced ensembles are balanced, while FIGS. 134-160 (blocks 5030-6080) address the balancing of other permutations of ensemble parts.

At block 7, vocalists are assigned to specific parts based on the vocal range of the vocalist and the part being assigned, as shown in more detail by example in FIGS. 28-59 (blocks 1150-2205). Bass and baritone vocalists are assigned in FIGS. 28-38 (blocks 1150-1545). Tenor vocalists are assigned in FIGS. 39-45 (1555-1760). Alto vocalists are assigned at FIGS. 46-52 (1770-2040). Sopranos are assigned at FIGS. 53-59 (2045-2205).

At block 8, it is determined whether any available variants on the part should be used, and if so, for which vocalist(s). For example, the system may determine which altos would be best suited to perform the alto 1 part, and which would be better off singing the alto 2 part. This aspect is illustrated in detail in FIGS. 60-74 and FIG. 99 (blocks 2210-2600 and 3645-3655).

In block 9, the system processes standard arrangement types such as SATB, STB, ATB, SSA, SAB, SA, TB, or solo. Where ensembles have parts that are needed but which are not provided by the initial arrangement, the system must create the missing parts. Additionally, alternative versions within the larger arrangement categories may be created. For example, SATB could be further altered into SSATB or SATBB. Arrangements may be enhanced either by adding alternate arrangements or reducing larger arrangements. In another example, an SATB arrangement would focus on the SA and TB functions separately. If a SSAATTBB arrangement was initially selected, alternate versions for the SA portion of the arrangement could include SSAA, SSA, SAA, and SA. If a SATB arrangement was initially selected, a simpler a three part arrangement may be generated, e.g., SA, SSA and SAA. Example implementation details of this aspect of the disclosure are presented in FIGS. 75-98 (blocks 2610-3640).

Figure 2:
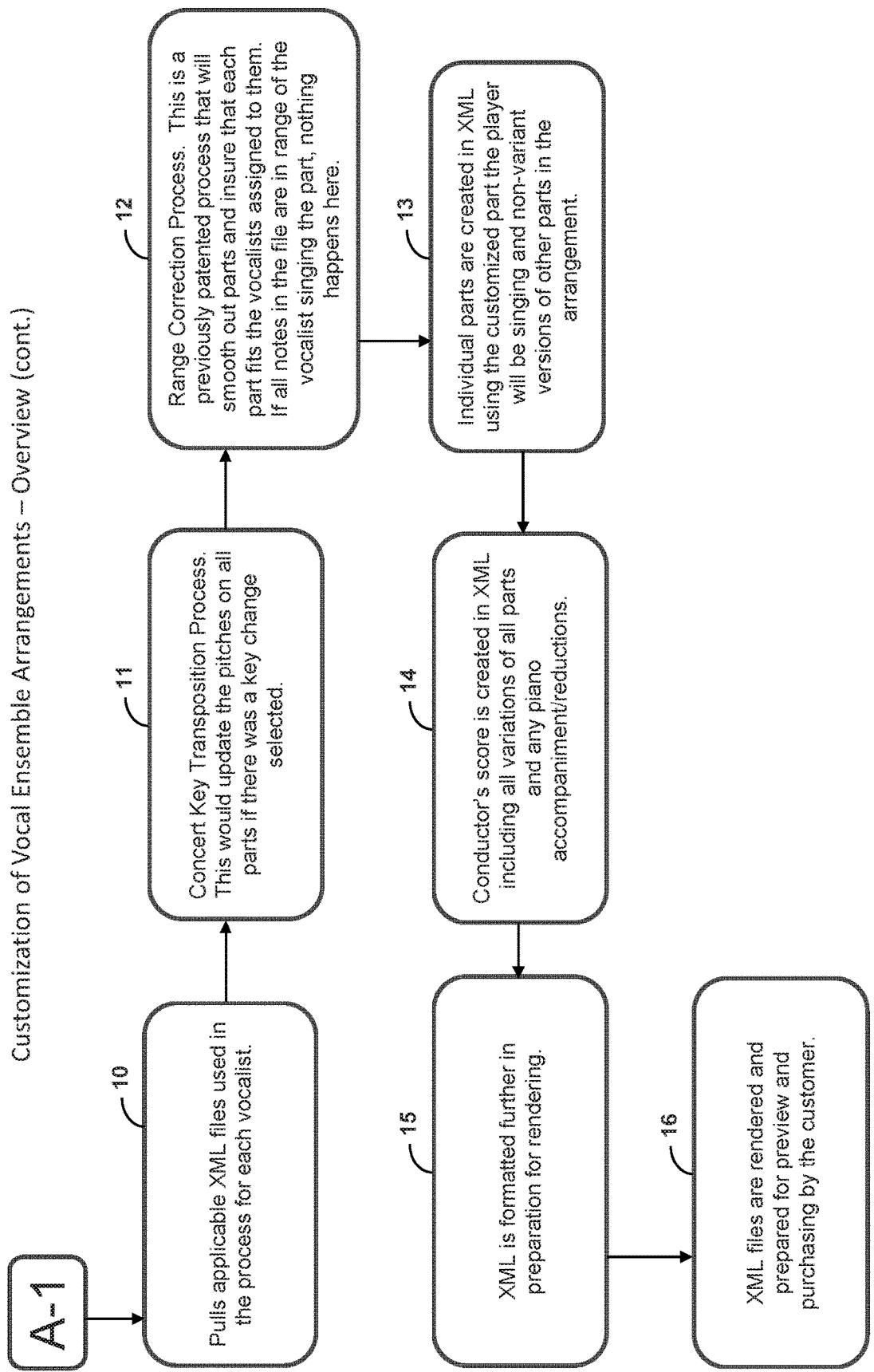
Figure 3:
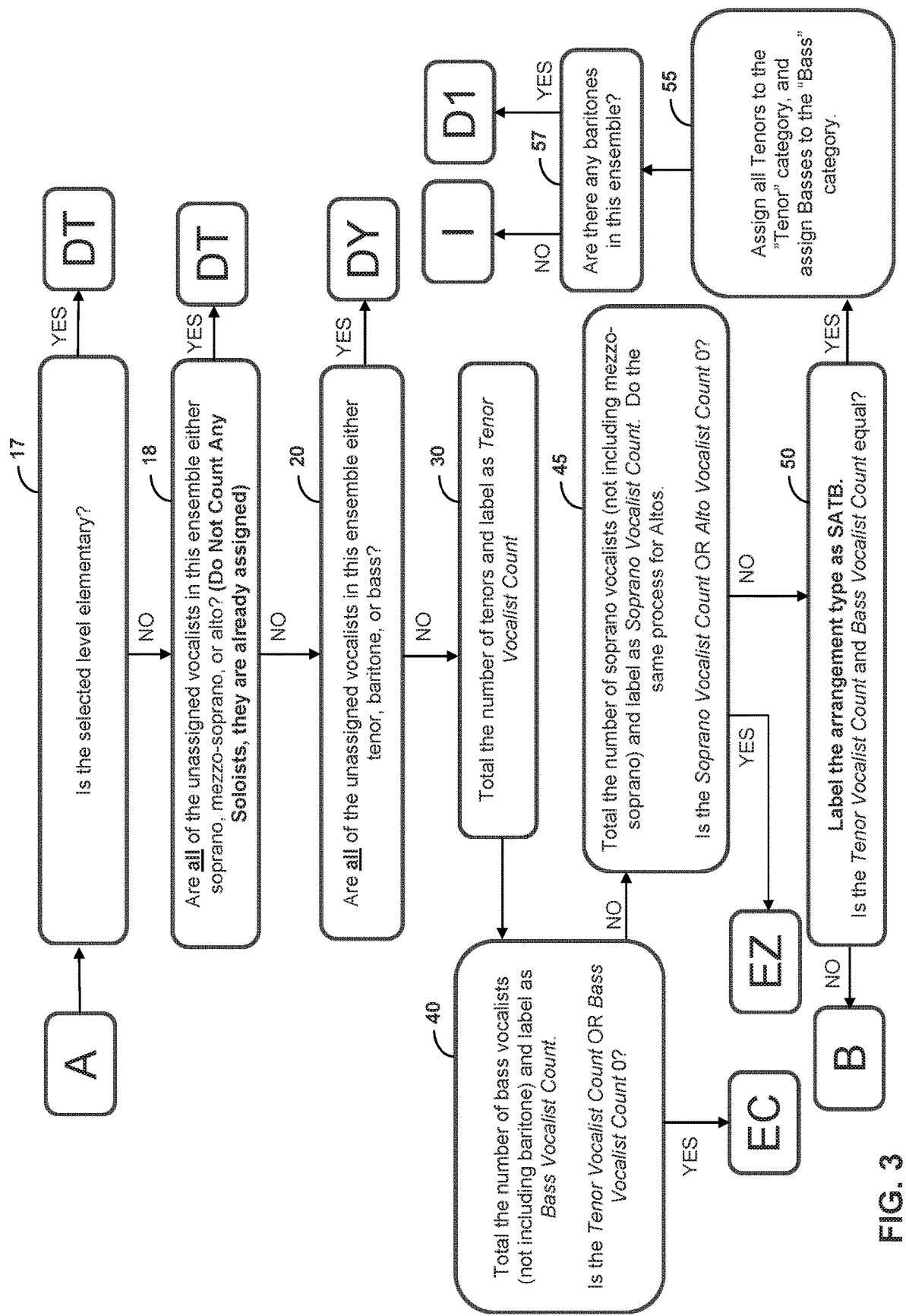
FIGS. 3-27 illustrate aspects of the present disclosure directed to determining the ideal arrangement type for a given ensemble of vocalists.
Figure 4:
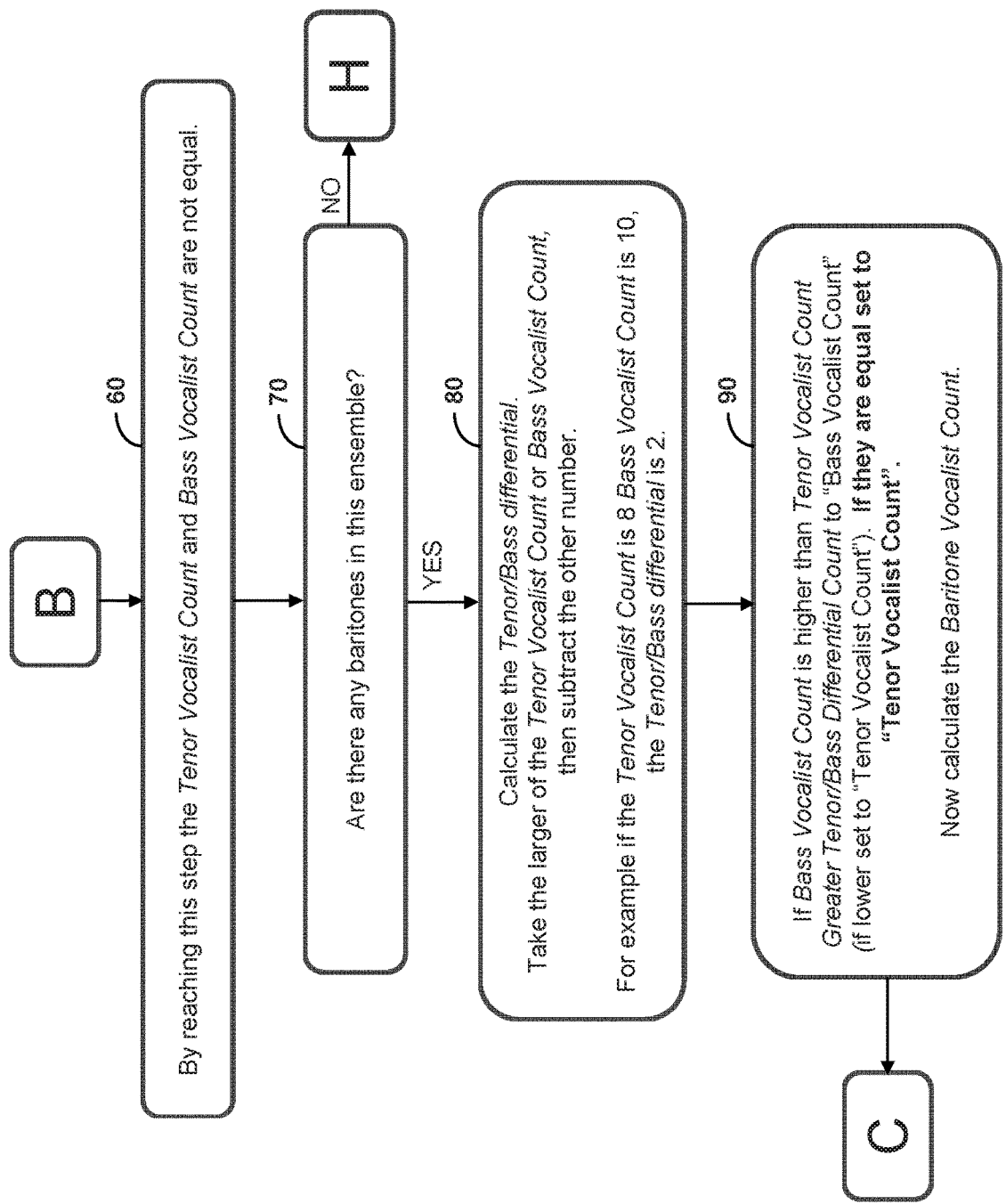
Figure 5:
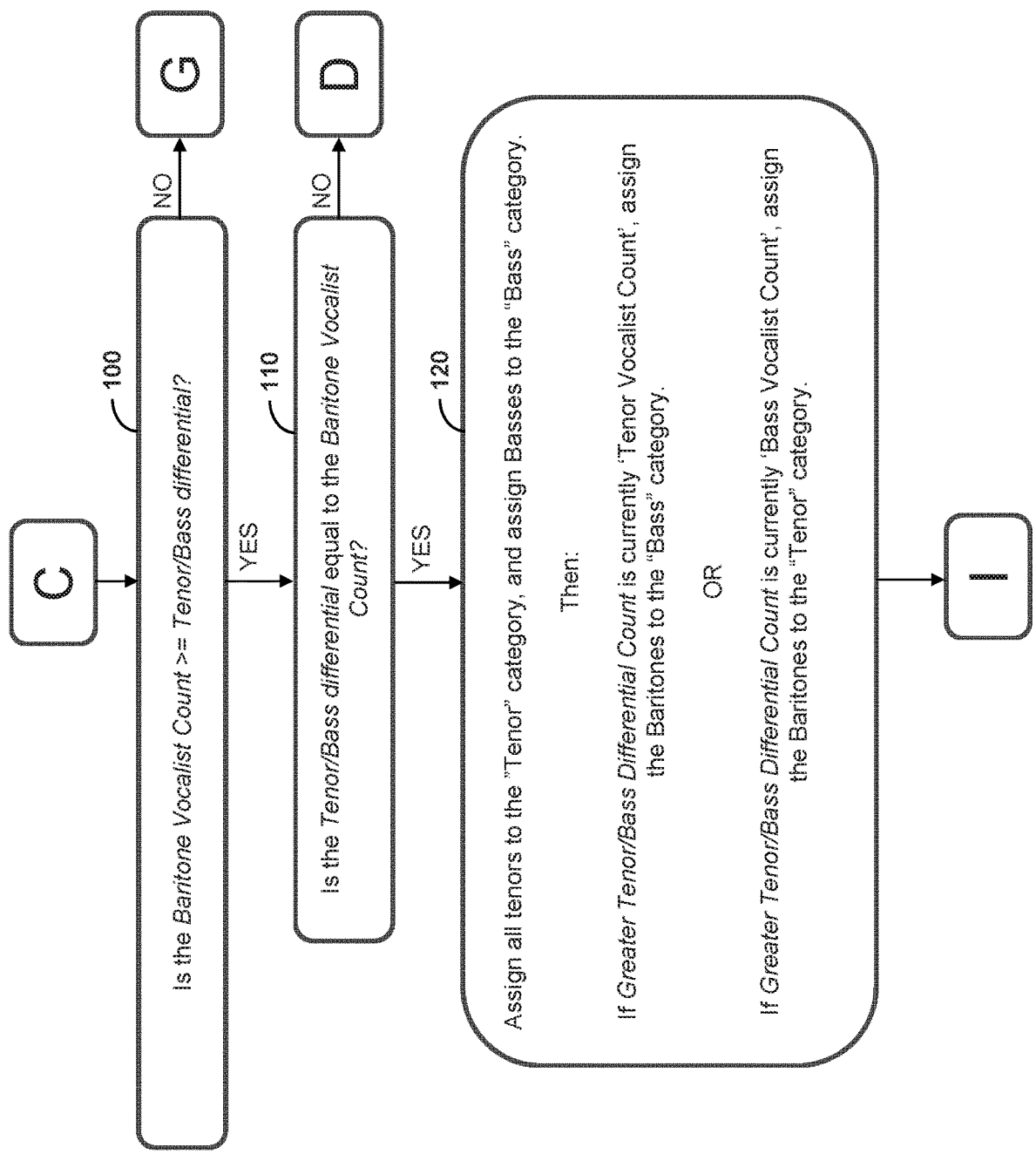
Figure 6:
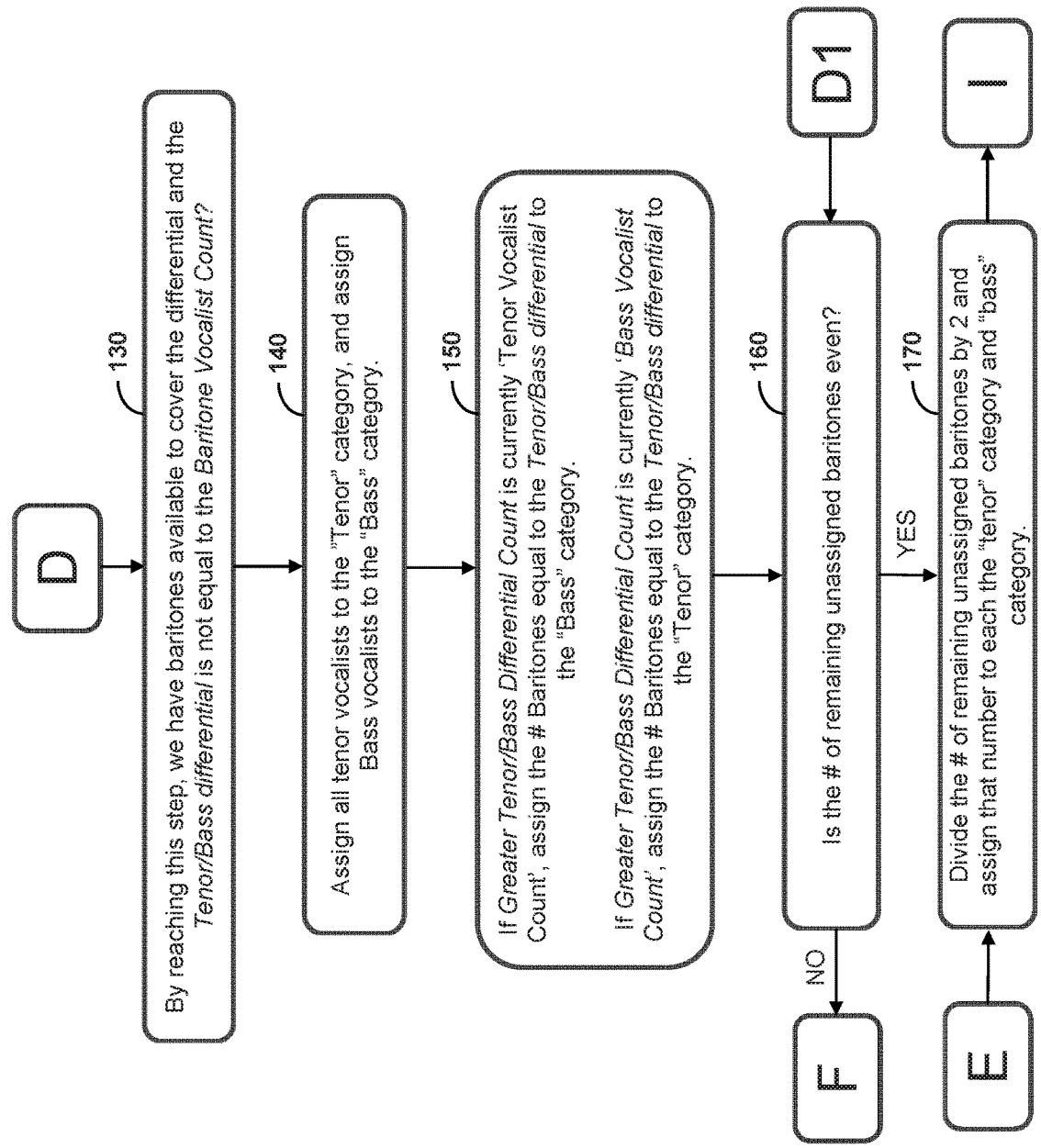
Figure 7:
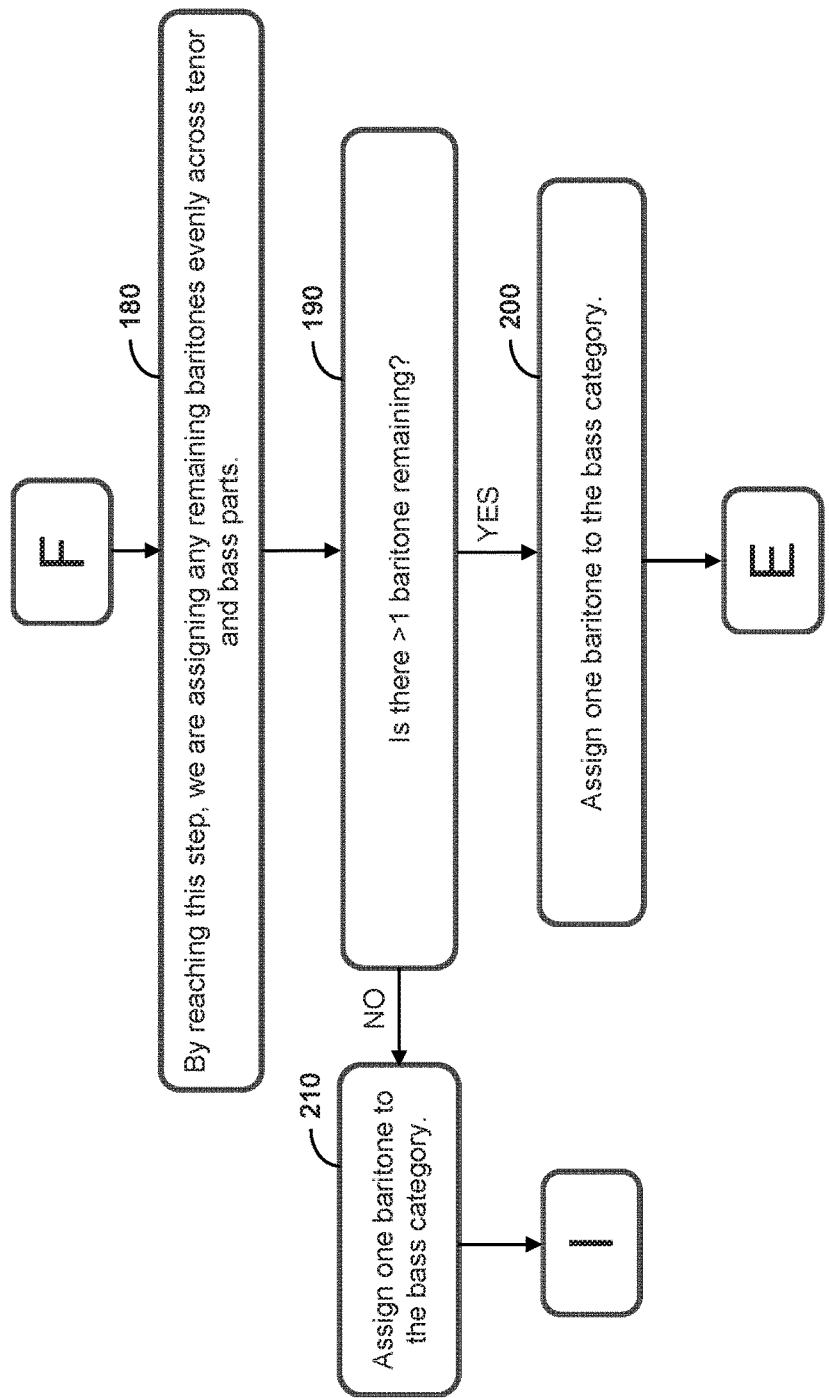
Figure 8:
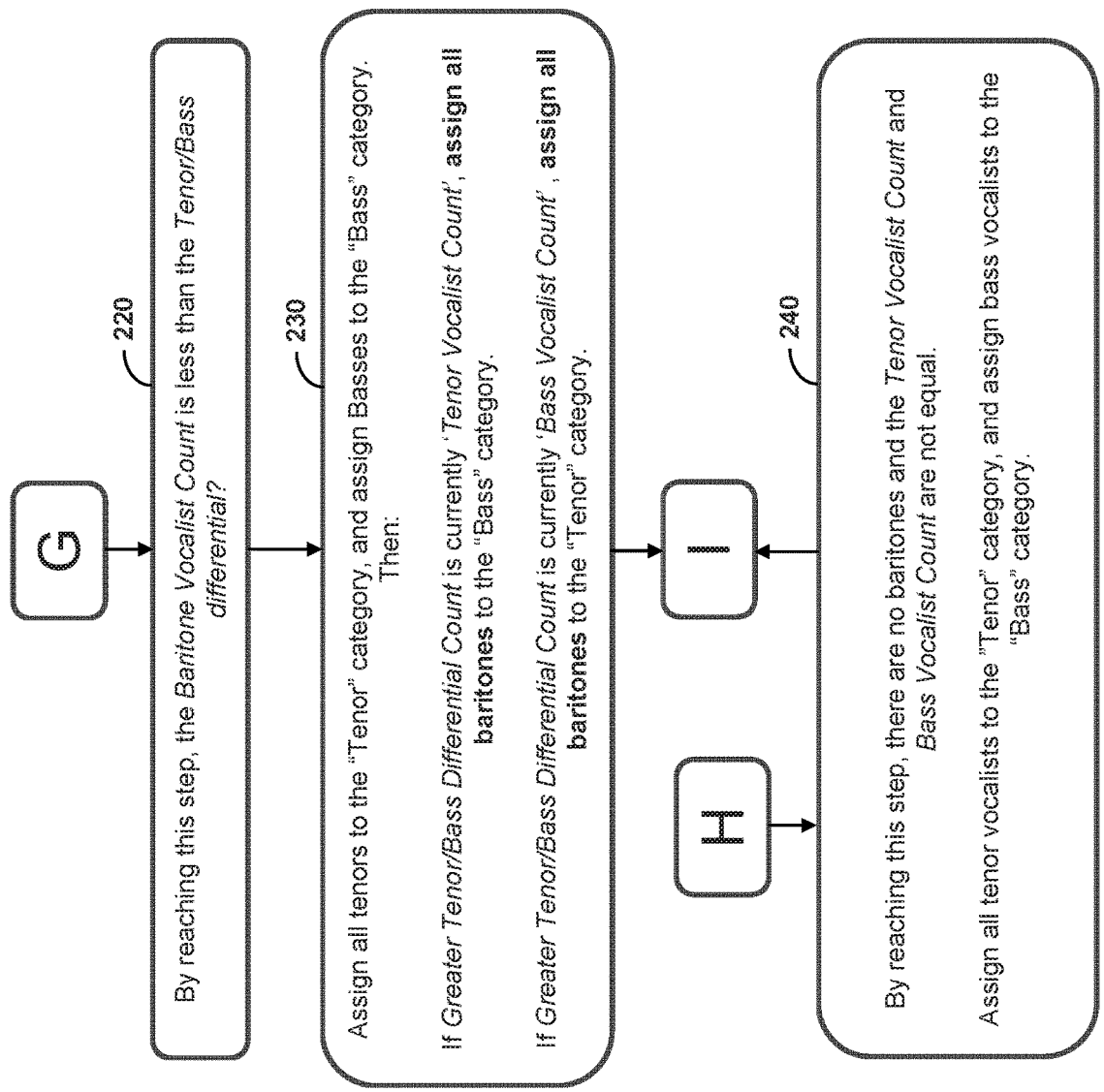
Figure 9:
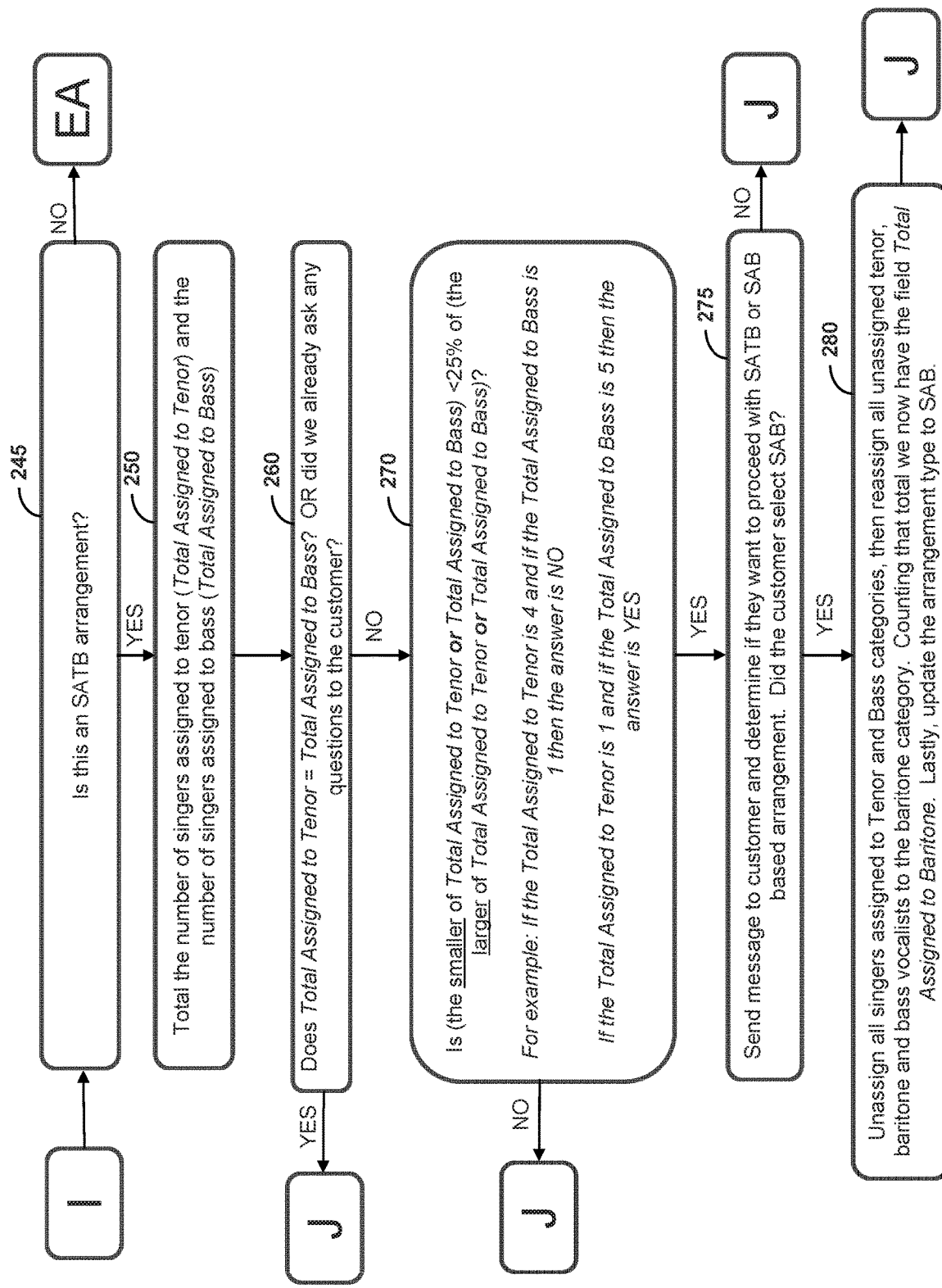
Figure 10:
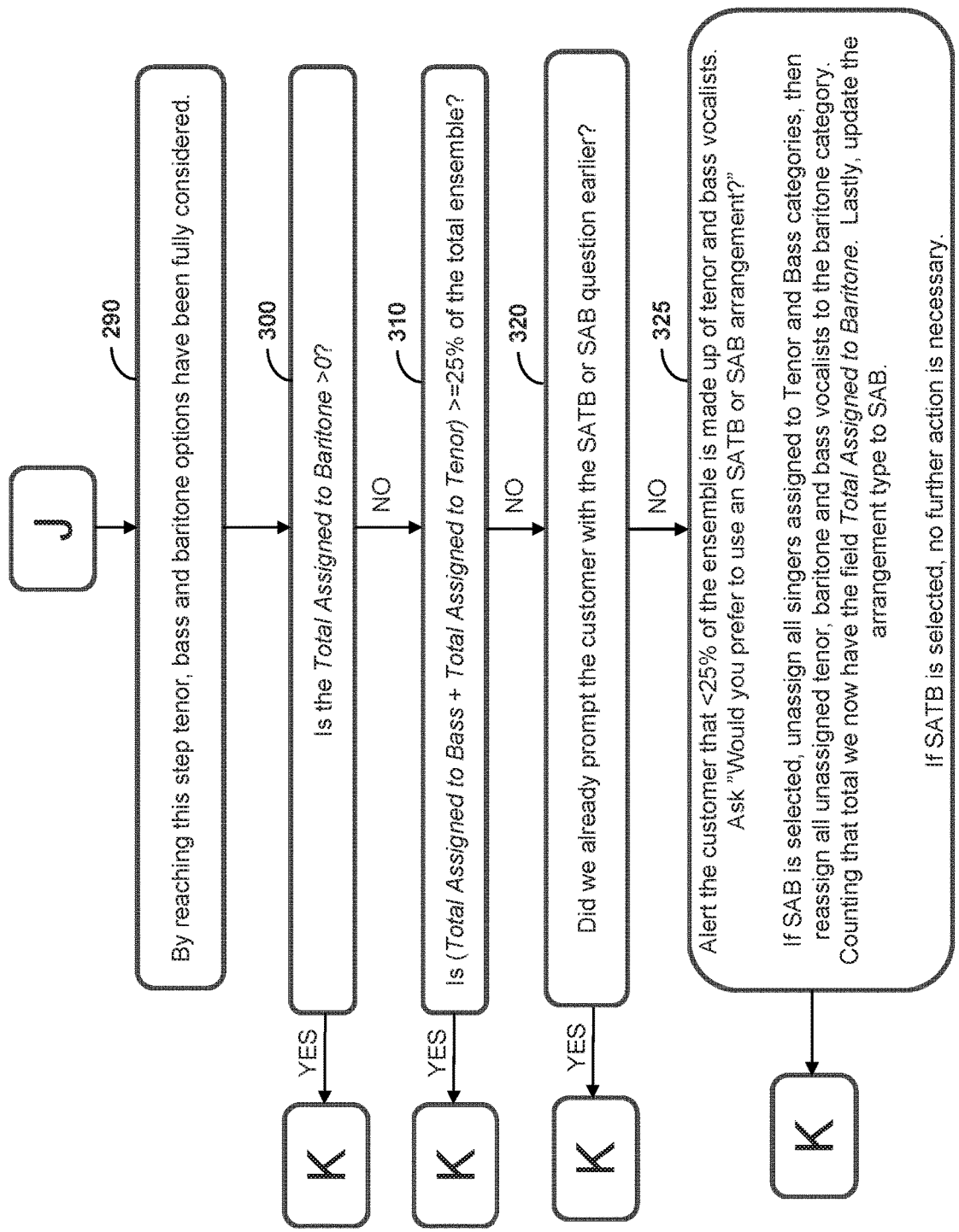
Figure 11:
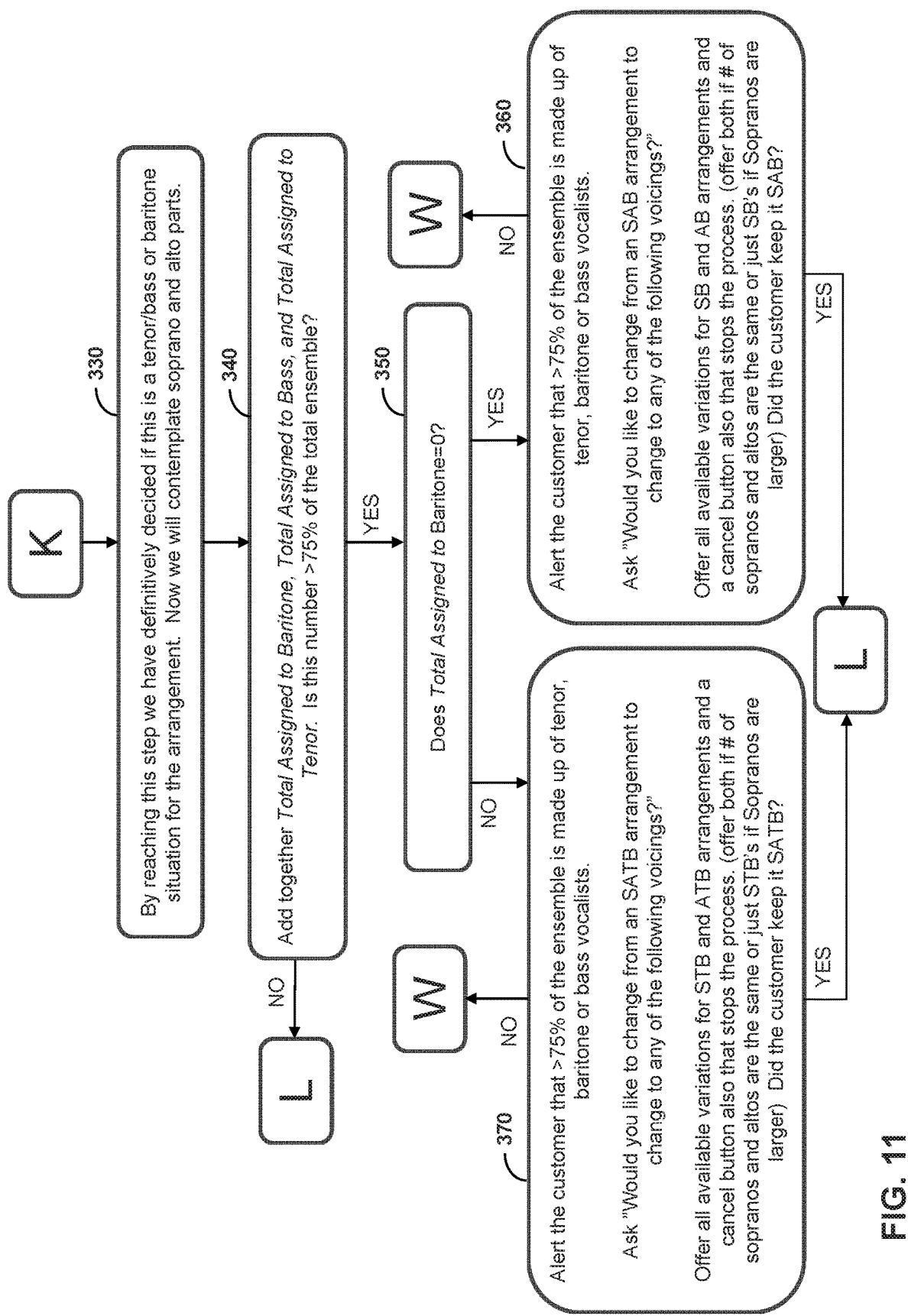
Figure 12:
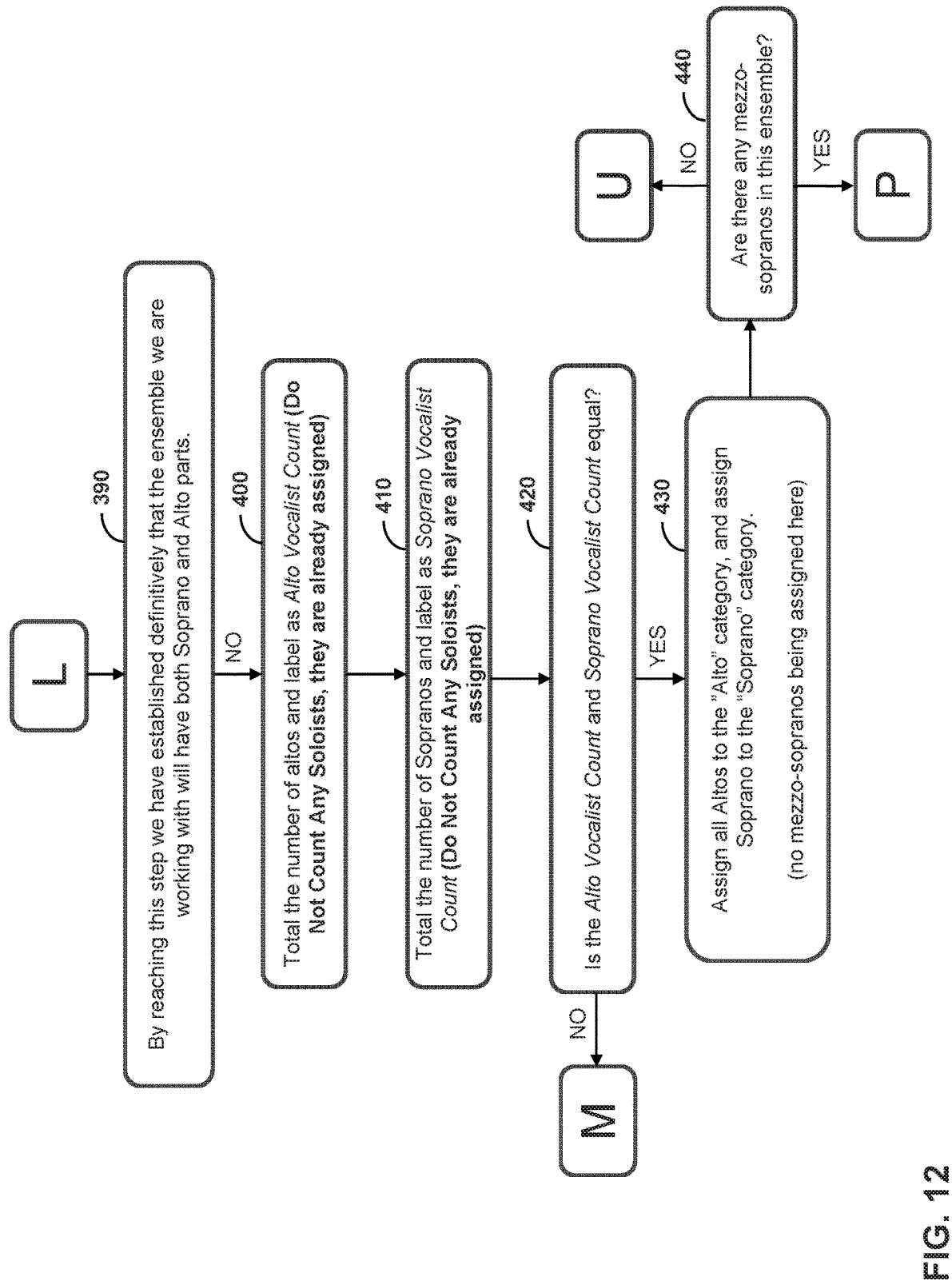
Figure 13:
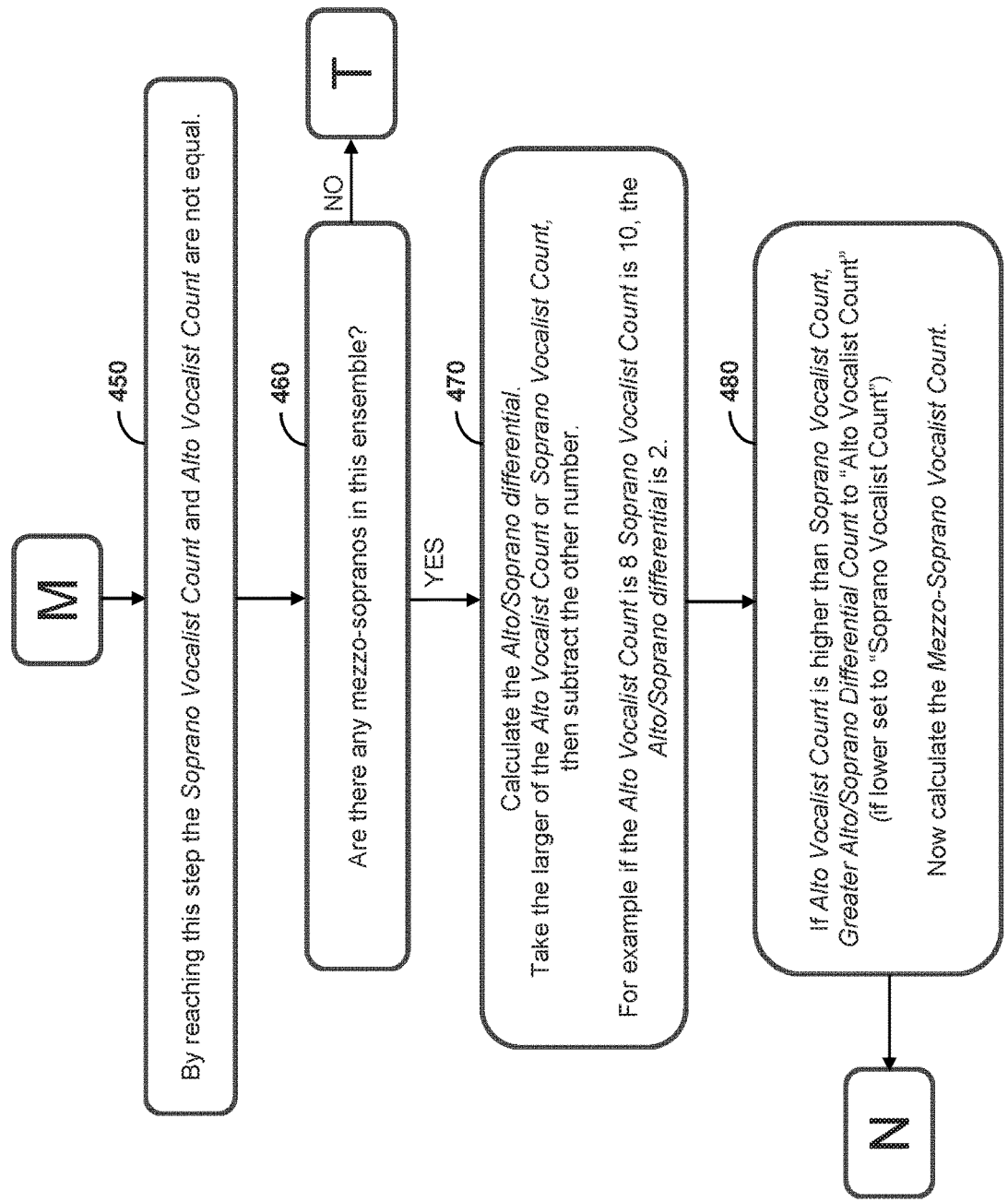
Figure 14:
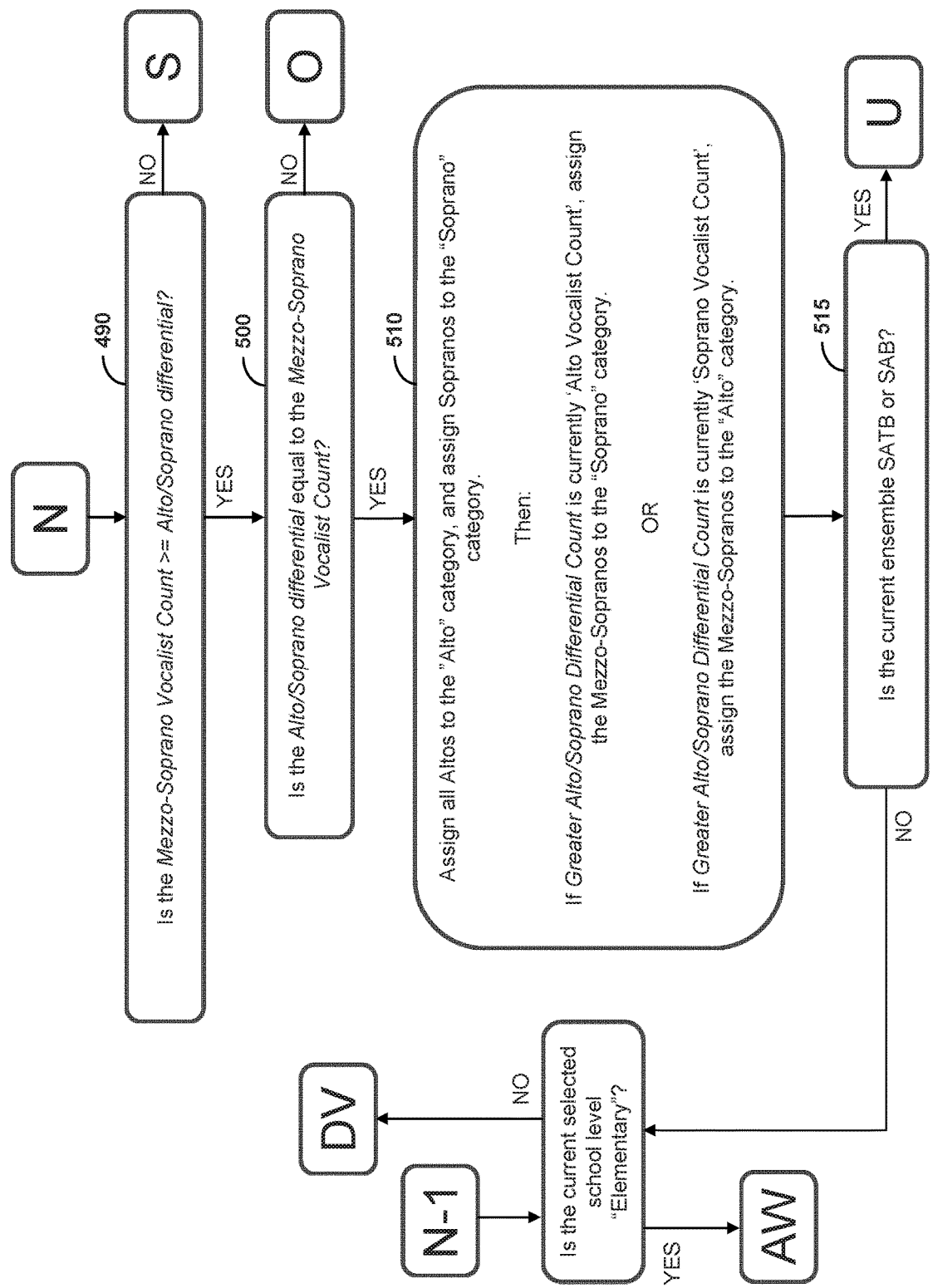
Figure 15:
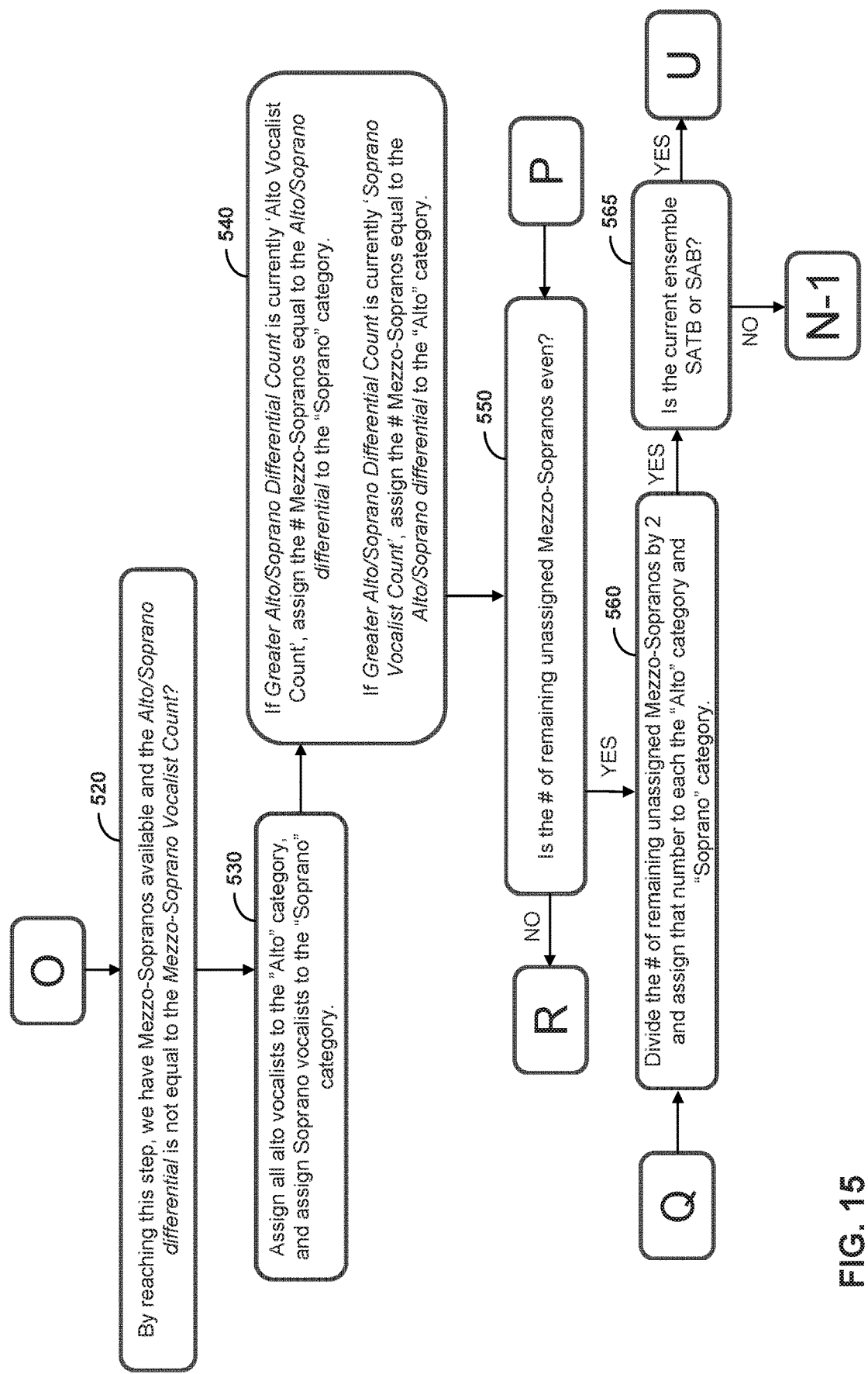
Figure 16:
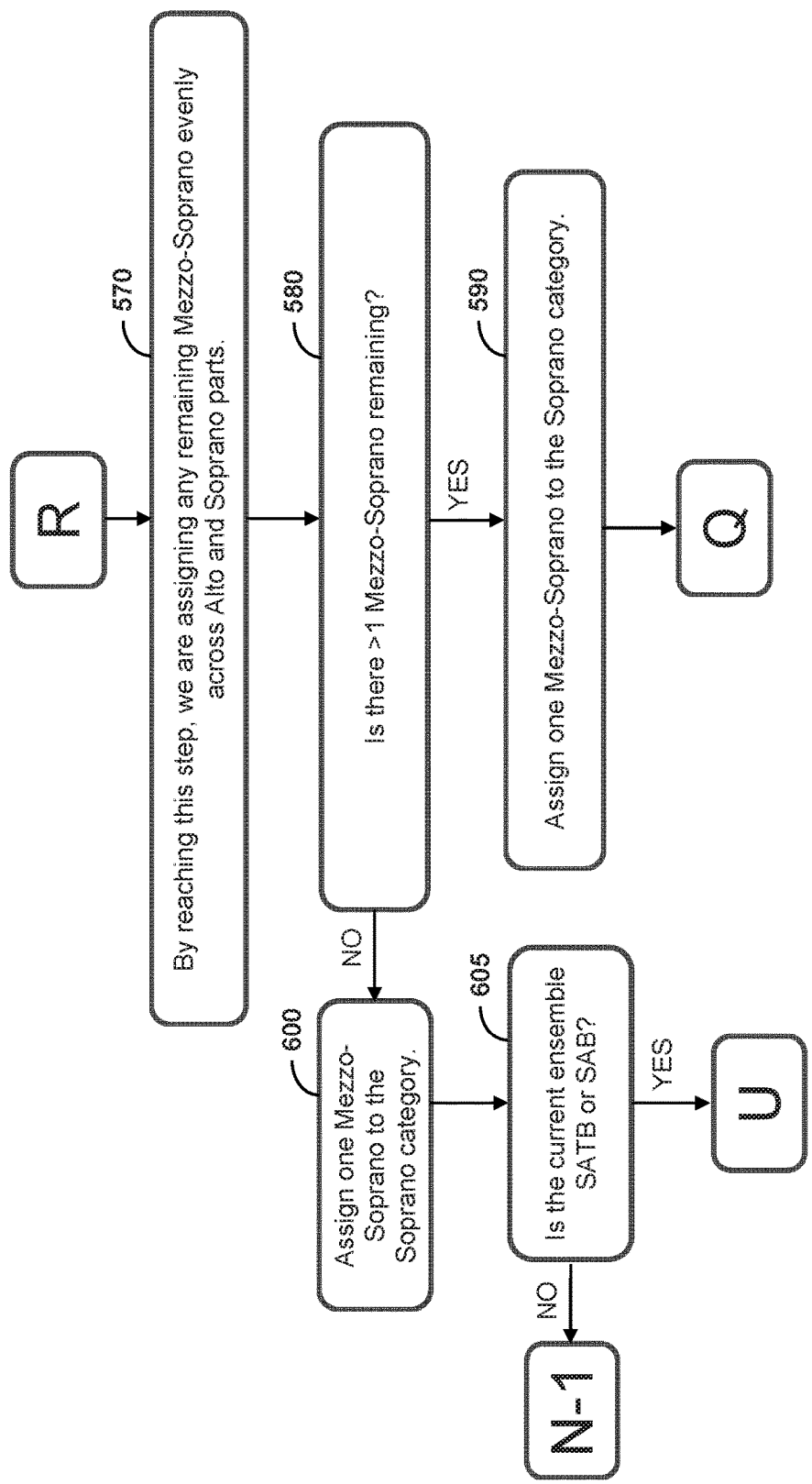
Figure 17:
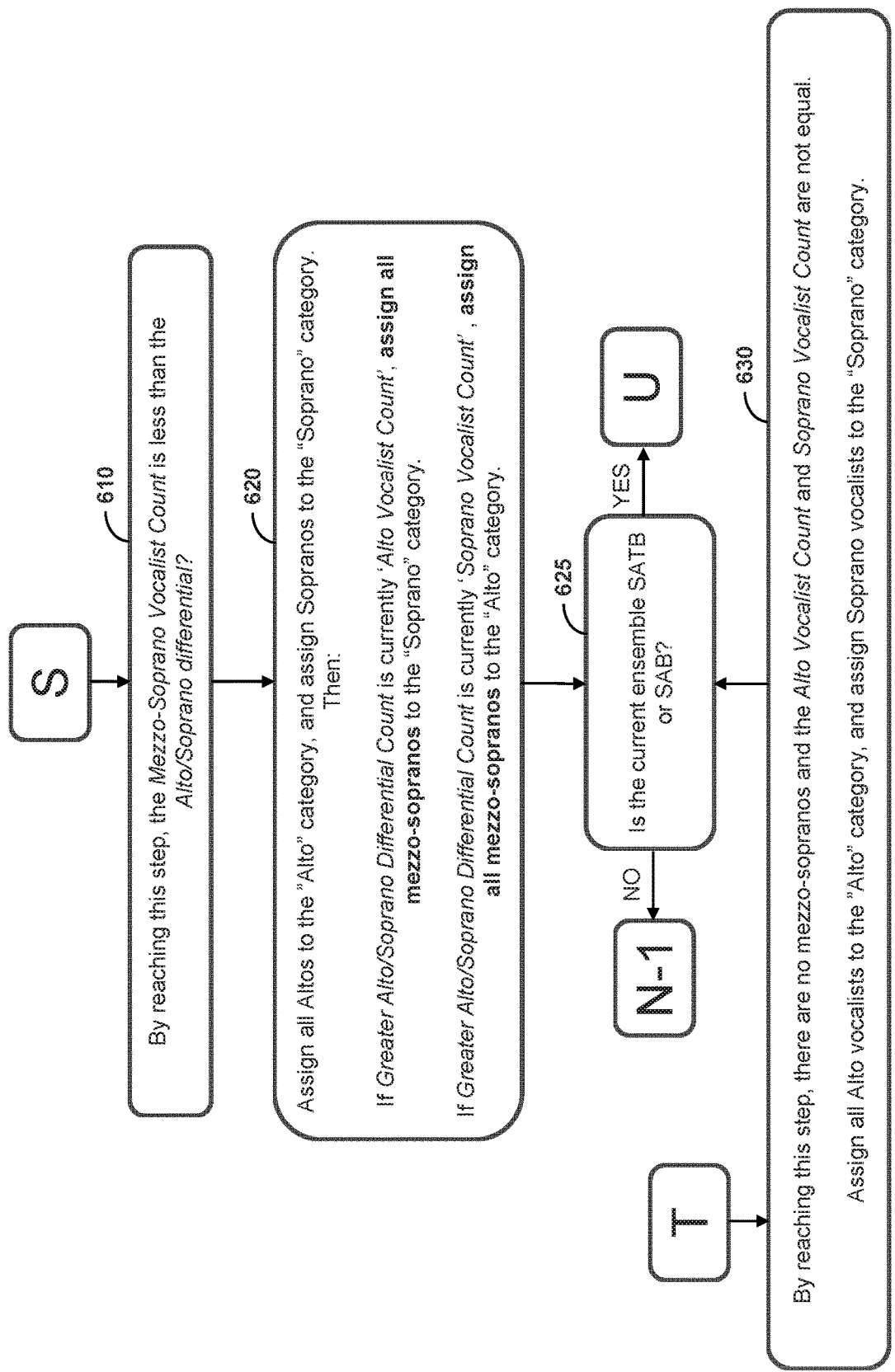
Figure 18:
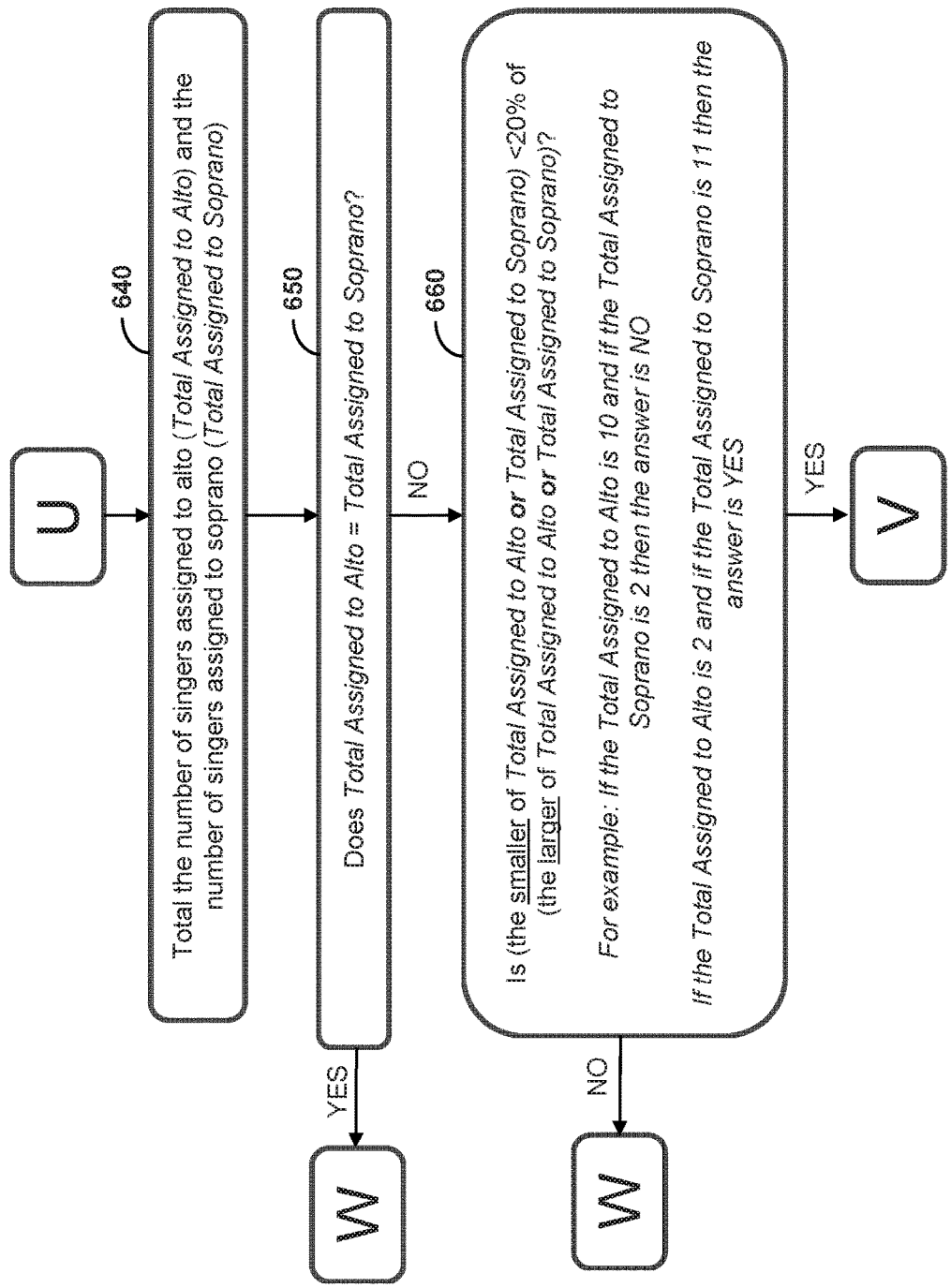
Figure 19:
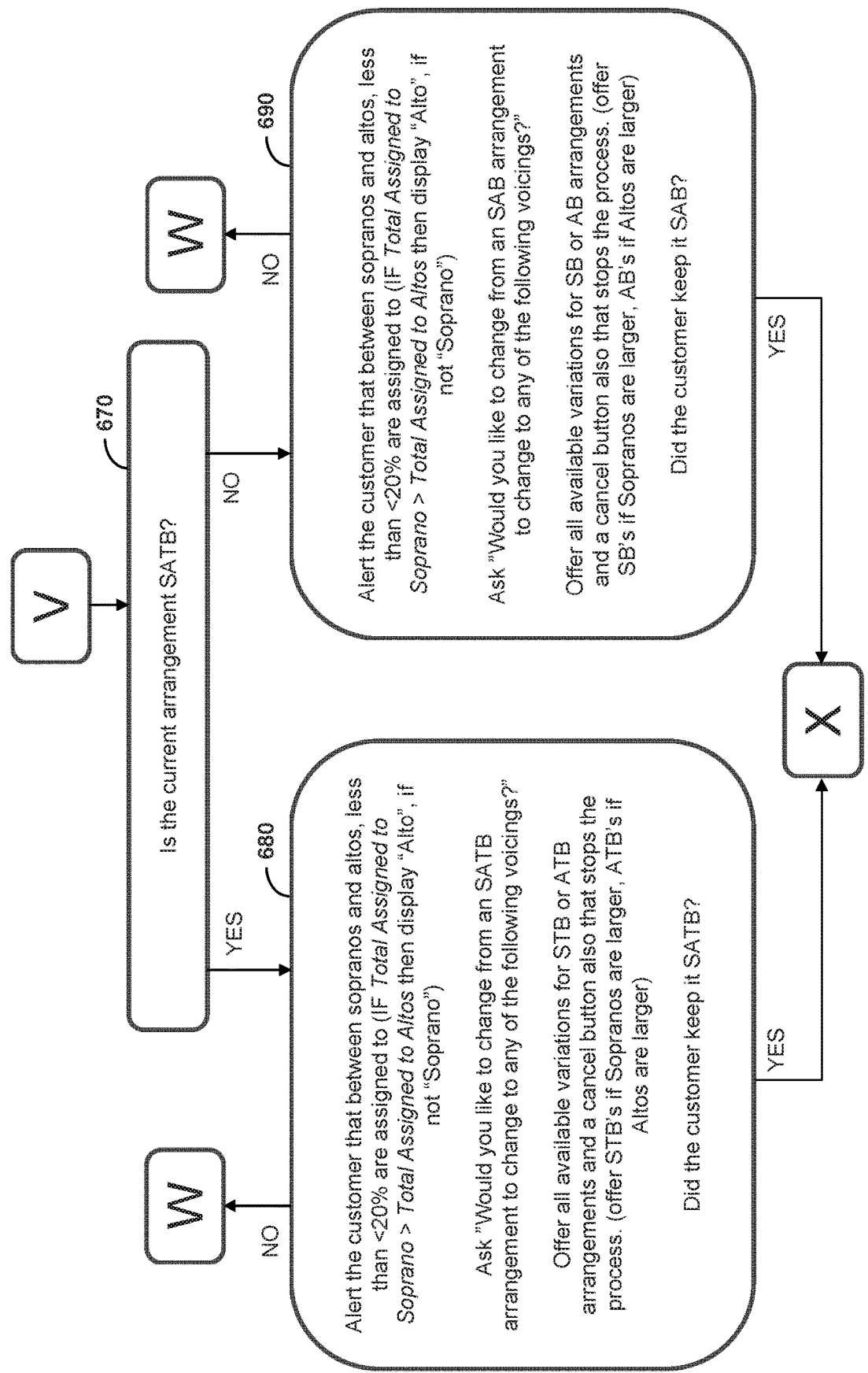
Figure 20:
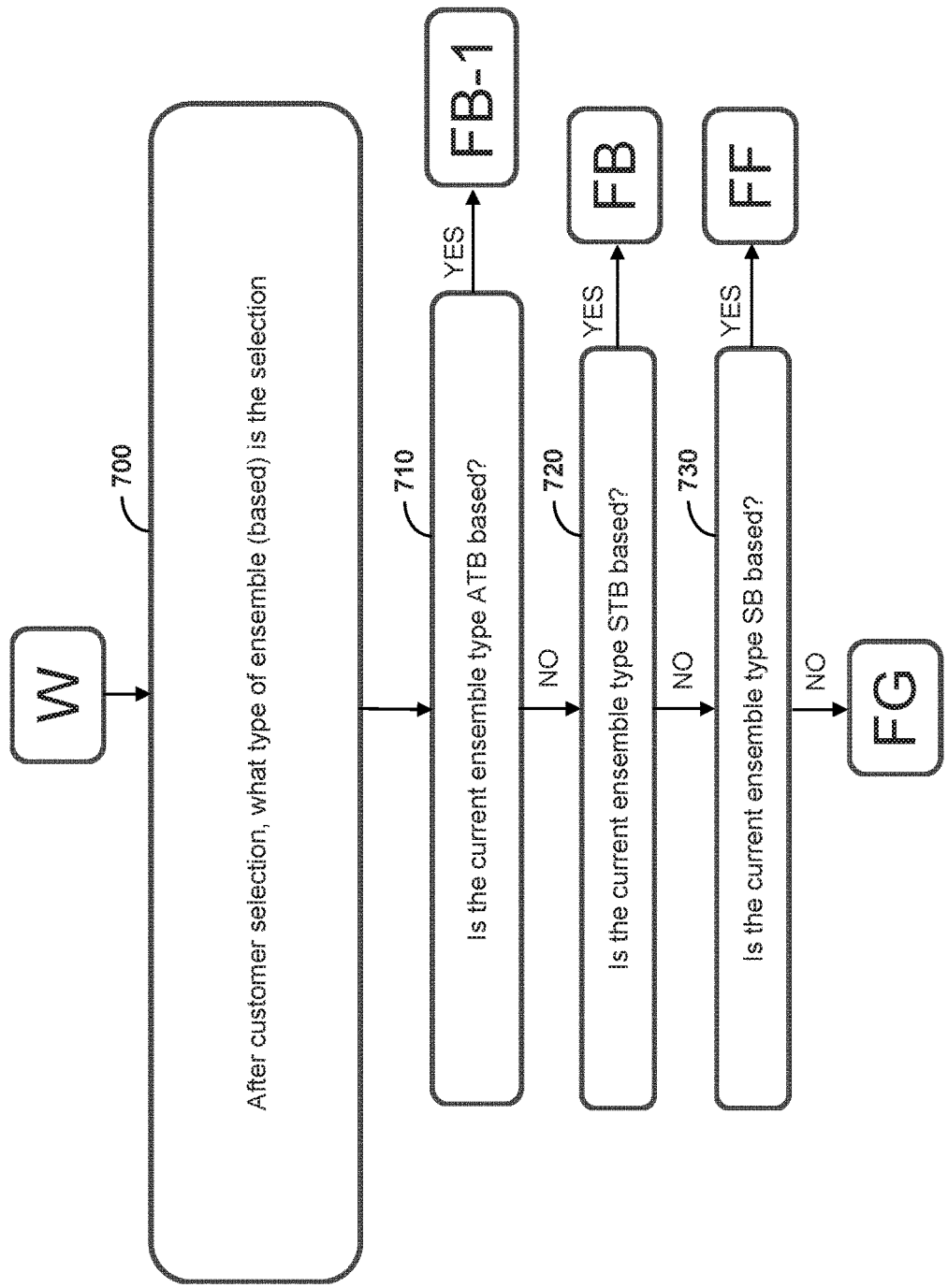
Figure 21:
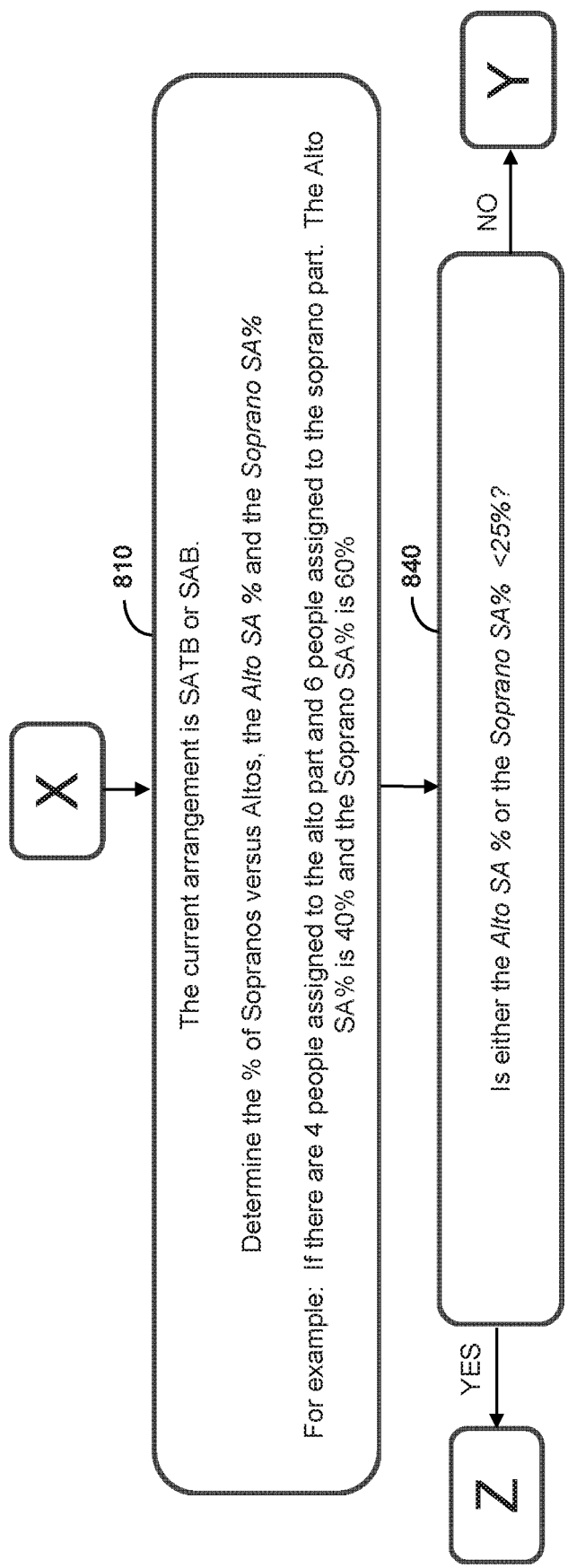
Figure 22:
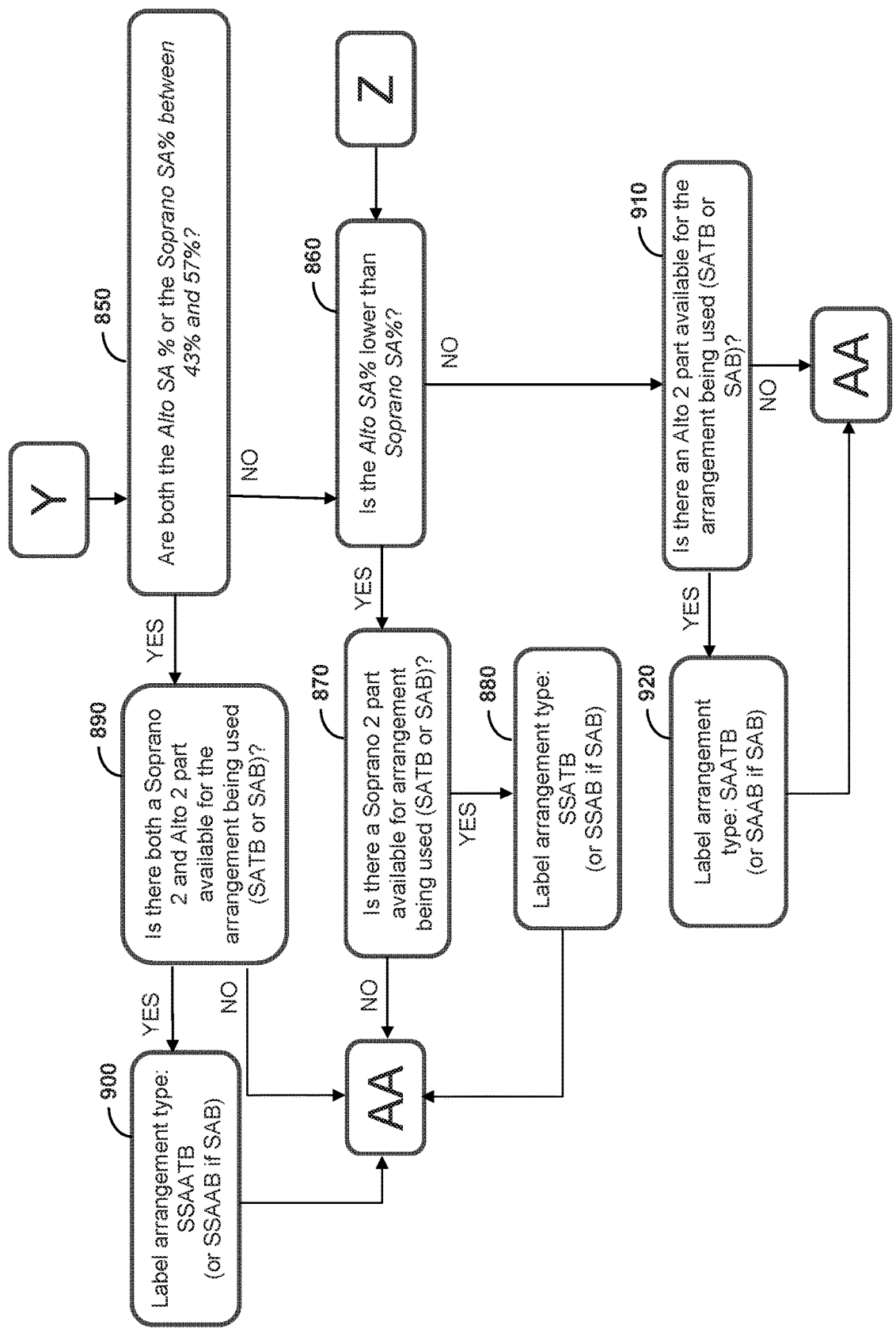
Figure 23:
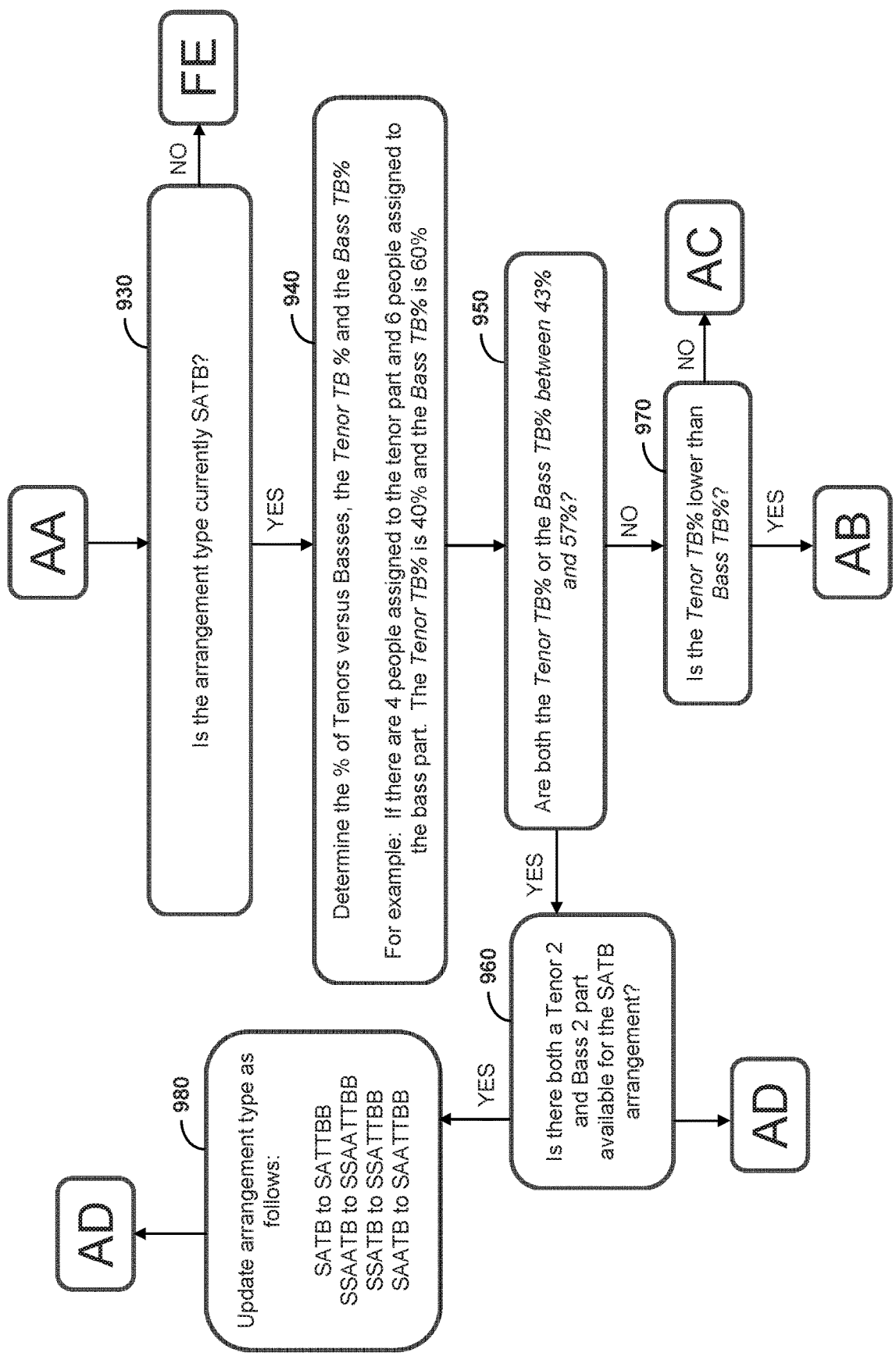
Figure 24:
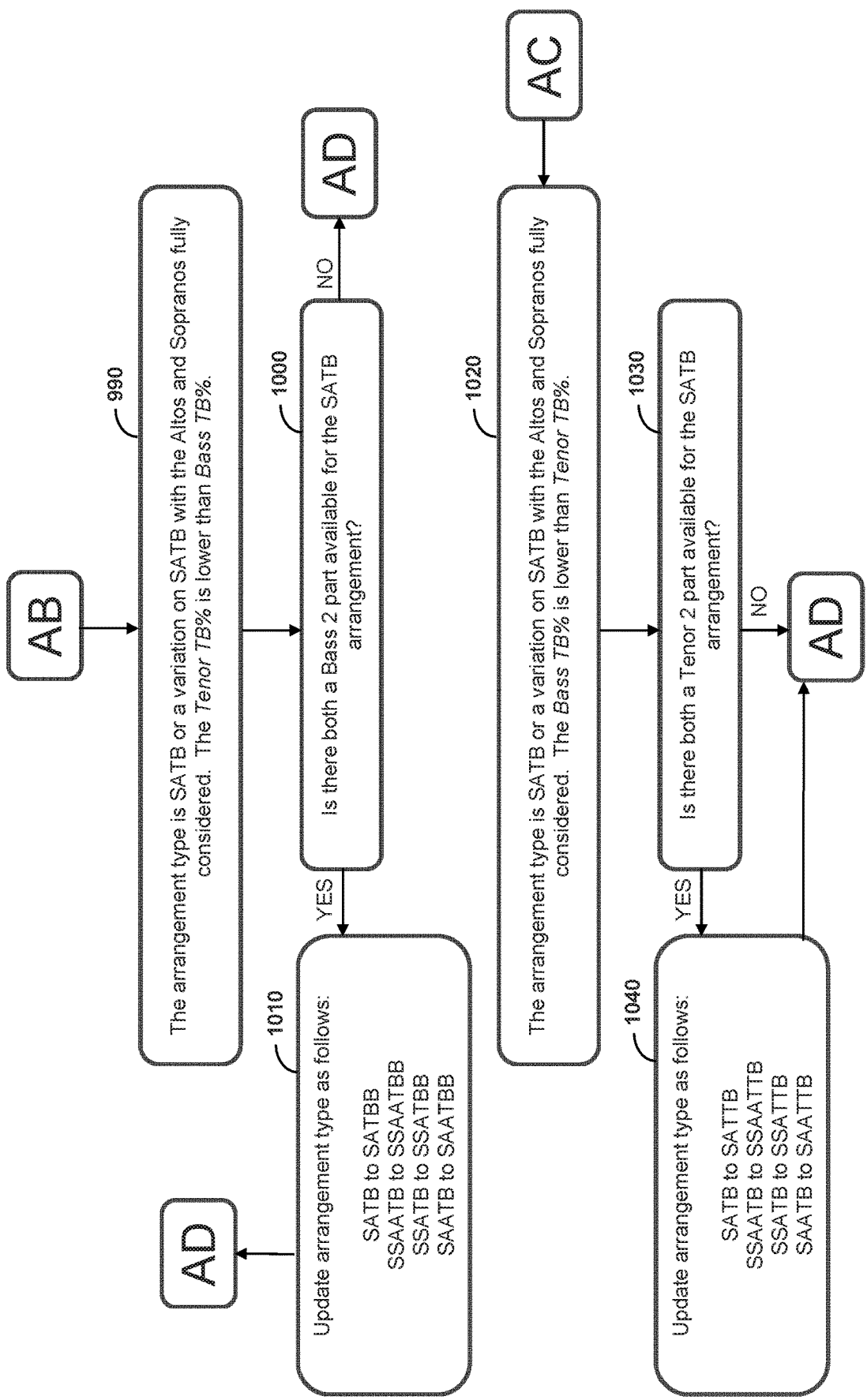
Figure 25:
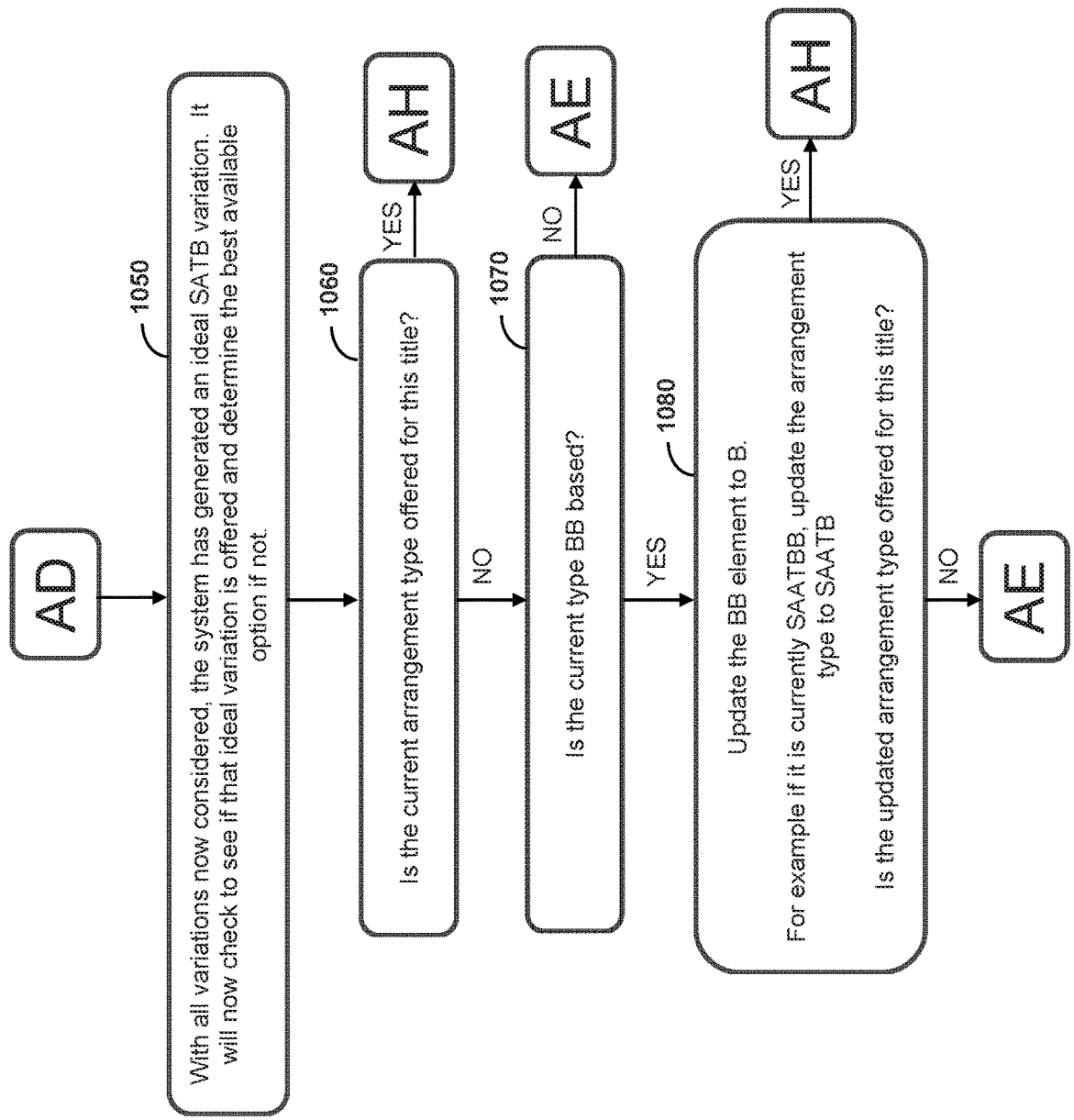
Figure 26:
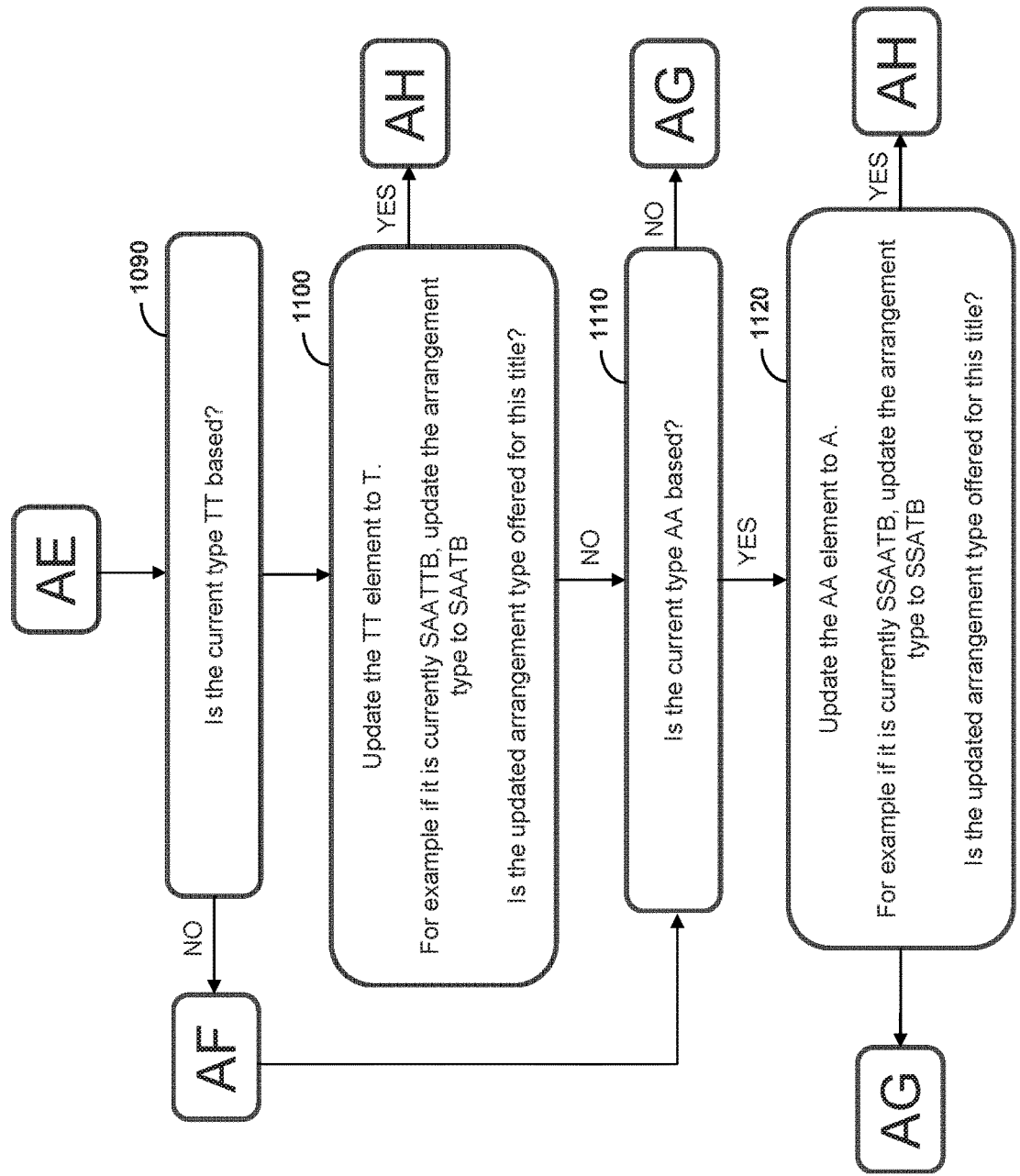
Figure 27:
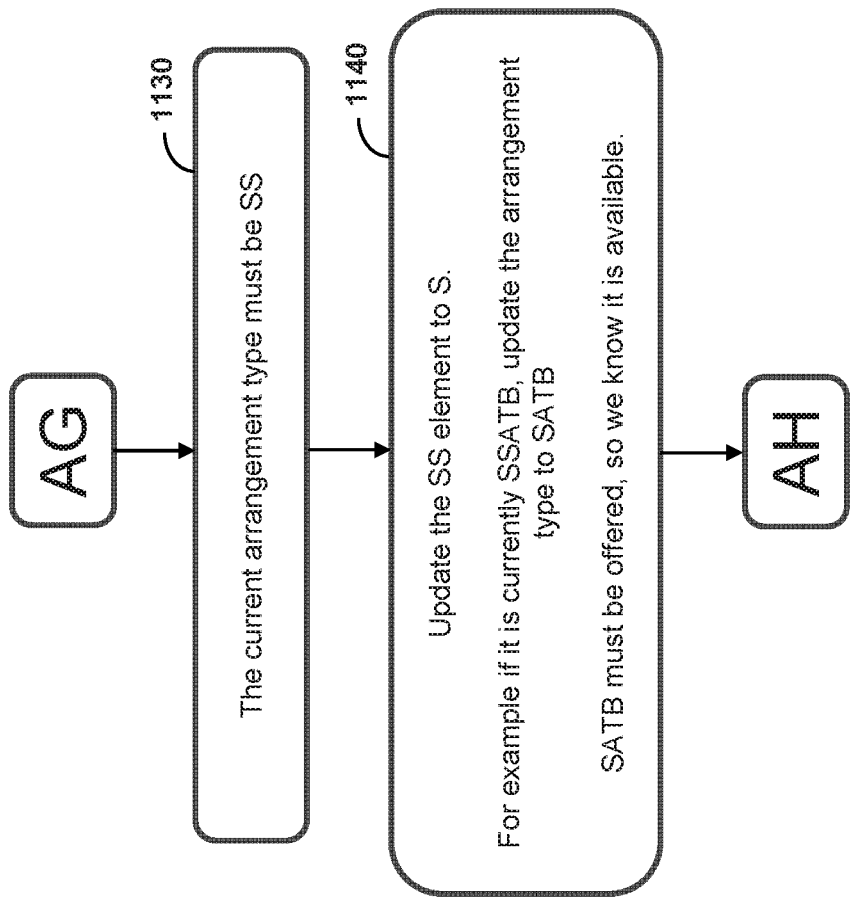

With attention now to FIG. 2, block 10, definitions for each vocalist in the ensemble are retrieved in XML format for concert key adjustment and range correction processing. The definitions may include, without limitation, vocalist part (soprano, alto, etc.), name, gender, vocal range, flagging for solos, comments, and the like. In block 11, concert key adjustment or transposition is performed on all or some of the arrangement to accommodate fine tune the piece to the aggregate vocal range of the ensemble. The system may automatically determine the best concert key by, for example, determining which key encompasses the greatest number or percentage of individual vocalists' ranges, or, the user may manually adjust the concert key. In block 12, the system performs range correction on individual parts. A suitable range correction process is described in co-owned U.S. Pat. No. 9,202,448.

In blocks 13-14, the score sheets are assembled, preferably in XML format. In block 13, the individual score sheets are assembled. Each score sheet includes the individual part for each vocalist, with representative parts for the other sections of the ensemble also included. Individual, customized, and/or solo parts of other sections or vocalists are not included by default but may be selectively included by the user as desired. This is illustrated in more detail with reference to FIGS. 100-108 (blocks 3660-3990). In block 14, the conductor's score sheets are assembled and may include all variations of all parts and any piano accompaniment (FIGS. 109-121, blocks 4000-4490).

Figure 122:
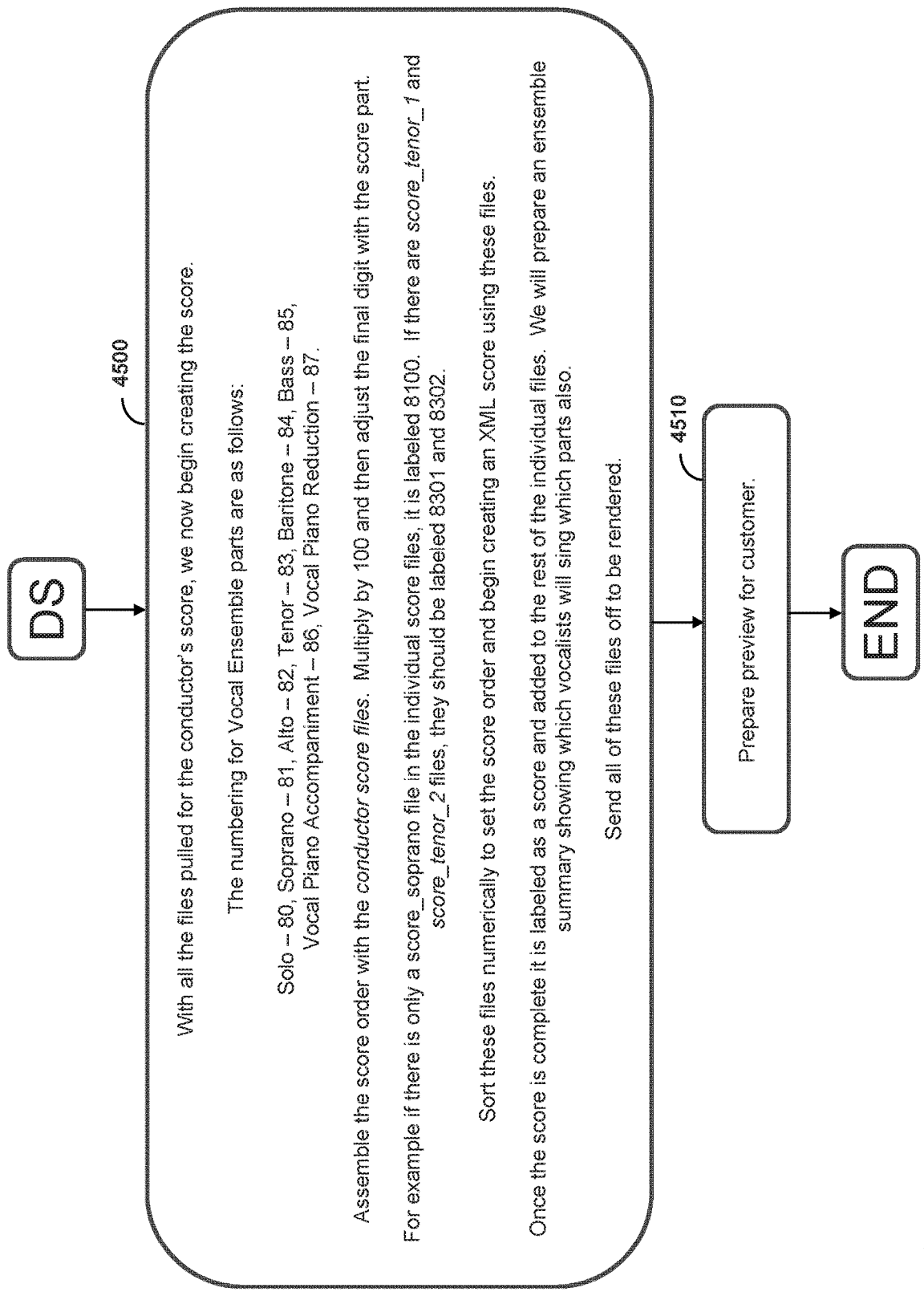
FIG. 122 illustrates aspects of the present disclosure directed to rendering a score in a target music notation format.
Figure 123:
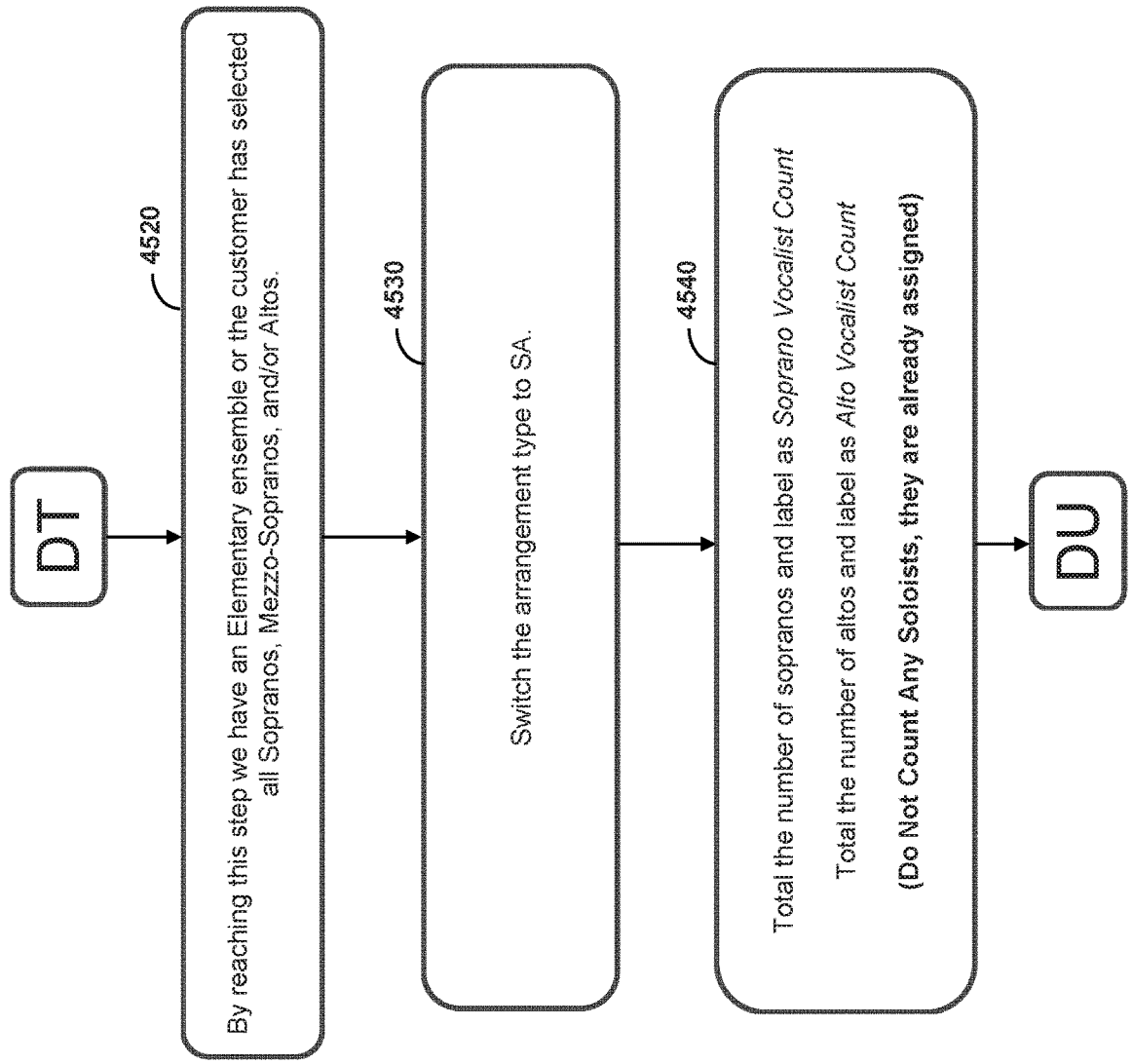
FIGS. 123-160 illustrate further aspects of the present disclosure directed to determining the ideal arrangement type for a given ensemble of vocalists.
Figure 124:
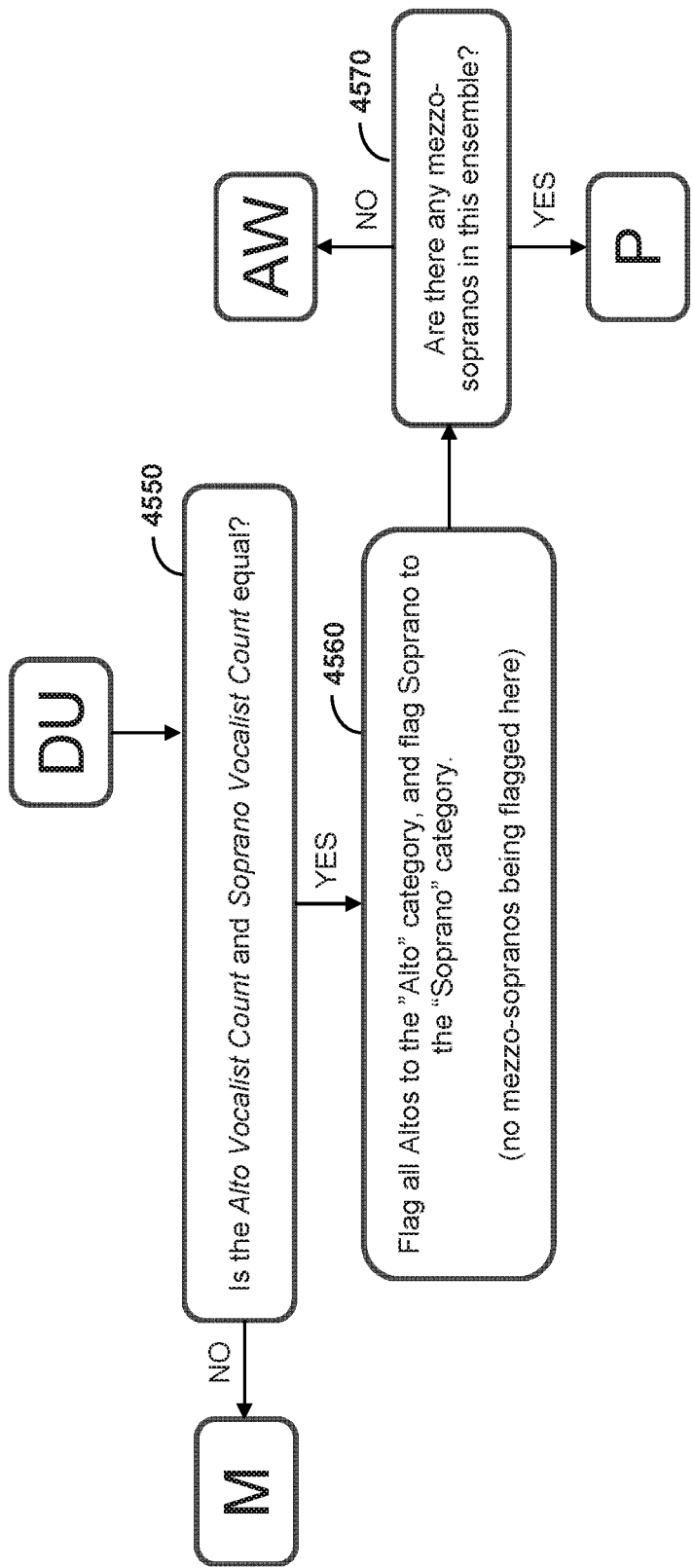
Figure 125:
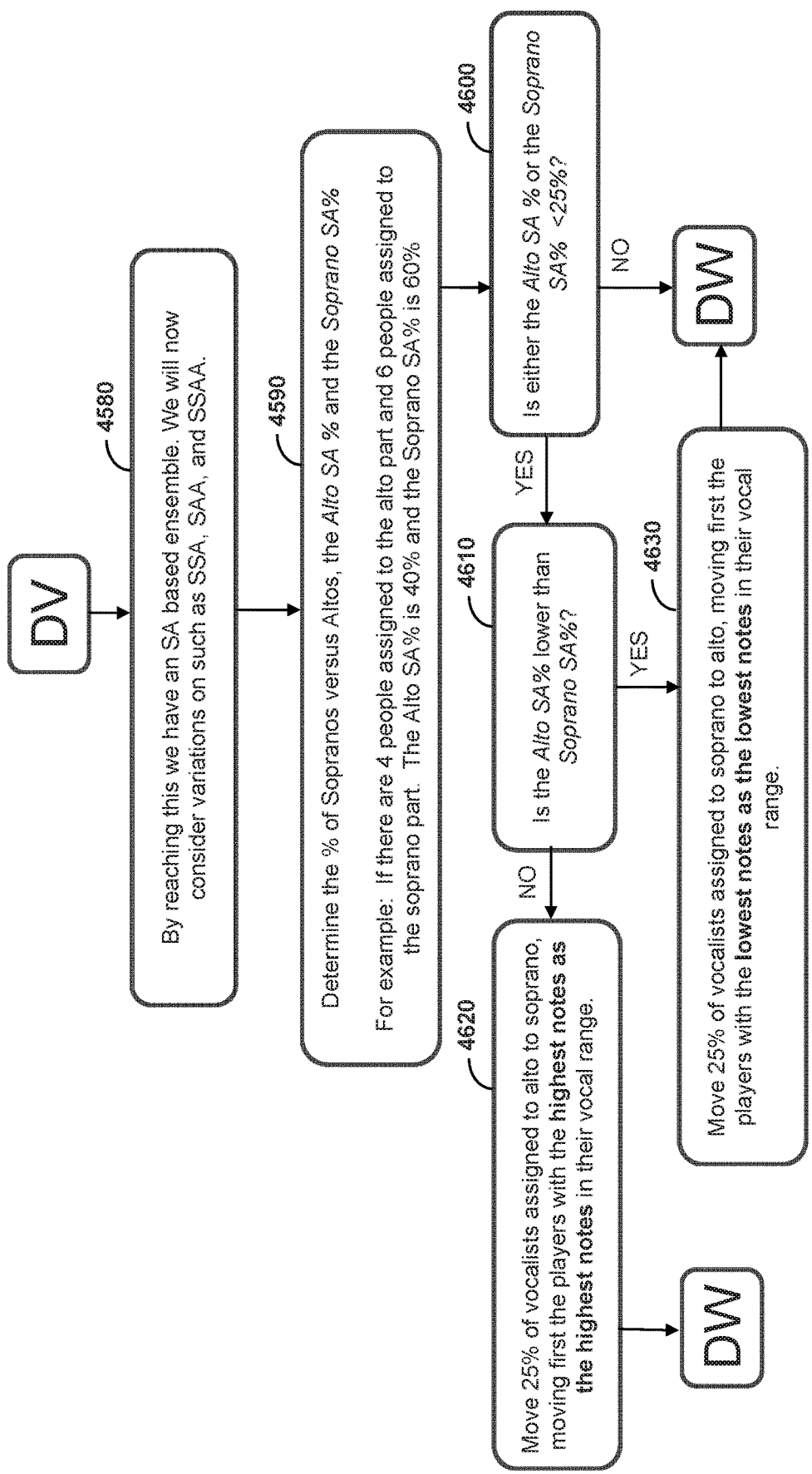
Figure 126:
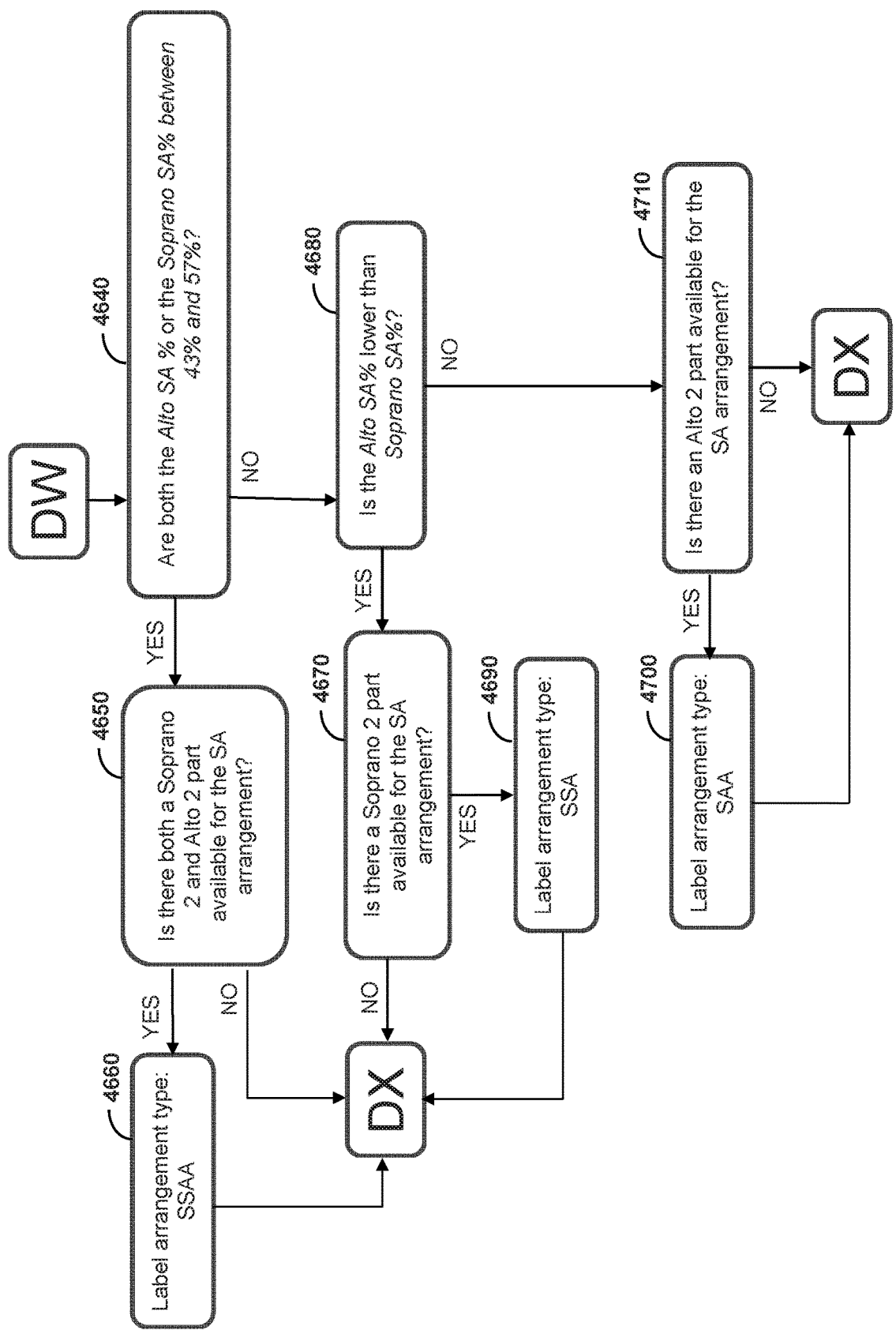

In block 15, the assembled XML score files are further processed to finalize the score for rendering as musical notation. In block 16, the finalized score is rendered from XML into musical notation format, preferably as a portable document format (.pdf) file, for delivery to the user (FIG. 122).

Another aspect of the present disclosure is a balancing process by which the system determines a larger category for the ensemble (such as SATB or SAB) and then further identifies an ideal variation (such as SSATTB) that reflects the makeup of the ensemble both as a SA:TB ratio and S:A or T:B ratio. If SATB arrangement is well-balanced across the part (such as 8 sopranos, 7 altos, 6 tenors and 5 basses) it may remain SATB, but if the ratio becomes lopsided between sopranos and altos (for example 8 sopranos and 4 altos) the system will choose to make it a SSATB arrangement, for example. This may also happen where the ratio of SA:TB is lopsided. For example, if the ensemble includes twenty sopranos and altos to ten tenors and basses, it would be preferable to have more soprano and alto parts in order to balance the parts. This may also re-balance the ensemble to, for example, SSATB or SAATB.

In some embodiments, the disclosed system includes a database that contains mandatory arrangements for SATB, SAB, SA, TB, STB, ATB, SB, and AB. Within these mandatory arrangements, arrangers can create further variants of these larger arrangements that reflect a part 1 and part 2. For example, SA could contain SSA and SAA as alternative arrangements.

Solo parts are processed first and are assigned by the user. Once a soloist is selected the soloist is not factored into any other balance considerations as they have already been assigned. There can be more than one solo part, but only one vocalist can be assigned to any given solo part.

With attention again to FIG. 3, the ensemble constituency is evaluated (blocks 17-57) to determine an ideal and balanced arrangement type. If an elementary-level ensemble is selected or if the user selected sopranos, mezzo-sopranos, and/or alto (e.g., the ensemble consists of only higher-pitched singers), processing proceeds at connector DT (FIGS. 123-124) where the arrangement type is constrained to soprano-alto (type SA).

After the system determines the ideal arrangement type (for example SSATTB) for the inputted group, it then determines if that subset of a mandatory arrangement type exists for the selected title by consulting the database. If found, the system locks in that arrangement type as the final arrangement type. If not found, the system may switch to the original arrangement from which it was derived. For example, if the system determines the ideal ensemble type would be SSAATB yet no viable solutions are found that satisfy the ensemble requirements, the system may revert to SATB as the final arrangement type.

Figure 28:
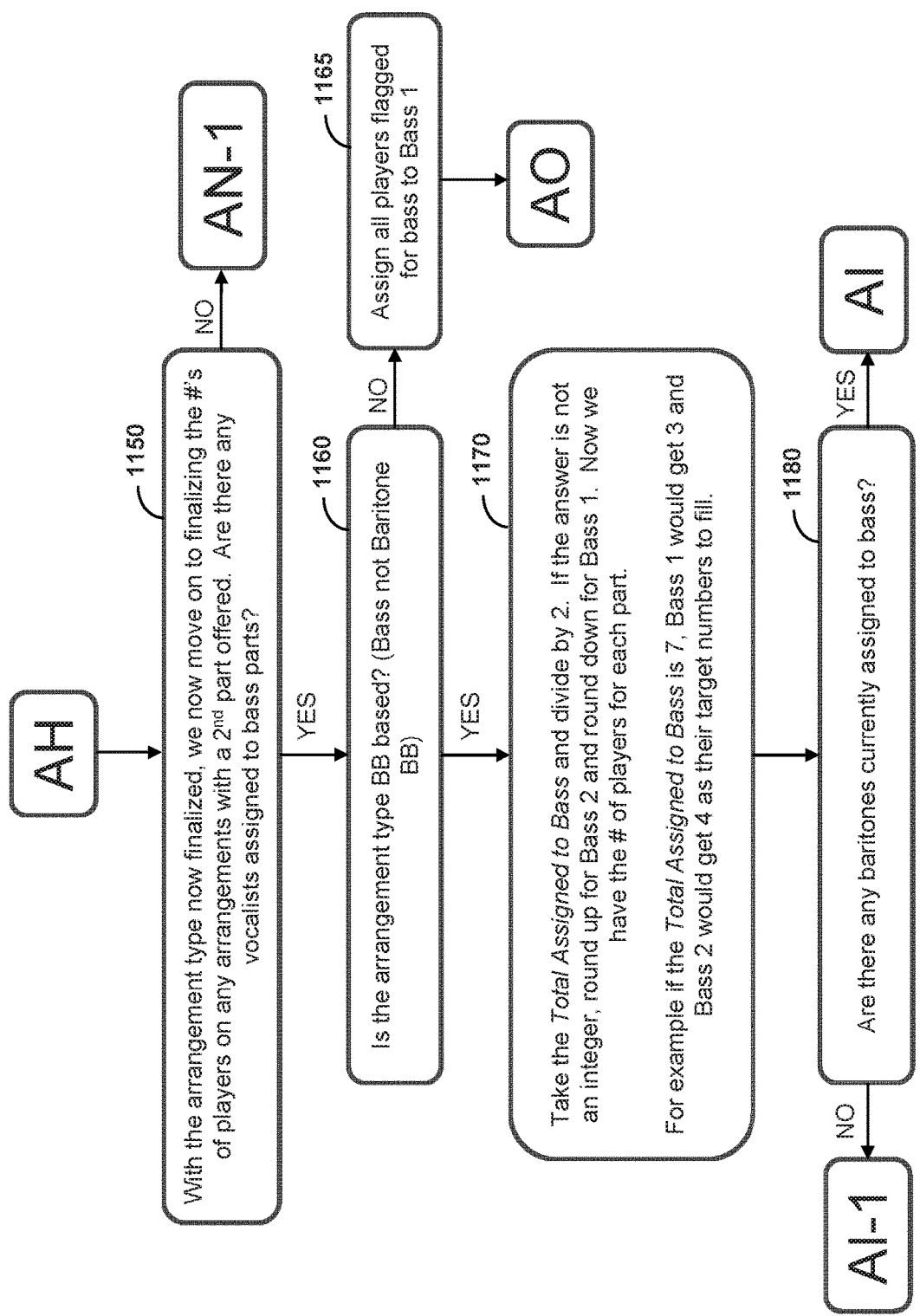
FIGS. 28-59 illustrate aspects of the present disclosure which assign vocalists to parts based on the vocal range of the vocalist and the part being assigned.
Figure 29:
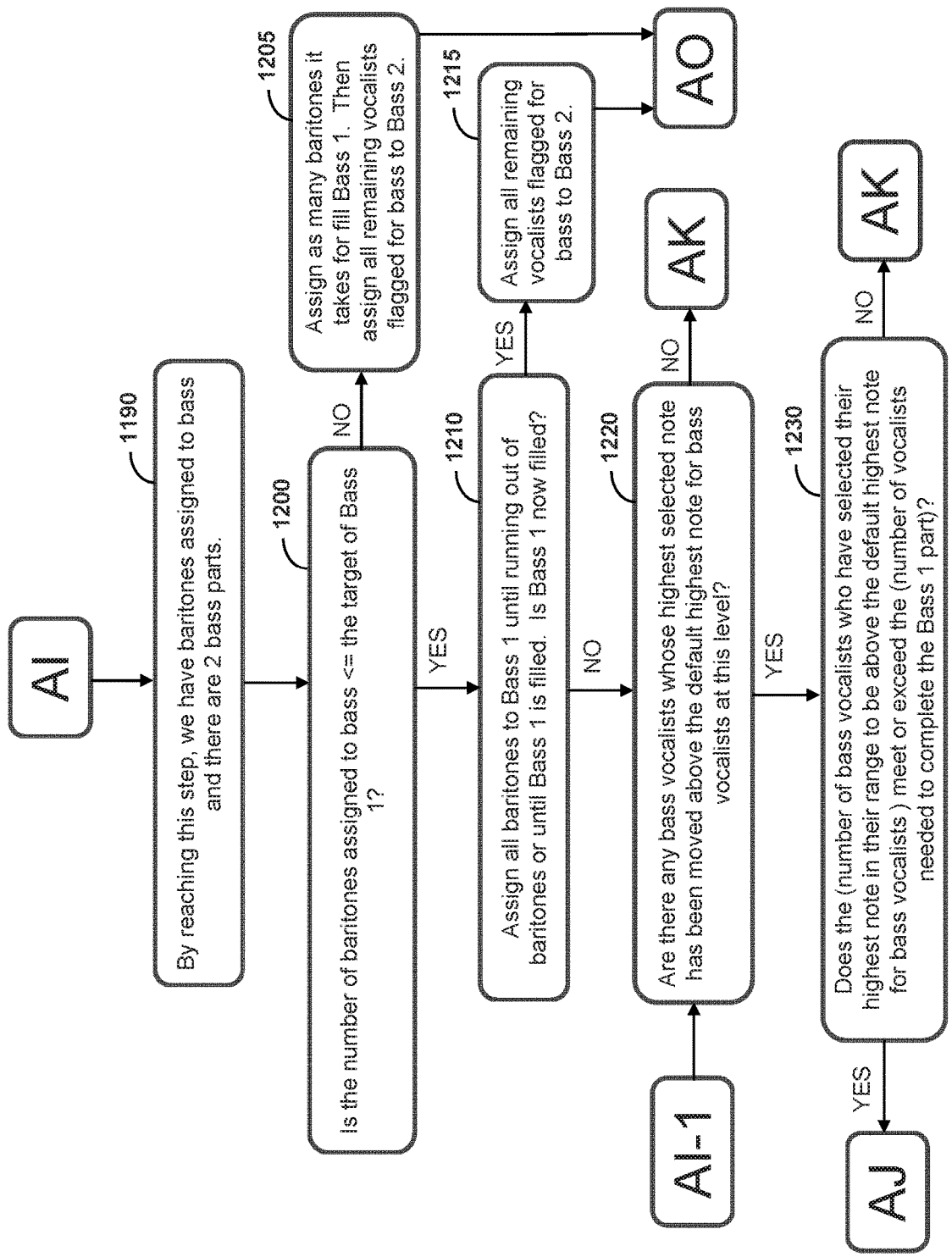
Figure 30:
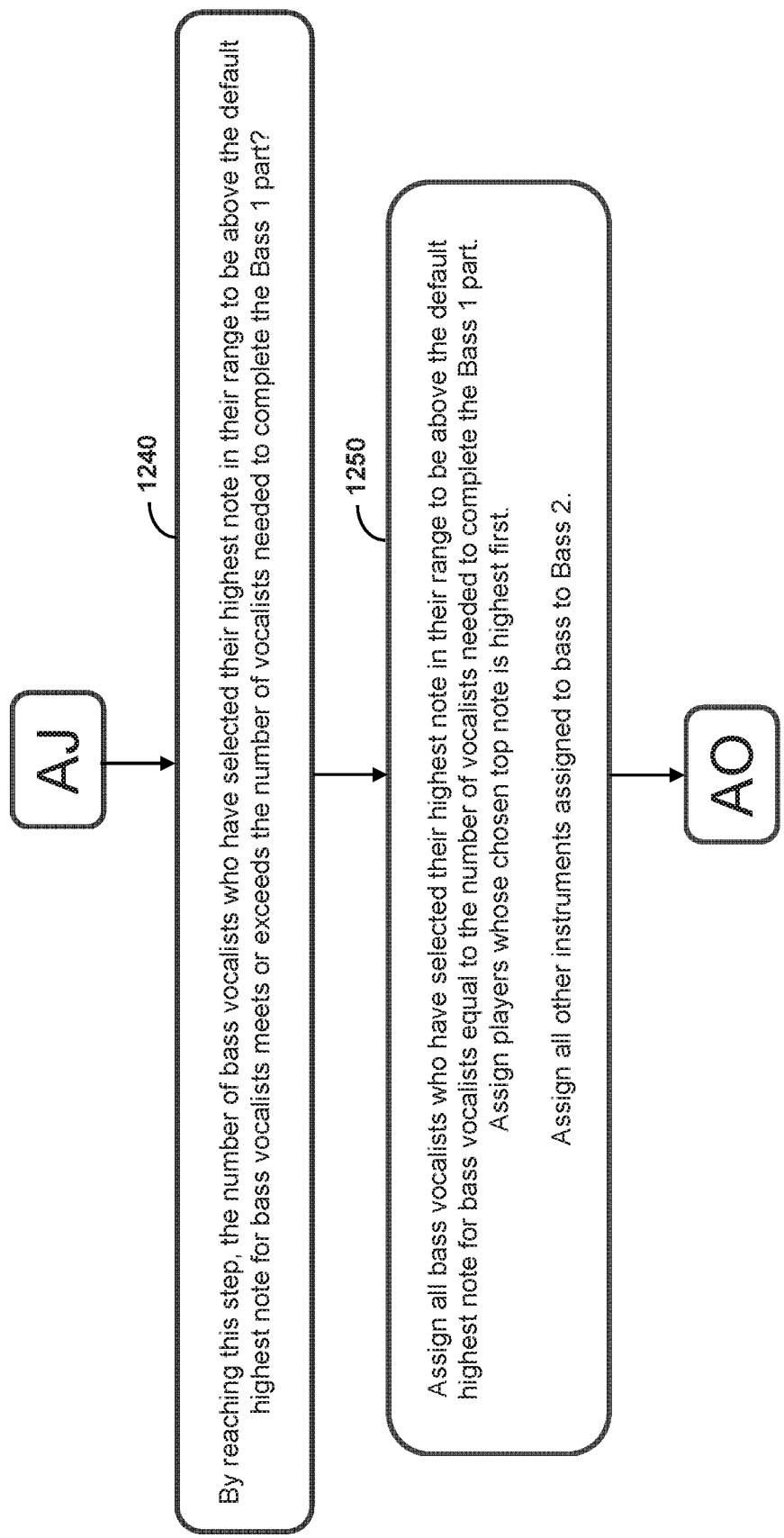
Figure 31:
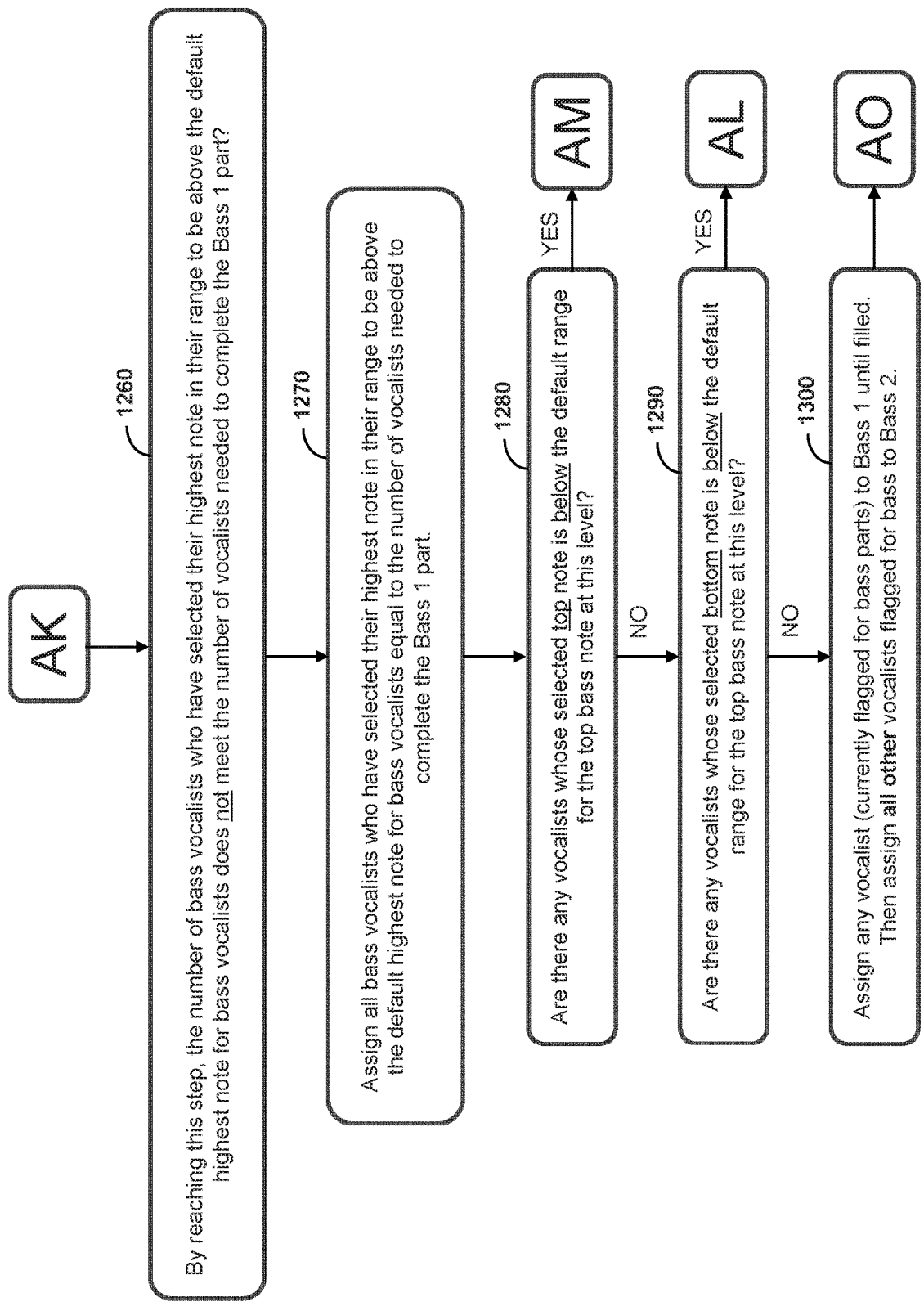
Figure 32:
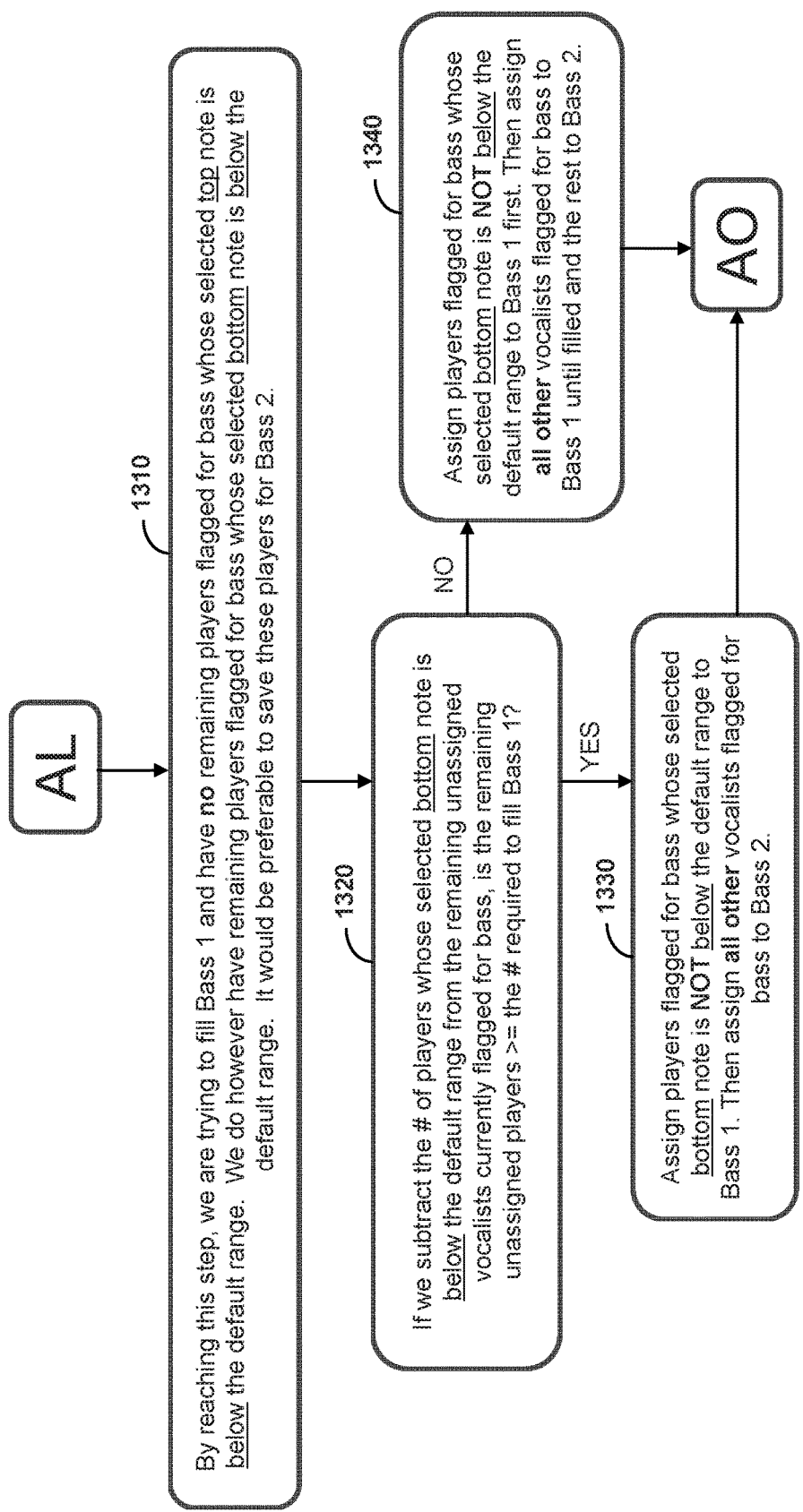
Figure 33:
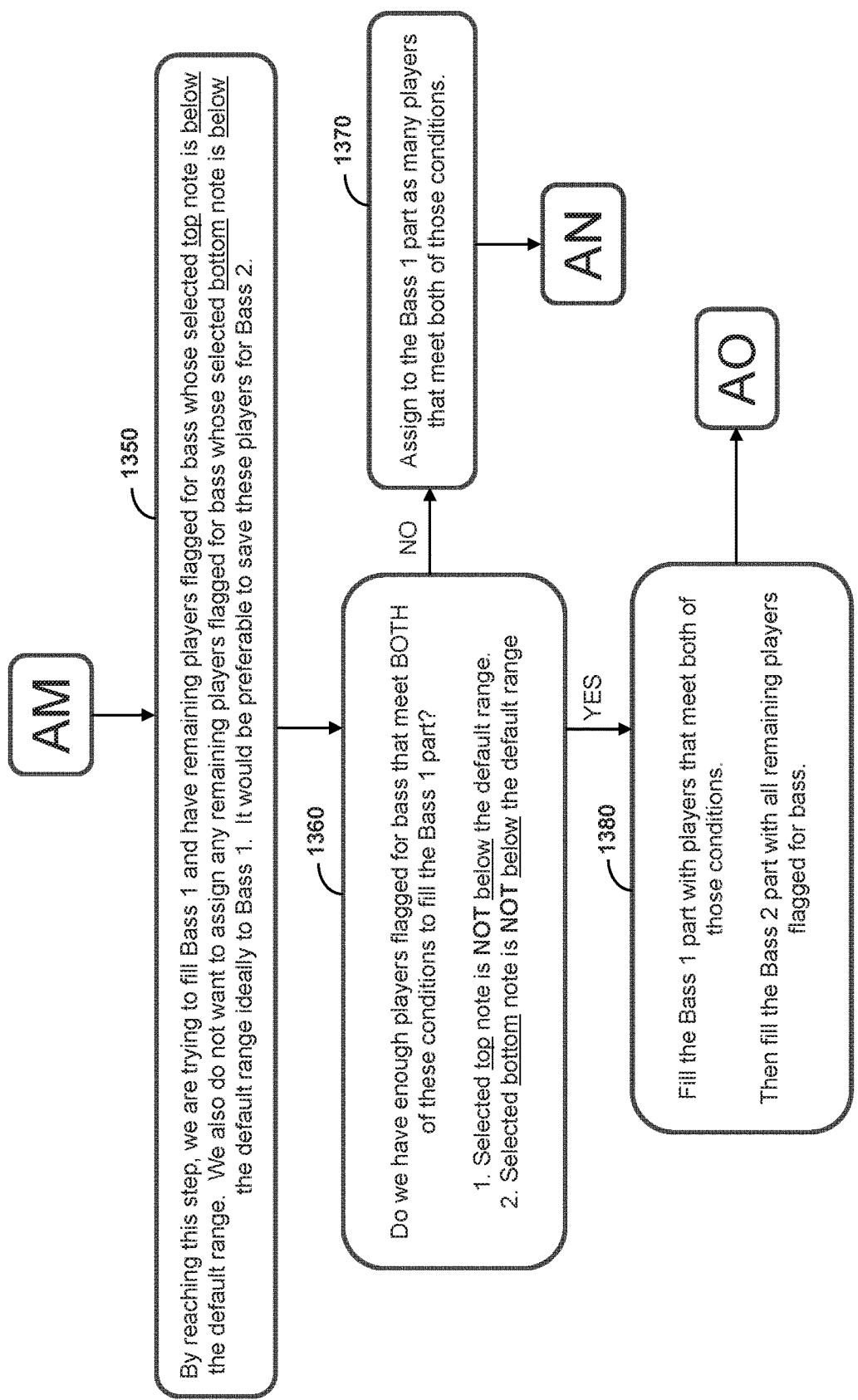
Figure 34:
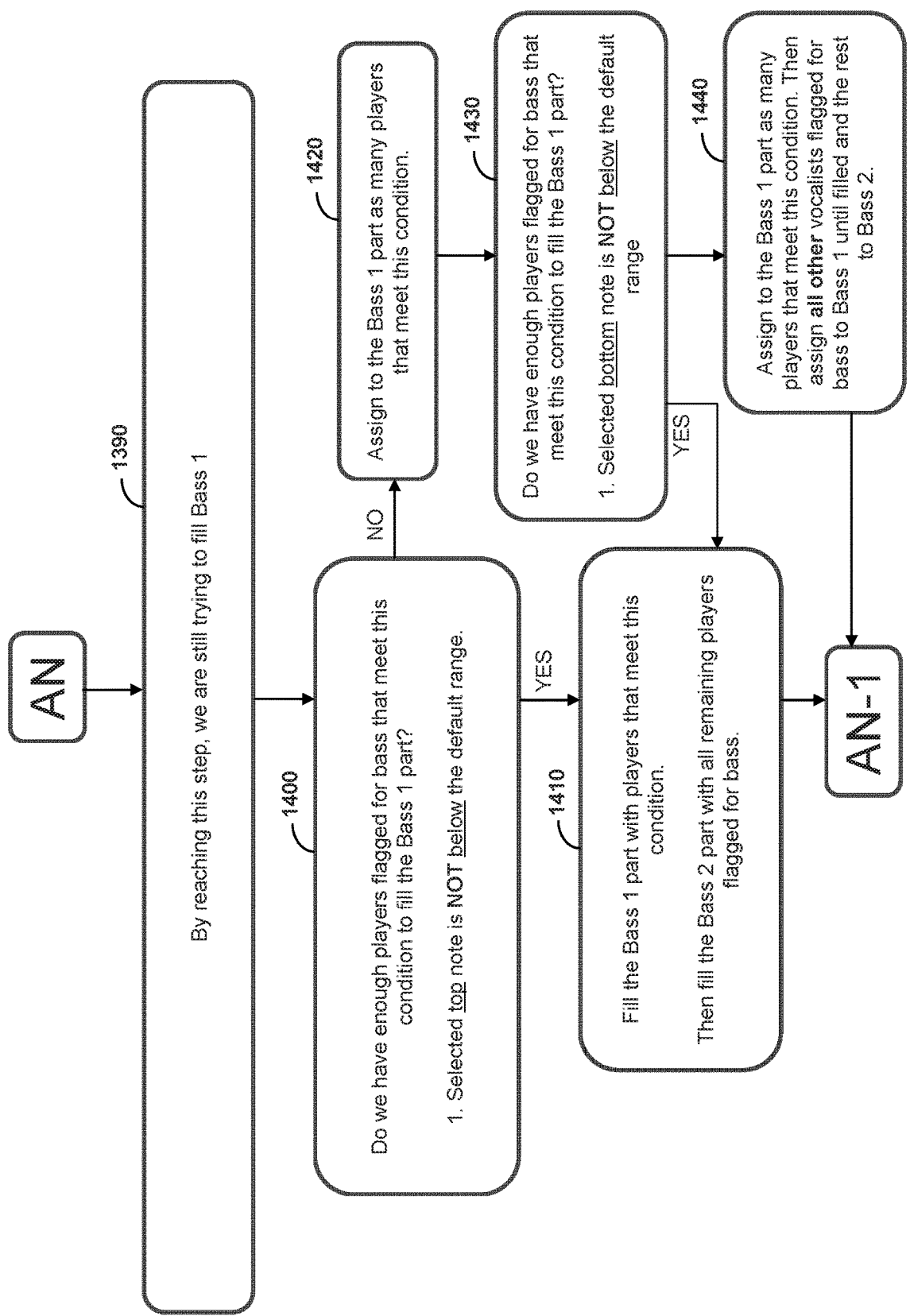
Figure 35:
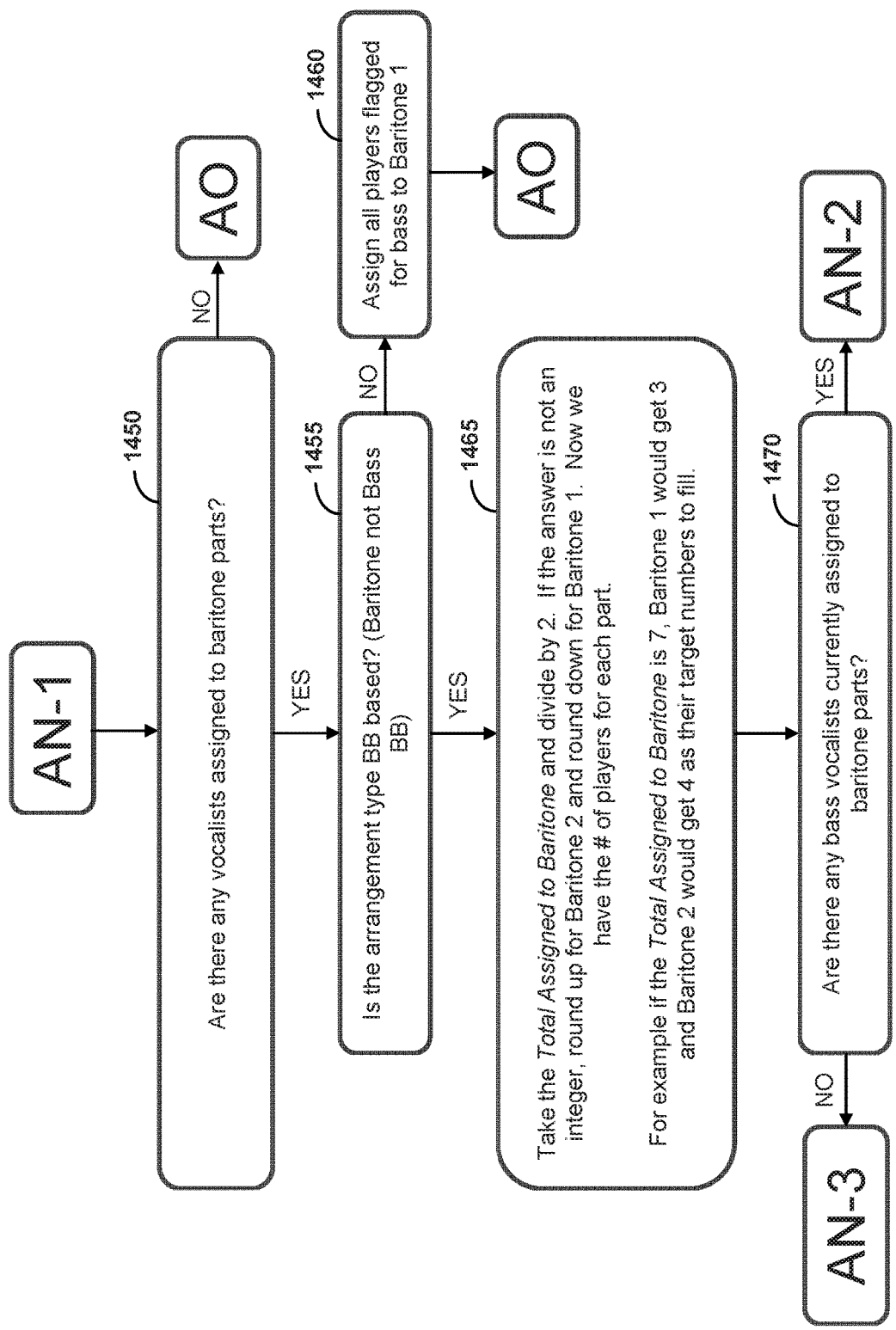
Figure 36:
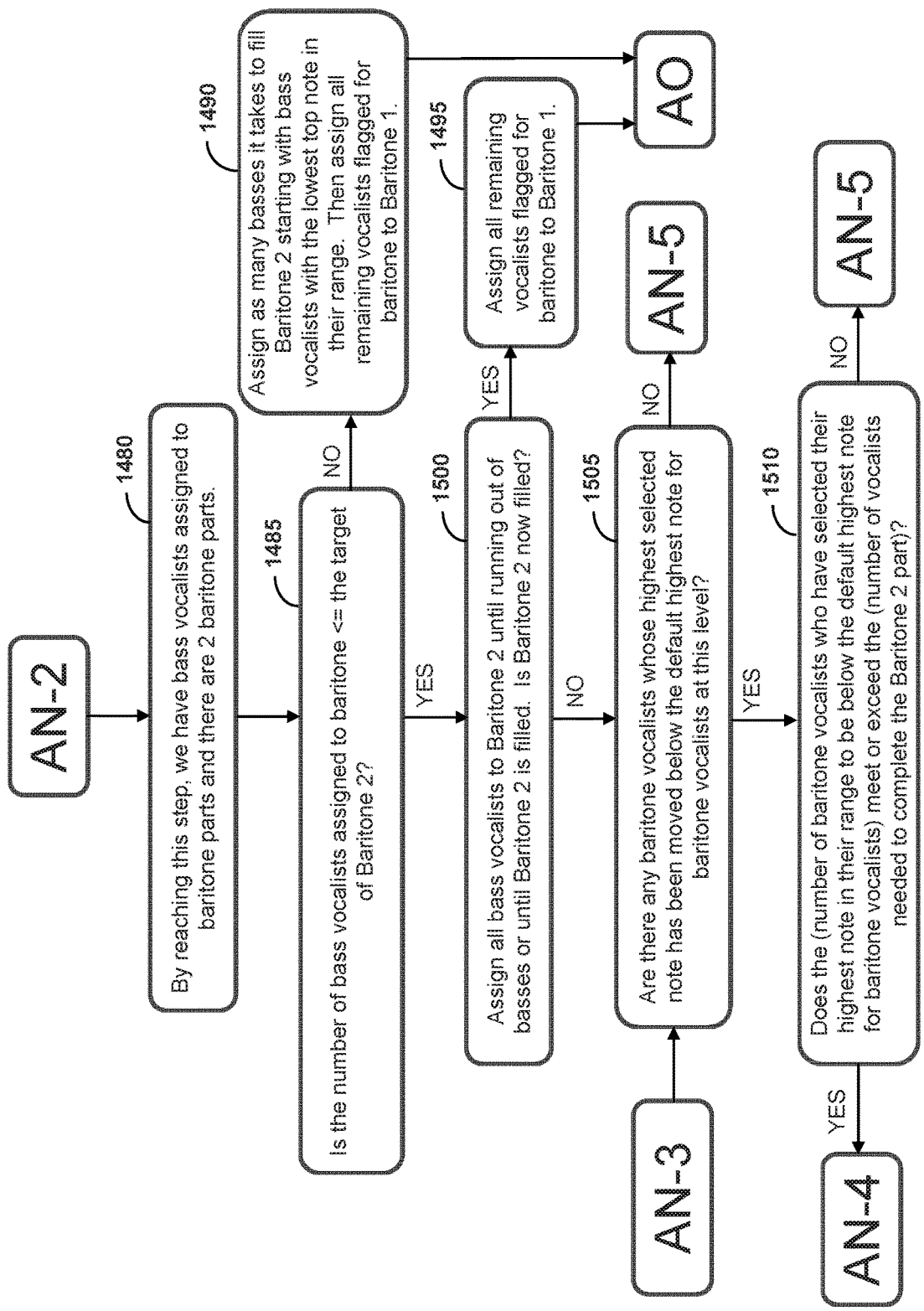
Figure 37:
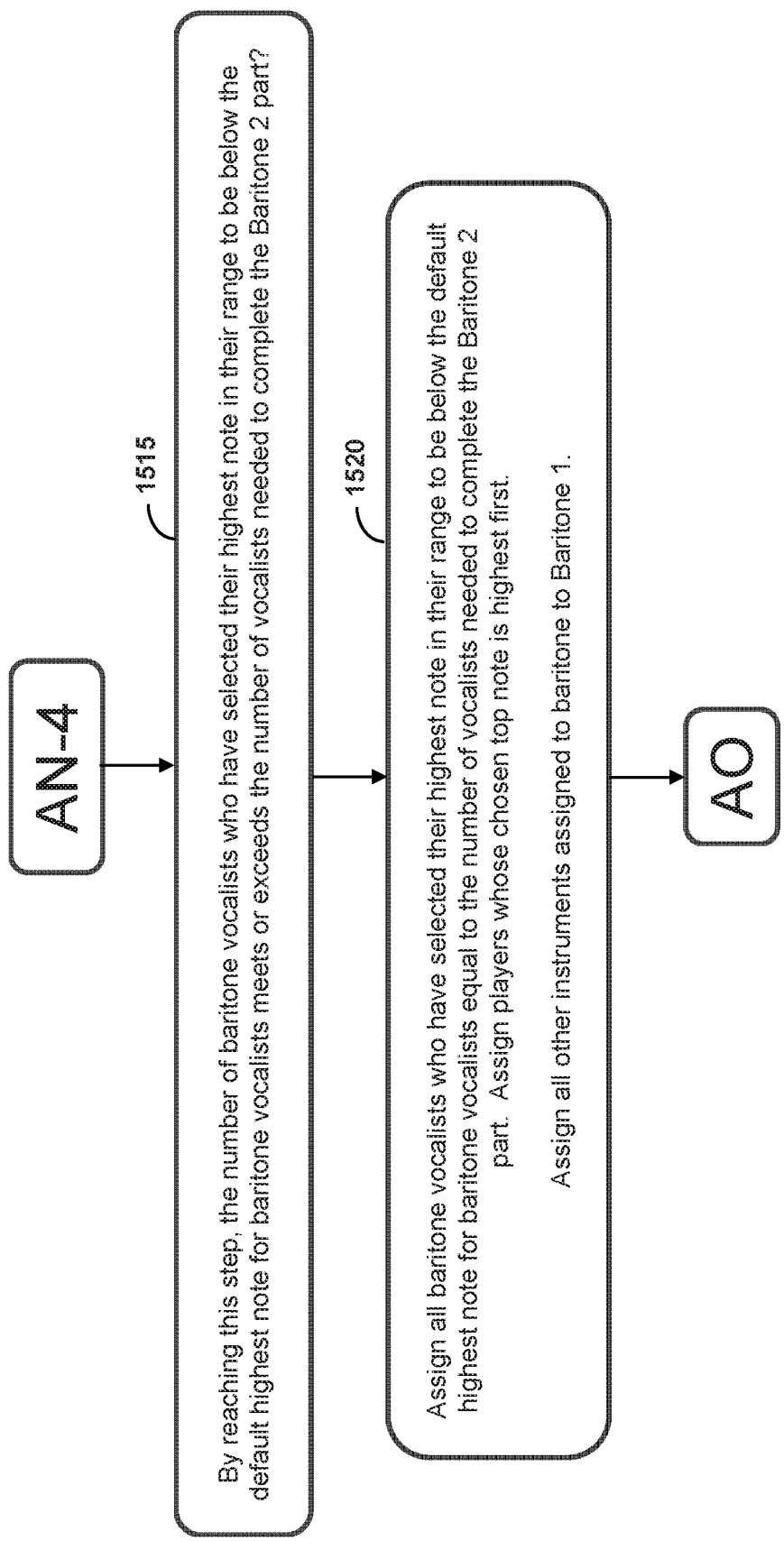
Figure 38:
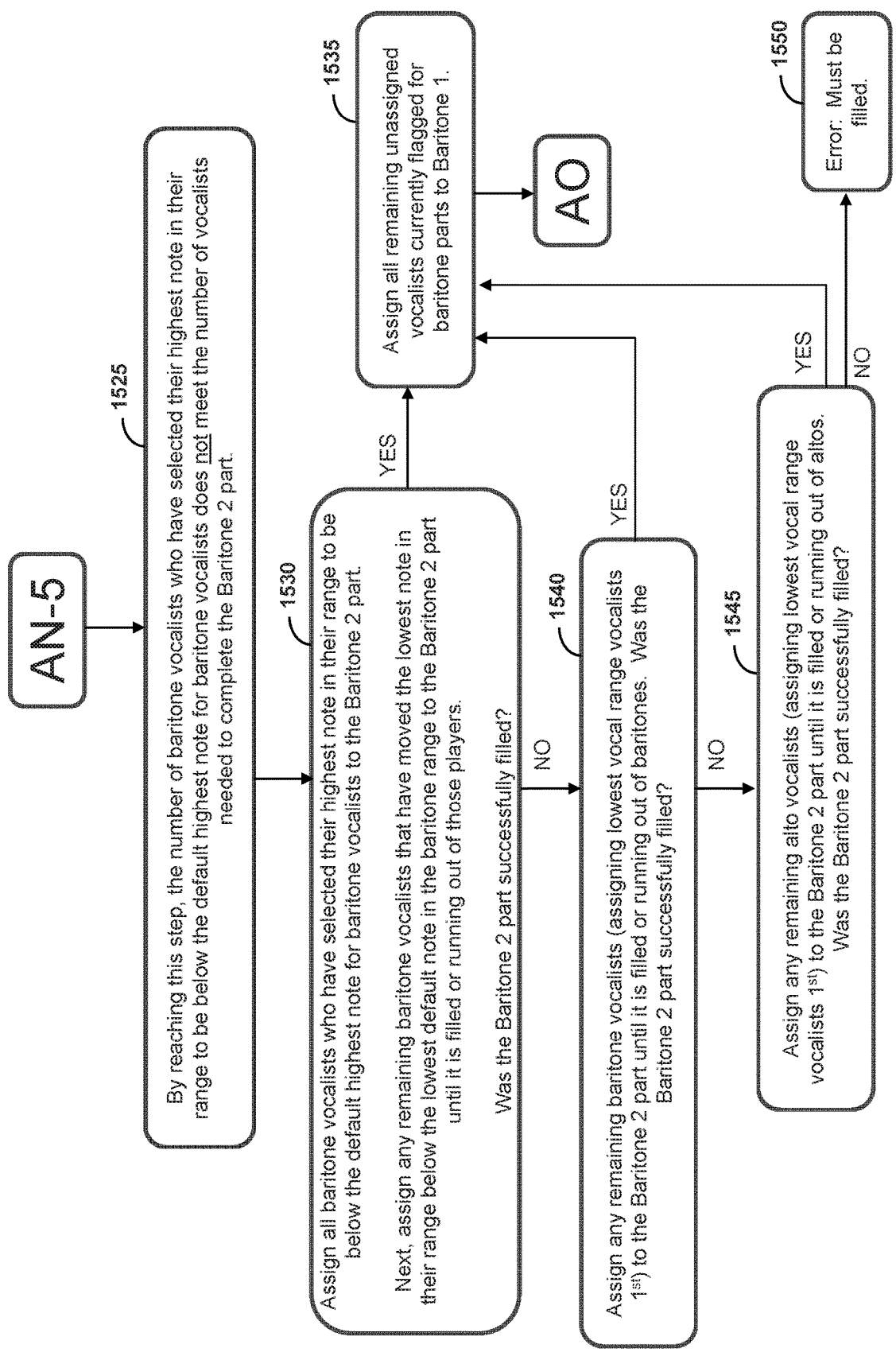
Figure 39:
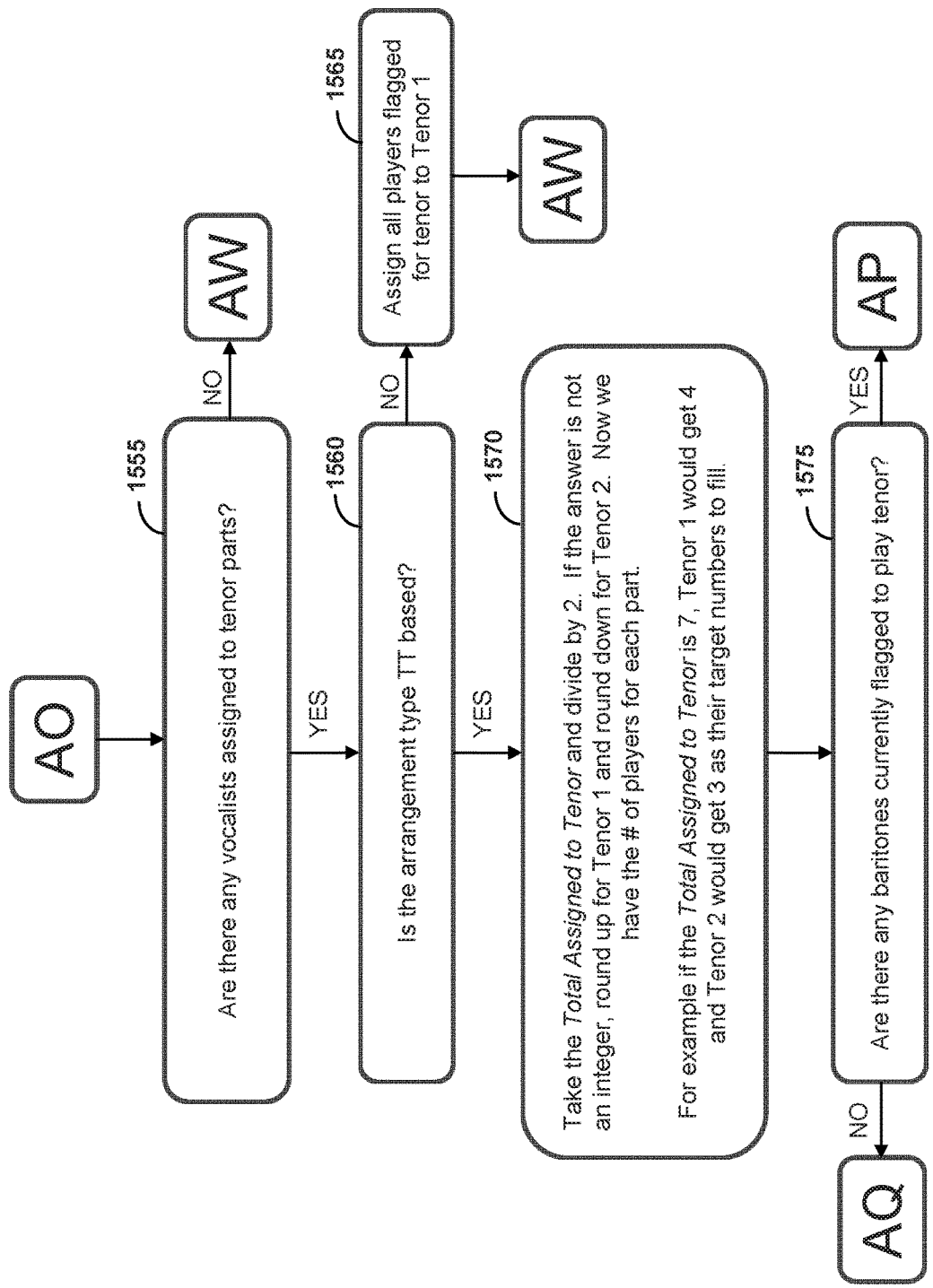
Figure 40:
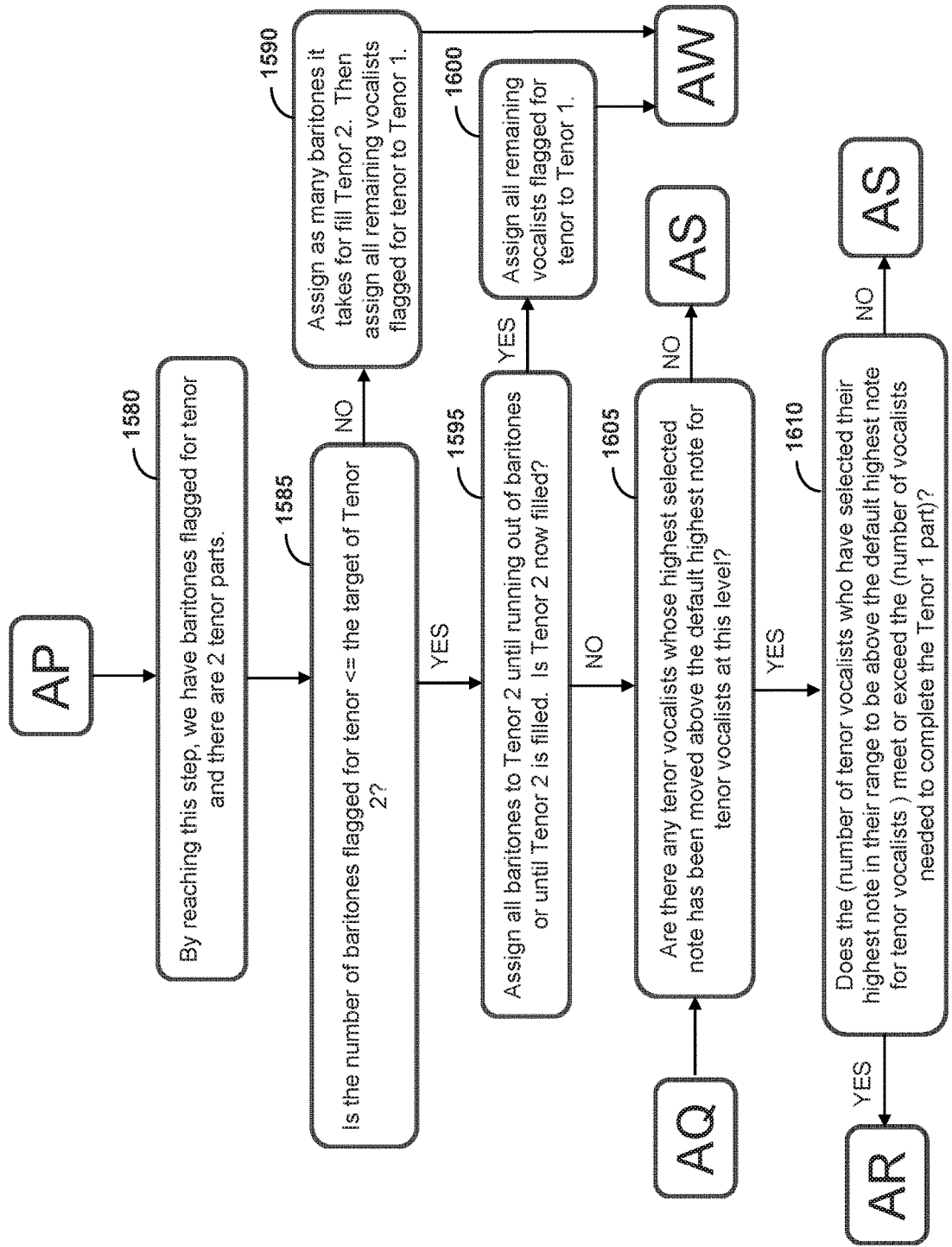
Figure 41:
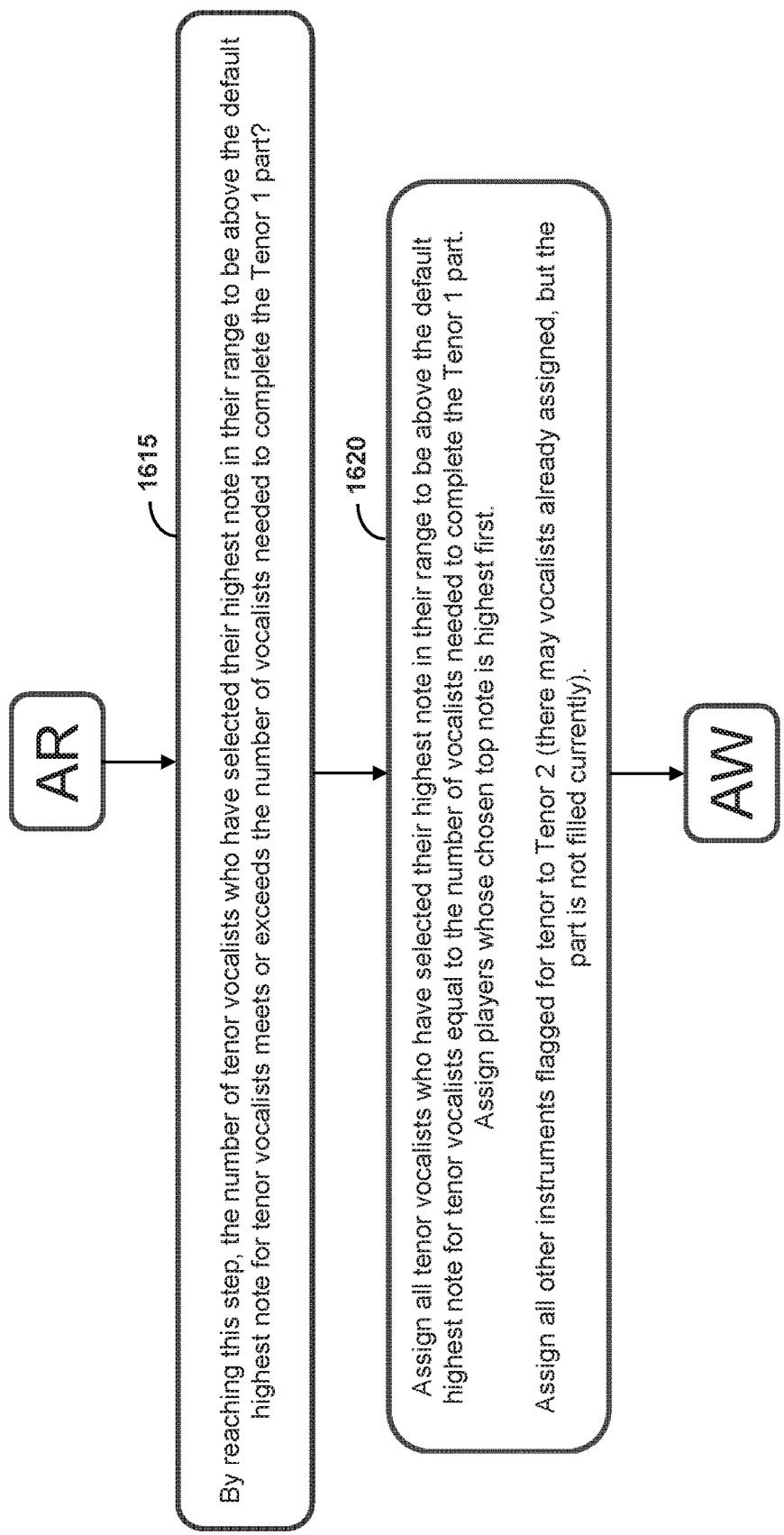
Figure 42:
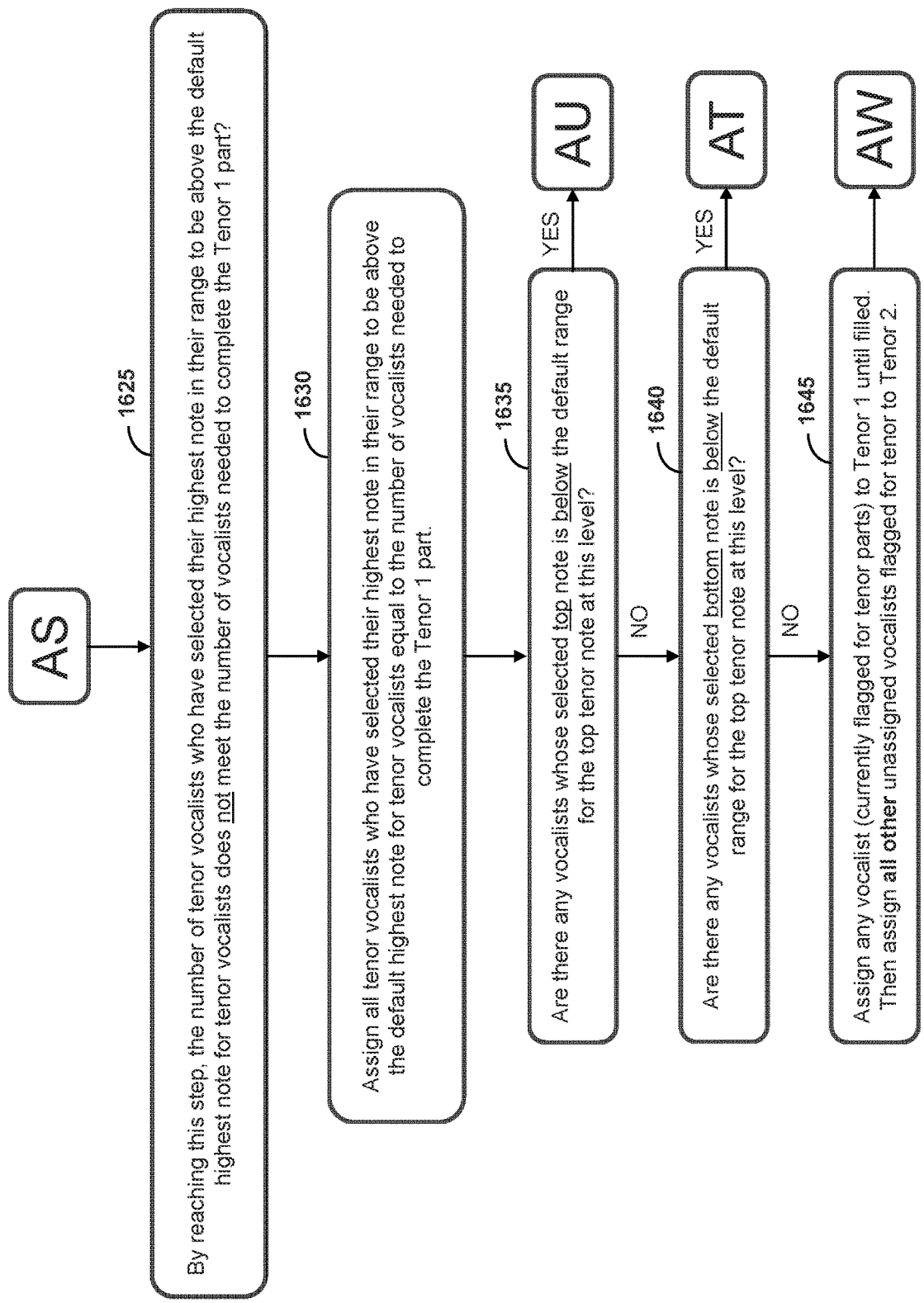
Figure 43:
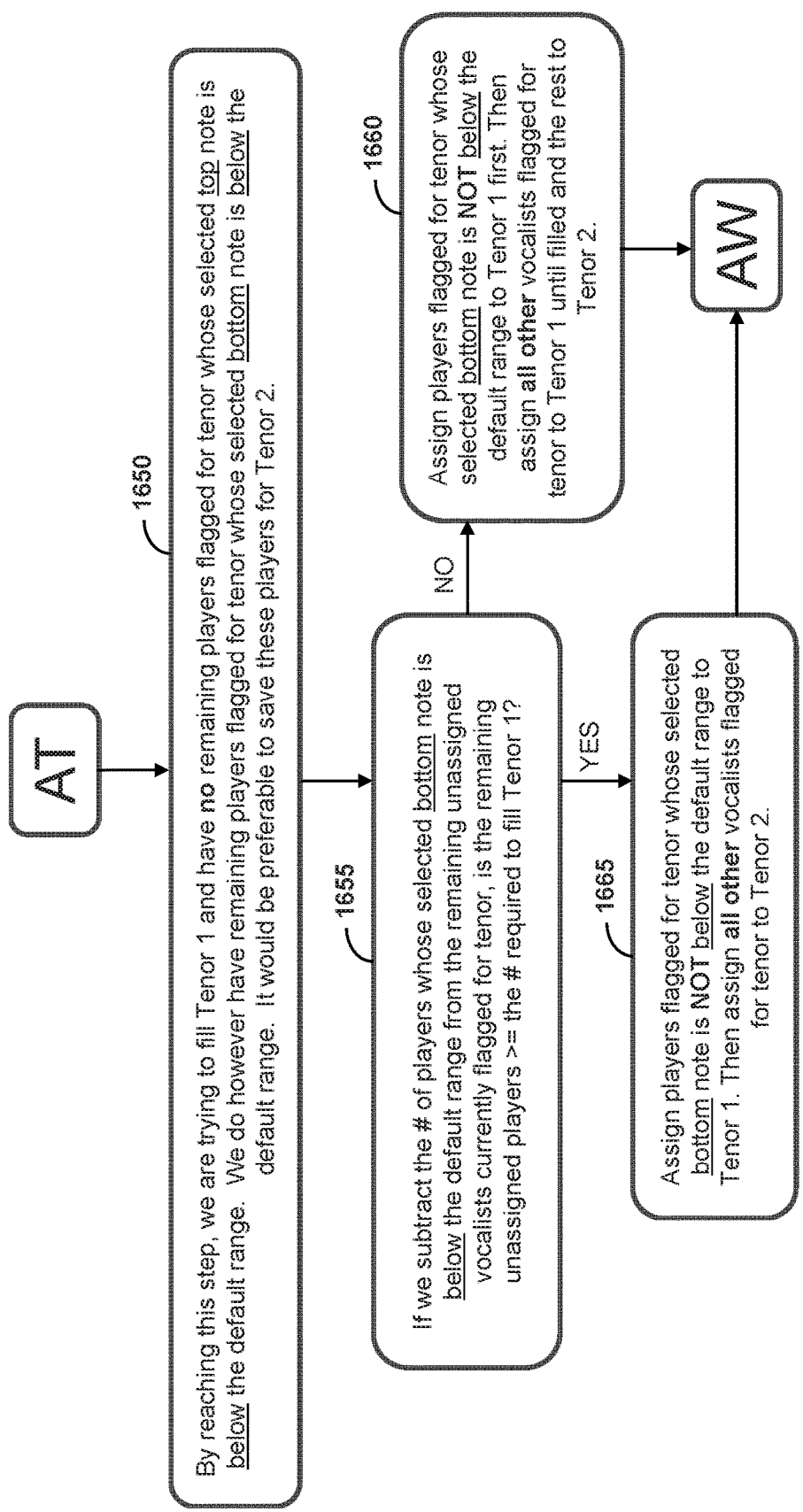
Figure 44:
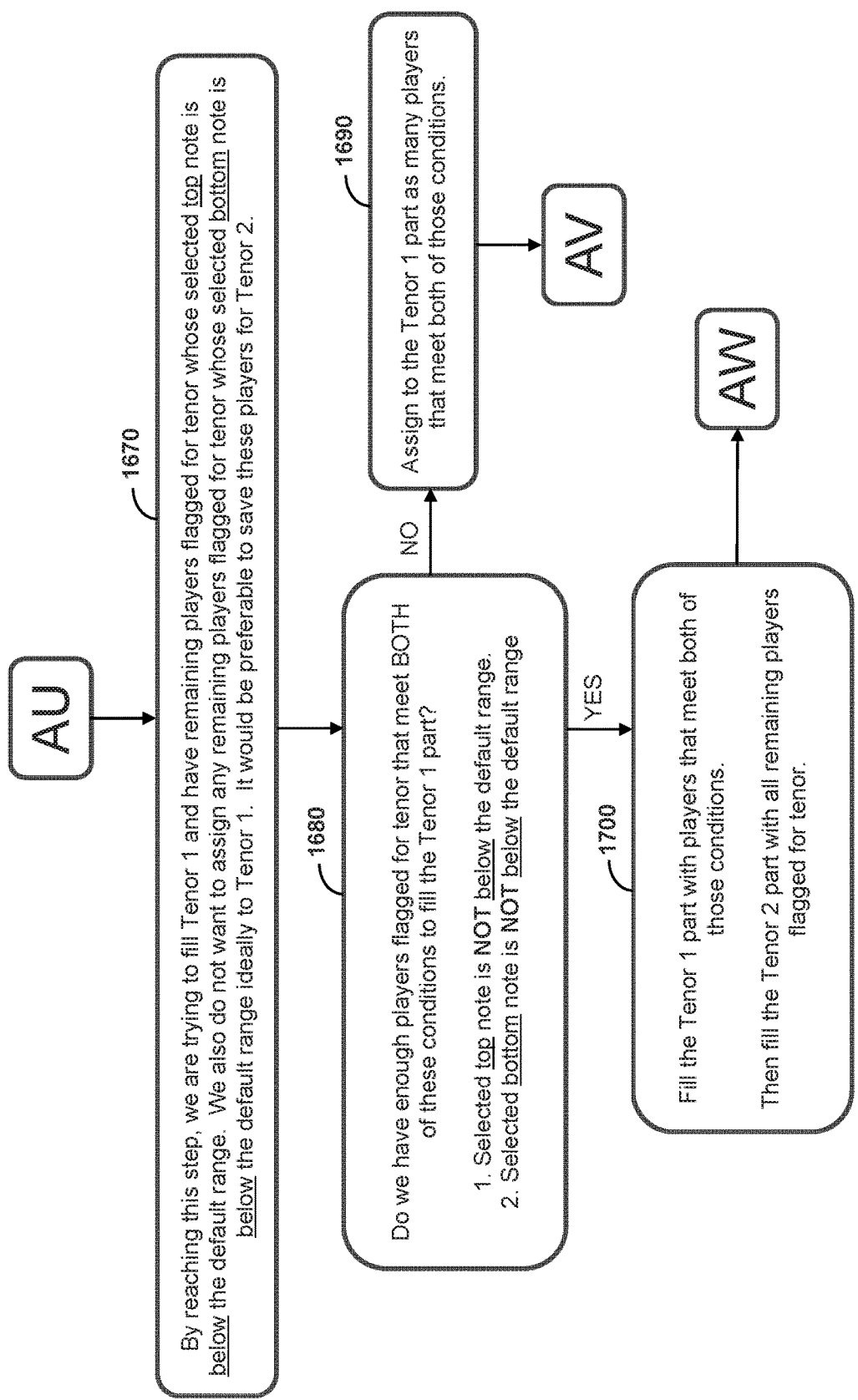
Figure 45:
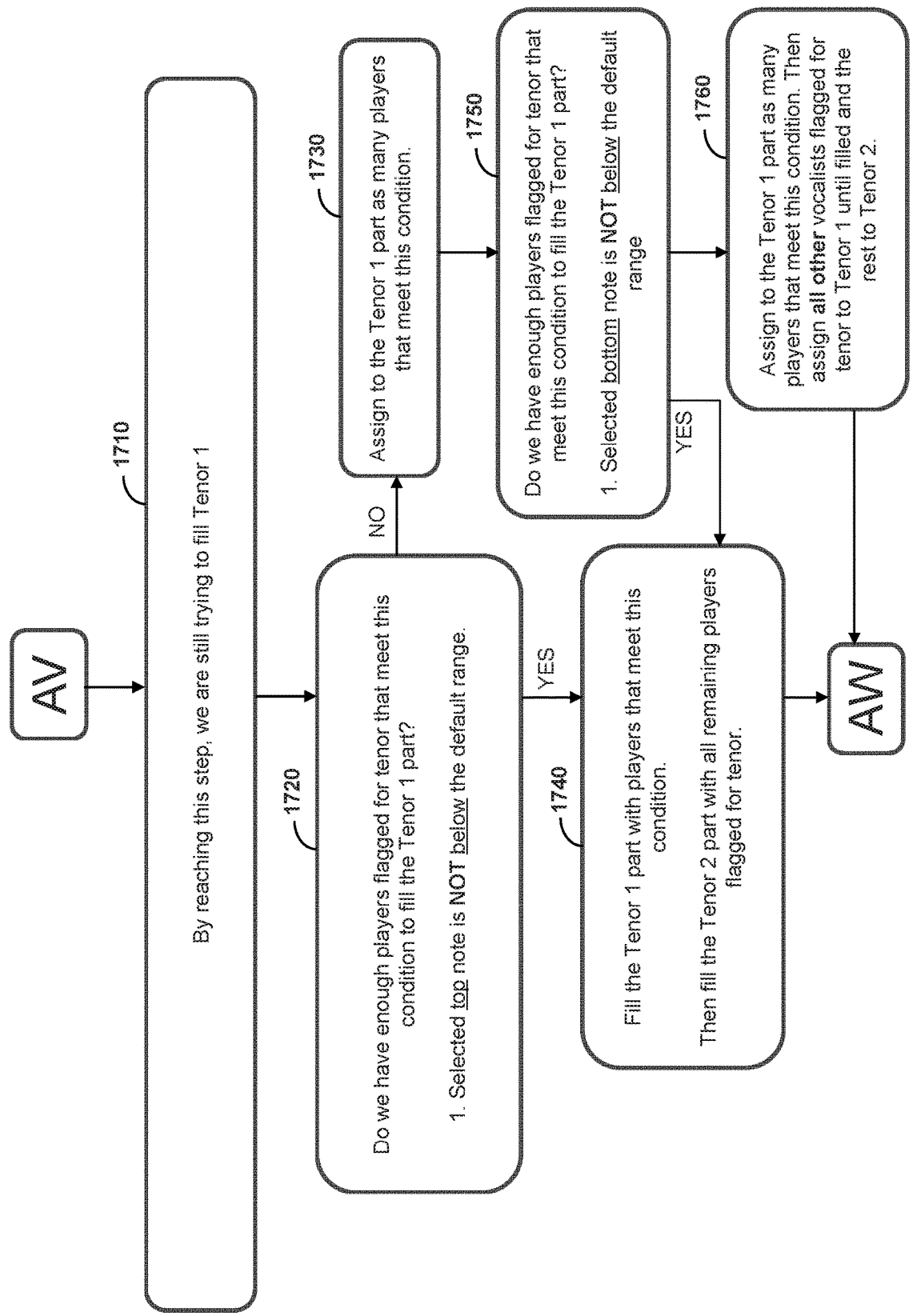
Figure 46:
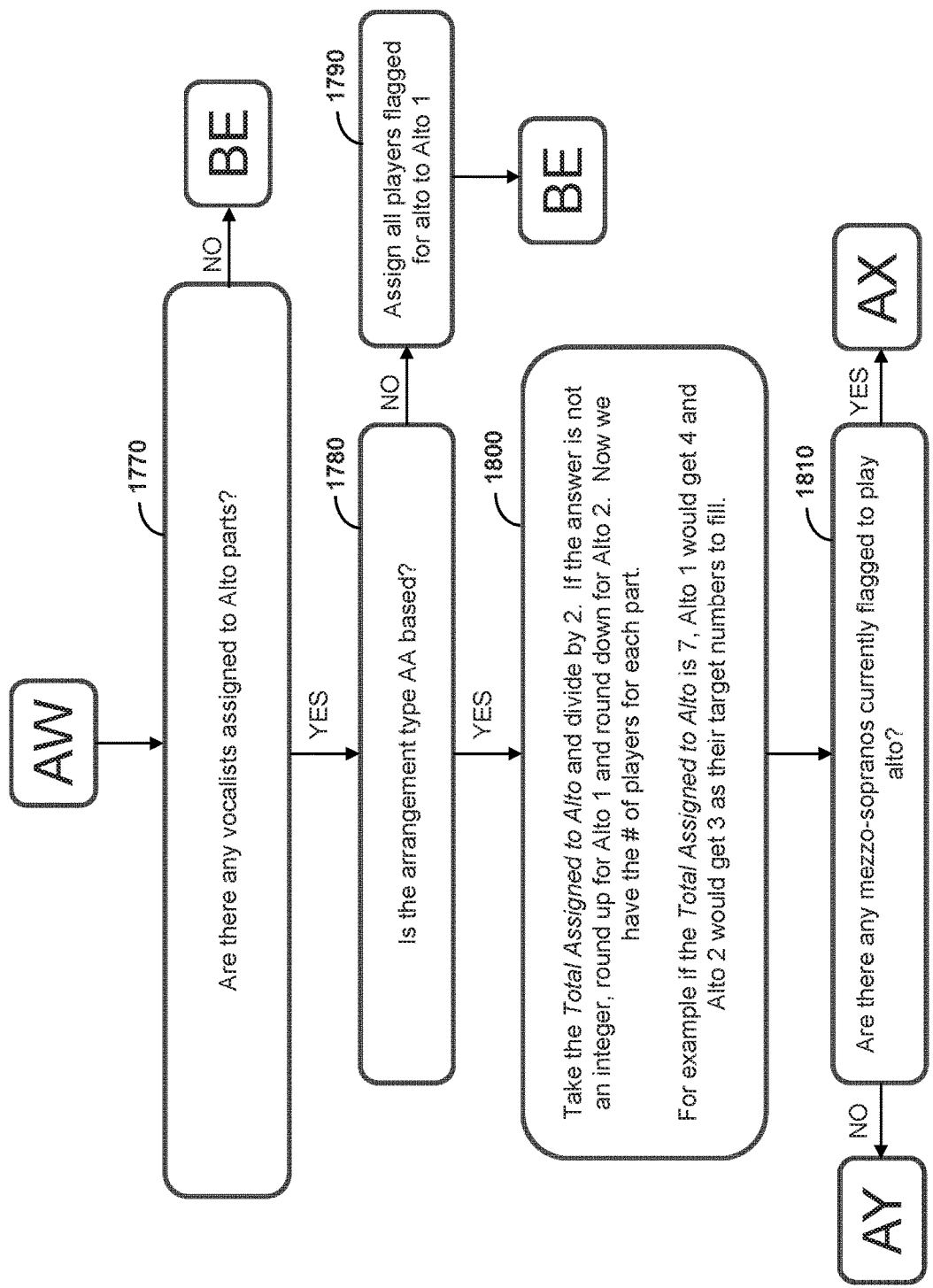
Figure 47:
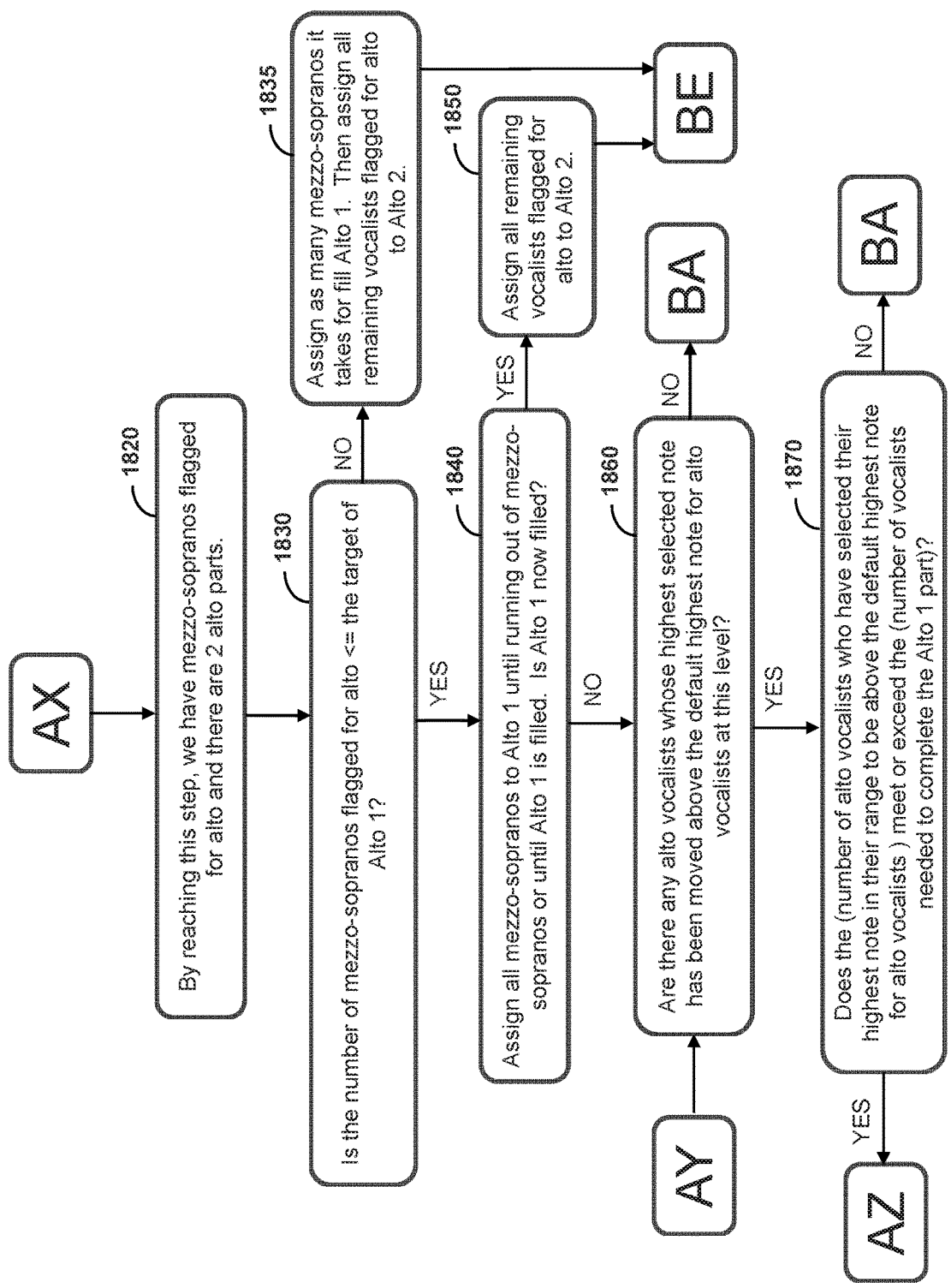
Figure 48:
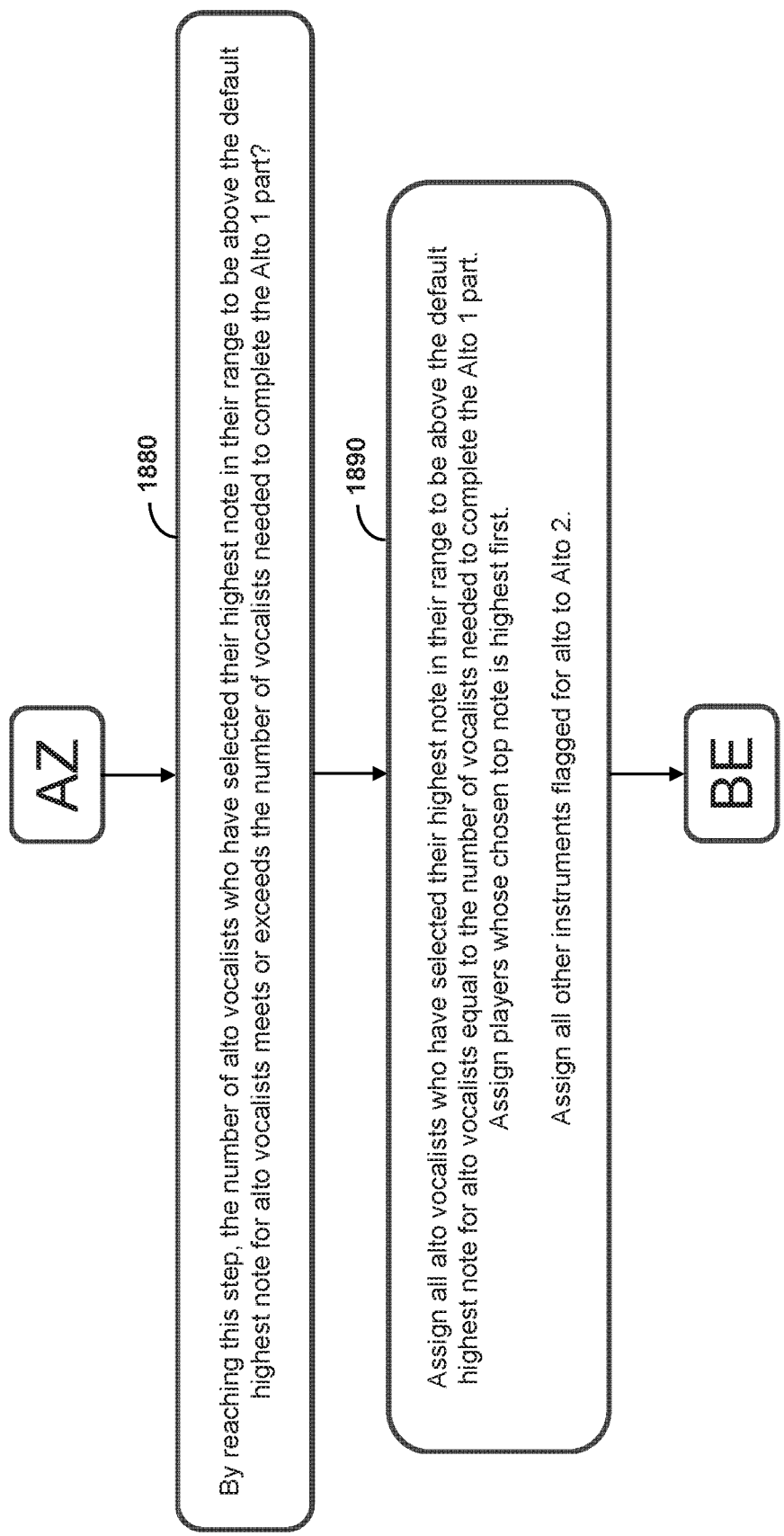
Figure 49:
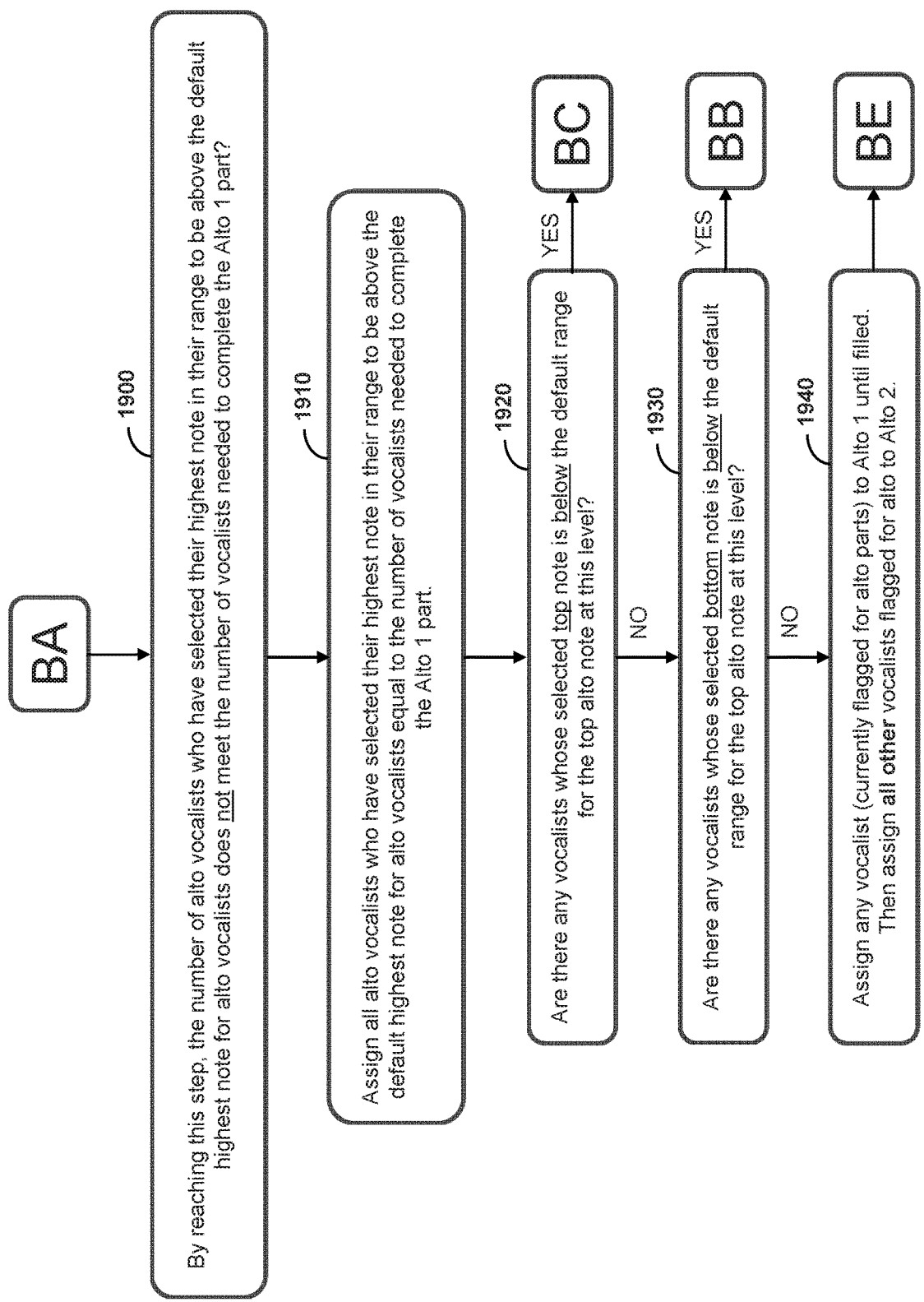
Figure 50:
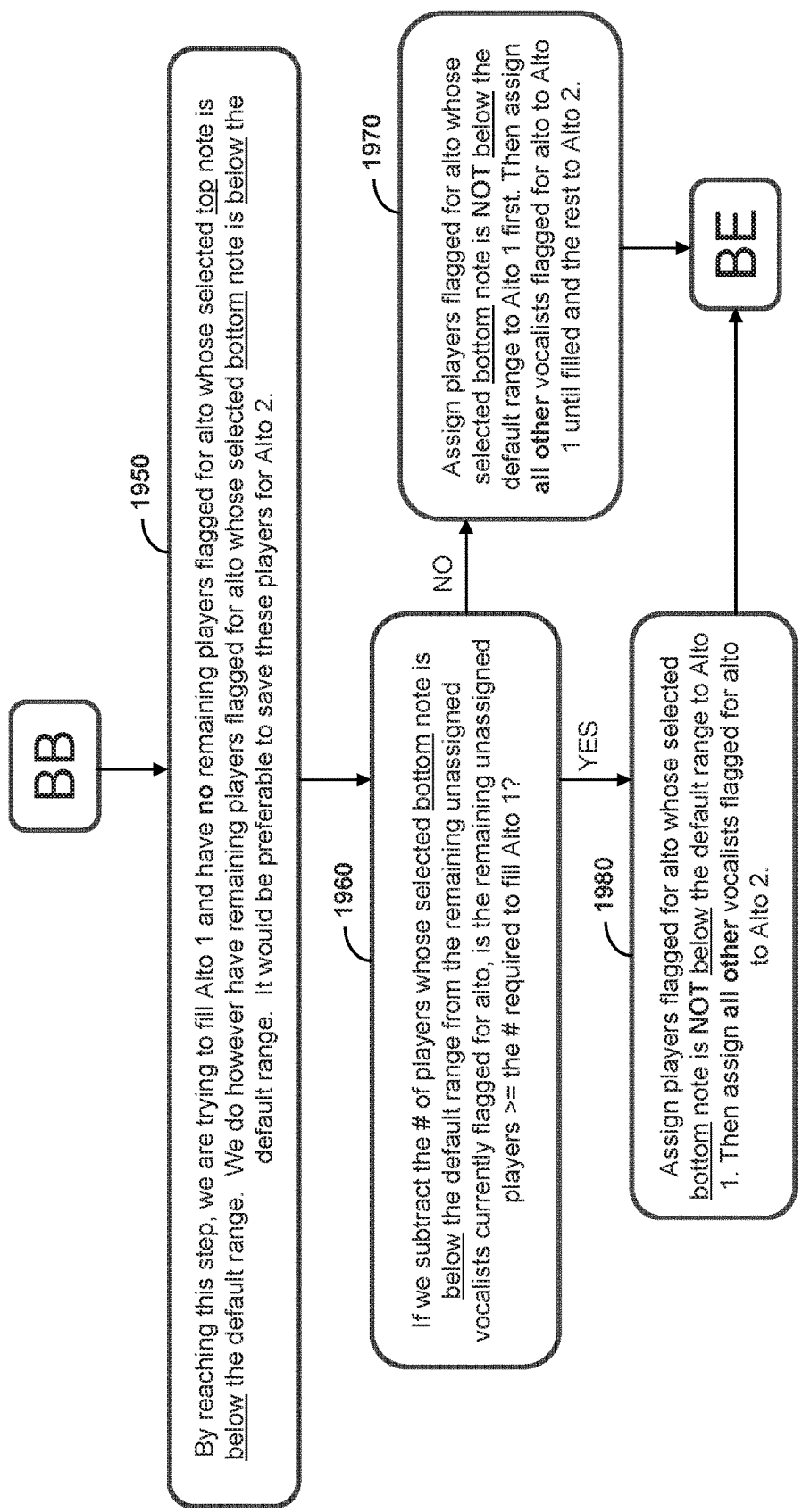
Figure 51:
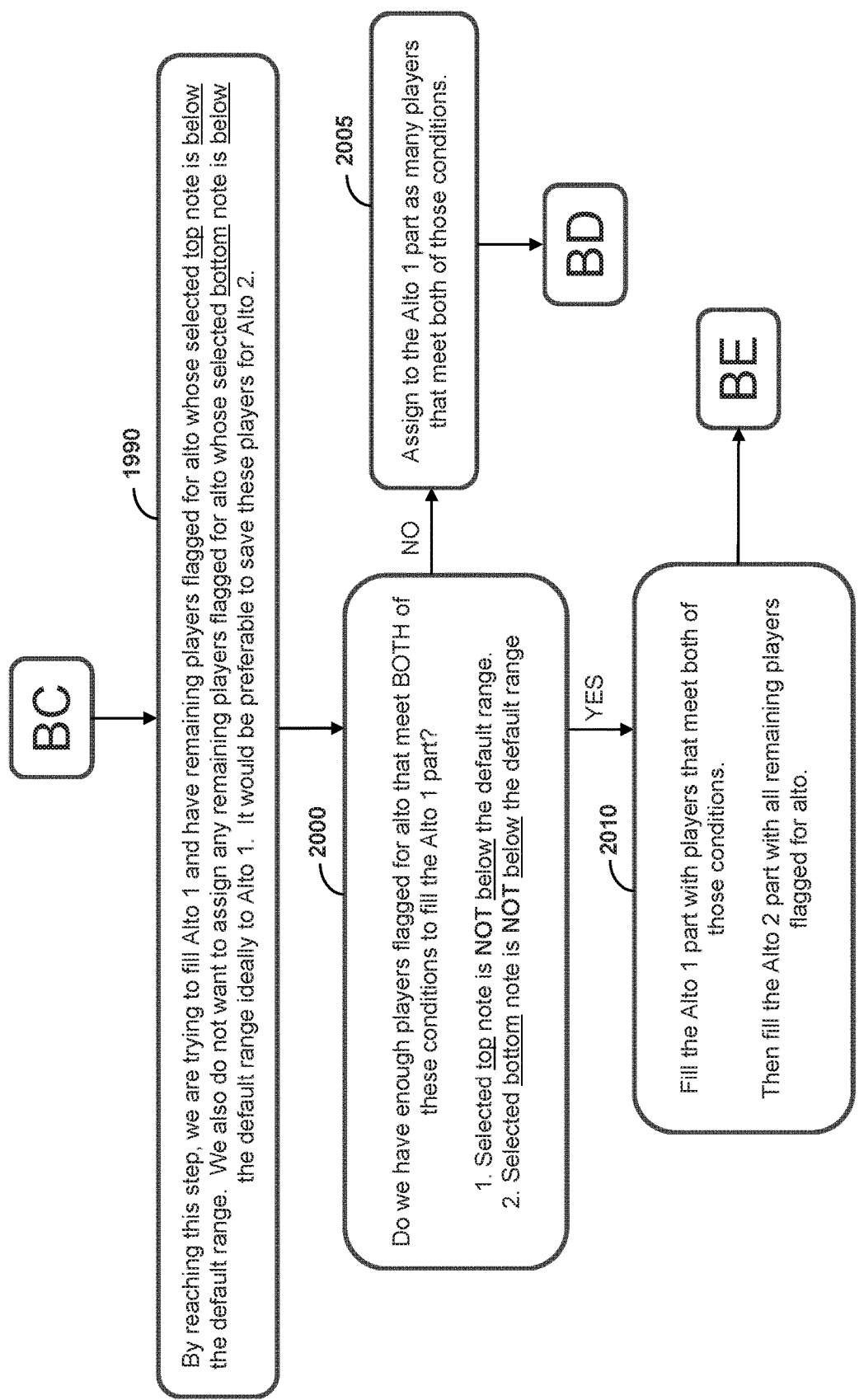
Figure 52:
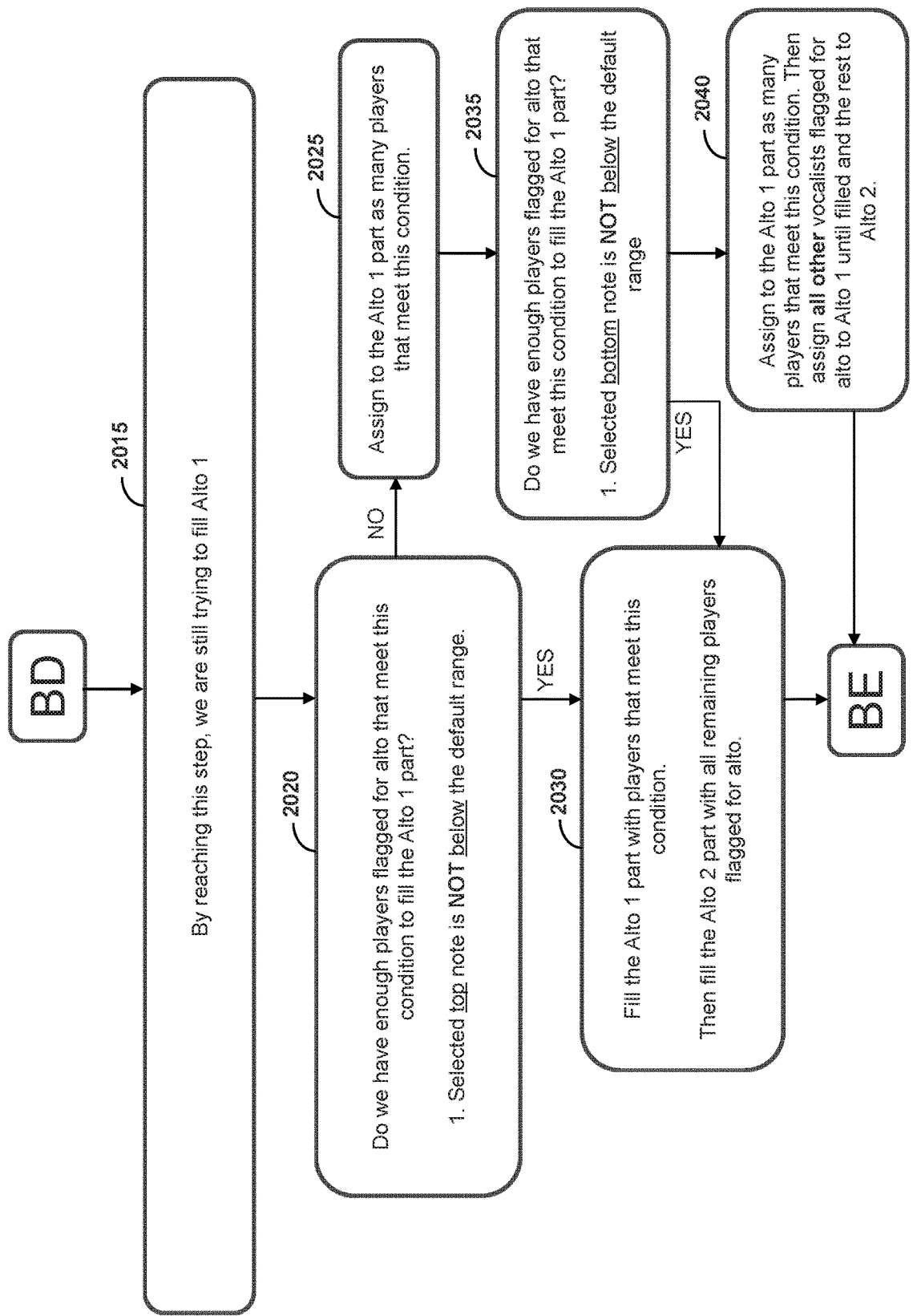
Figure 53:
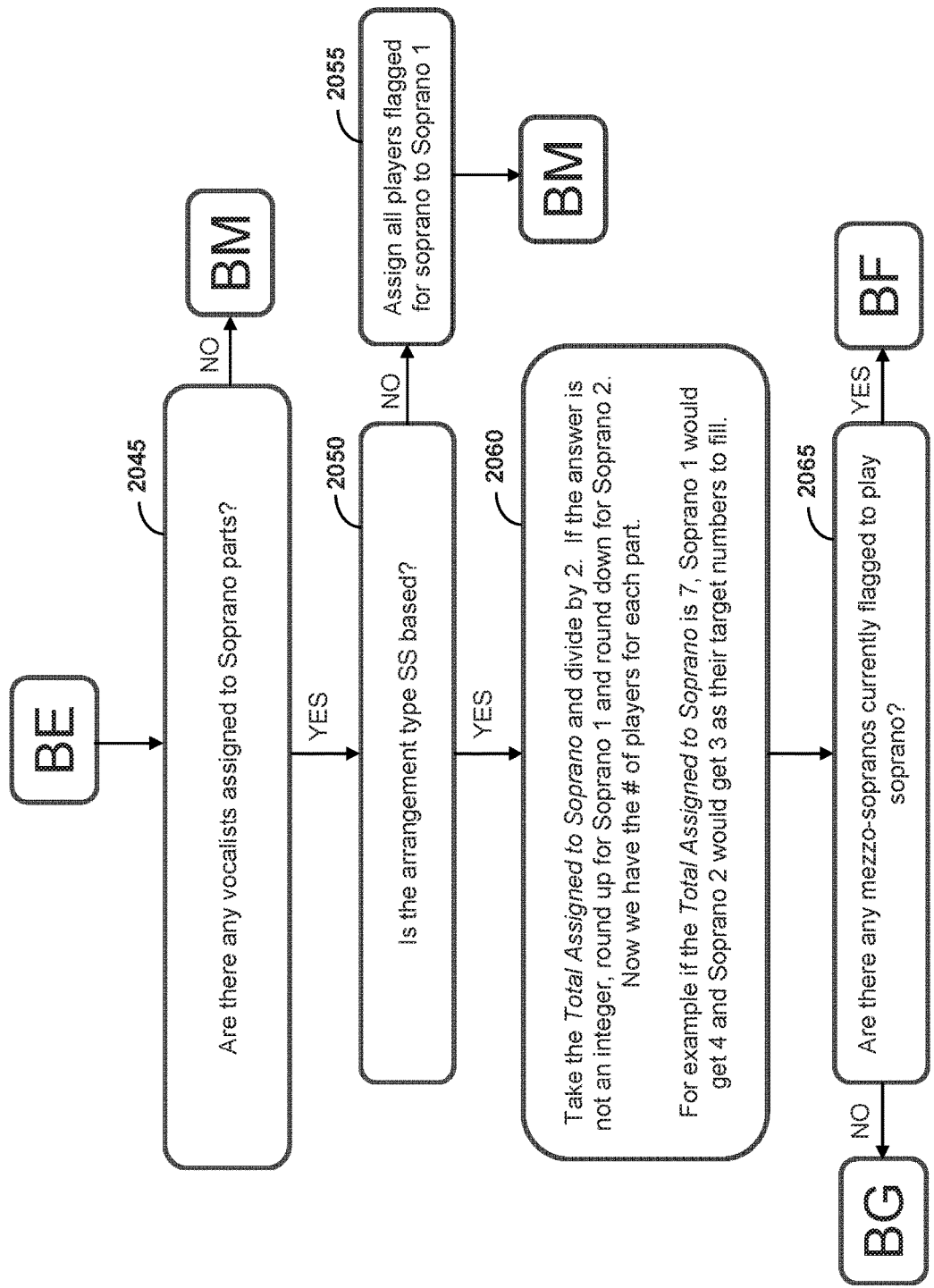
Figure 54:
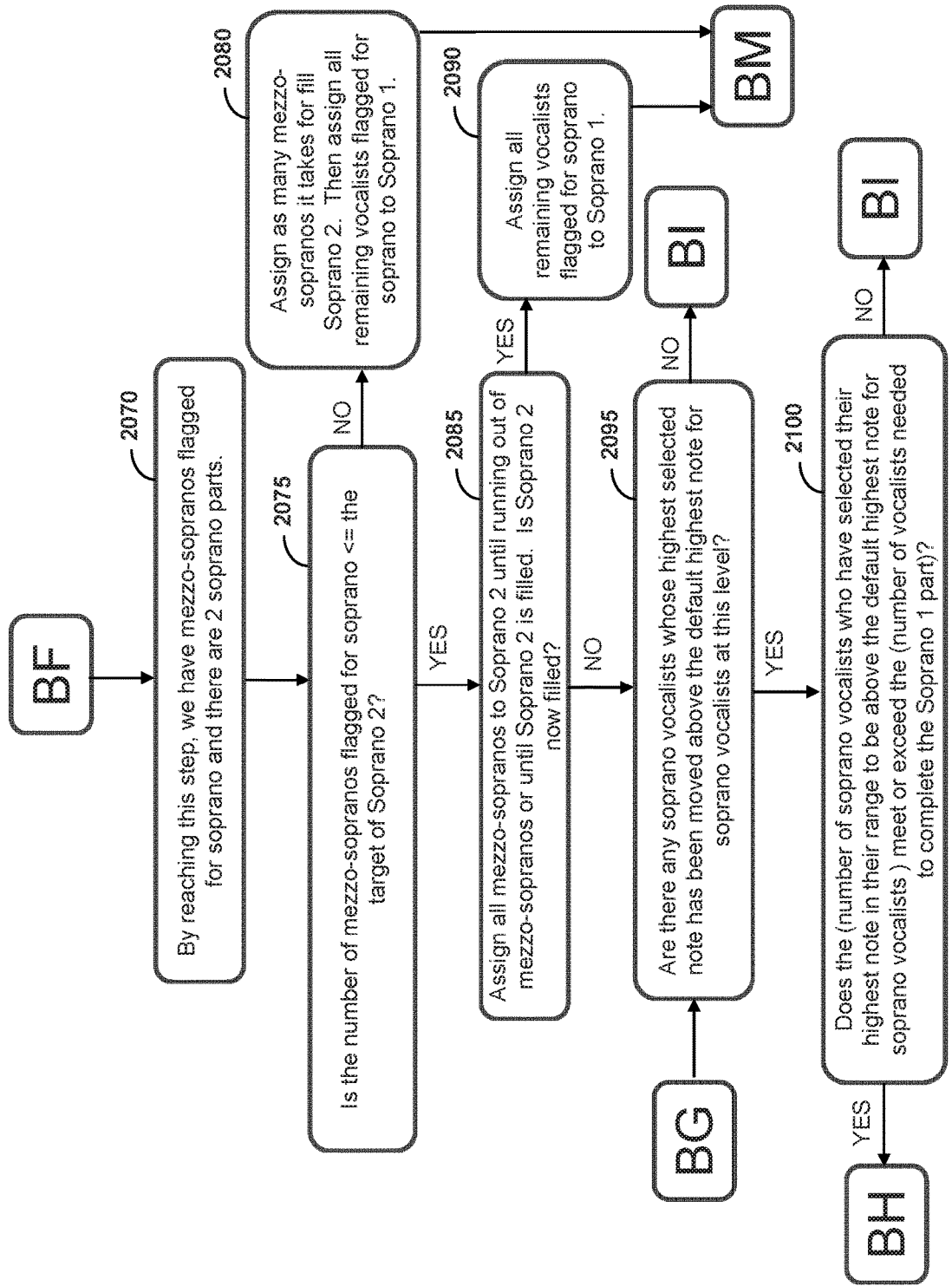
Figure 55:
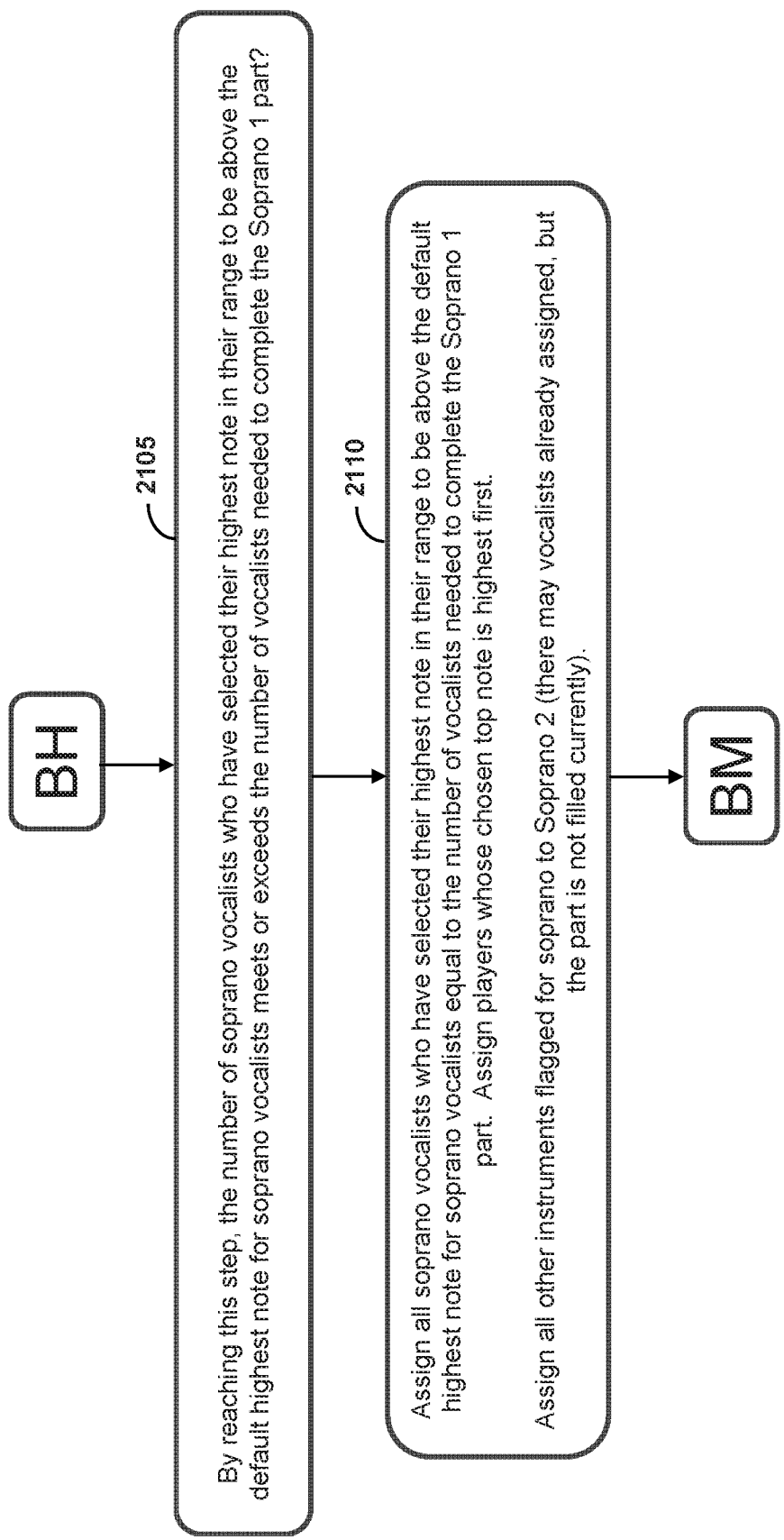
Figure 56:
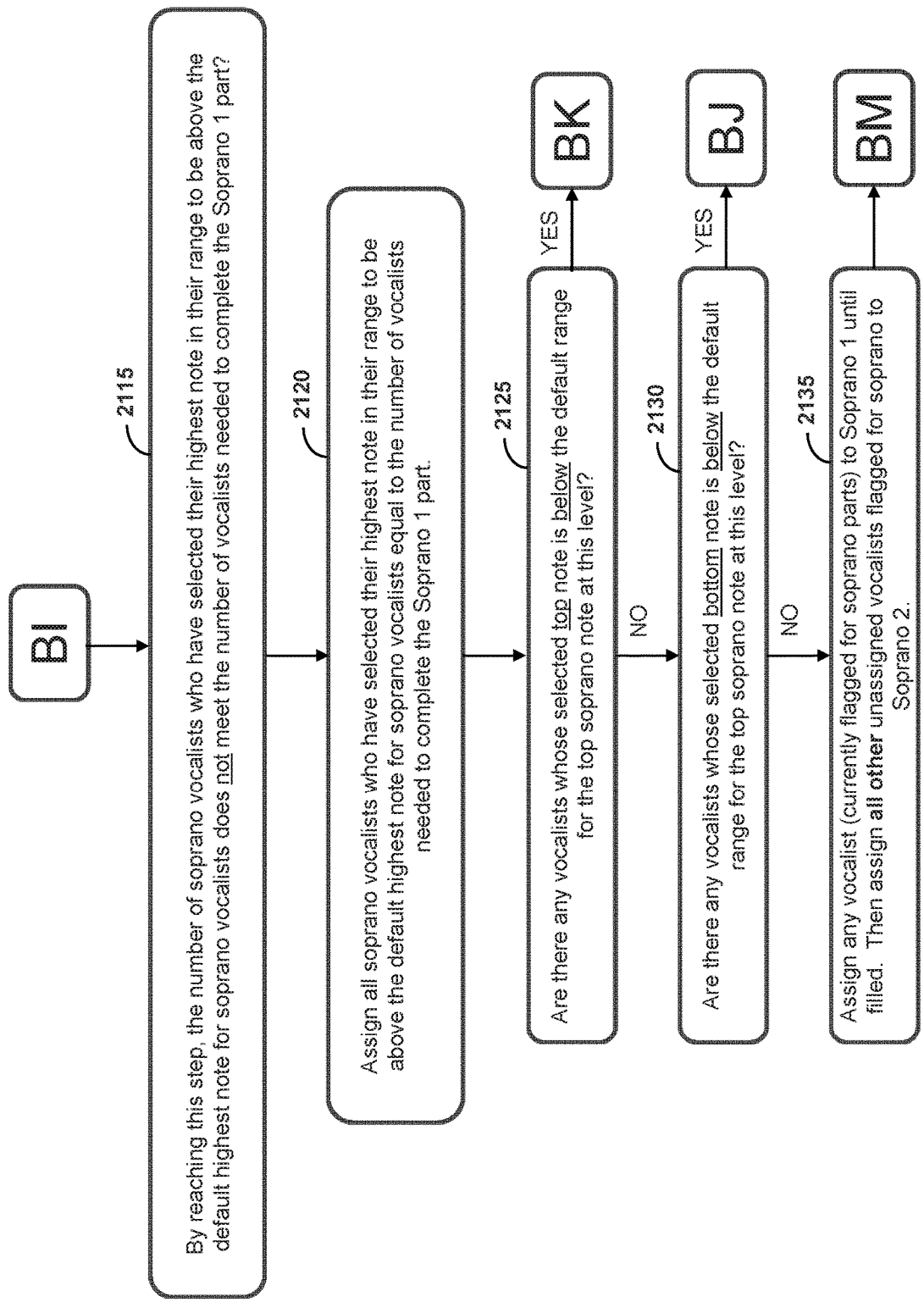
Figure 57:
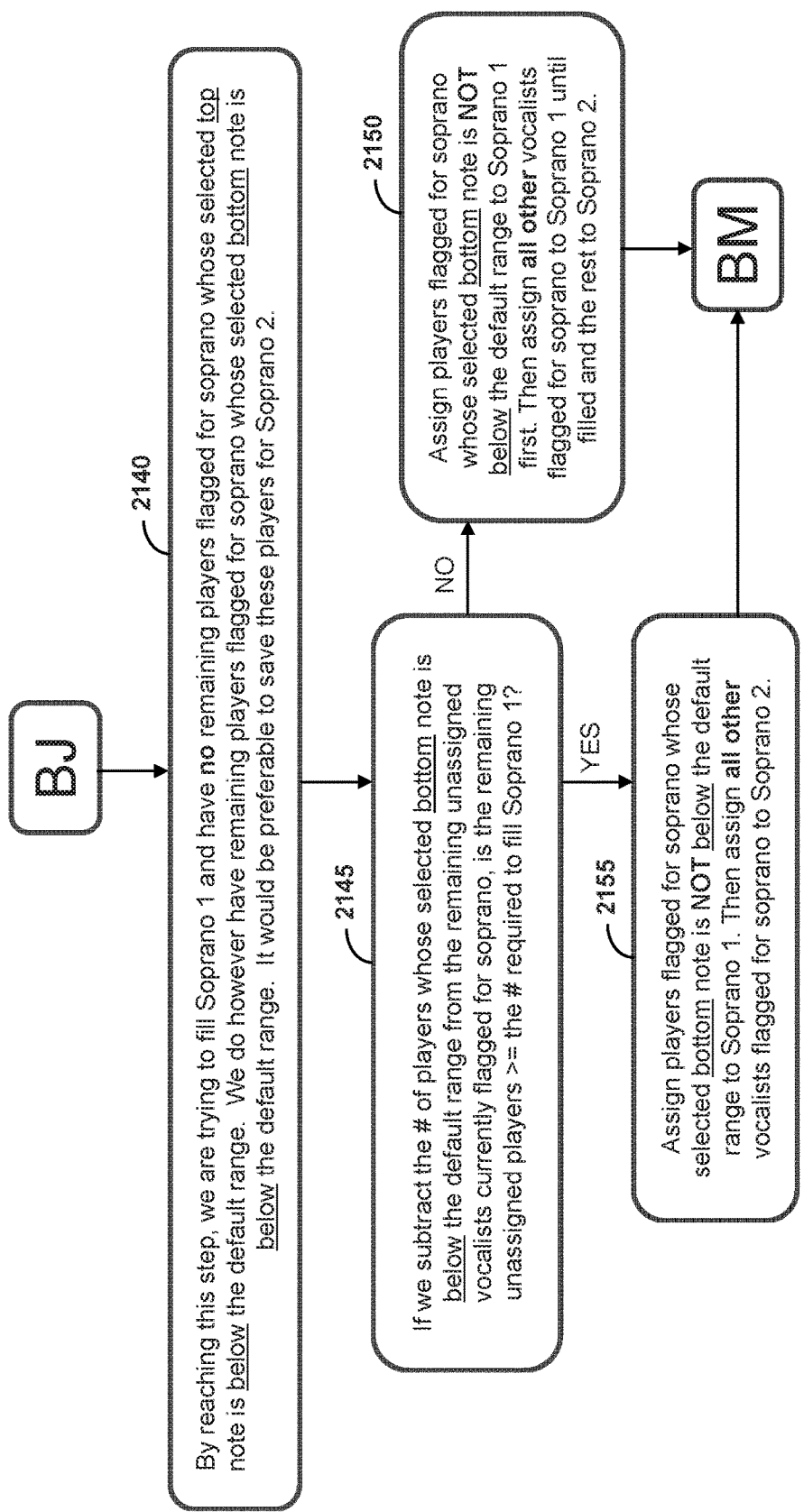
Figure 58:
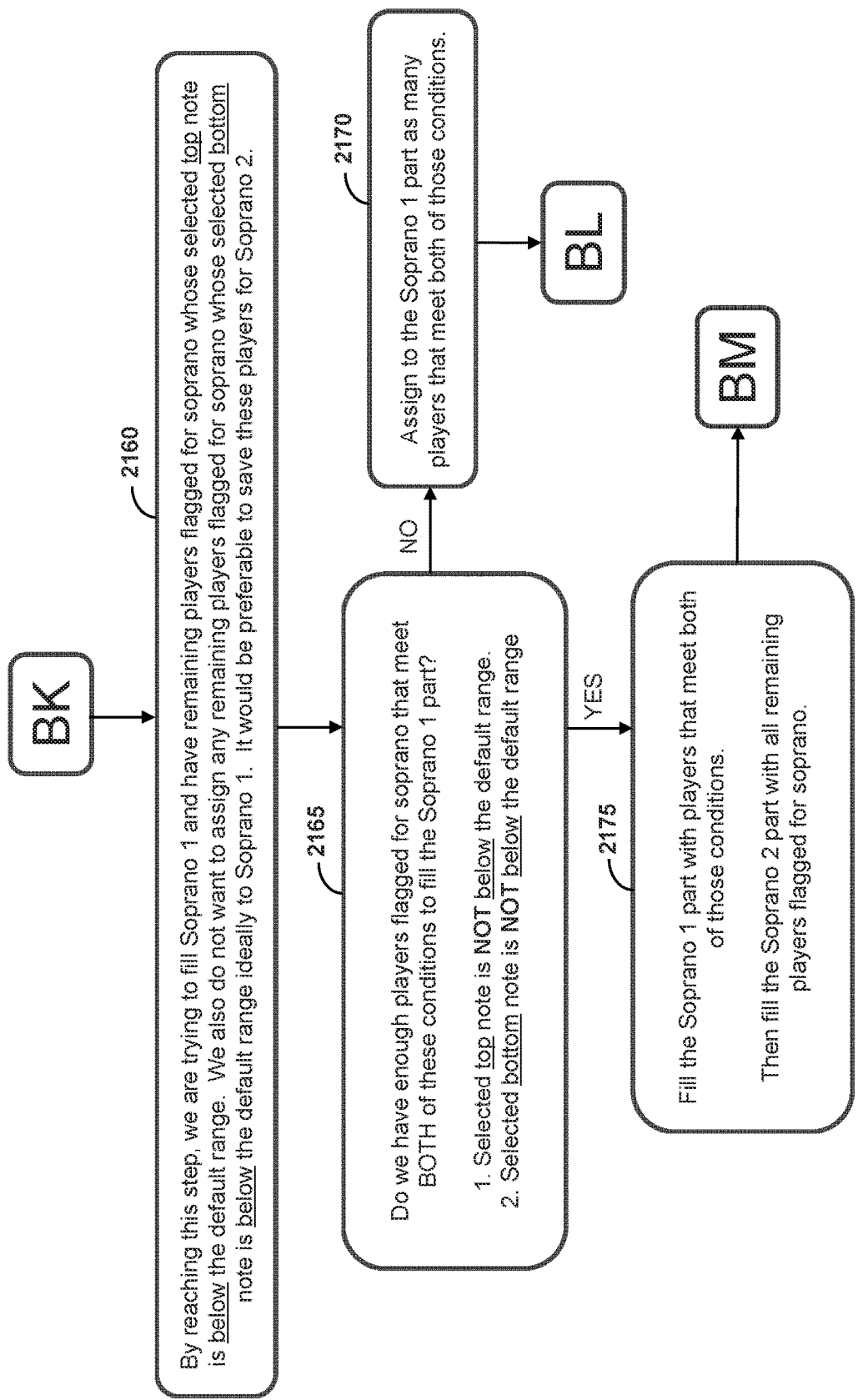
Figure 59:
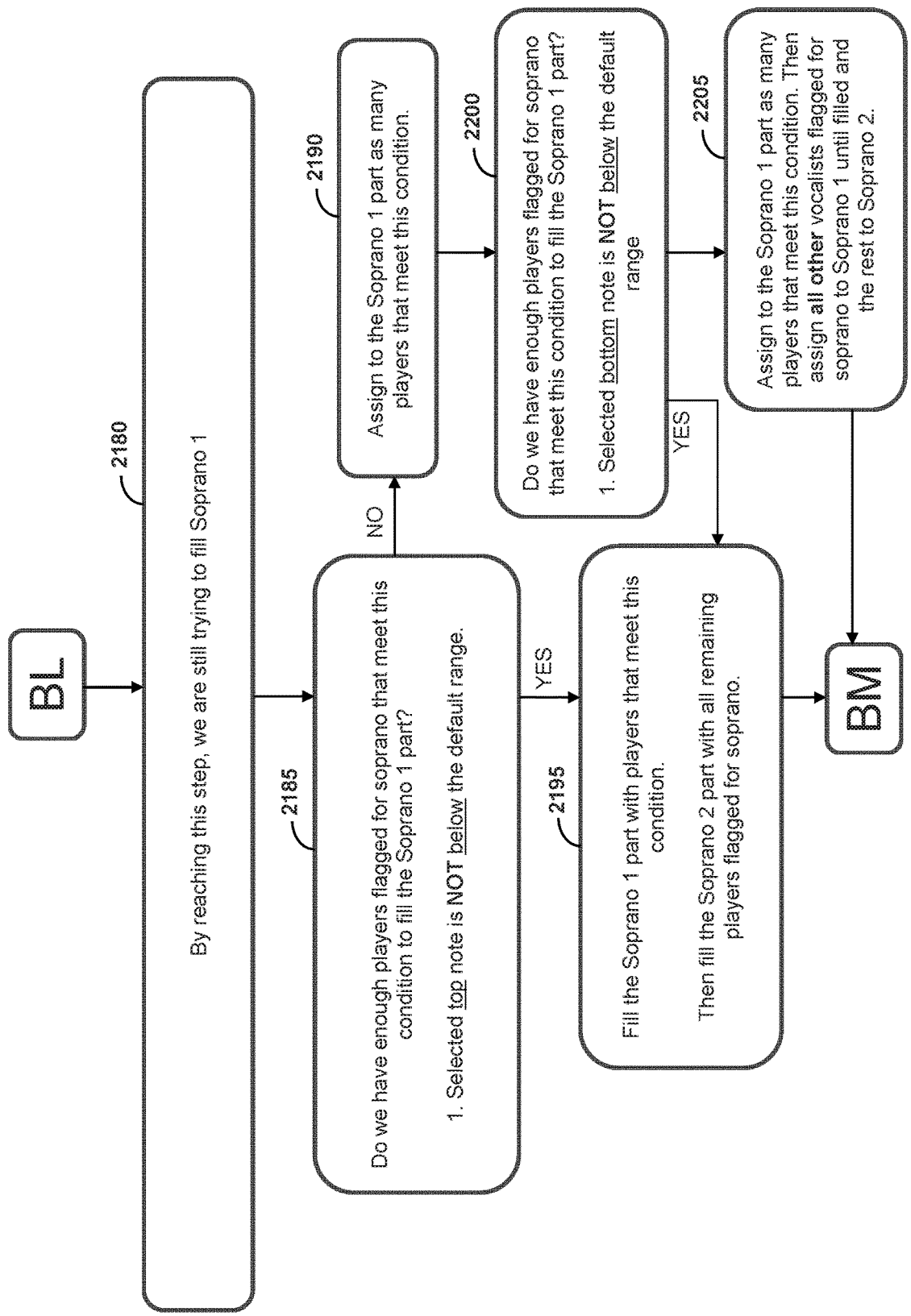
Figure 60:
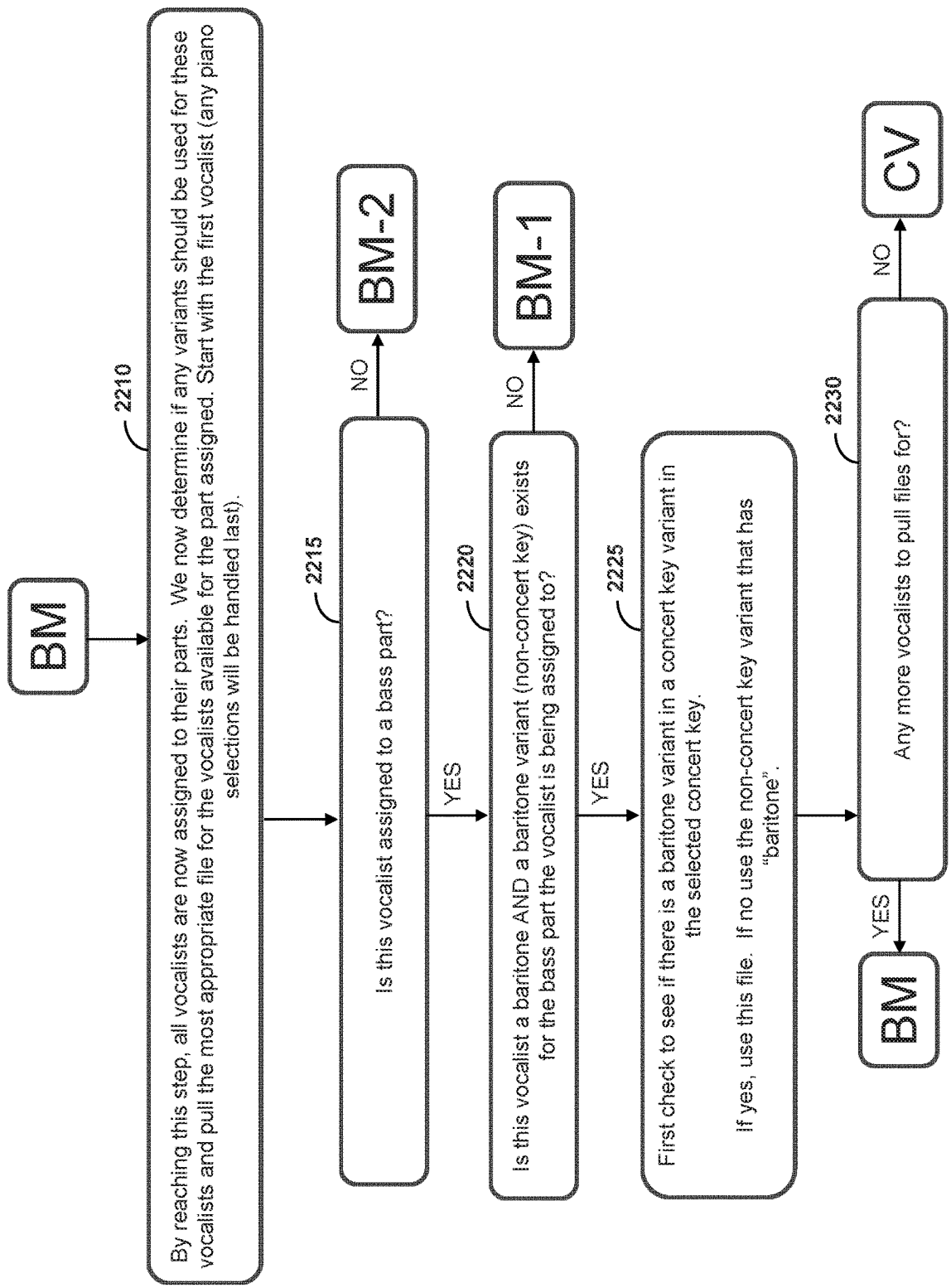
FIGS. 60-74 illustrate aspects of the disclosure directed to determining part variant assignments.
Figure 61:
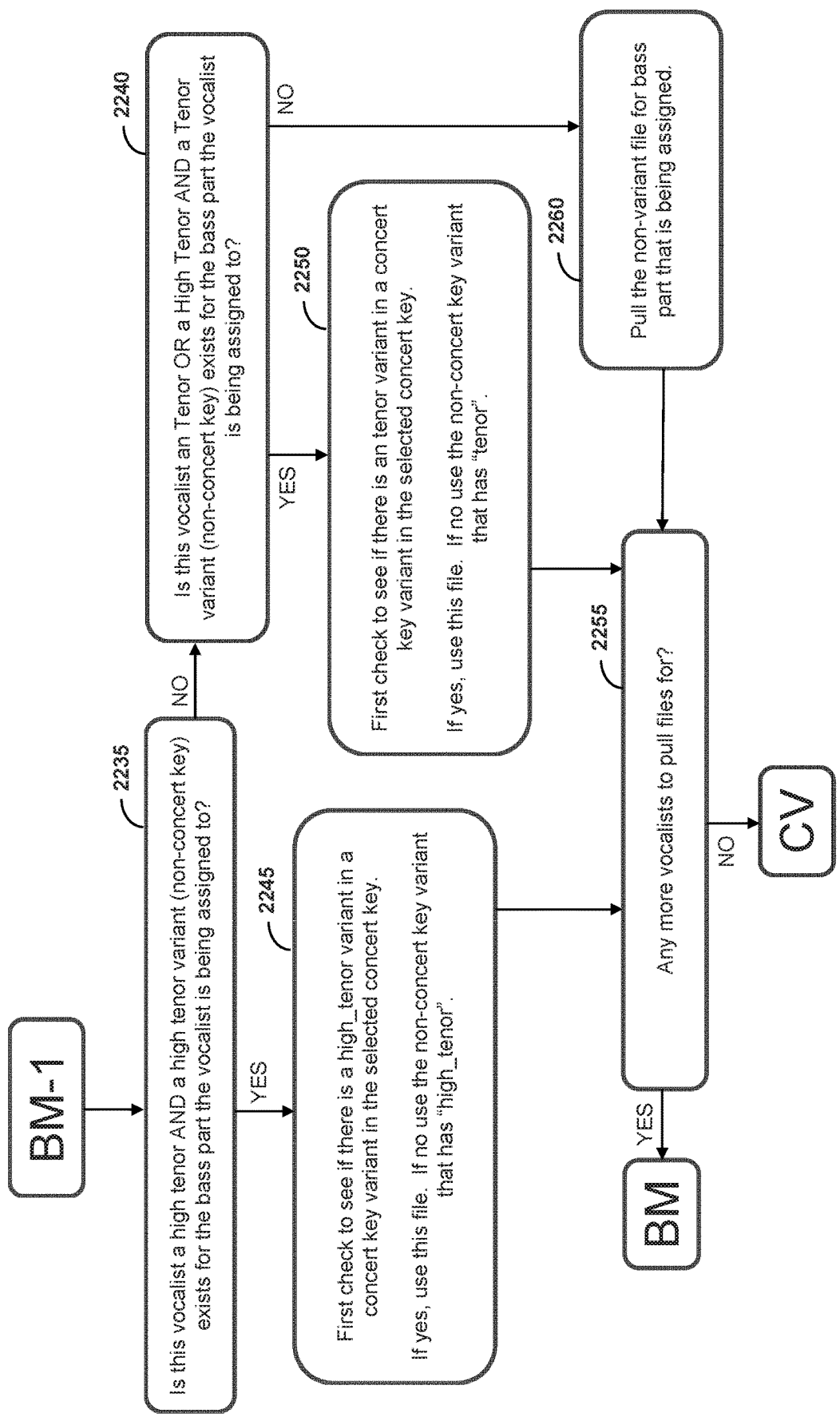
Figure 62:
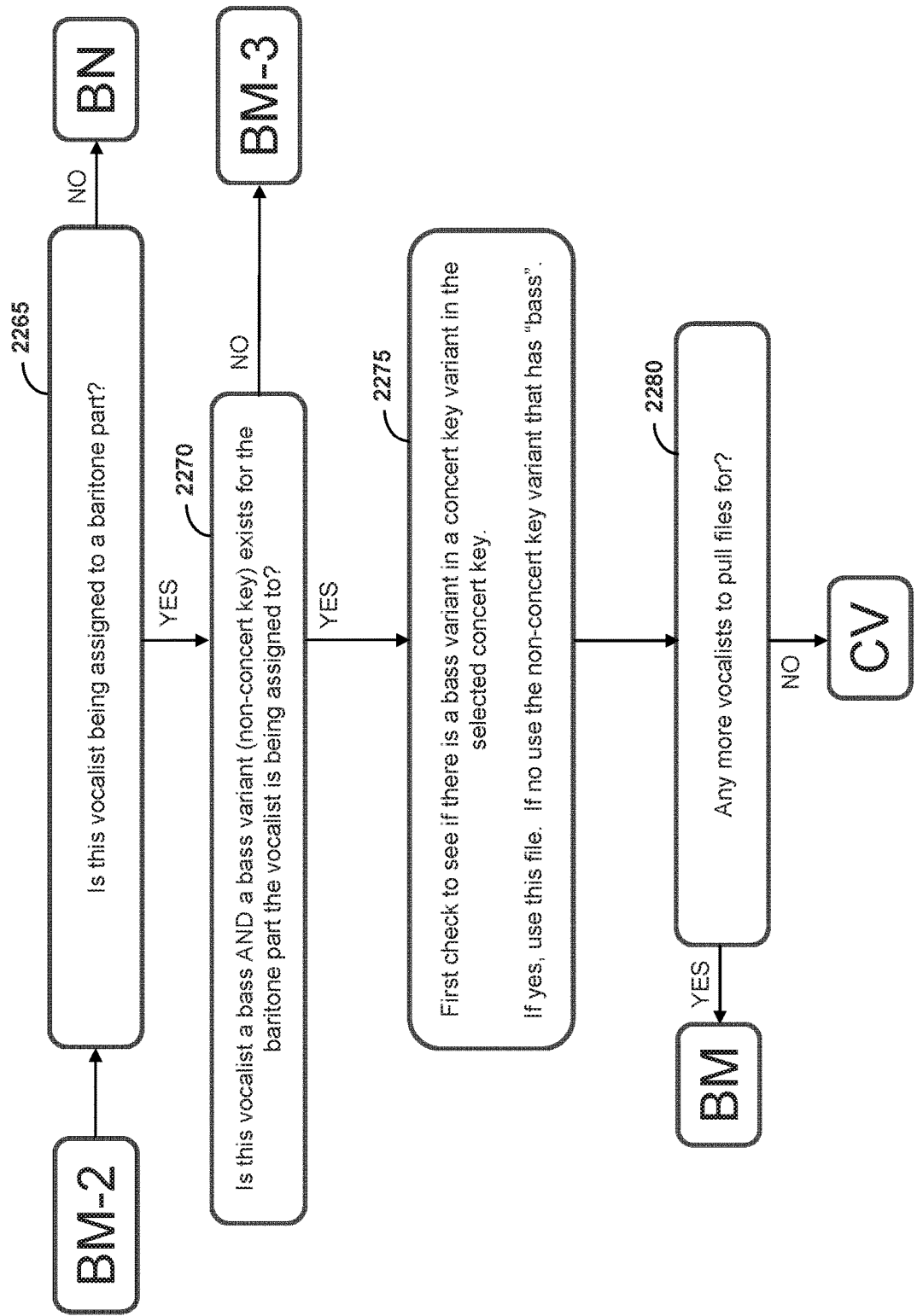
Figure 63:
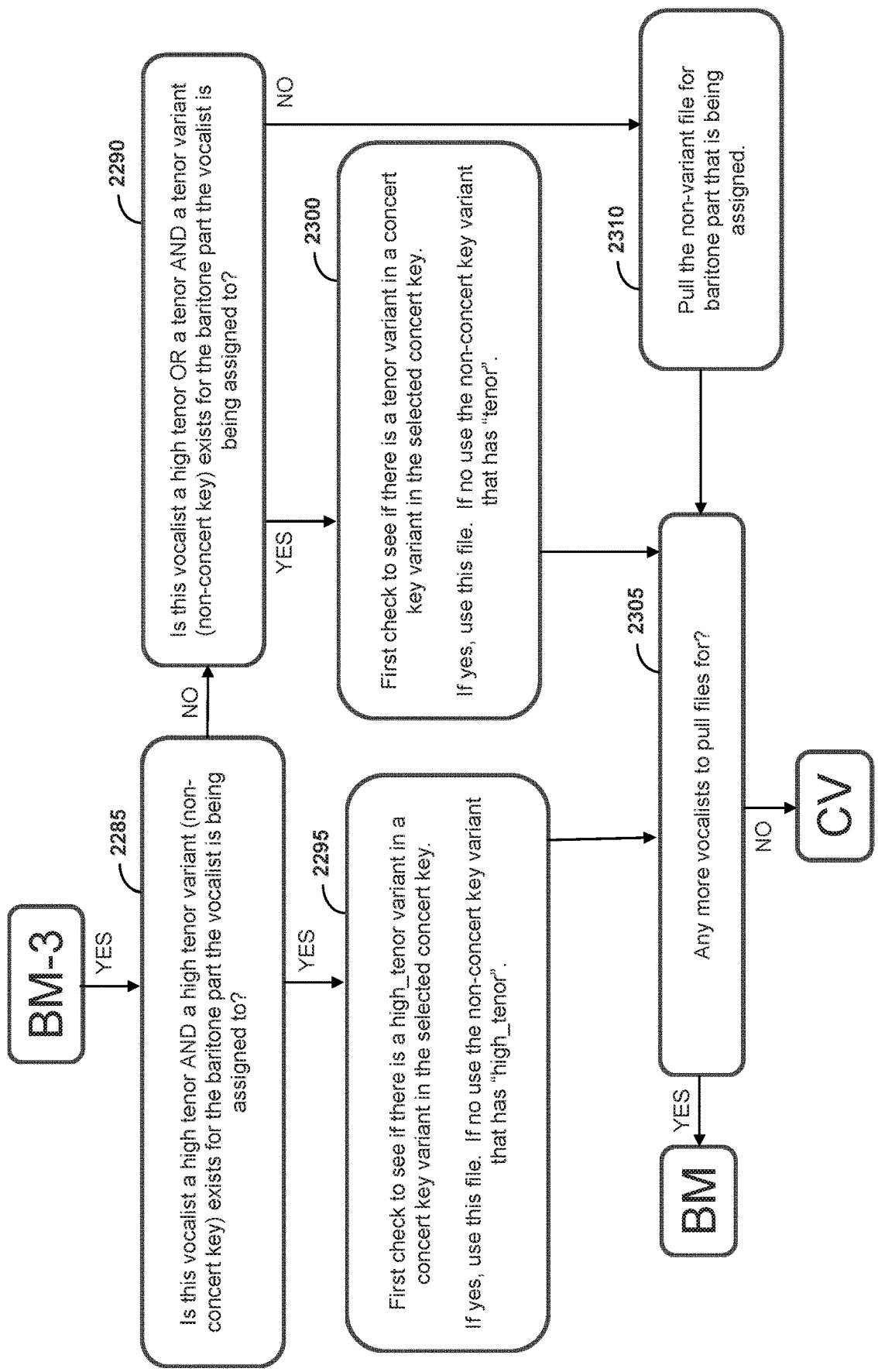
Figure 64:
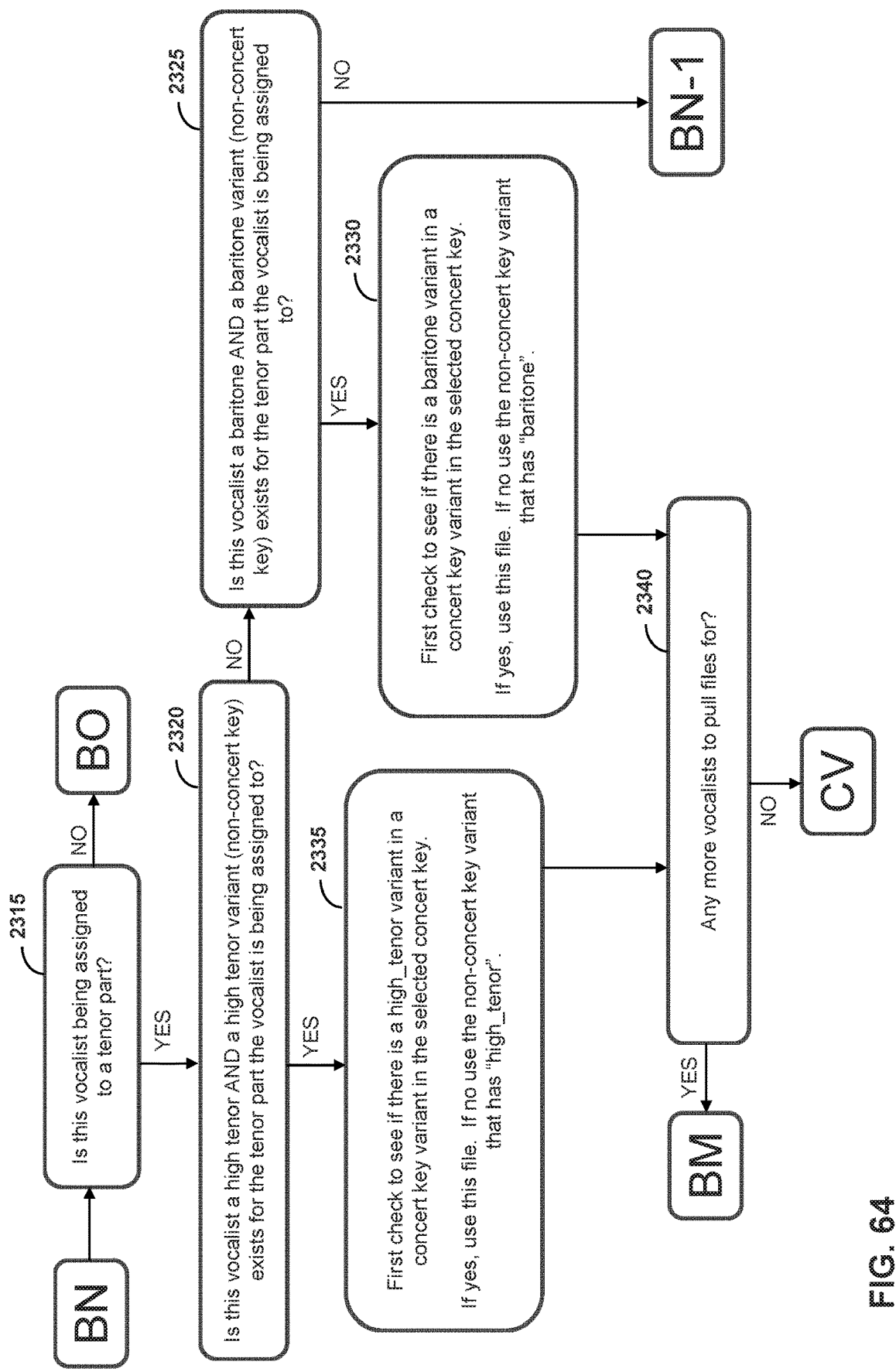
Figure 65:
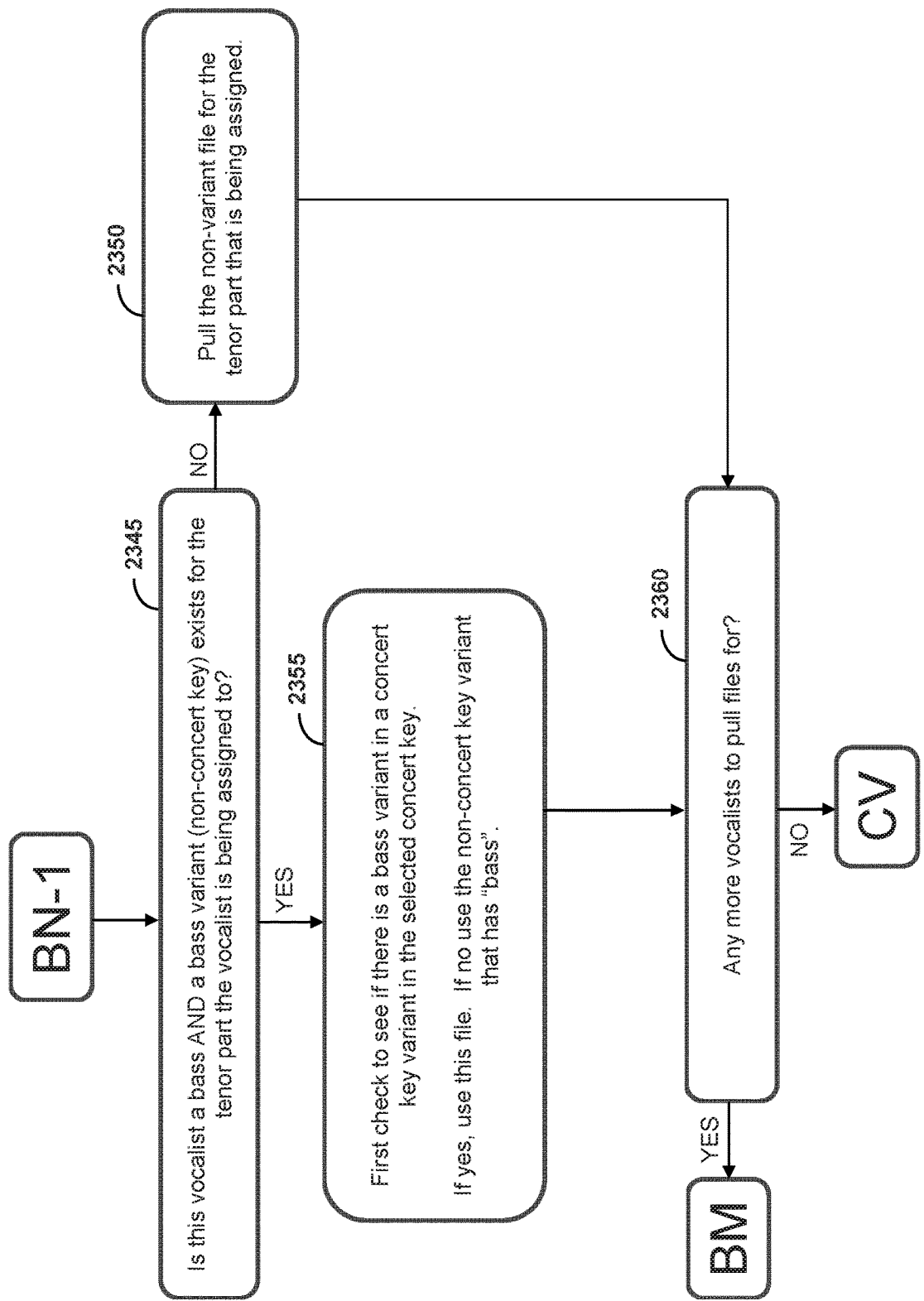
Figure 66:
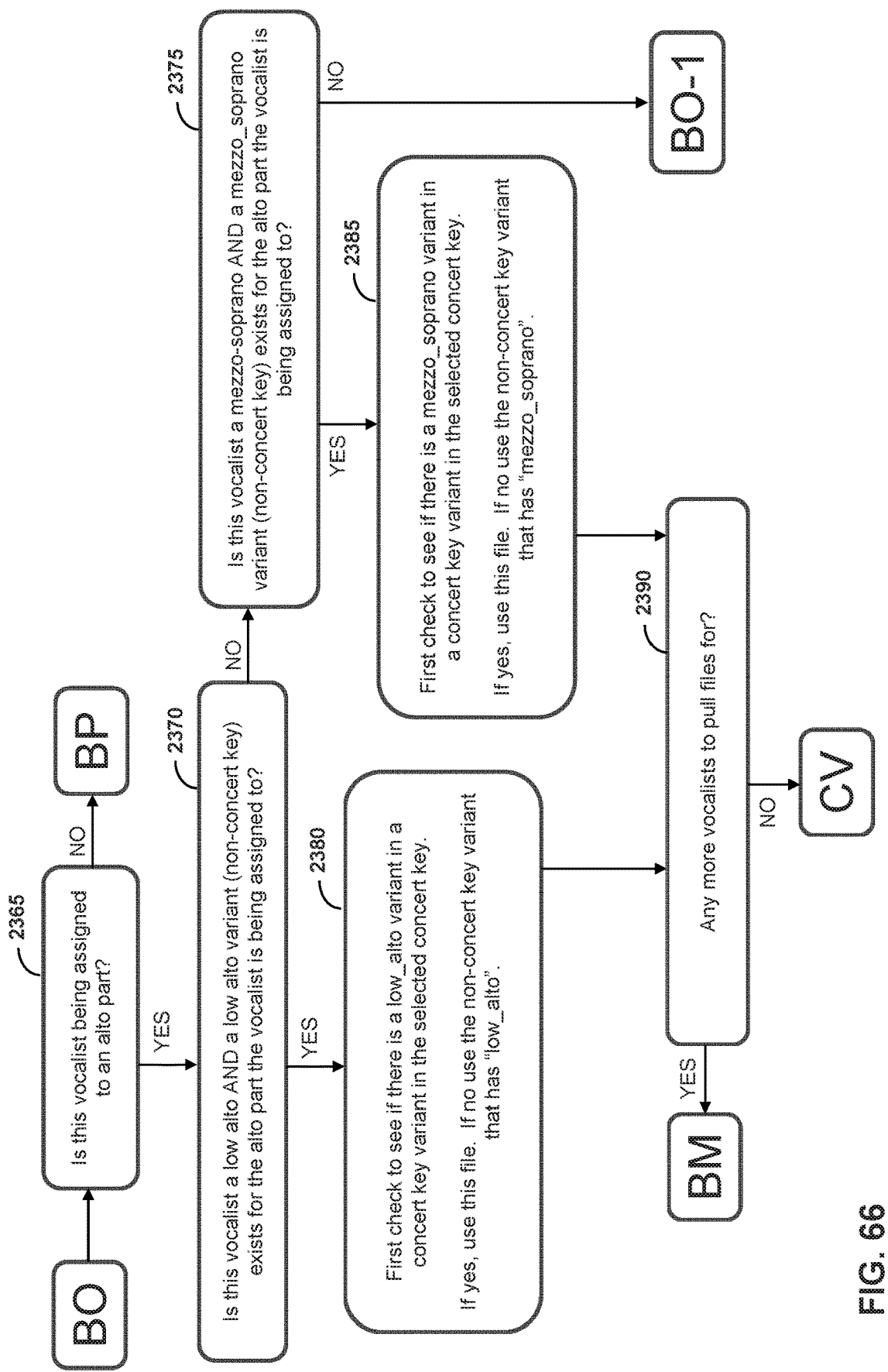
Figure 67:
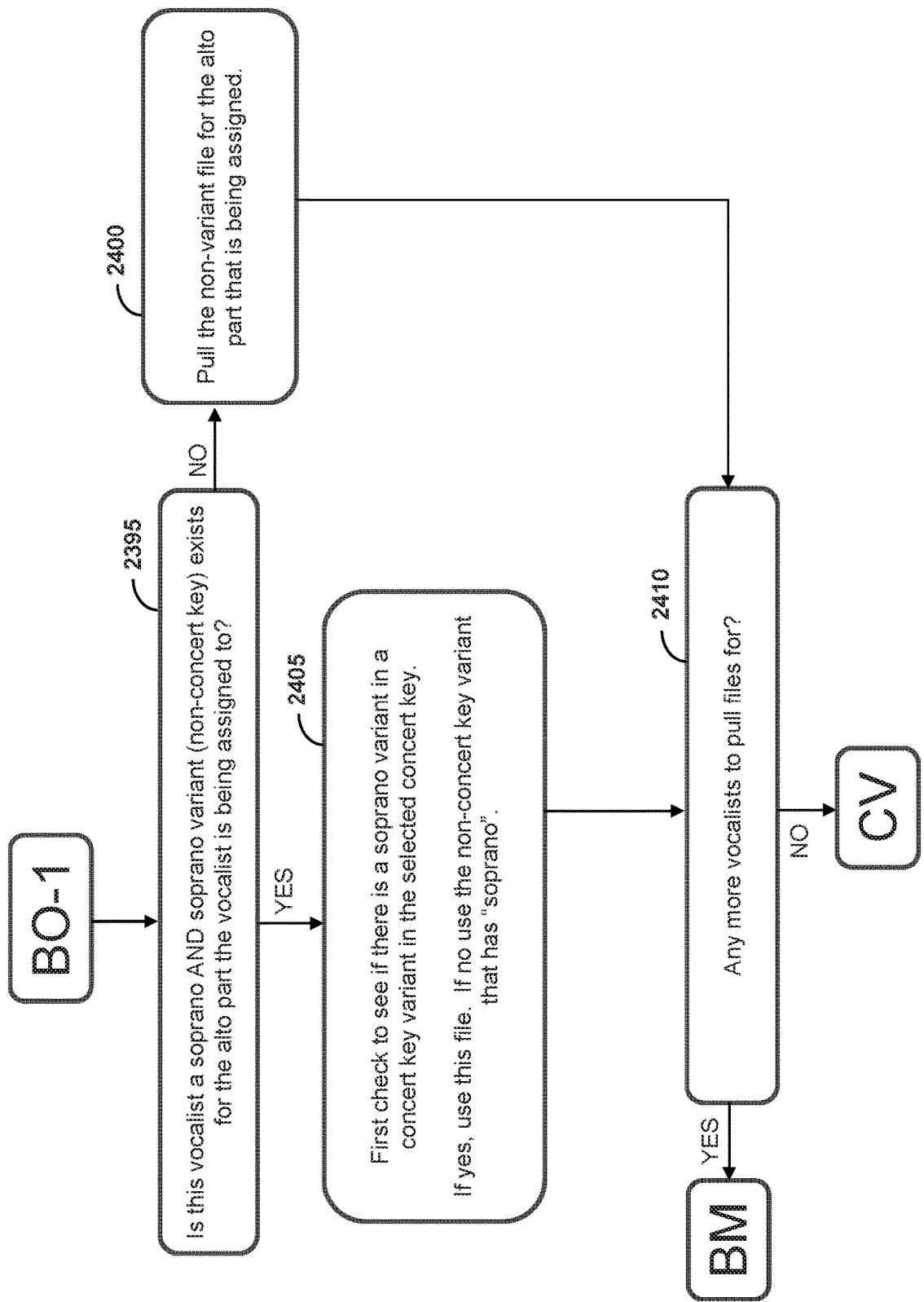
Figure 68:
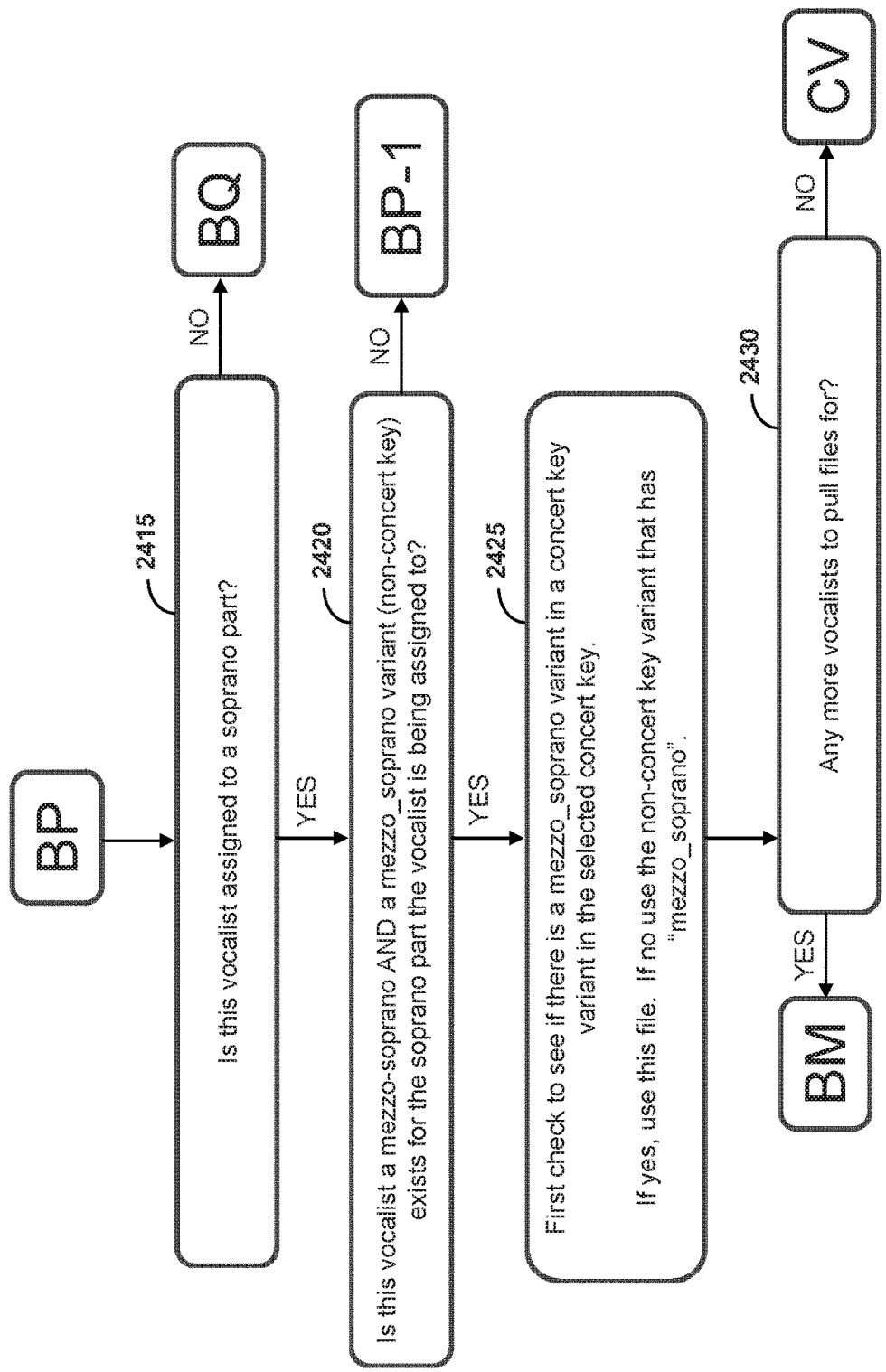
Figure 69:
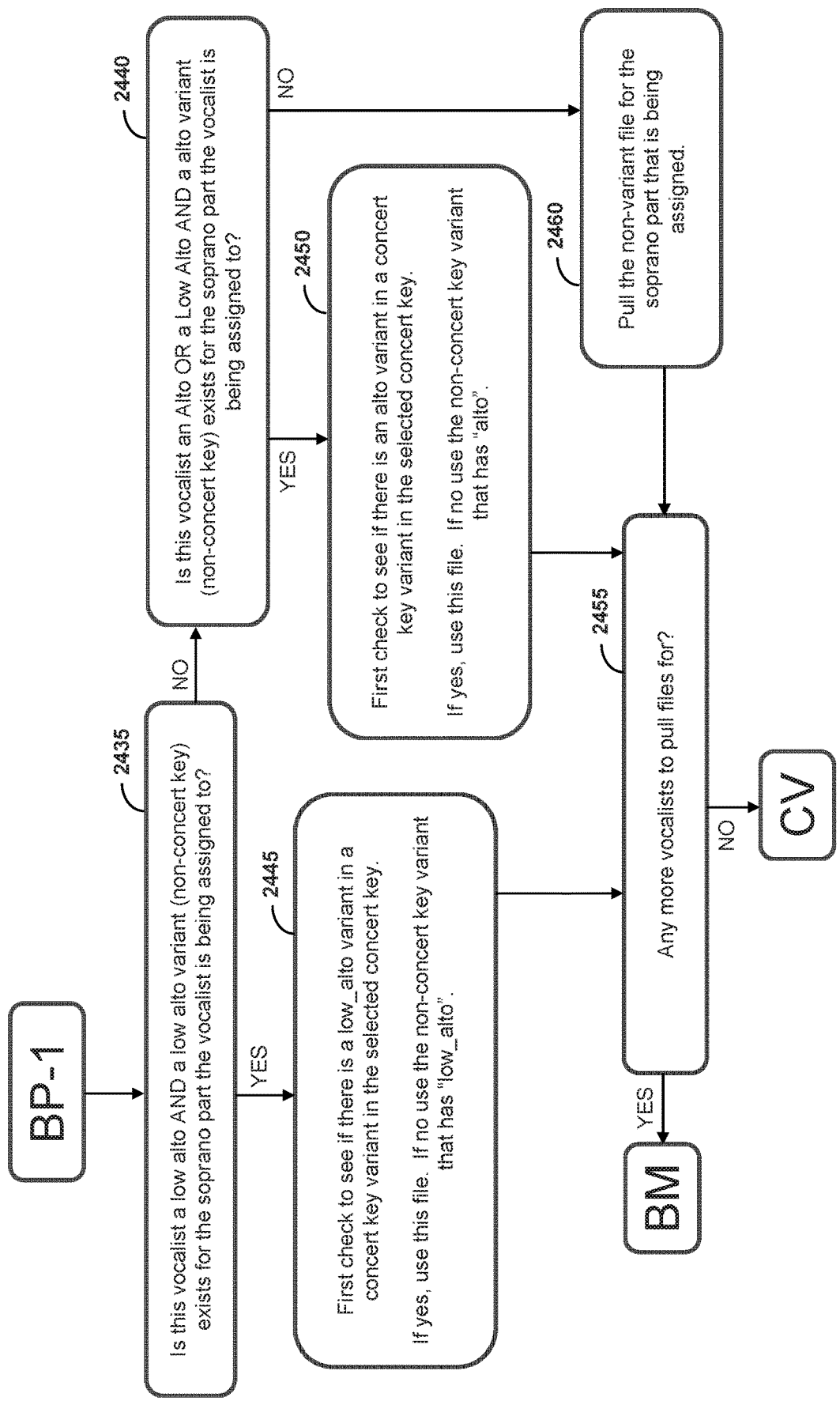
Figure 70:
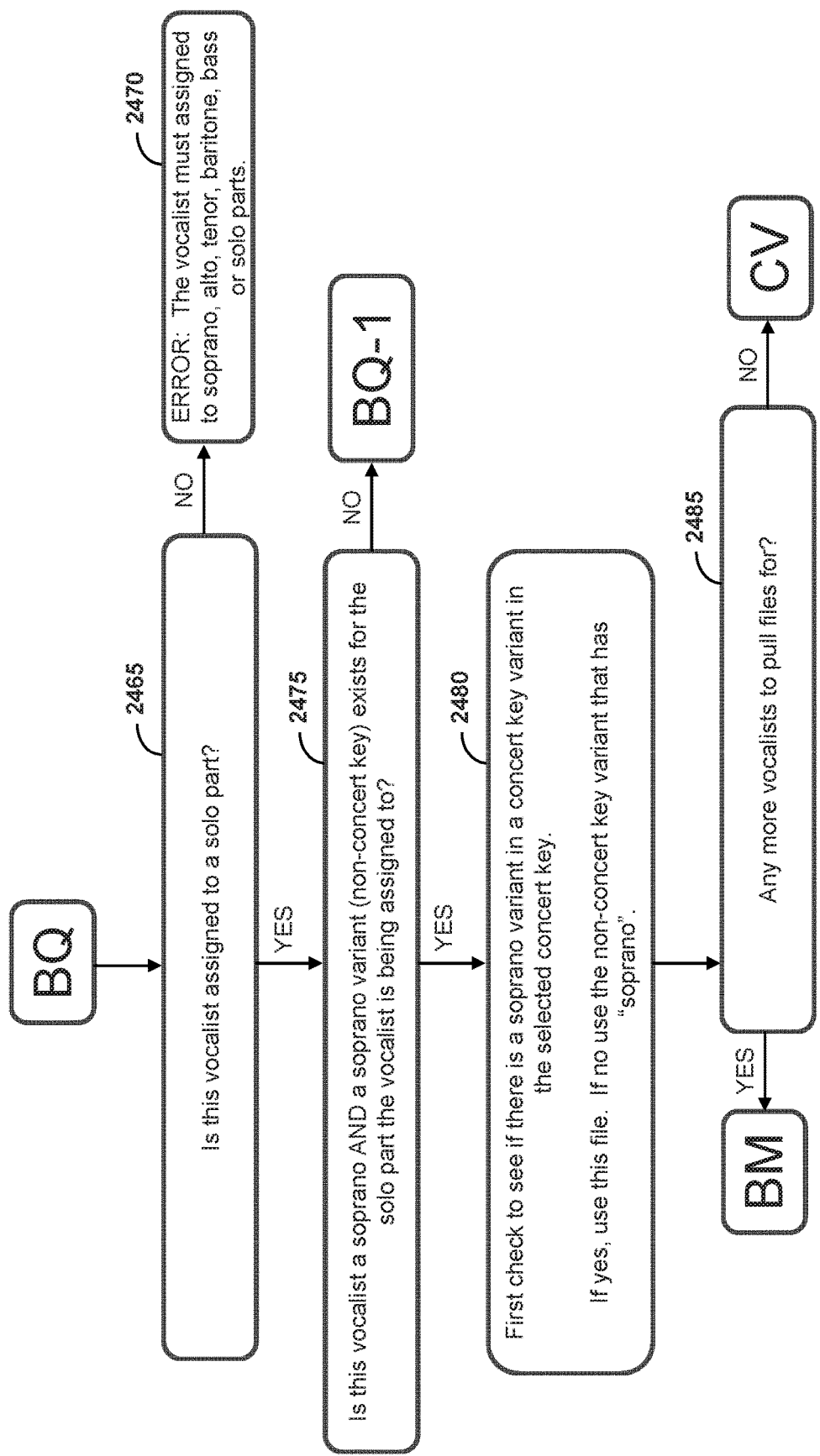
Figure 71:
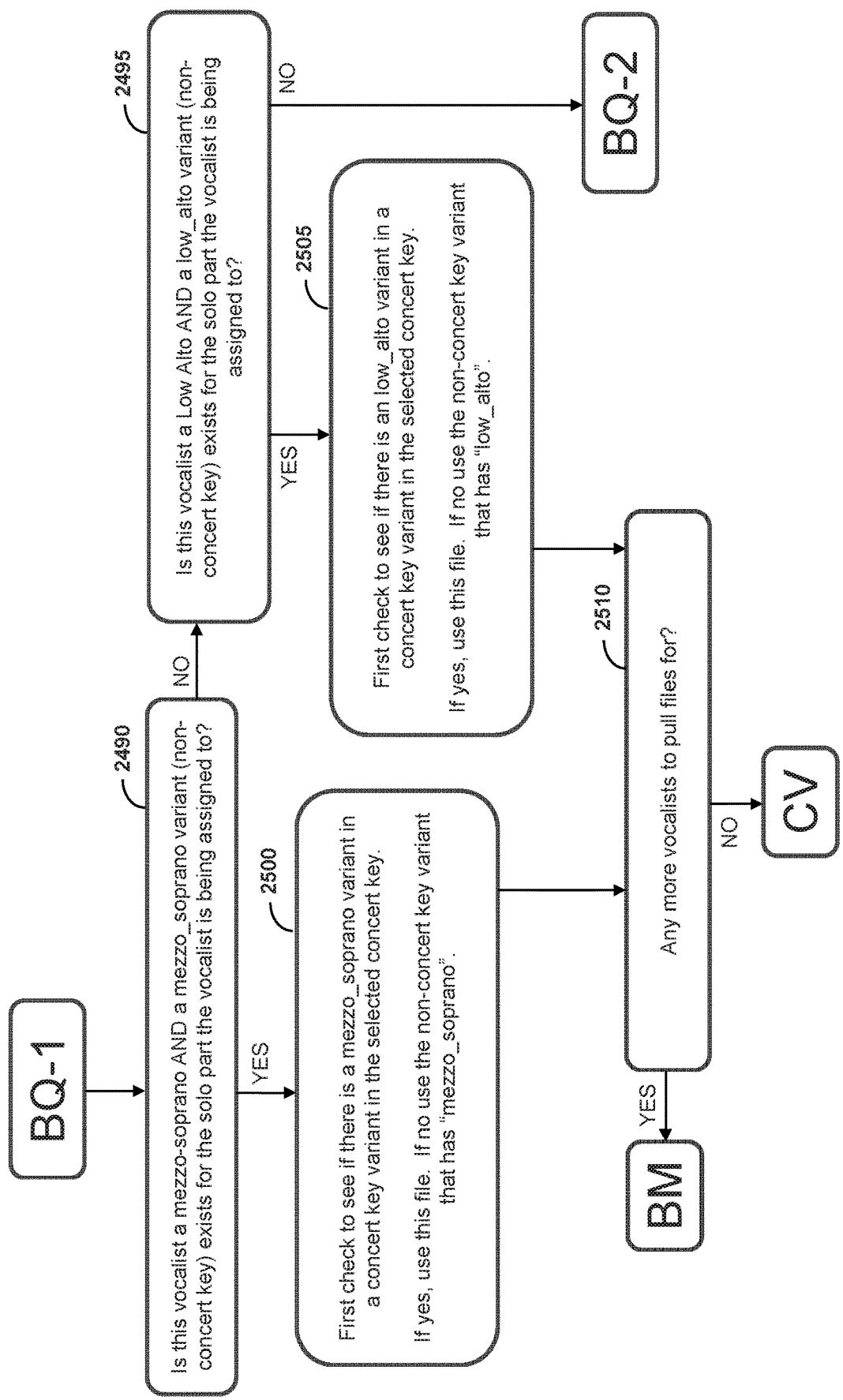
Figure 72:
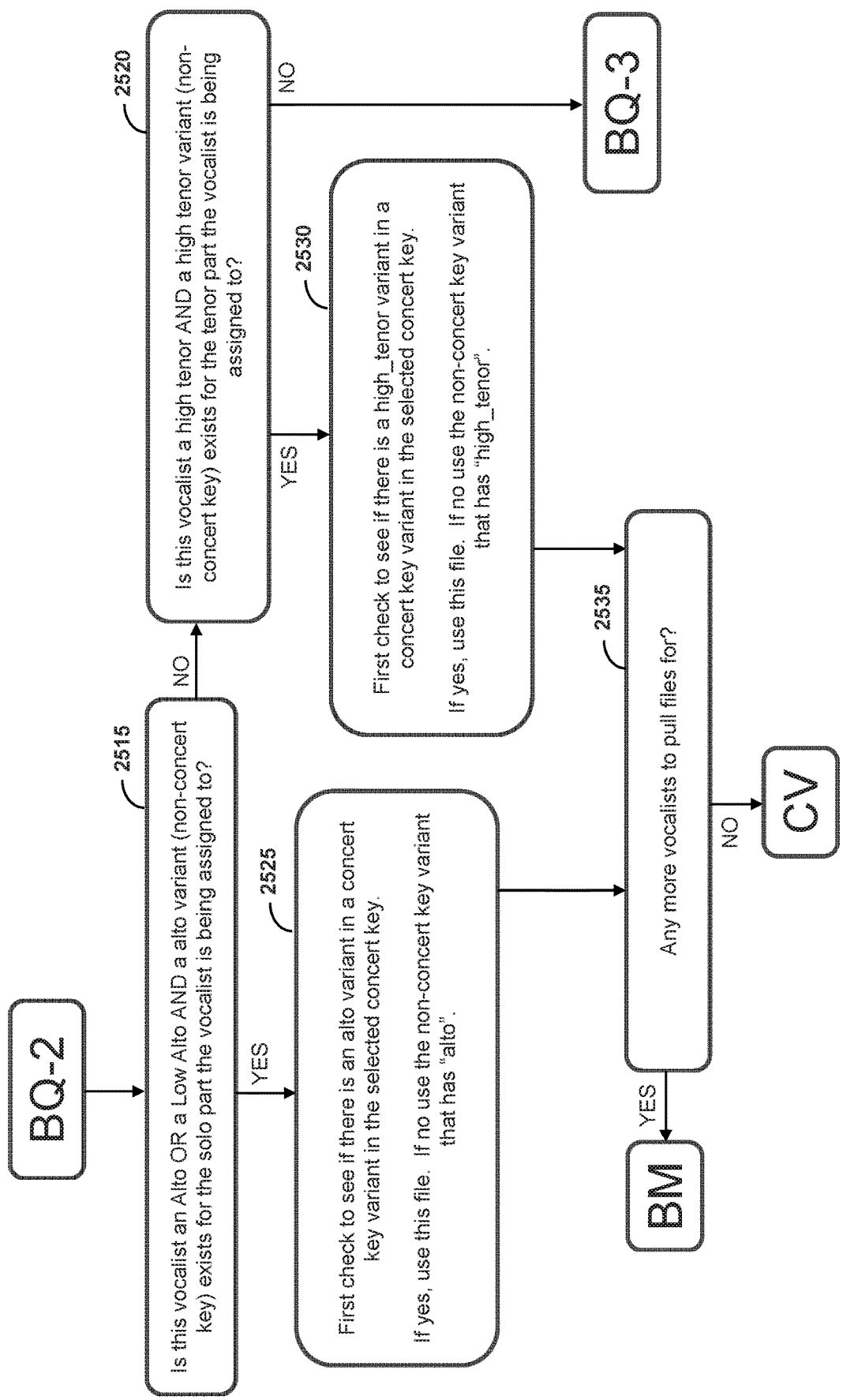
Figure 73:
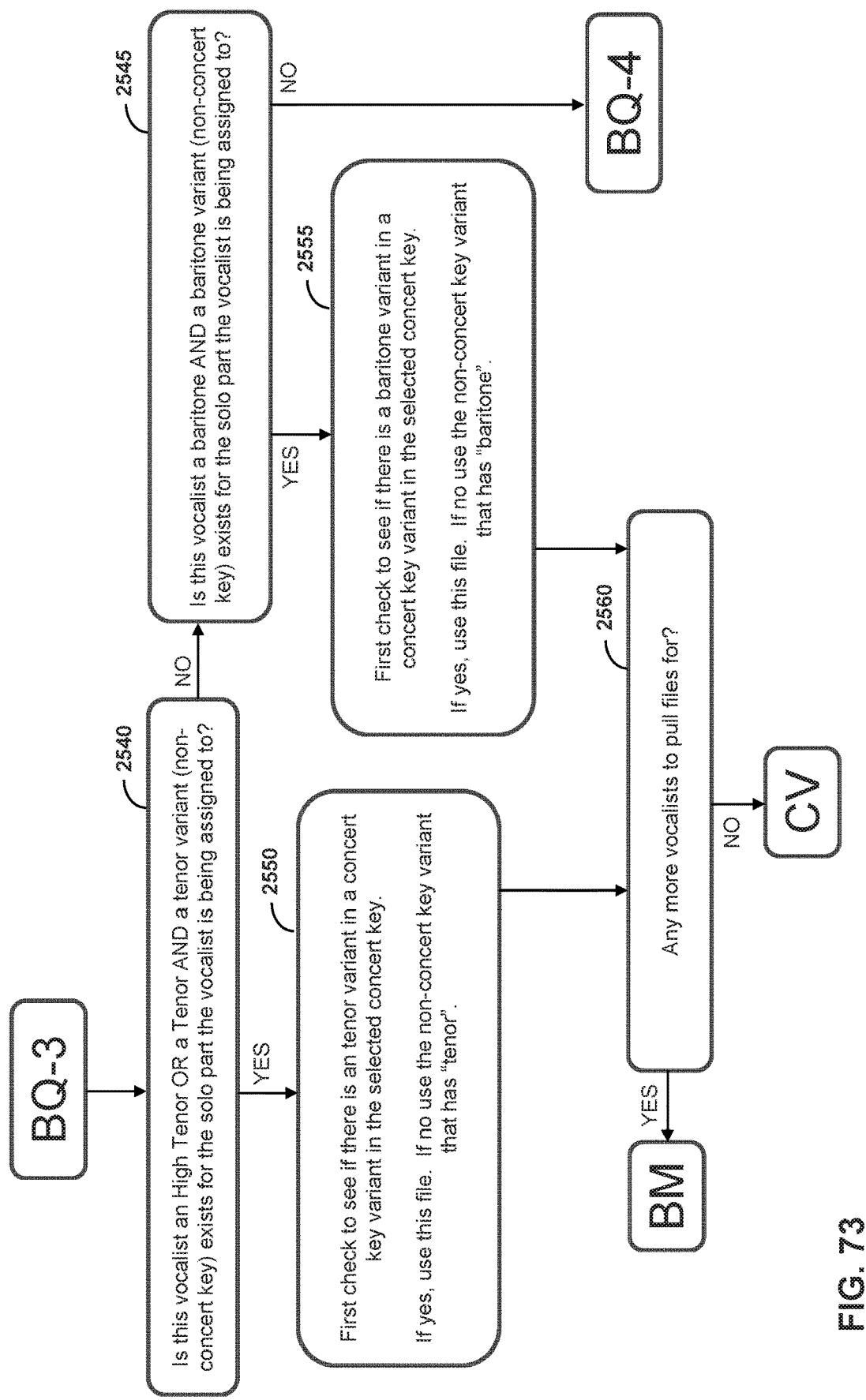
Figure 74:
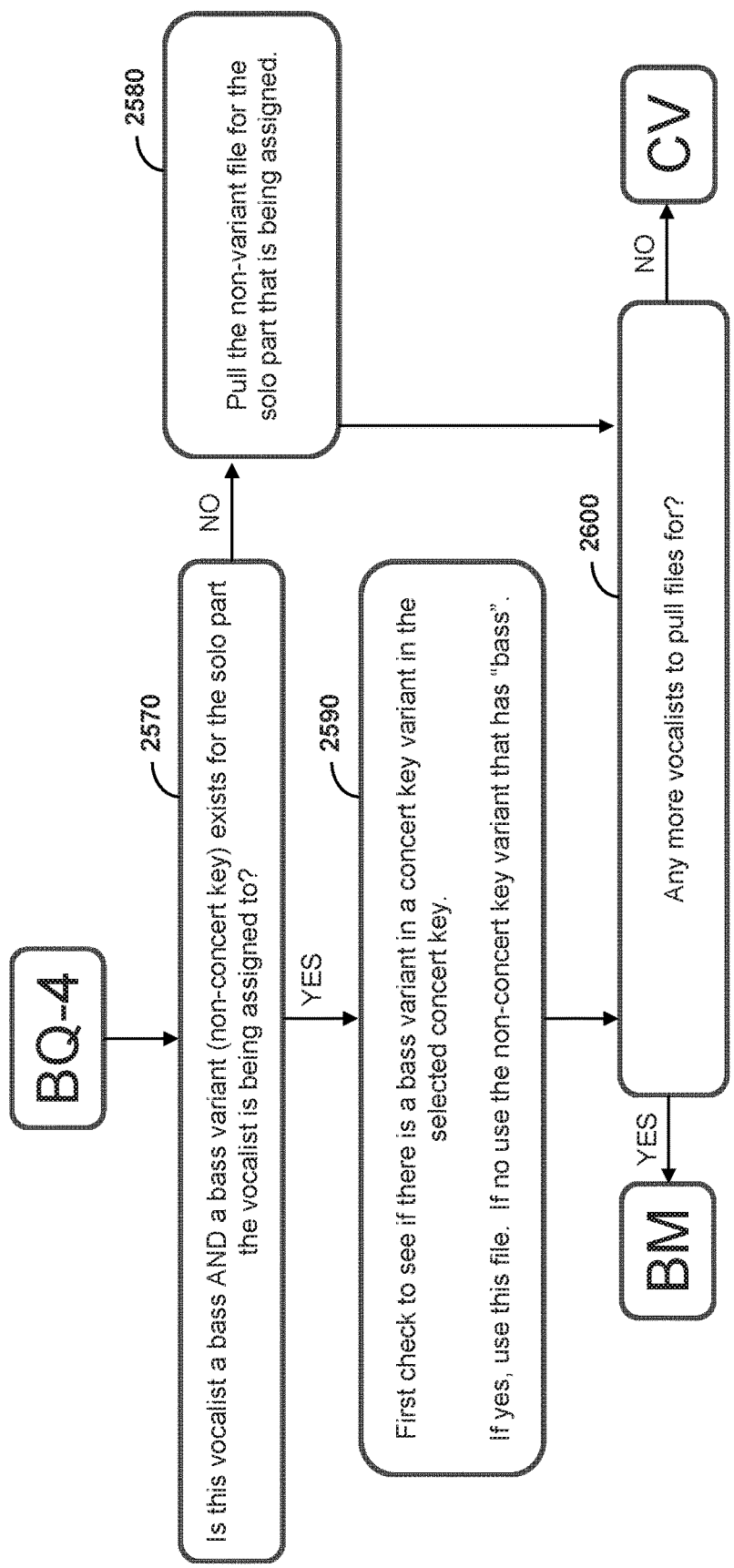
Figure 75:
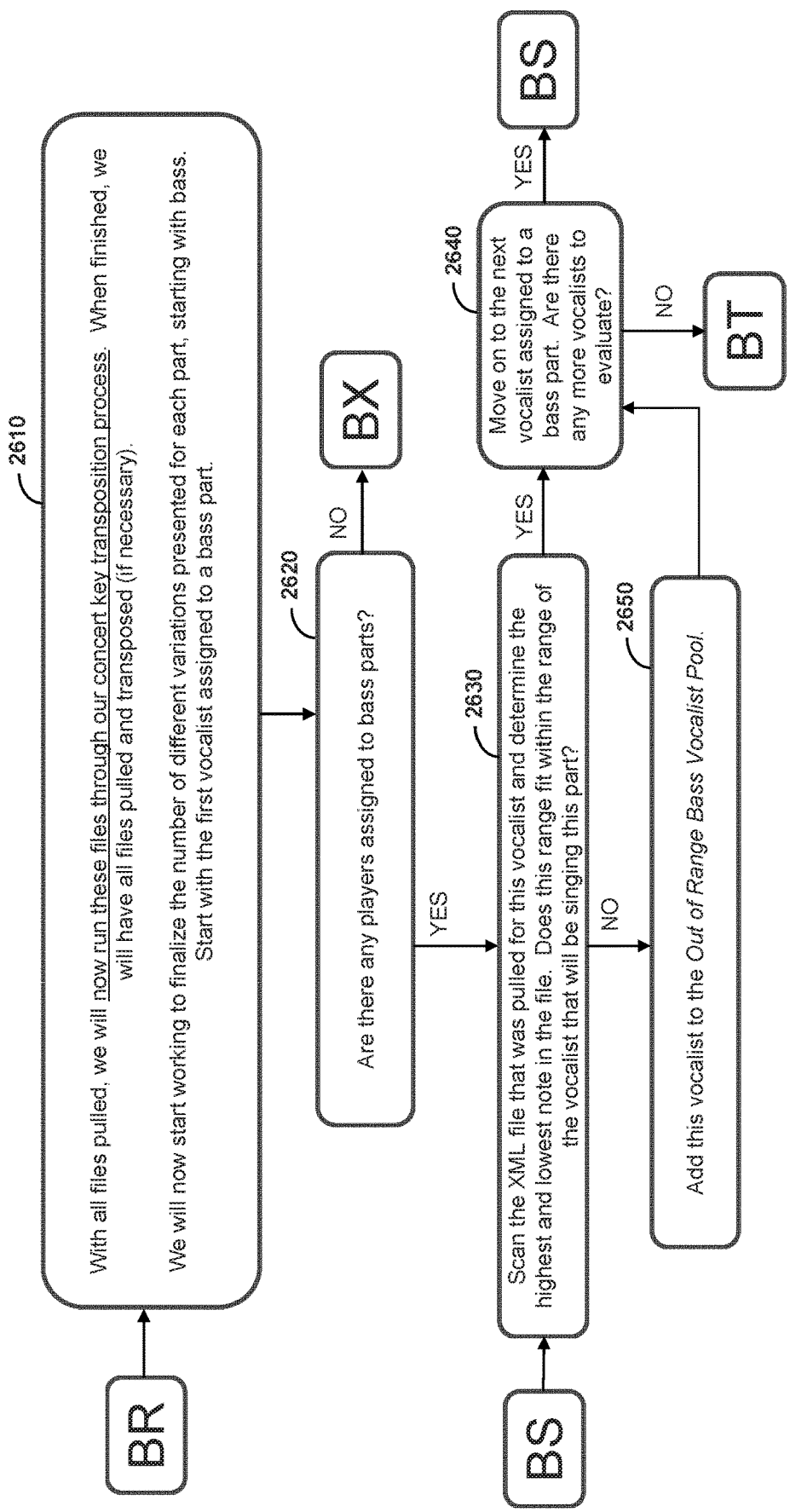
FIGS. 75-98 illustrate aspects of the present disclosure directed to generating variations of vocal parts.
Figure 76:
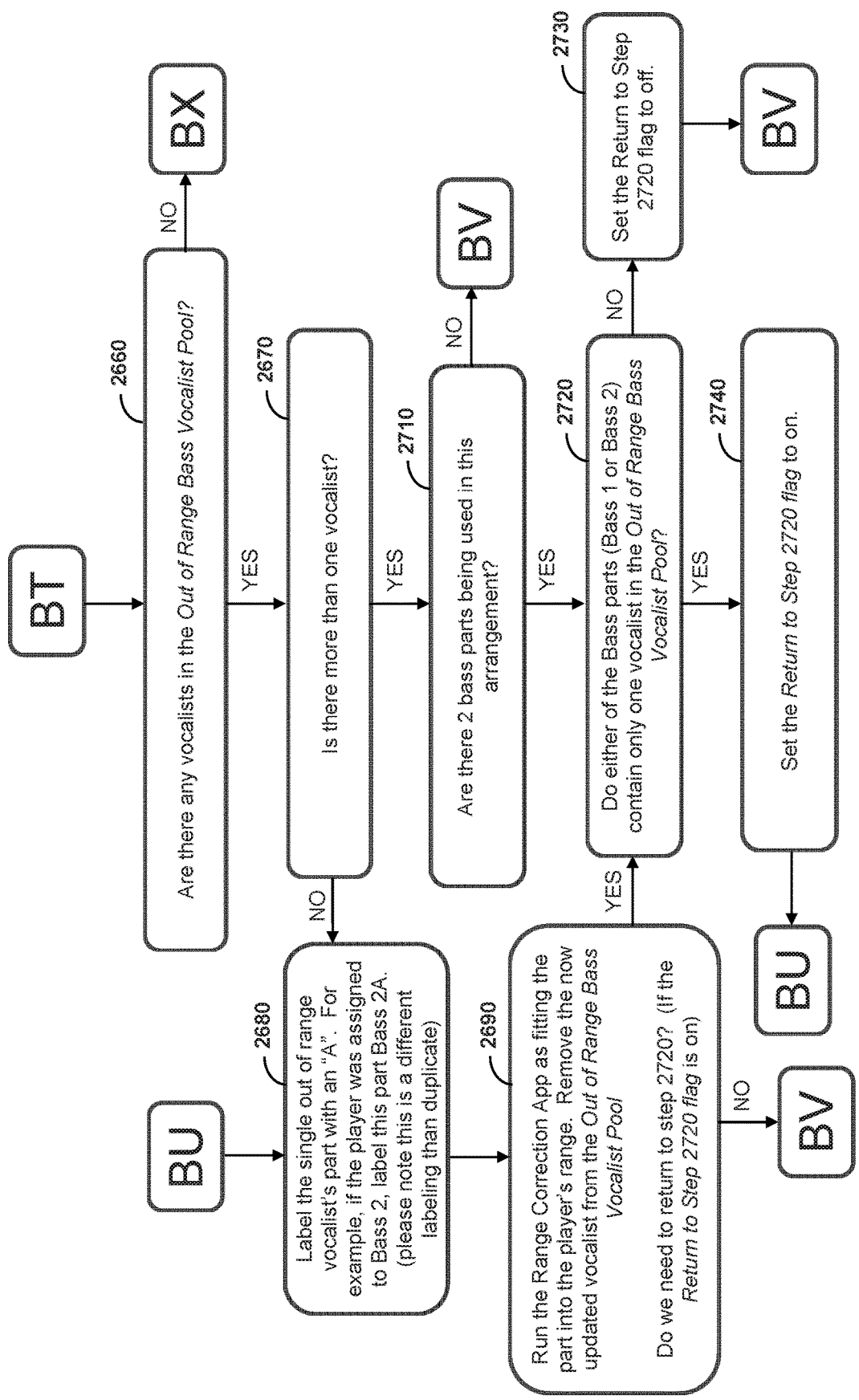
Figure 77:
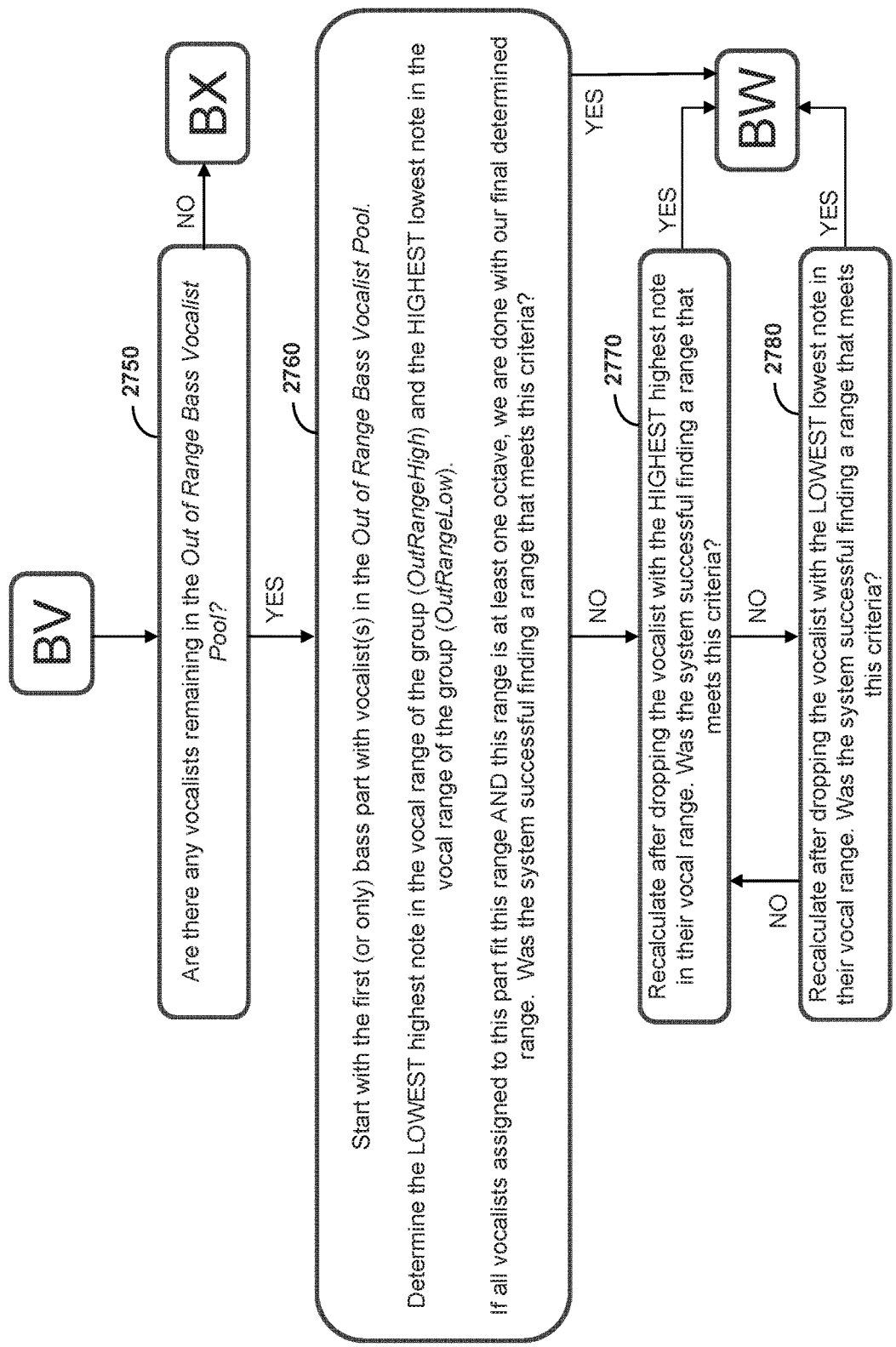
Figure 78:
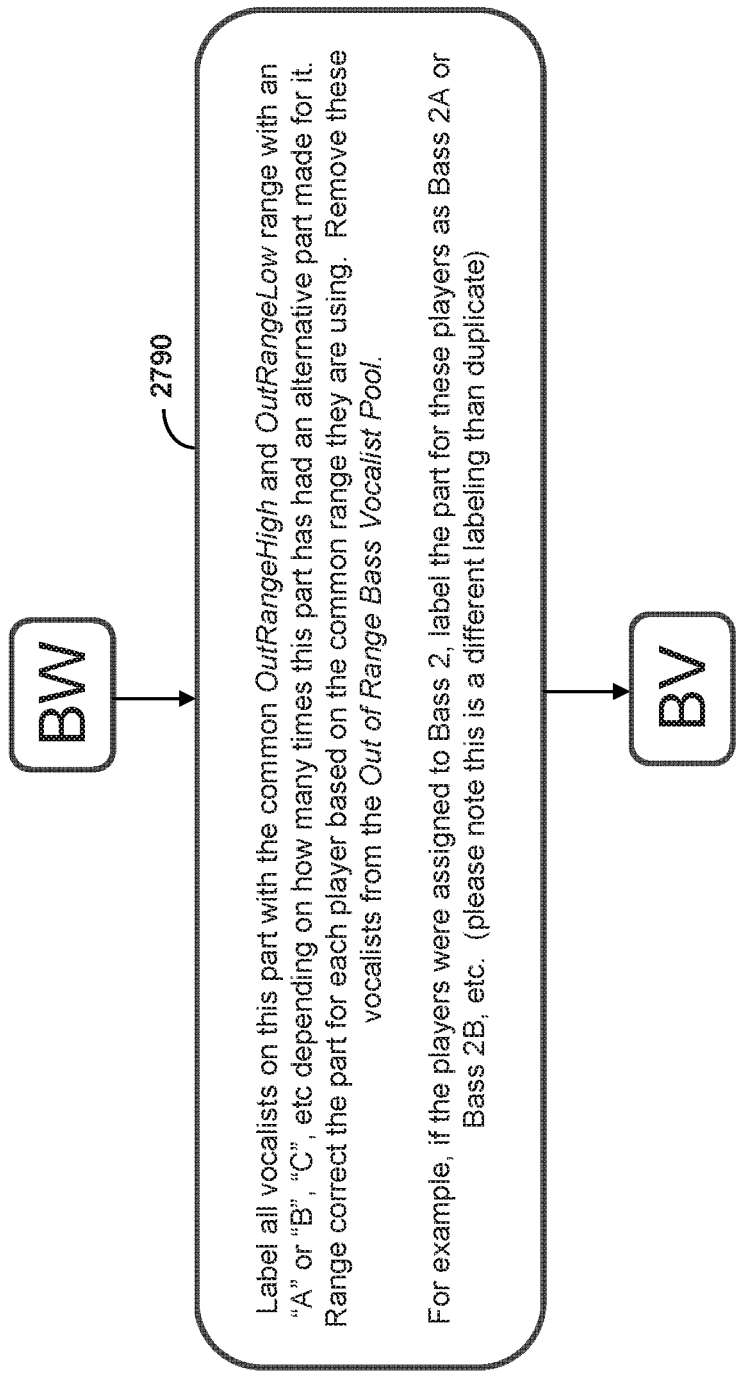
Figure 79:
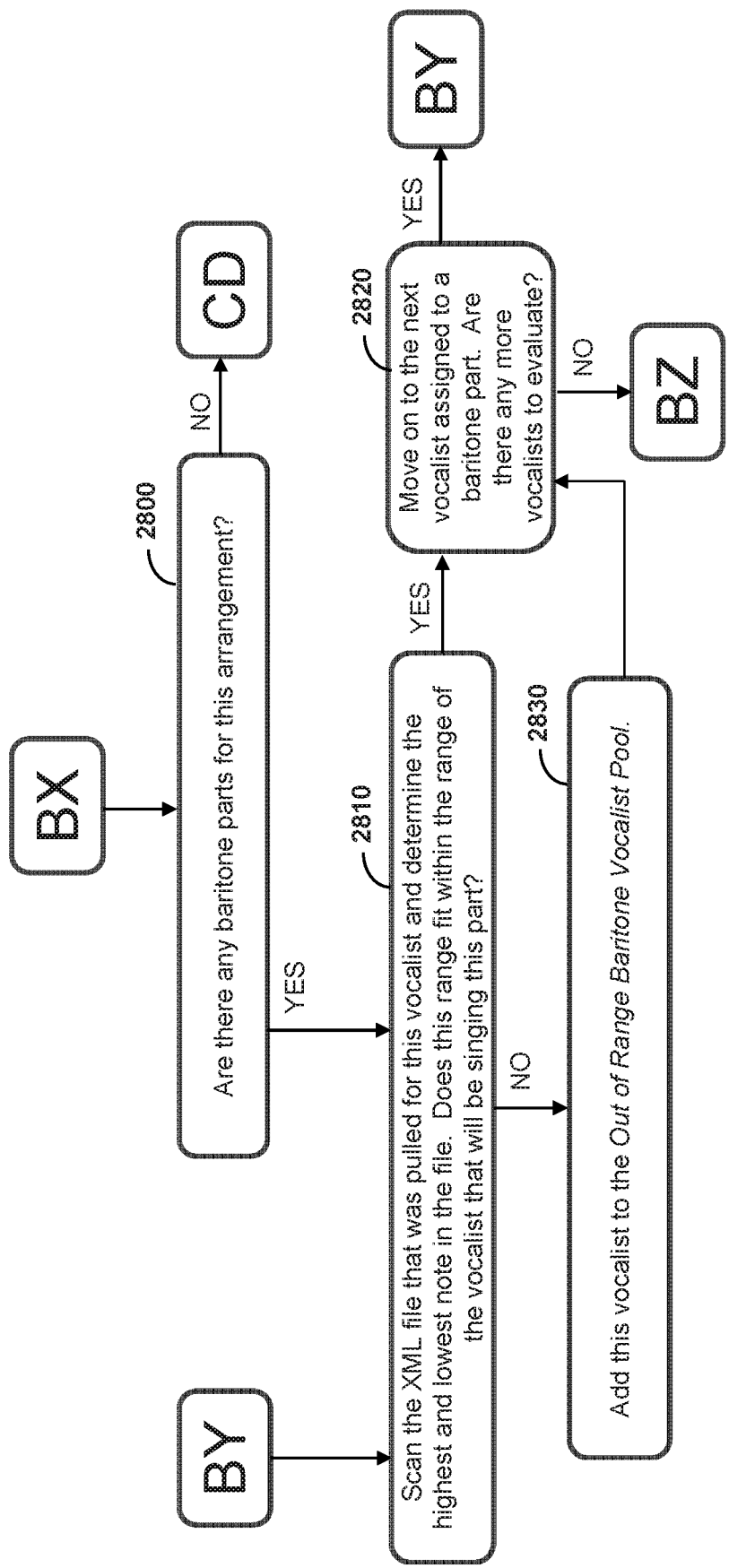
Figure 80:
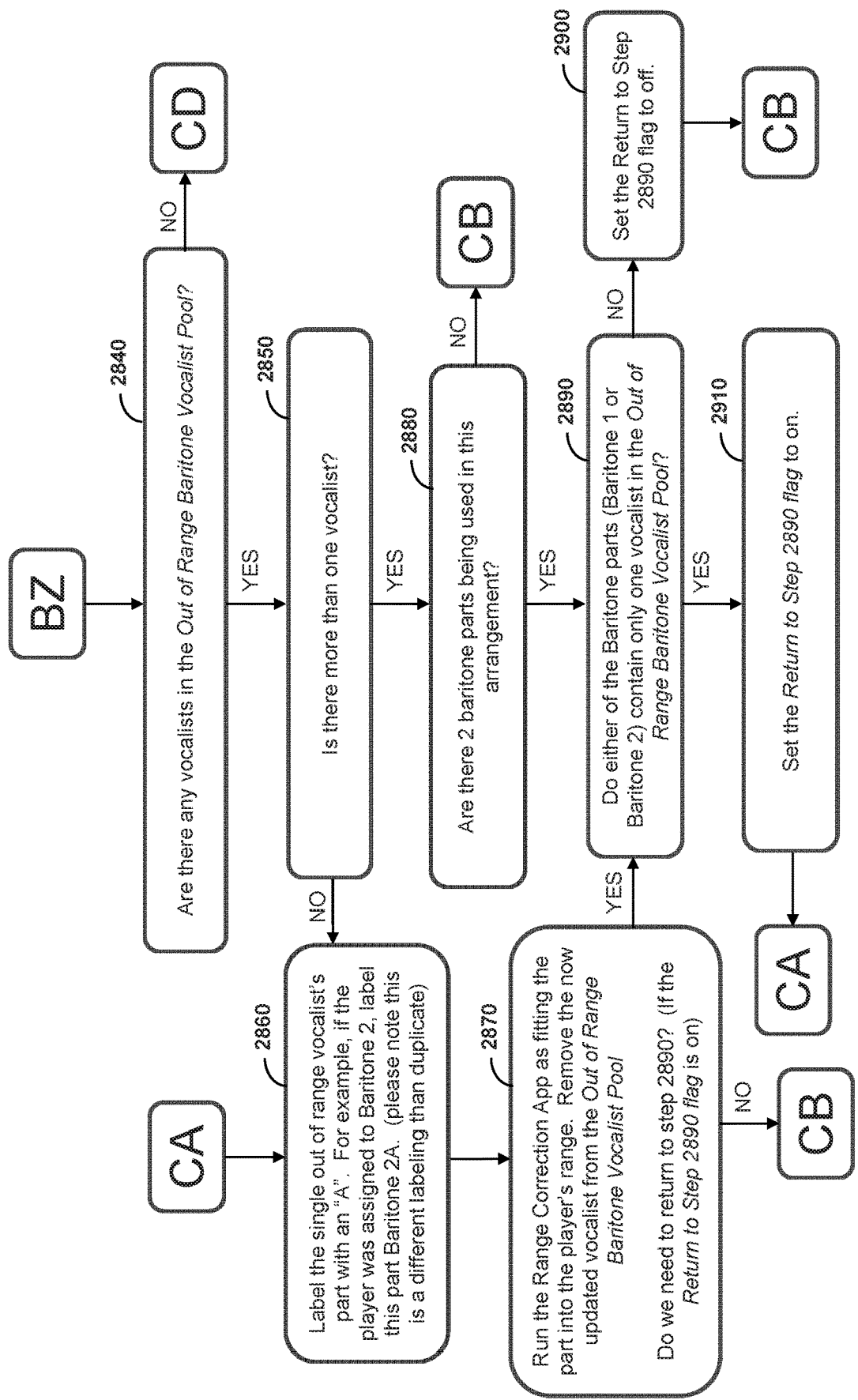
Figure 81:
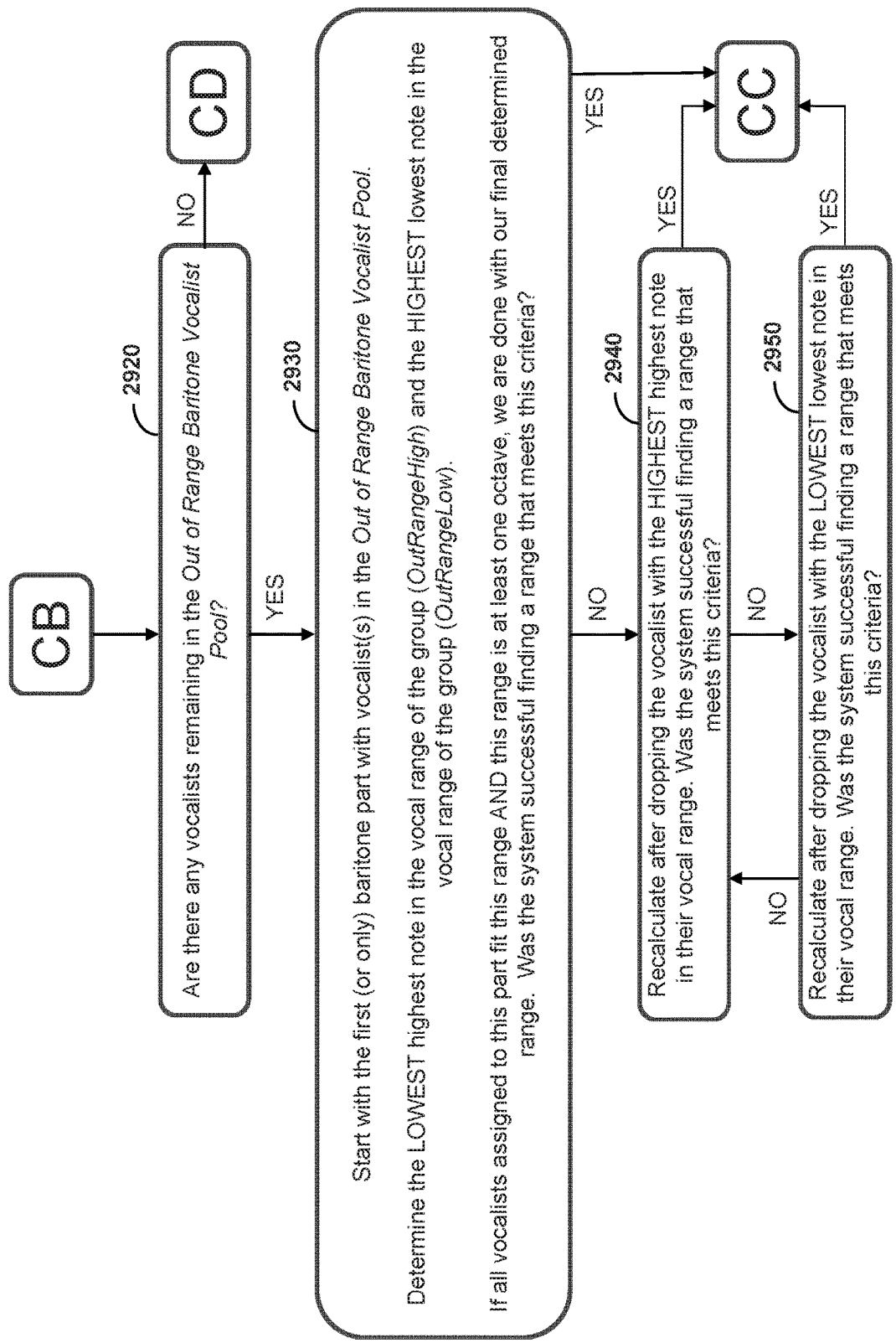
Figure 82:
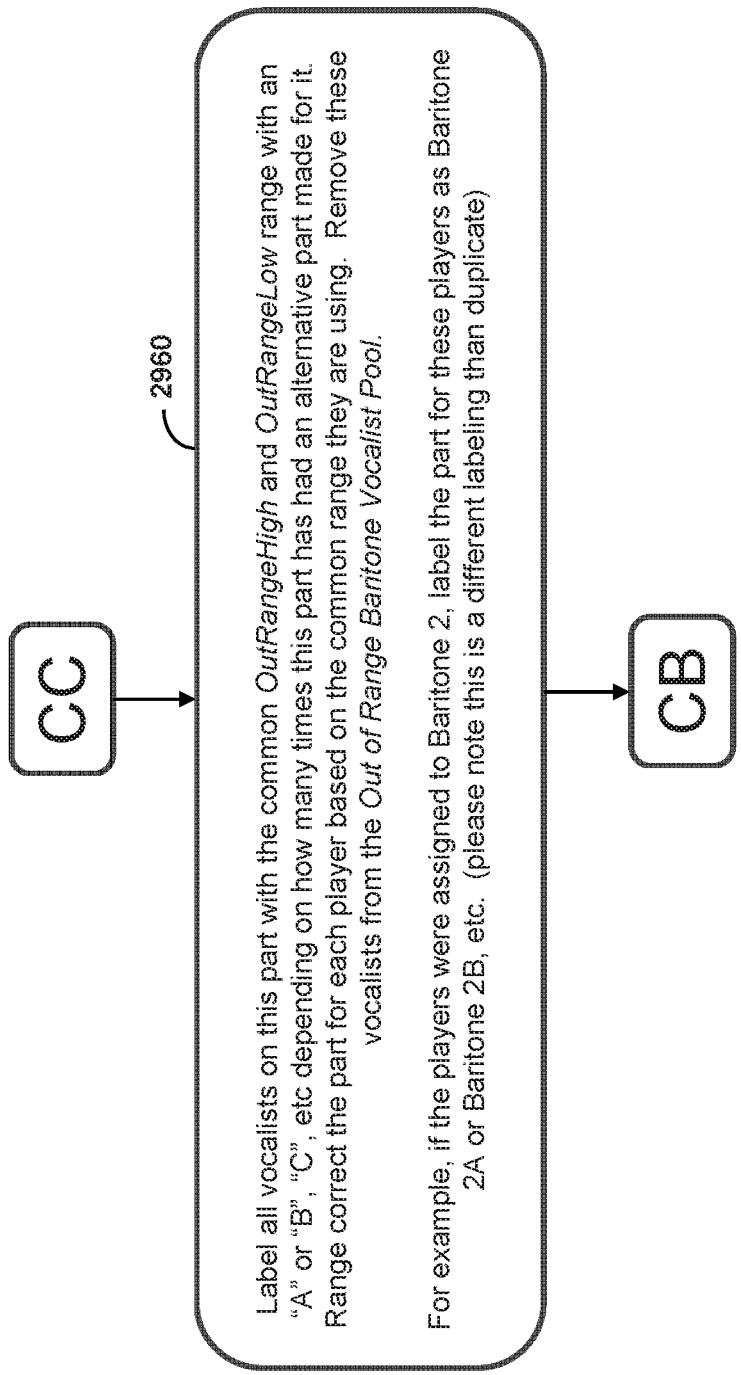
Figure 83:
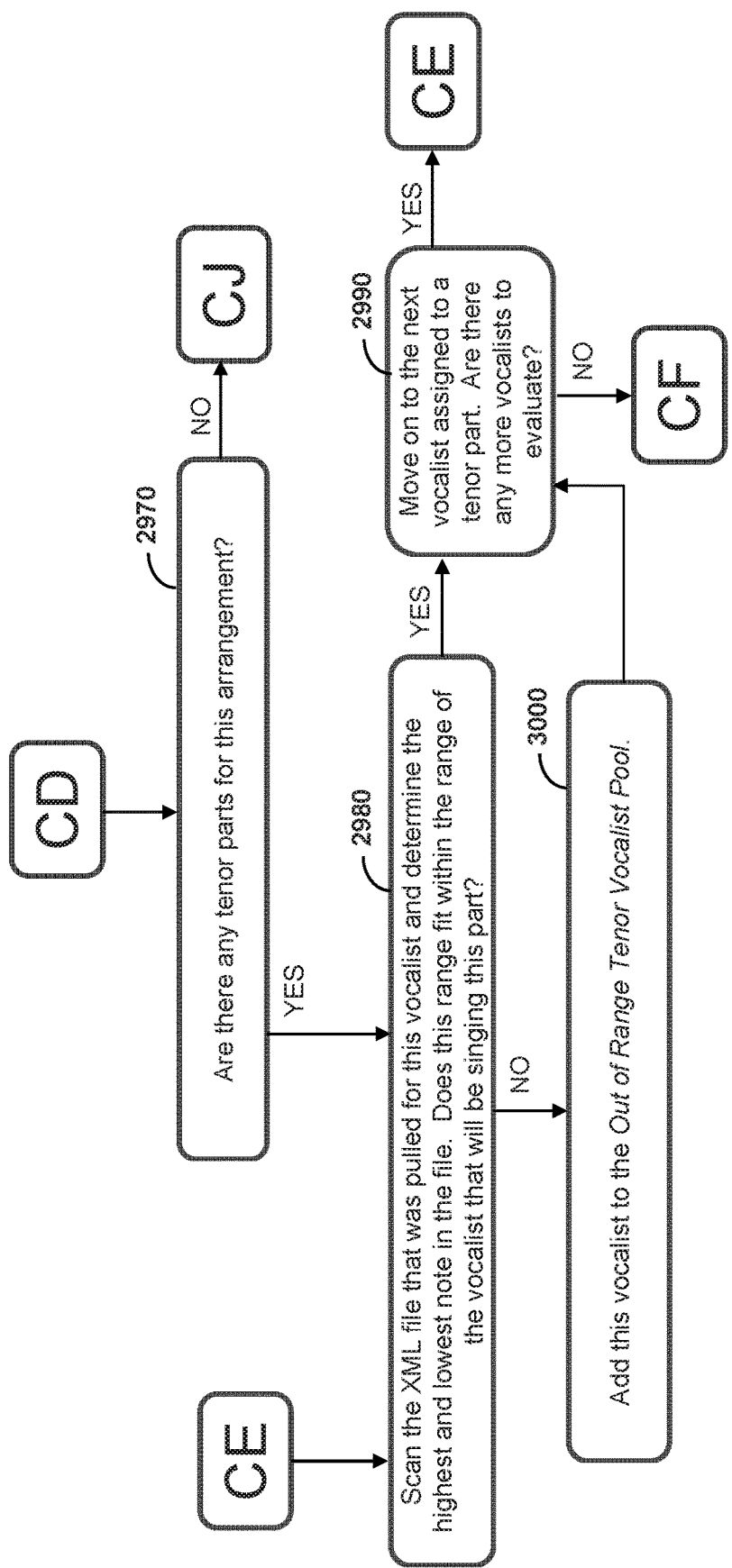
Figure 84:
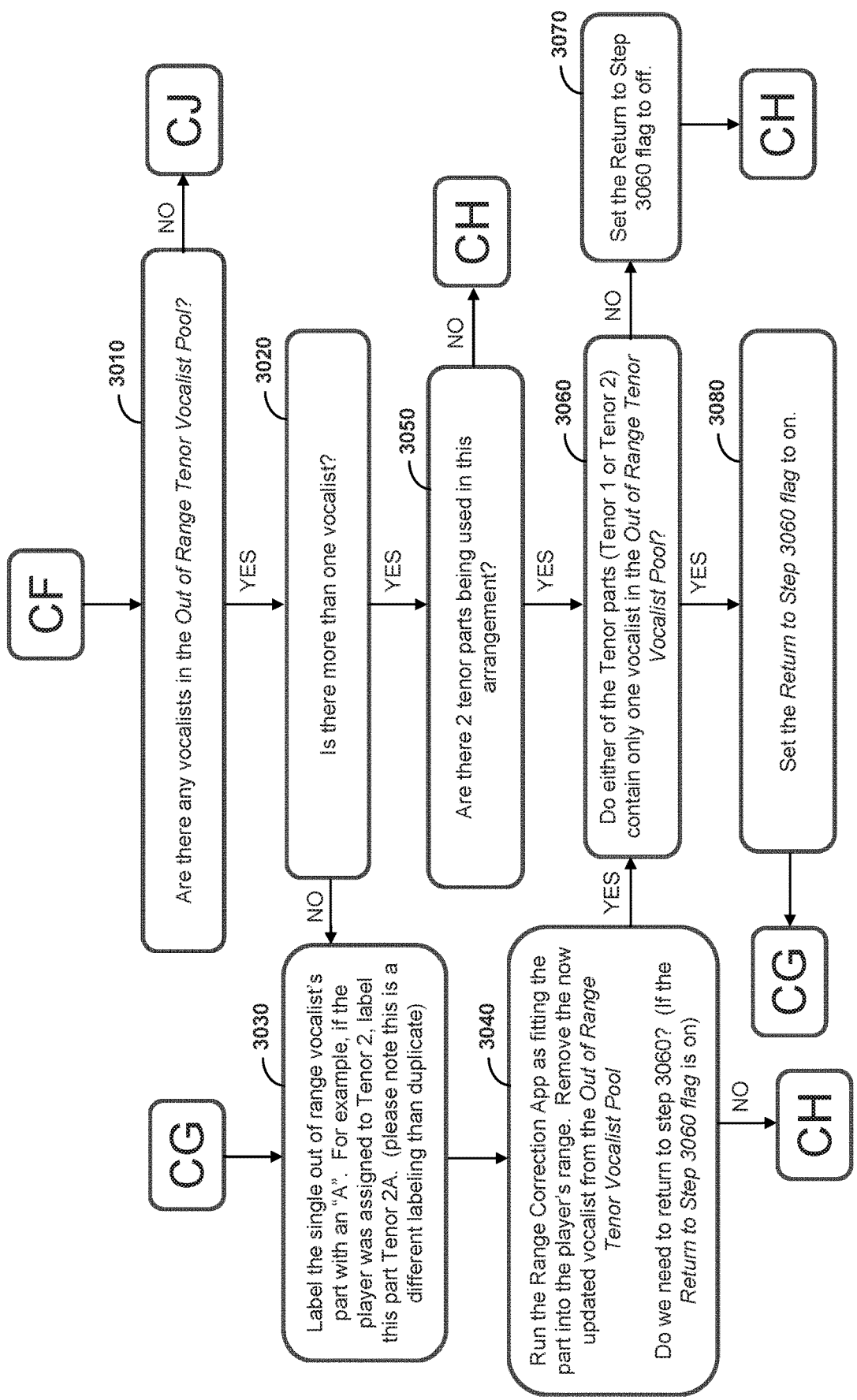
Figure 85:
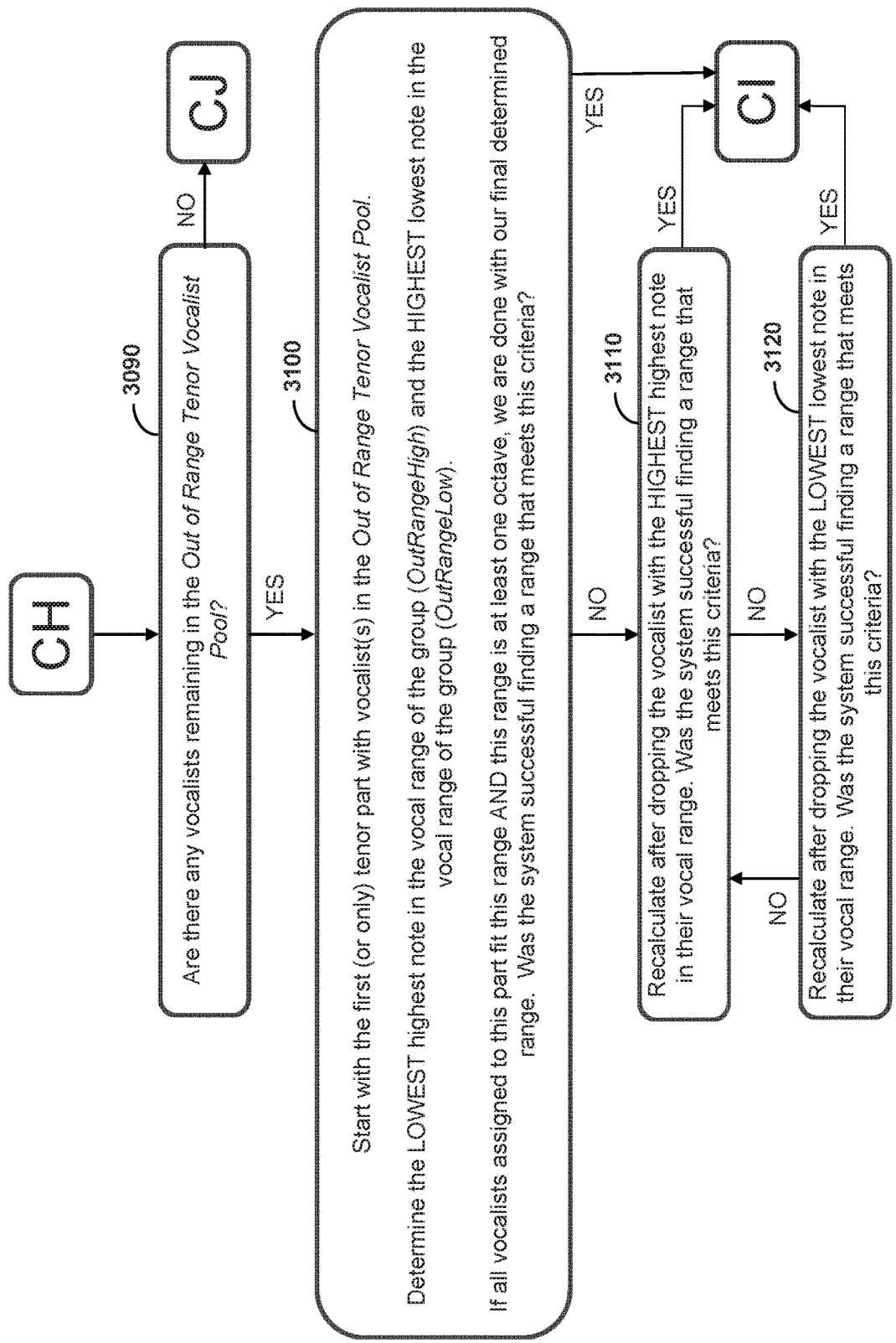
Figure 86:
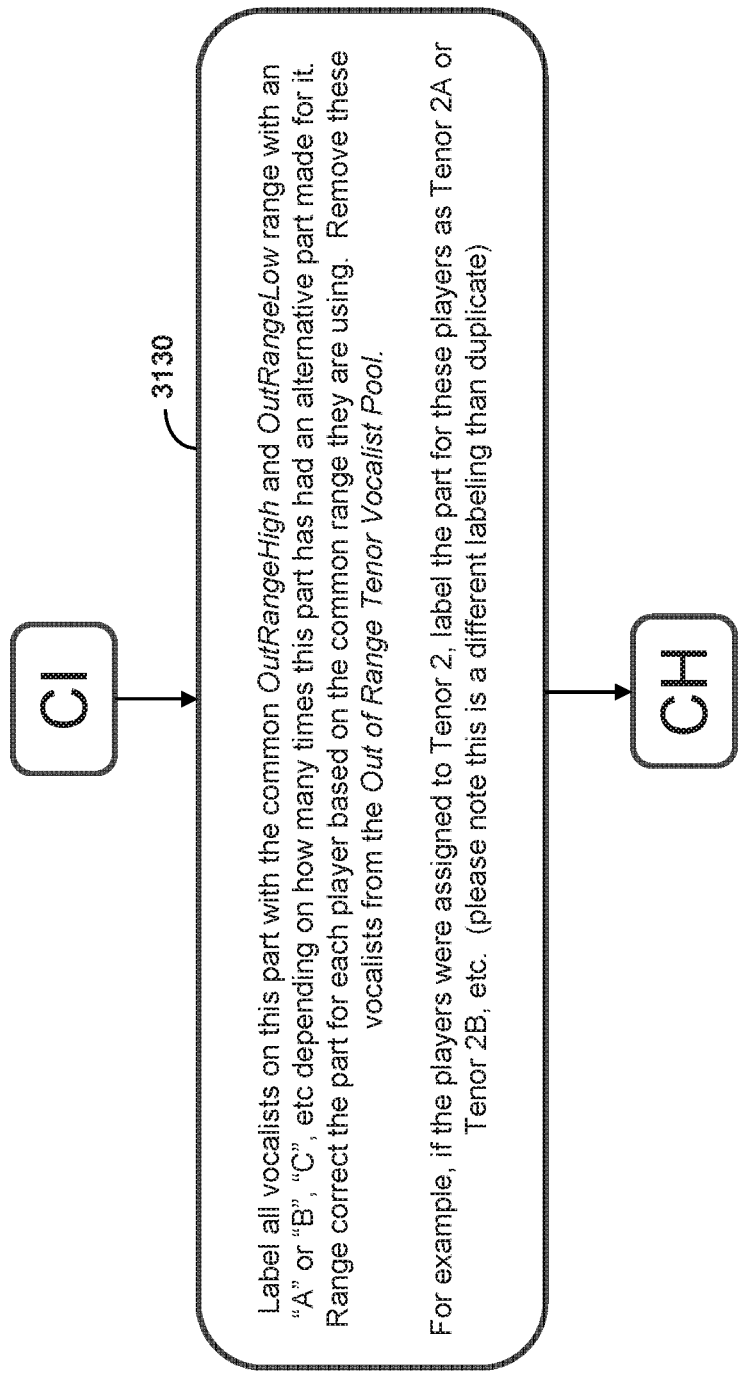
Figure 87:
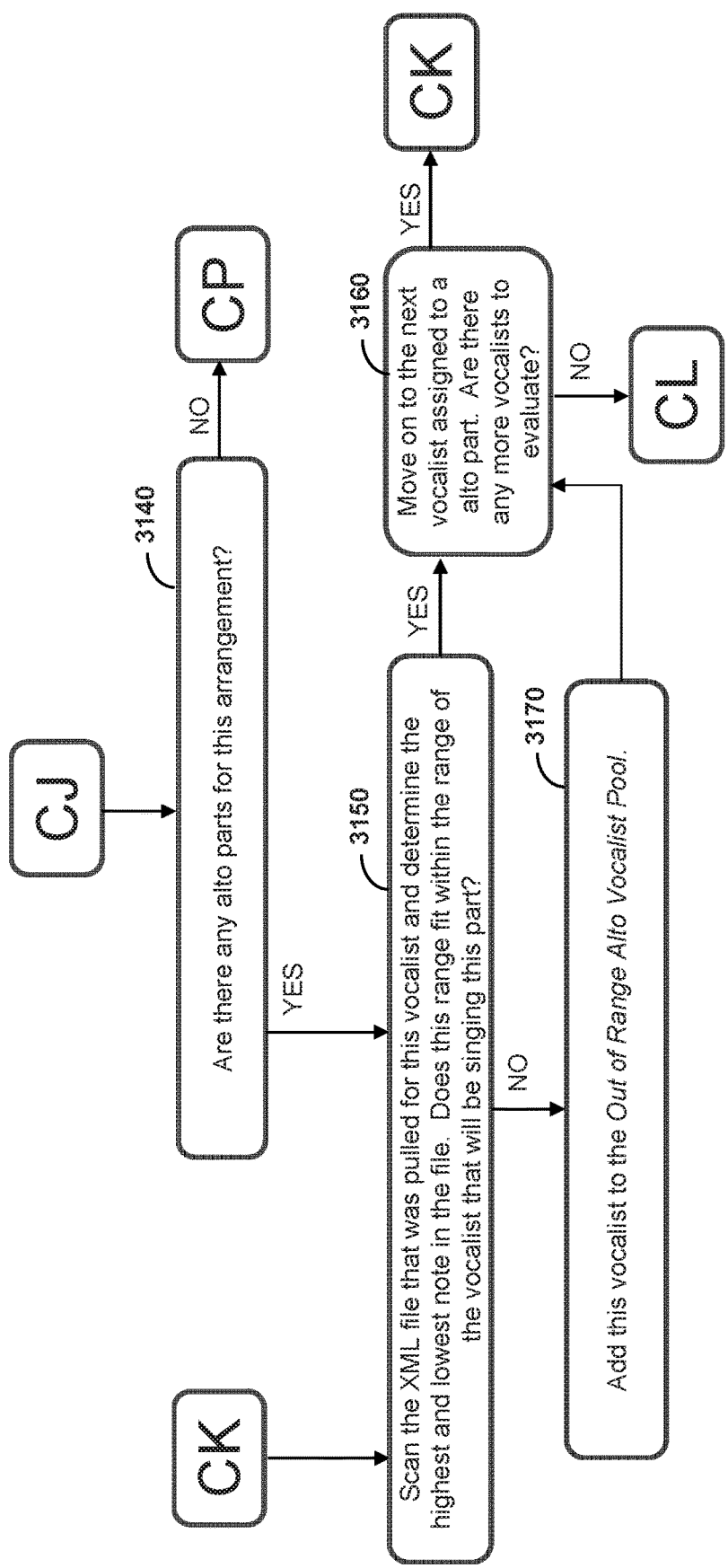
Figure 88:
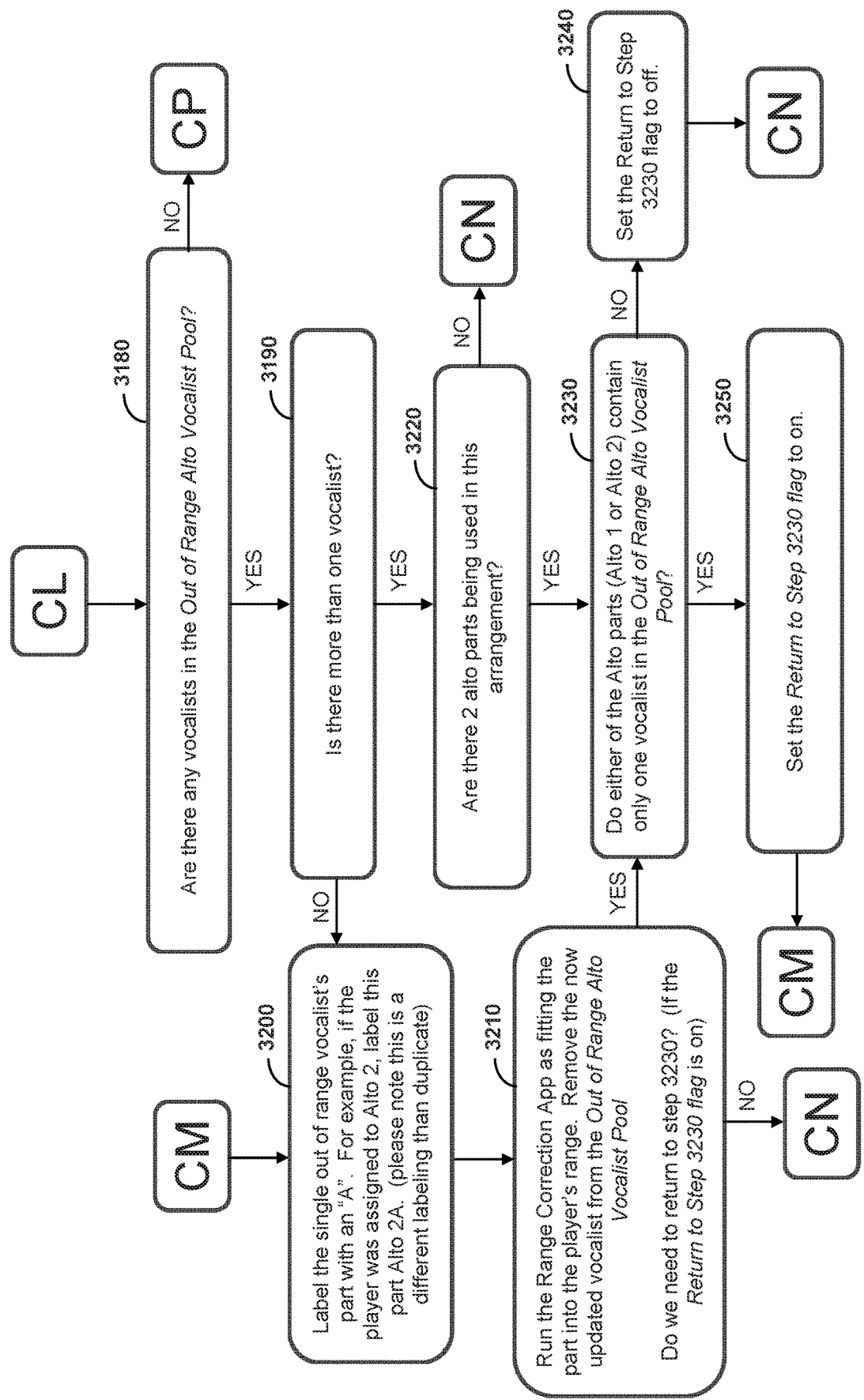
Figure 89:
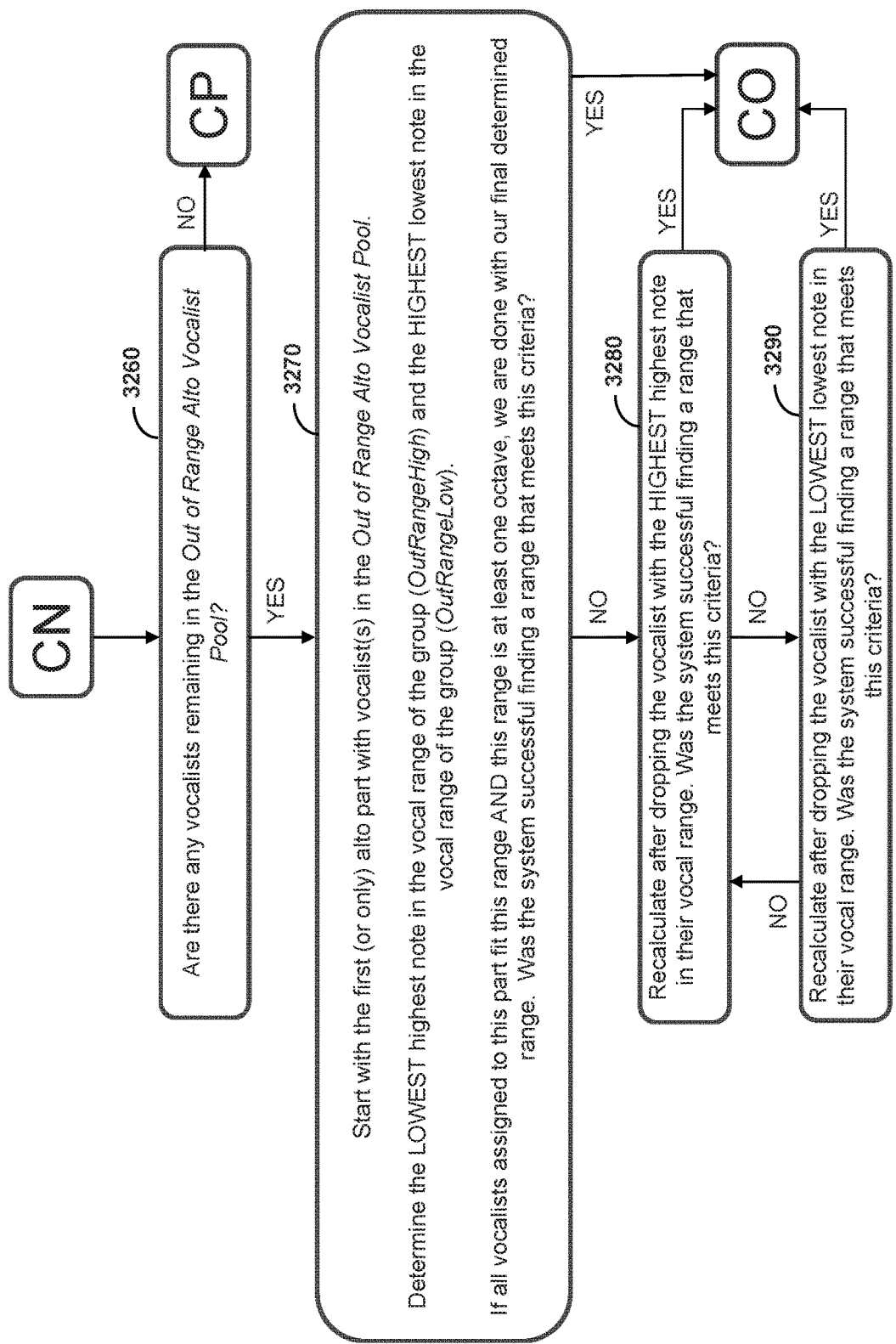
Figure 90:
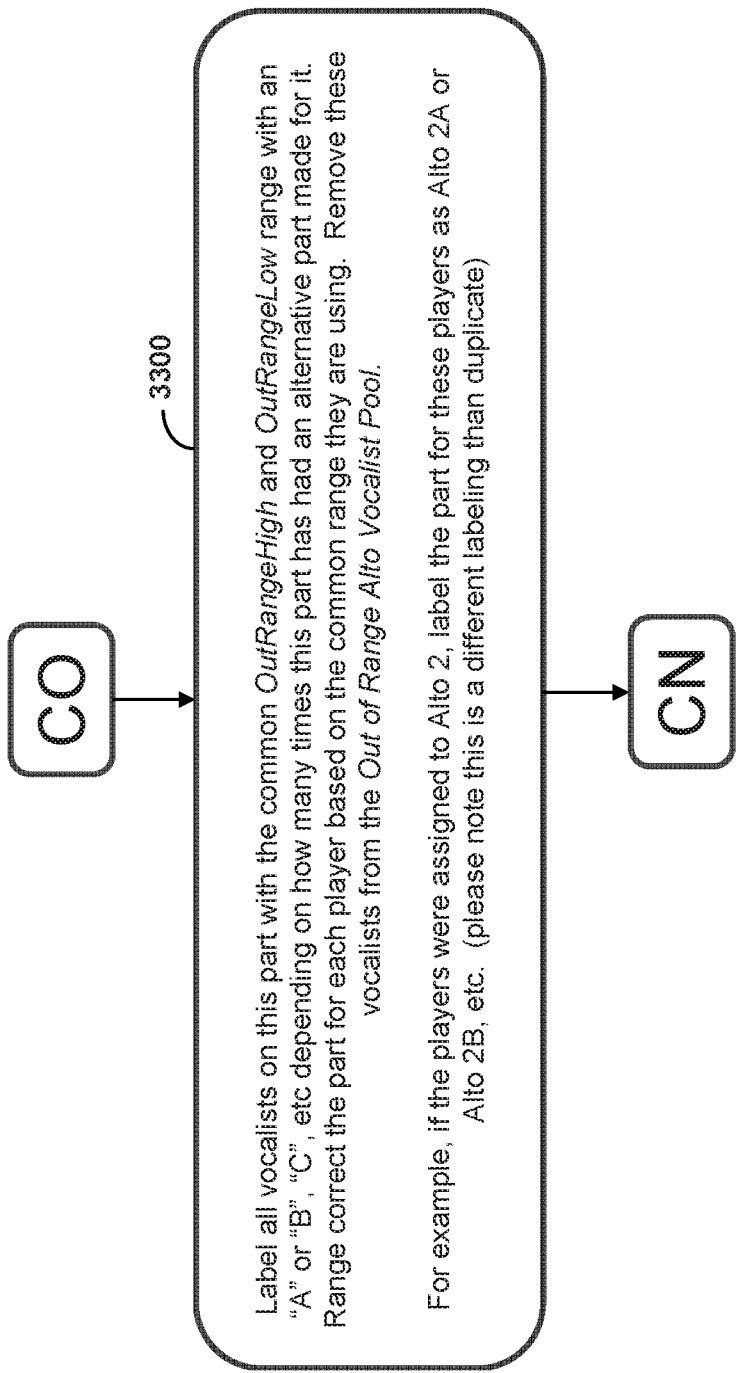
Figure 91:
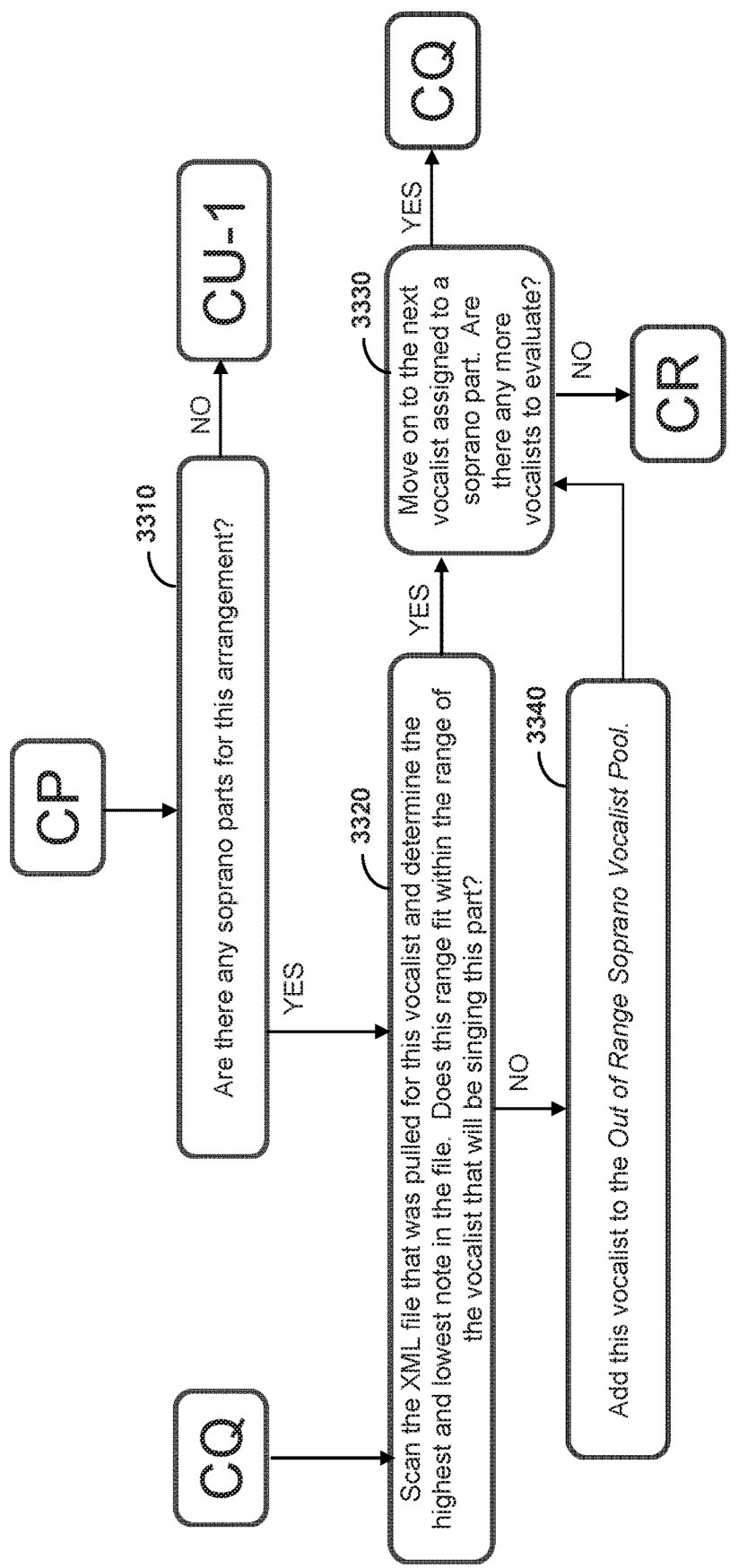
Figure 92:
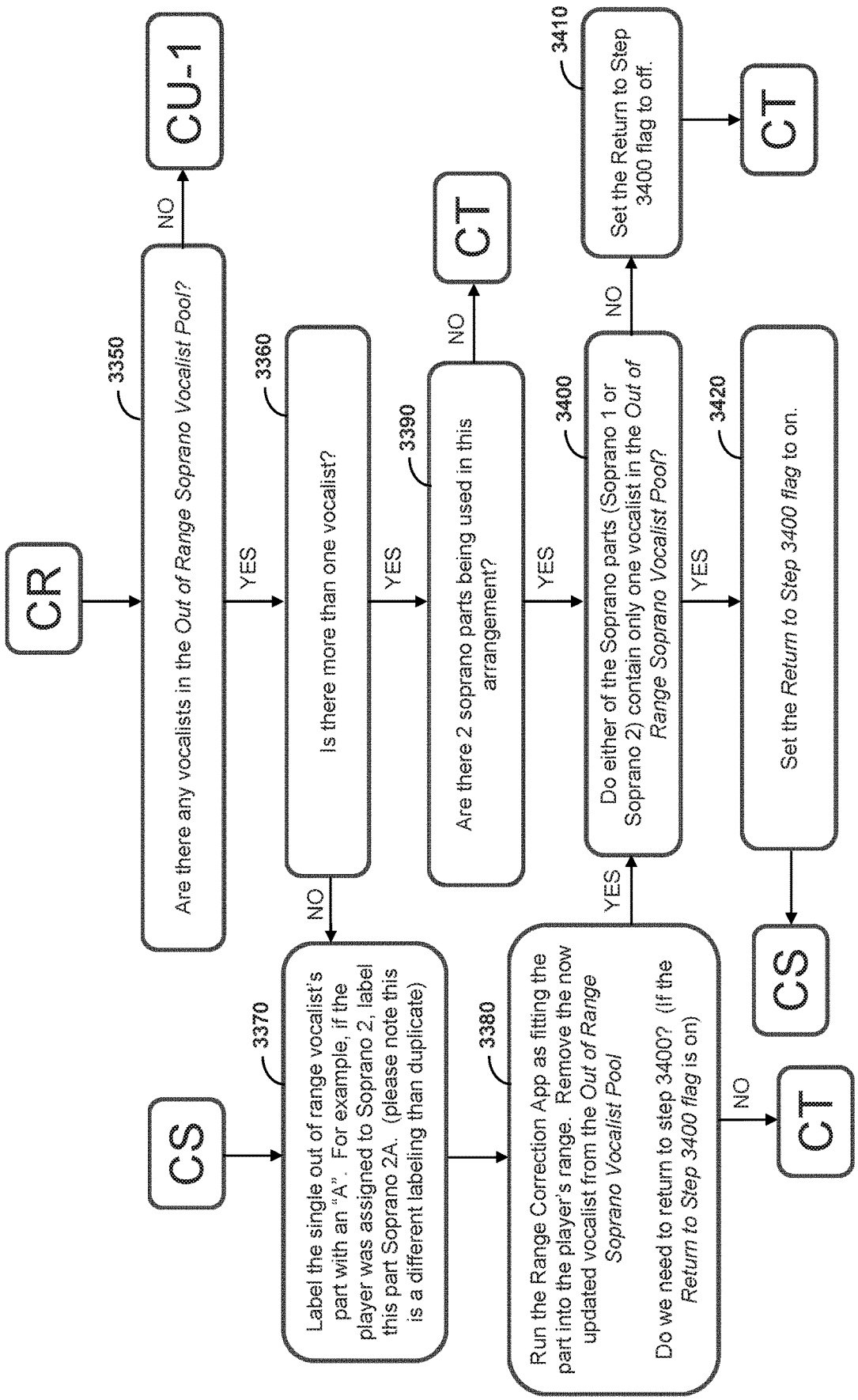
Figure 93:
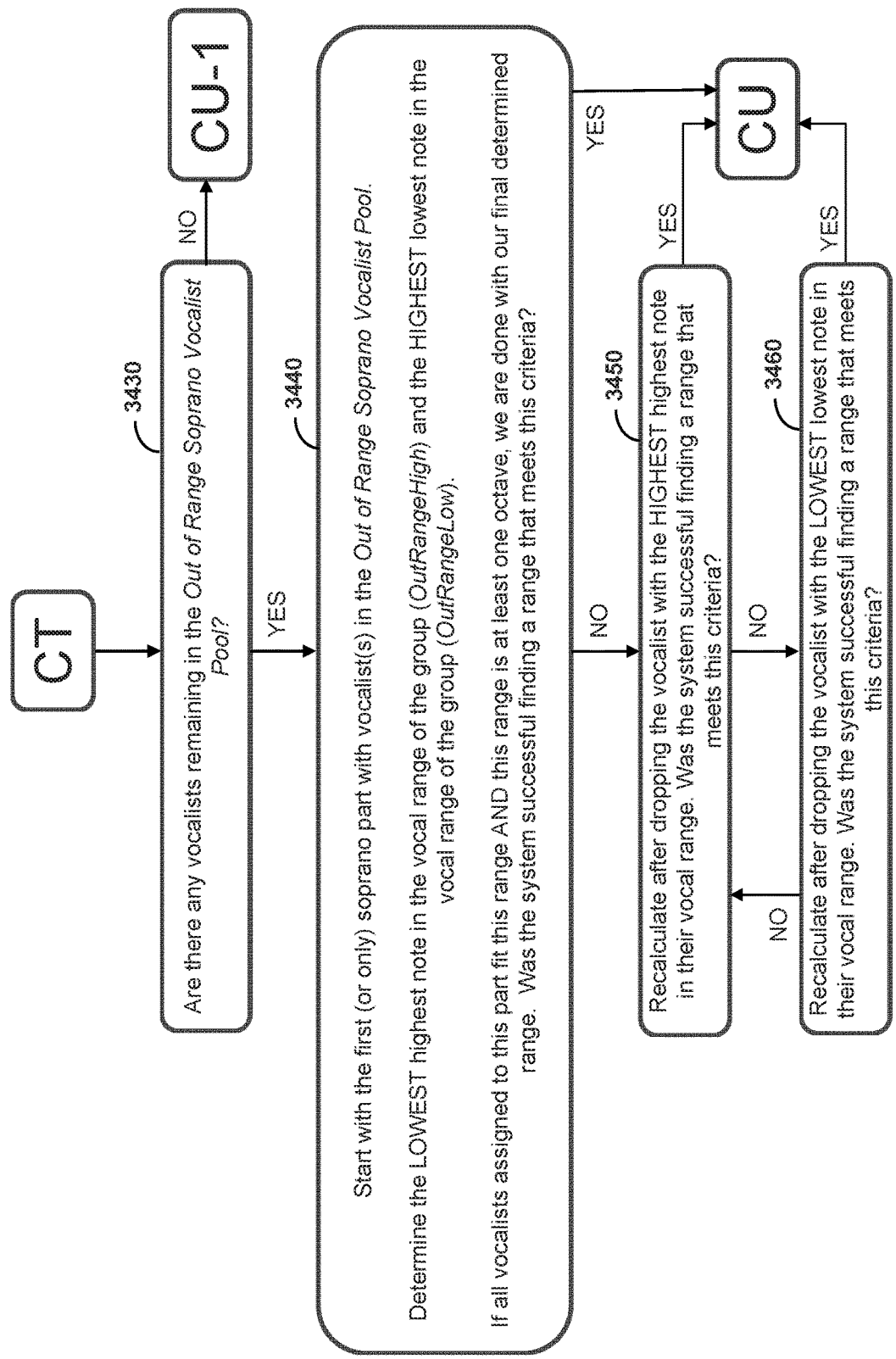
Figure 94:
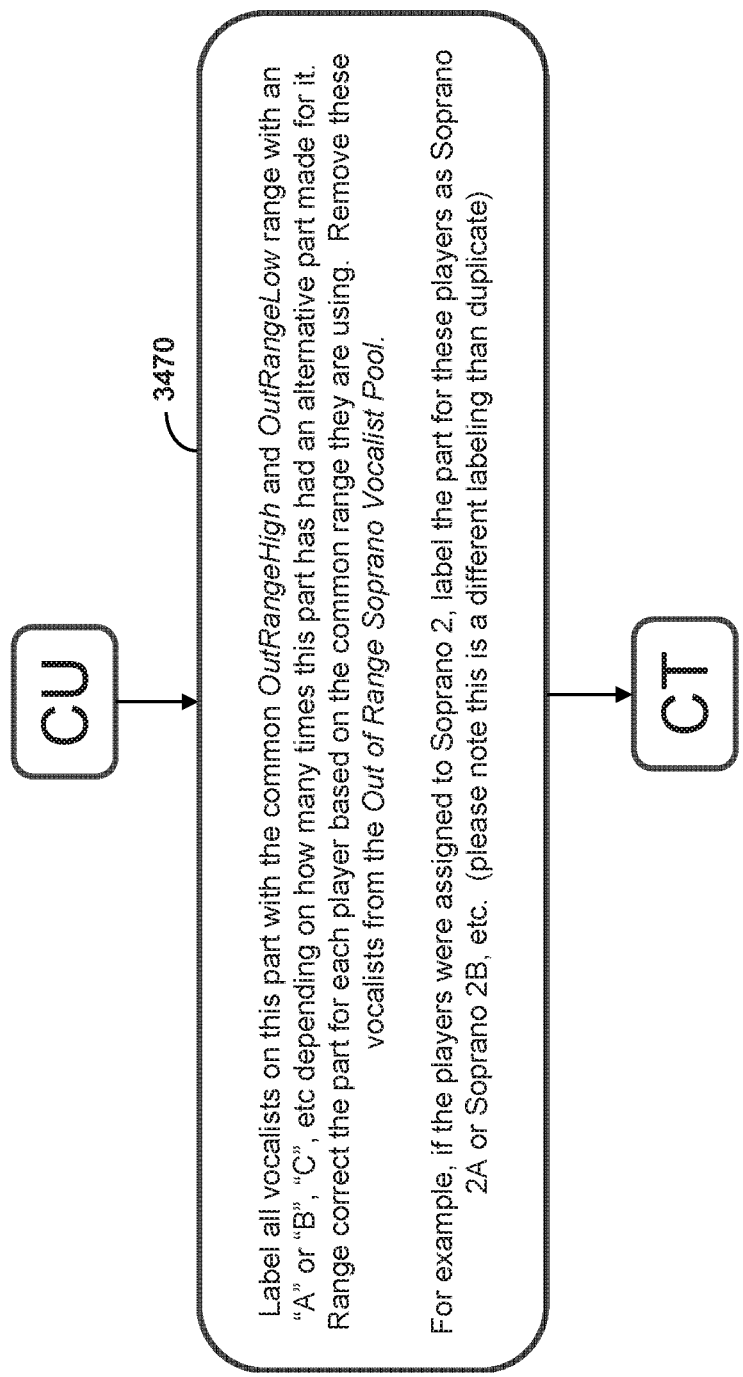
Figure 95:
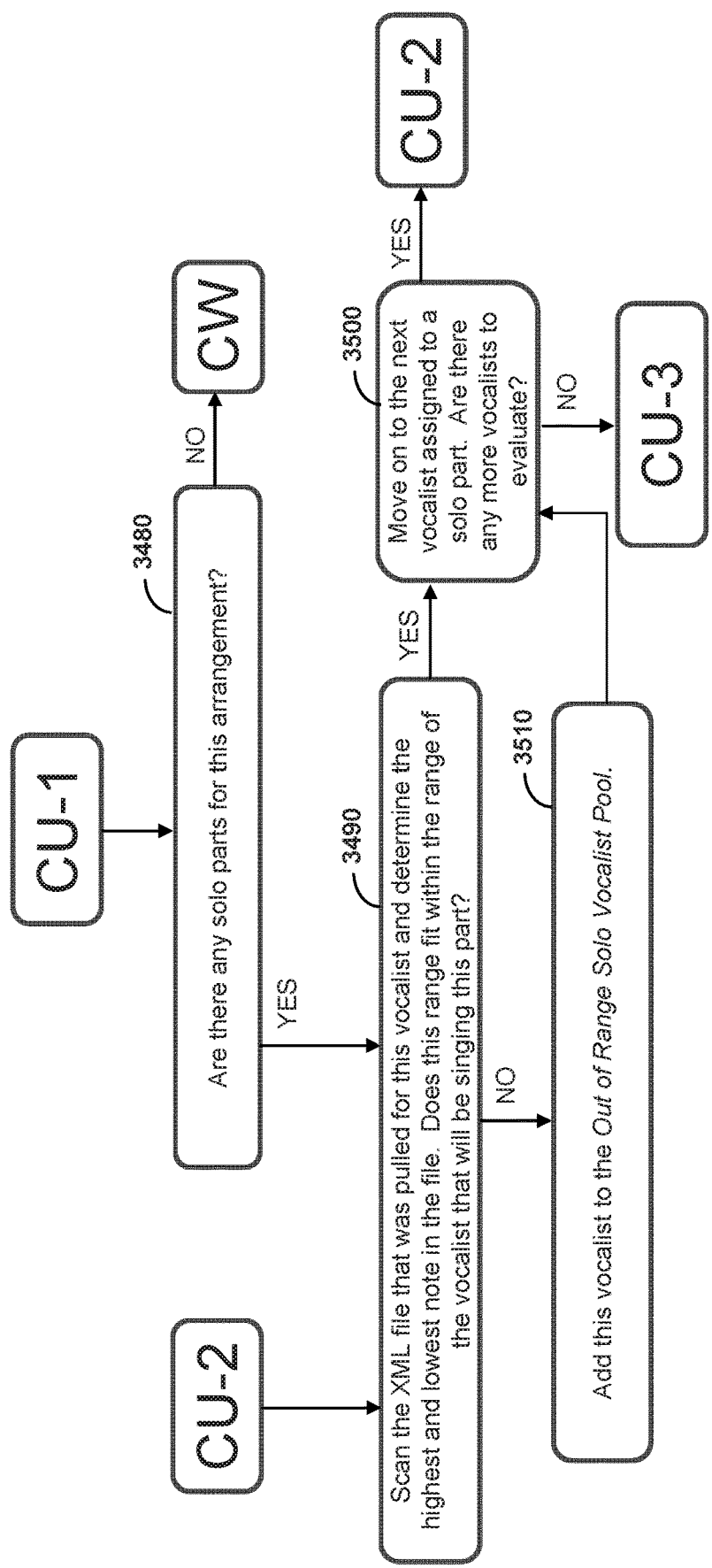
Figure 96:
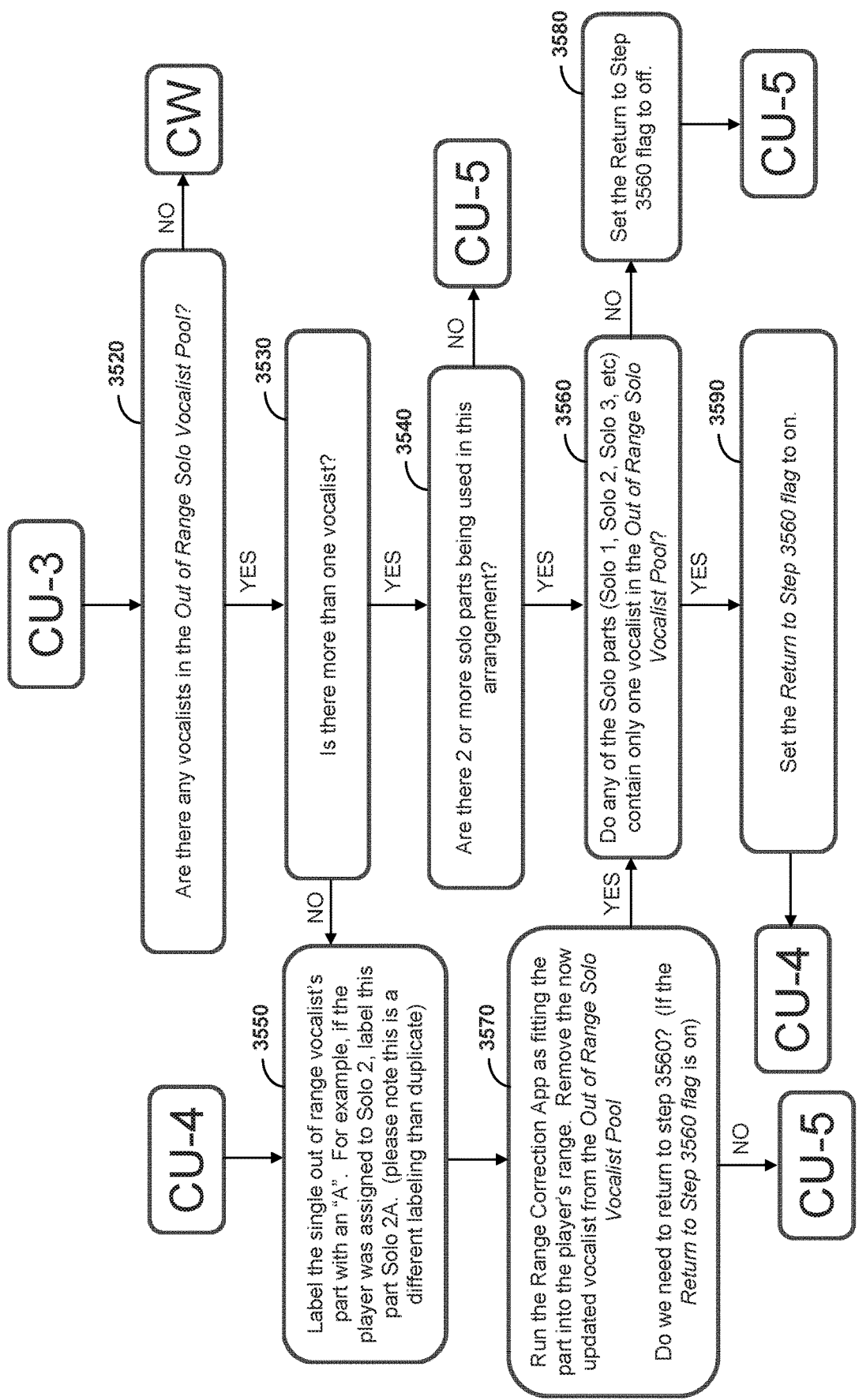
Figure 97:
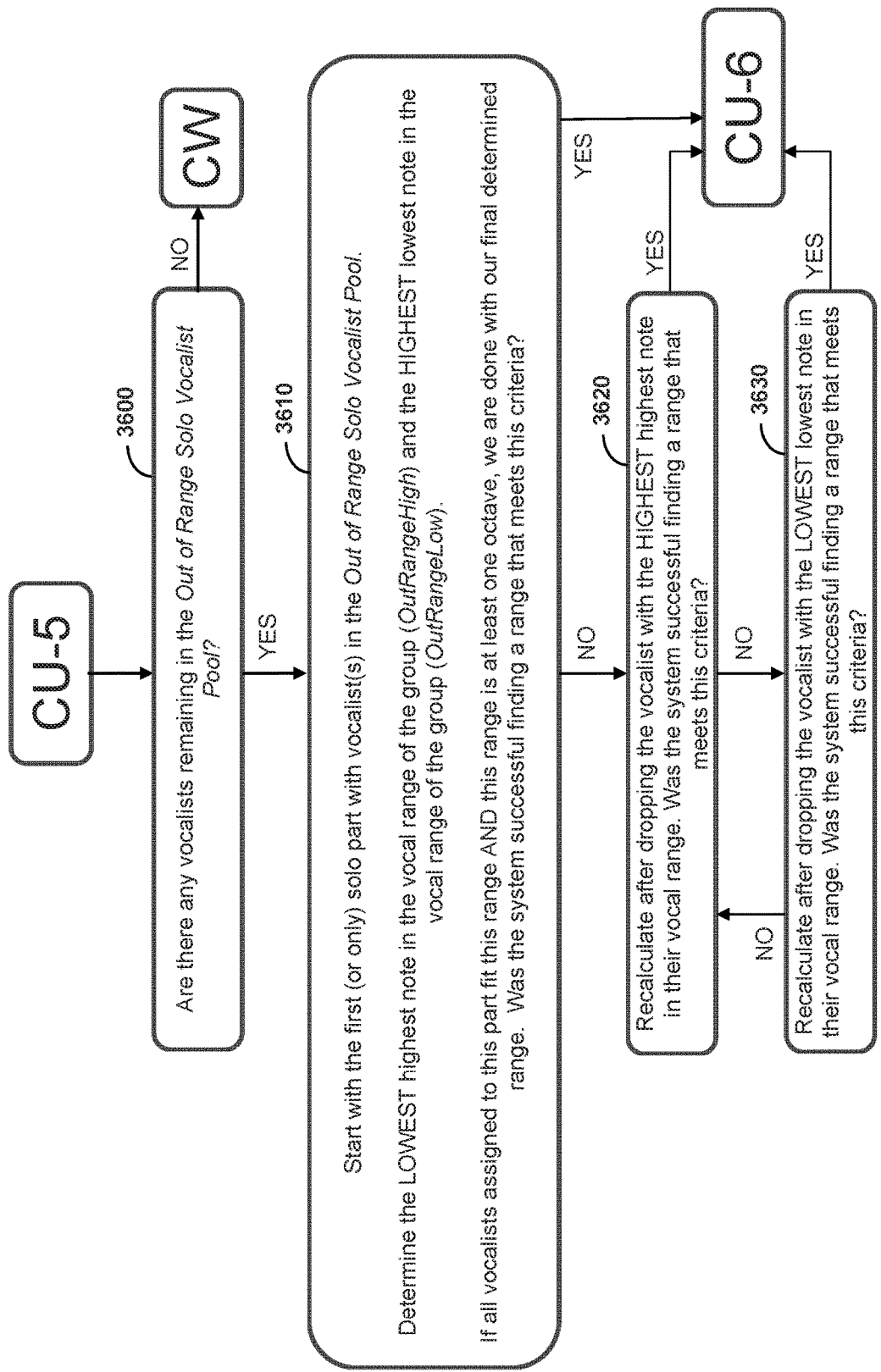
Figure 98:
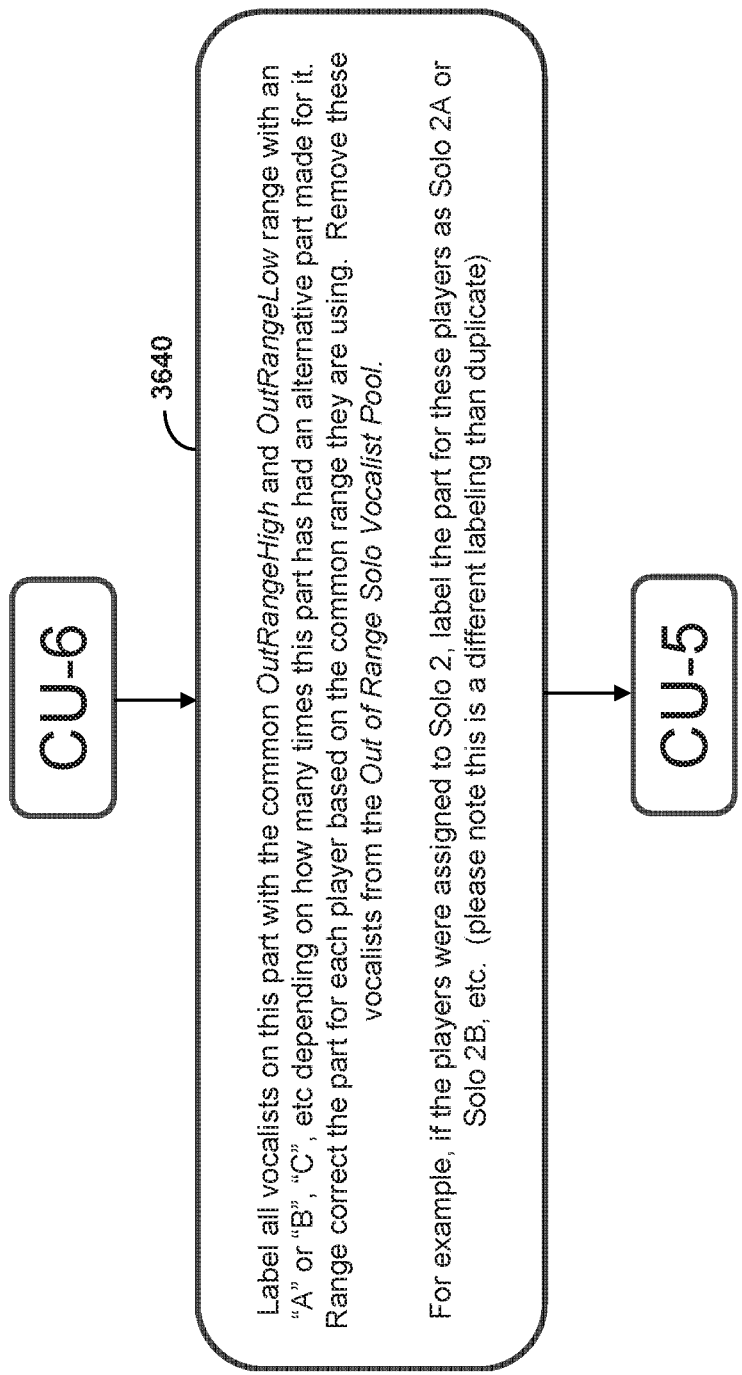

With the final arrangement type established, the system then determines the number of vocalists on each part and assigns them (FIG. 28, connector AH). After being assigned, the system surveys the parts (after any concert transposition) and determines the highest and lowest note of the part. It compares these parameters against each player assigned to the part and determining if further range processing will be required to make the part work. Alternate versions or "variants" of the part are stored that can be pre-range-corrected for a close alternative to the native part. This means tenors would have an alto and baritone variant. Bass parts would include a baritone alternative, and baritone parts would include a tenor and bass variant.

With the original or variant files selected for each player on each part, the system determines if any further range correction is necessary by comparing the vocalist's range to the range of the presented part. Parts that do not fit the assigned vocalist's range are adjusted through a range correction process.

After all transposition (FIG. 75, connector BR), variant selection (FIG. 60, connector BM), when necessary, and range correction (FIG. 75, connector BS), also when necessary, is complete, the parts are labeled. In the event there is only one part (such as tenor) versus more than one (such as "tenor 1" and "tenor 2"), the part will be labeled by its function only ("tenor"). All parts typically will be labeled starting with simply the part name (tenor 1 or tenor) and then any alternate versions are labeled alphabetically after that. In the event there are alternate versions of the part created due to range issues, it will read for example, "tenor 1A". The assignment process will designate which players are given the alphabetical variants versus what is considered the real part. Individual parts are labeled, for example, whether they are tenor 1 versus tenor 1A, and the conductor's score will contain all variations of all parts being used.

Exemplary System Configuration

Figure 161:
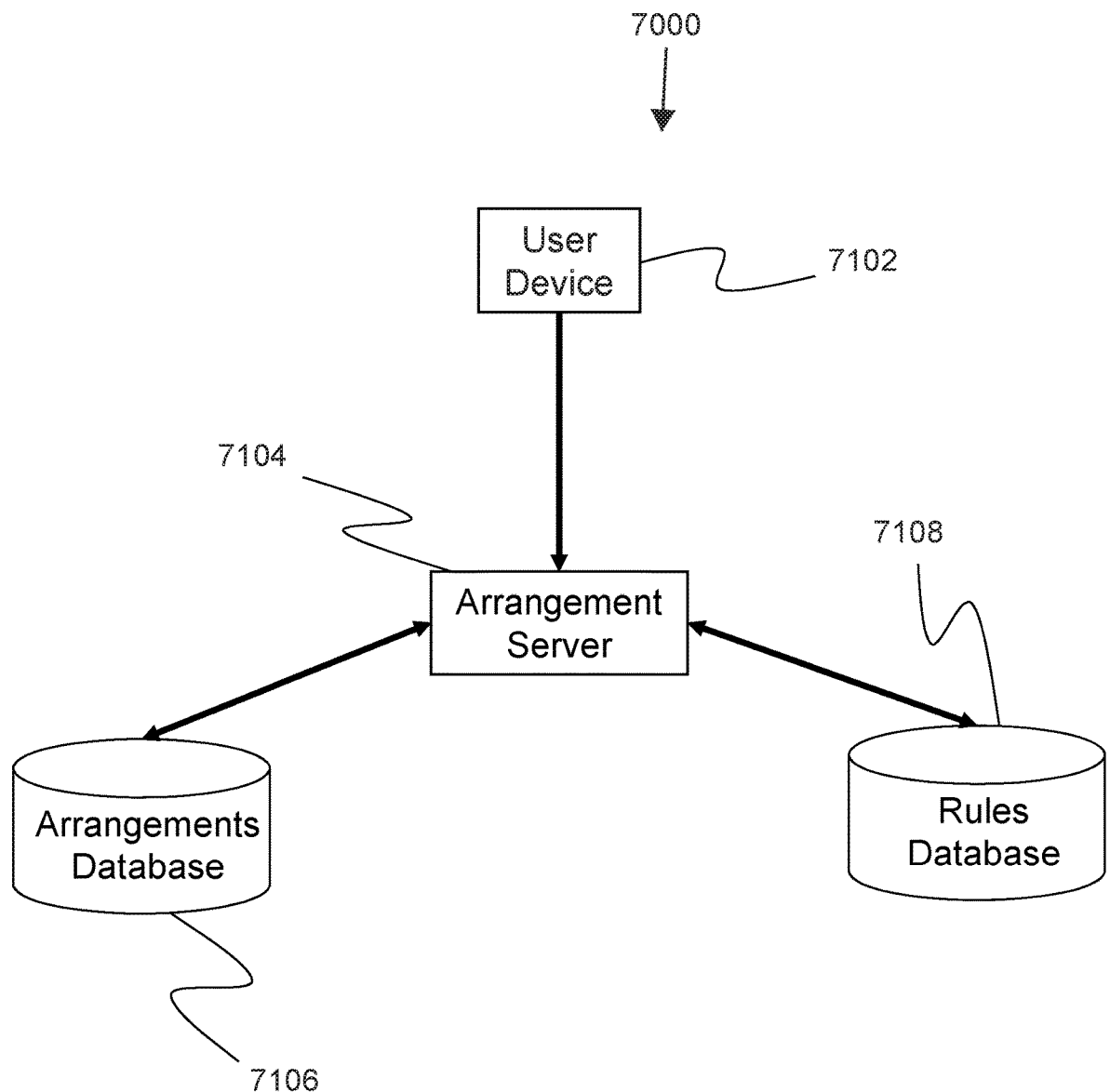
FIG. 161 is a block diagram illustrating aspects of a musical rhythm simplification system according to an embodiment of the present disclosure.

FIG. 161 illustrates one embodiment of a system 7000 that incorporate the disclosed vocal ensemble arrangement customization process, where a user utilizes a device 7102 to interface with an arrangement server 7104. A user interacts with the system through the user device 7102 to input the individual player or ensemble information at the user device 7102, select music and receive the resulting customized arrangements. The individual player or ensemble information and other information input by the user will then be transmitted to the arrangement server 7104. The user device 7102 may be any type of computing device, such as a desktop computer, laptop computer, tablet, smartphone or other electronic device. The user device 7102 may run an application locally on the user device or provide an internet browser-based interface run by arrangement server 7104 and displayed at user device 7102 through an internet browser application. User device 7102 may also include a simple interface device, such as a touchscreen monitor, which is operatively coupled with arrangement server 7104 and displays a graphical user interface from the arrangement server 7104 for display on the interface device and for interaction with the user.

The arrangement server 7104 will be responsible for receiving the individual player or ensemble information input by the user at the user device 7102 and creating the appropriate arrangements. The arrangement server 7104 may include one or more computing devices, as described below, and will also be connected with one or more databases which store the arrangements, arrangement rules and received input information. In one embodiment, an arrangements database 7106 is connected with the arrangement server 7104 and stores information on all of the possible musical selections and arrangements for each musical selection. A rules database 7108 may store the rules described above for selecting a particular arrangement for a particular ensemble, vocal part in the arrangement, range correction logic, and any other relevant criteria utilized for selecting the appropriate arrangement based on the input ensemble information. It should be understood that the information stored in the arrangements database 7106 and the rules database may be stored in a single database and utilize multiple relational database tables. Additional databases and/or database tables may be utilized to store additional information understood by one of skill in the art, such as user account information, rights information, graphical user interface data, etc.

The arrangement server 7104 may then be configured to output the customized music arrangements to the user device 7102, where the user can view, print, download or otherwise receive the arrangements. In one embodiment, the arrangement server 7104 may be connected with a plurality of user devices such that each vocalist in the ensemble has a user device (such as a tablet or monitor) which will display their own customized arrangement. This embodiment can also apply to individual players not part of an ensemble. Thus, the arrangements could be created and displayed to the members of the ensemble or individual players not part of an ensemble on their user devices in real-time.

Computer-Implemented Embodiment

Figure 162:
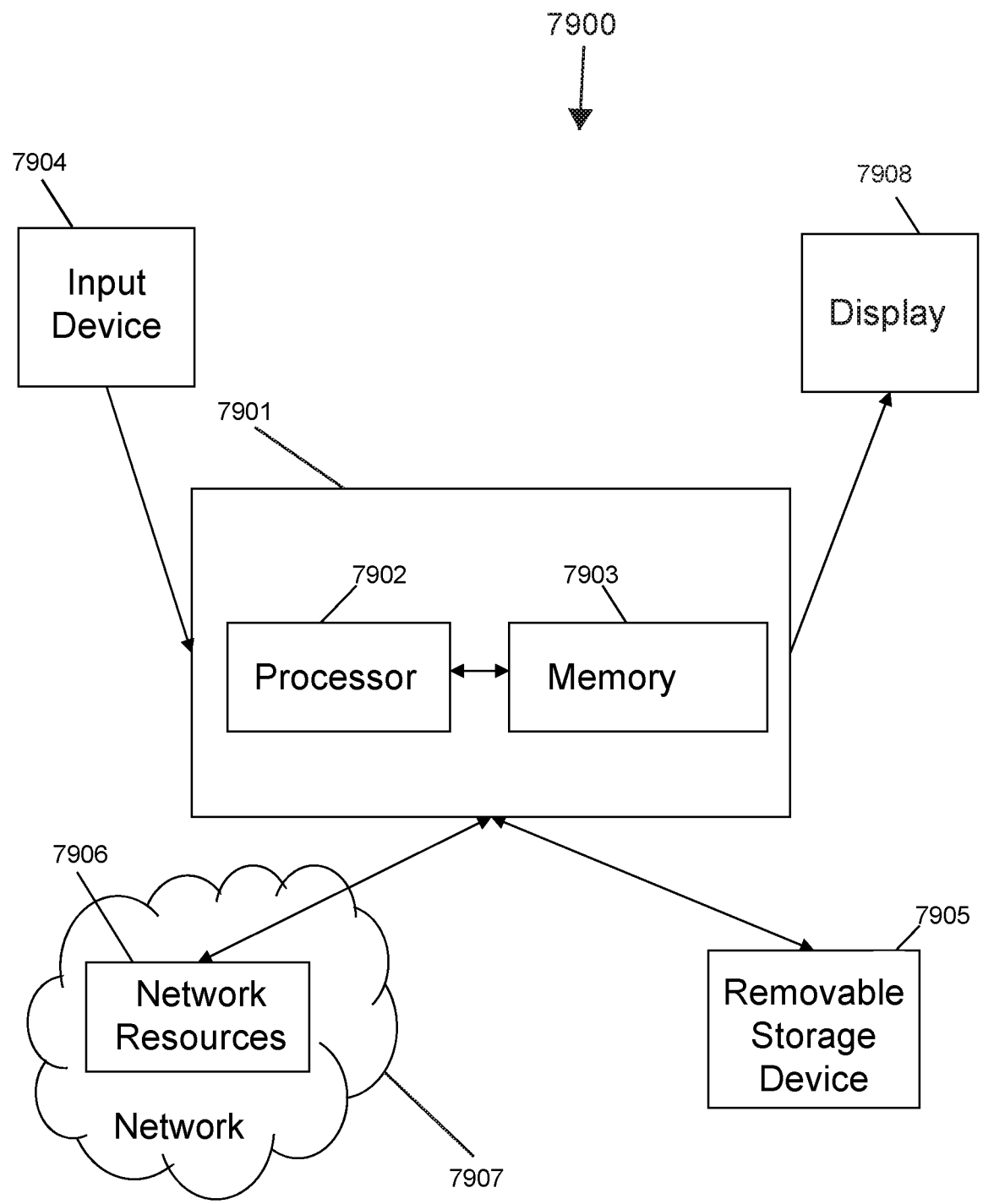
FIG. 162 is a block diagram that illustrates other aspects of a musical rhythm simplification system according to an embodiment of the present disclosure.

FIG. 162 is a block diagram that illustrates an embodiment of a computer/server system 7900 upon which an embodiment of the inventive methodology may be implemented. The system 7900 includes a computer/server platform 7901 including a processor 7902 and memory 7903 which operate to execute instructions, as known to one of skill in the art. The term "computer-readable storage medium" as used herein refers to any tangible medium, such as a disk or semiconductor memory, that participates in providing instructions to processor 7902 for execution. Additionally, the computer platform 7901 receives input from a plurality of input devices 7904, such as a keyboard, mouse, touch device or verbal command. The computer platform 7901 may additionally be connected to a removable storage device 7905, such as a portable hard drive, optical media (CD or DVD), disk media or any other tangible medium from which a computer can read executable code. The computer platform may further be connected to network resources 7906 which connect to the Internet or other components of a local public or private network. The network resources 7906 may provide instructions and data to the computer platform from a remote location on a network 7907. The connections to the network resources 7906 may be via wireless protocols, such as the WiFi 802.11 standards, Bluetooth® or cellular protocols, or via physical transmission media, such as cables or fiber optics. The network resources may include storage devices for storing data and executable instructions at a location separate from the computer platform 7901. The computer interacts with a display 7908 to output data and other information to a user, as well as to request additional instructions and input from the user.

The display 7908 may therefore further act as an input device 7904 for interacting with a user.

While various embodiments have been described above, it should be understood that they have been presented by way of example only, and not of limitation. The breadth and scope should not be limited by any of the above-described exemplary embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this disclosure, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method of customizing a vocal ensemble arrangement, comprising:
    providing a database storing alternative arrangements of a musical selection, each alternative arrangement having a different set of vocal parts;
    determining a target arrangement type having the ideal number of vocal parts for the musical selection based on the individual vocal ranges of a selected ensemble of vocalists;
    querying the database to determine whether a stored alternative arrangement matches the target arrangement type;
    changing the target arrangement type to a stored arrangement type in accordance with a predetermined substitution rule if no stored alternative arrangement matches the target arrangement type;
    assigning each vocalist of the ensemble to a vocal part based on the vocal range of the vocalist and the range of the part being assigned; and
    generating individual scores for each vocal part.

2. The method in accordance with claim 1, wherein the assigning further comprises:
    determining whether the vocal part being assigned includes at least one variation part,
    wherein the assigning is further based upon the vocal range of the vocalist and the range of the variation part.

3. The method in accordance with claim 1, further comprising:
    range-correcting the assigned part in response to a determination that determining whether one or more notes of an assigned part are outside the range of the assigned vocalist;
    creating a new part from the range-corrected part; and
    re-assigning the vocalist to the newly created range-corrected part.

4. The method in accordance with claim 1, further comprising:
    generating an accompaniment score comprising at least one accompanying instrument part and at least one vocal part, wherein the accompaniment instrument part is selected from the group consisting of a standard notation version, a slash version, and a lead sheet version.

5. The method in accordance with claim 1, further comprising:
    determining the ratio of the number of vocalists assigned to a first part to the sum of the number of vocalists assigned to the first part and the number of vocalists assigned to second part that is contiguous to the first part, and if the ratio is less than a predetermined percentage:
    re-assigning the vocalists from the first part to the second part; and
    eliminating the first part.

6. The method in accordance with claim 5, wherein the predetermined percentage is 25%.

7. The method in accordance with claim 5 where the first part is lower than the second part, comprising:
    re-assigning a vocalist from first part to the second part if a highest note of the first part corresponds to a highest note of the vocalist's range.

8. The method in accordance with claim 5 where the first part is higher than the second part, comprising:
    re-assigning a vocalist from first part to the second part if a lowest note of the first part corresponds to a lowest note of the vocalist's range.

9. The method in accordance with claim 1, further comprising:
    determining which key encompasses the greatest number of individual vocalists' ranges; and
    transposing the arrangement to the determined key.

10. The method in accordance with claim 1, wherein the individual scores for each vocal part includes the primary vocal part and at least one other representative vocal part of another section of the ensemble.

11. A system for customizing a vocal ensemble arrangement, comprising:
    a database storing alternative arrangements of a musical selection, each alternative arrangement having a different set of vocal parts;
    a processor in communication with the database;
    a memory operatively coupled to the processor and storing executable instructions, which, when executed by the processor, cause the processor to:
    determine a target arrangement type having the ideal number of vocal parts for the musical selection based on the individual vocal ranges of a selected ensemble of vocalists;
    query the database to determine whether a stored alternative arrangement matches the target arrangement type;
    change the target arrangement type to a stored arrangement type in accordance with a predetermined substitution rule if no stored alternative arrangement matches the target arrangement type;
    assign each vocalist of the ensemble to a vocal part based on the vocal range of the vocalist and the range of the part being assigned; and
    generate individual scores for each vocal part.

12. The system in accordance with claim 11, wherein the memory further includes instructions which, when executed by the processor, cause the processor to:

determine whether the vocal part being assigned includes at least one variation part, wherein the assigning is further based upon the vocal range of the vocalist and the range of the variation part.

13. The system in accordance with claim 11, wherein the memory further includes instructions which, when executed by the processor, cause the processor to:

range-correct the assigned part in response to a determination that determining whether one or more notes of an assigned part are outside the range of the assigned vocalist;

create a new part from the range-corrected part; and re-assign the vocalist to the newly created range-corrected part.

14. The system in accordance with claim 11, wherein the memory further includes instructions which, when executed by the processor, cause the processor to generate an accompaniment score comprising at least one accompanying instrument part and at least one vocal part, wherein the accompaniment instrument part is selected from the group consisting of a standard notation version, a slash version, and a lead sheet version.

15. The system in accordance with claim 11, wherein the memory further includes instructions which, when executed by the processor, cause the processor to determine the ratio of the number of vocalists assigned to a first part to the sum of the number of vocalists assigned to the first part and the number of vocalists assigned to second part that is contiguous to the first part, and if the ratio is less than a predetermined percentage:

re-assign the vocalists from the first part to the second part; and eliminate the first part.

16. The system in accordance with claim 15, wherein the predetermined percentage is 25%.

17. The system in accordance with claim 15, wherein the memory further includes instructions which, when executed by the processor, cause the processor to re-assign a vocalist from first part to the second part if a highest note of the first part corresponds to a highest note of the vocalist's range and the first part is lower than the second part.

18. The system in accordance with claim 15, wherein the memory further includes instructions which, when executed by the processor, cause the processor to re-assign a vocalist from first part to the second part if a lowest note of the first part corresponds to a lowest note of the vocalist's range and the first part is higher than the second part.

19. The system in accordance with claim 11, wherein the memory further includes instructions which, when executed by the processor, cause the processor to:

determine which key encompasses the greatest number of individual vocalists' ranges; and transpose the arrangement to the determined key.

20. The system in accordance with claim 11, wherein the memory further includes instructions which, when executed by the processor, cause the processor to include a primary vocal part and at least one other representative vocal part of another section of the ensemble in the generated score.

\* \* \* \* \*